US009551867B1

(12) United States Patent
Grabowski et al.

(10) Patent No.: US 9,551,867 B1
(45) Date of Patent: Jan. 24, 2017

(54) HEAD-UP DISPLAY

(71) Applicant: Making Virtual Solid, LLC, New Milford, NJ (US)

(72) Inventors: Christopher T. Grabowski, San Jose, CA (US); Thomas Zamojdo, San Jose, CA (US)

(*) Notice: Subject to any disclaimer, the term of this patent is extended or adjusted under 35 U.S.C. 154(b) by 183 days.

(21) Appl. No.: 13/967,528

(22) Filed: Aug. 15, 2013

Related U.S. Application Data

(63) Continuation of application No. 10/593,138, filed on Sep. 8, 2008, now Pat. No. 8,521,411, which is a continuation of application No. PCT/US2005/019446, filed on May 28, 2005.

(60) Provisional application No. 60/577,001, filed on Jun. 3, 2004.

(51) Int. Cl.
*G05D 1/00* (2006.01)
*G02B 27/01* (2006.01)

(52) U.S. Cl.
CPC ................ *G02B 27/0101* (2013.01)

(58) Field of Classification Search
CPC ..... G02B 27/01; G02B 27/017; G01C 21/365; B60K 2350/2052

USPC ............................................. 701/2
See application file for complete search history.

(56) References Cited

U.S. PATENT DOCUMENTS

| 8,384,730 | B1 * | 2/2013 | VanDerKamp | G01C 23/00 340/945 |
| 2002/0049532 | A1 * | 4/2002 | Nakamura | 701/208 |
| 2002/0049534 | A1 * | 4/2002 | Yuda et al. | 701/209 |
| 2005/0093818 | A1 * | 5/2005 | Hatam-Tabrizi et al. | 345/156 |
| 2015/0355461 | A1 * | 12/2015 | Kessler | G02B 27/0103 359/631 |

\* cited by examiner

*Primary Examiner* — Reginald R Reyes
(74) *Attorney, Agent, or Firm* — Capitol Patent & Trademark Law Firm, PLLC

(57) ABSTRACT

In an en-route navigation system such as for a vehicle, an image of a cable is presented as a navigation object in a head-up display to indicate a route that the vehicle should follow. The head-up display may comprise a projection screen, light projector apparatus configured to project one or more images onto the projection screen, viewing optics and a computer, wherein the projection screen is moveable under control of the computer in such a way as to adjust positions of the projection screen and to thereby adjust the distance between the projection screen and the viewing optics during at least a portion each of a succession of refresh periods.

11 Claims, 80 Drawing Sheets

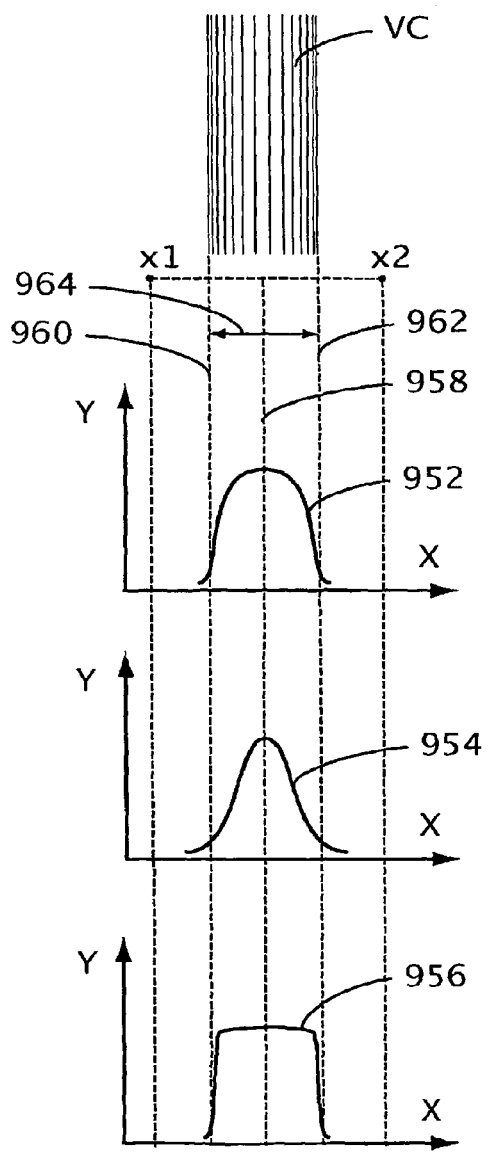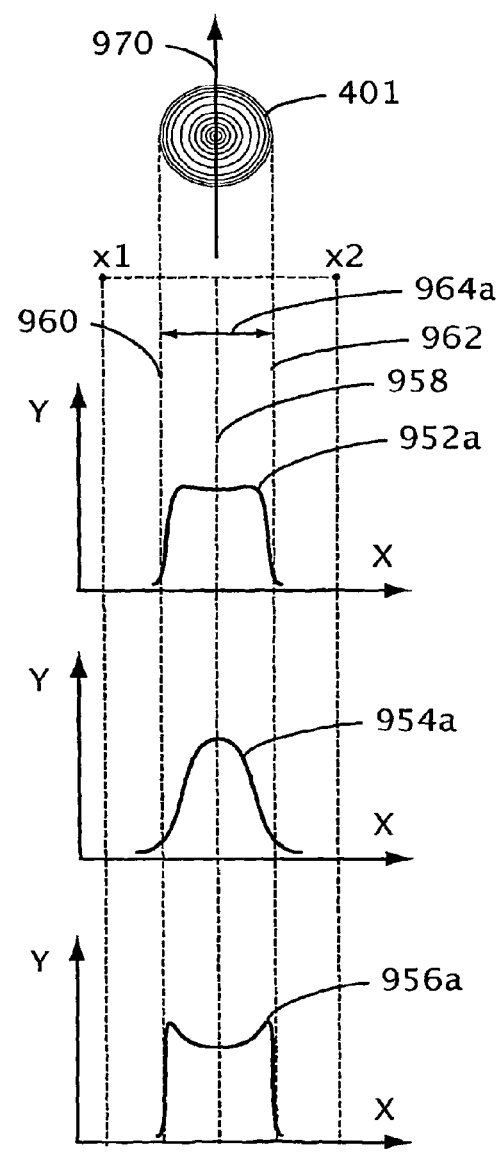

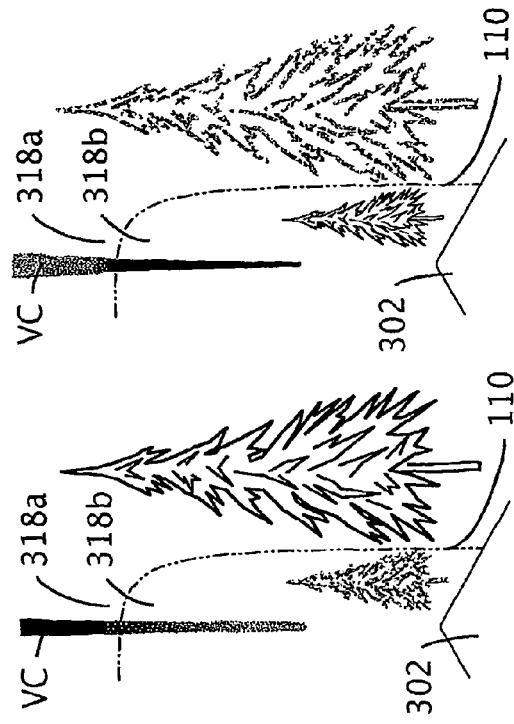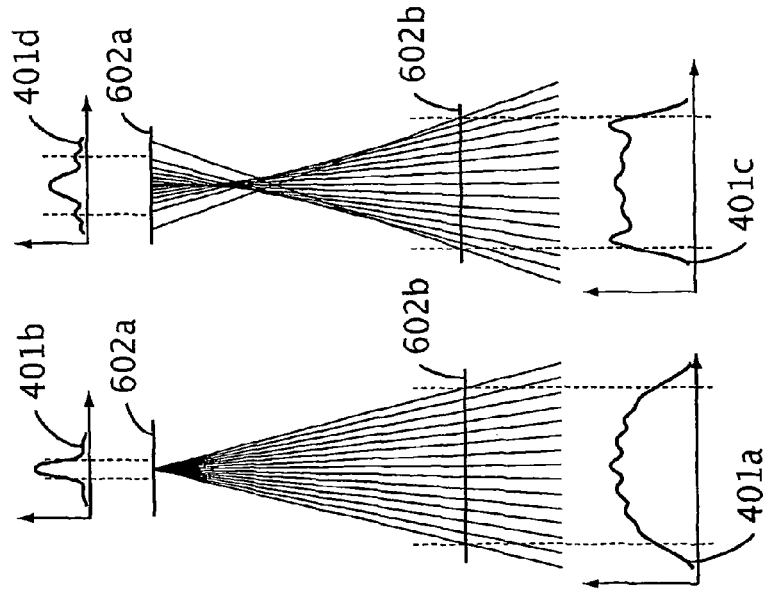

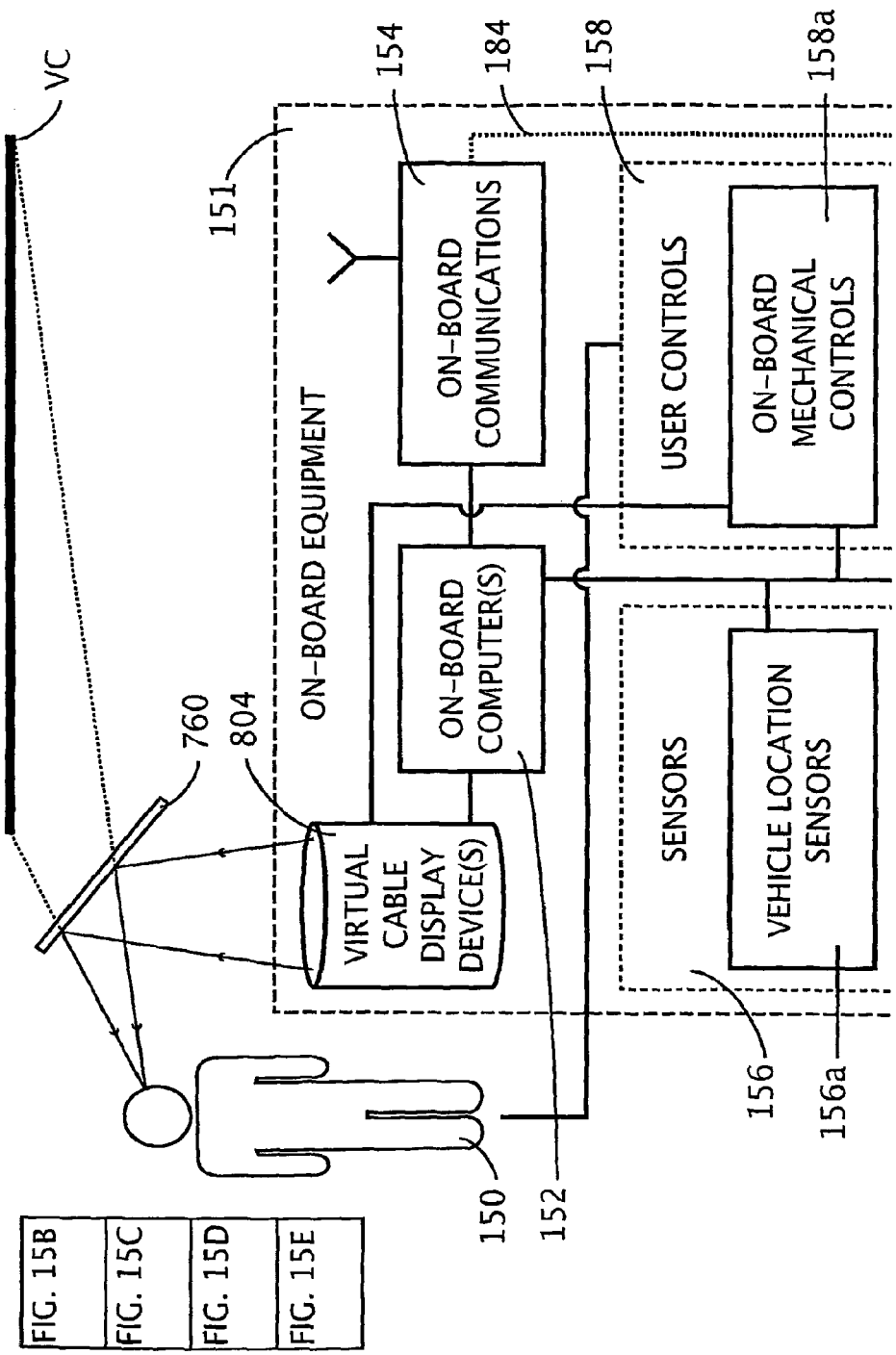

Fig. 36A
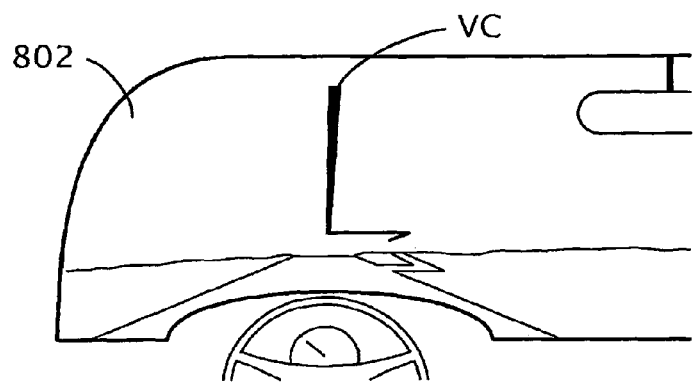
Fig. 36B  Fig. 36C  Fig. 36D
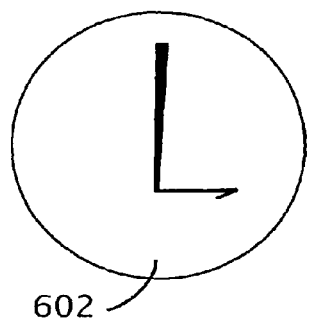 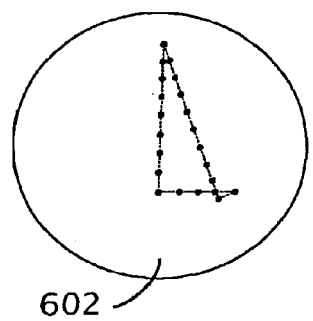 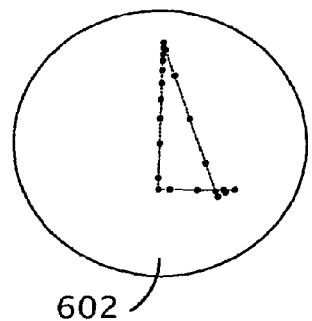

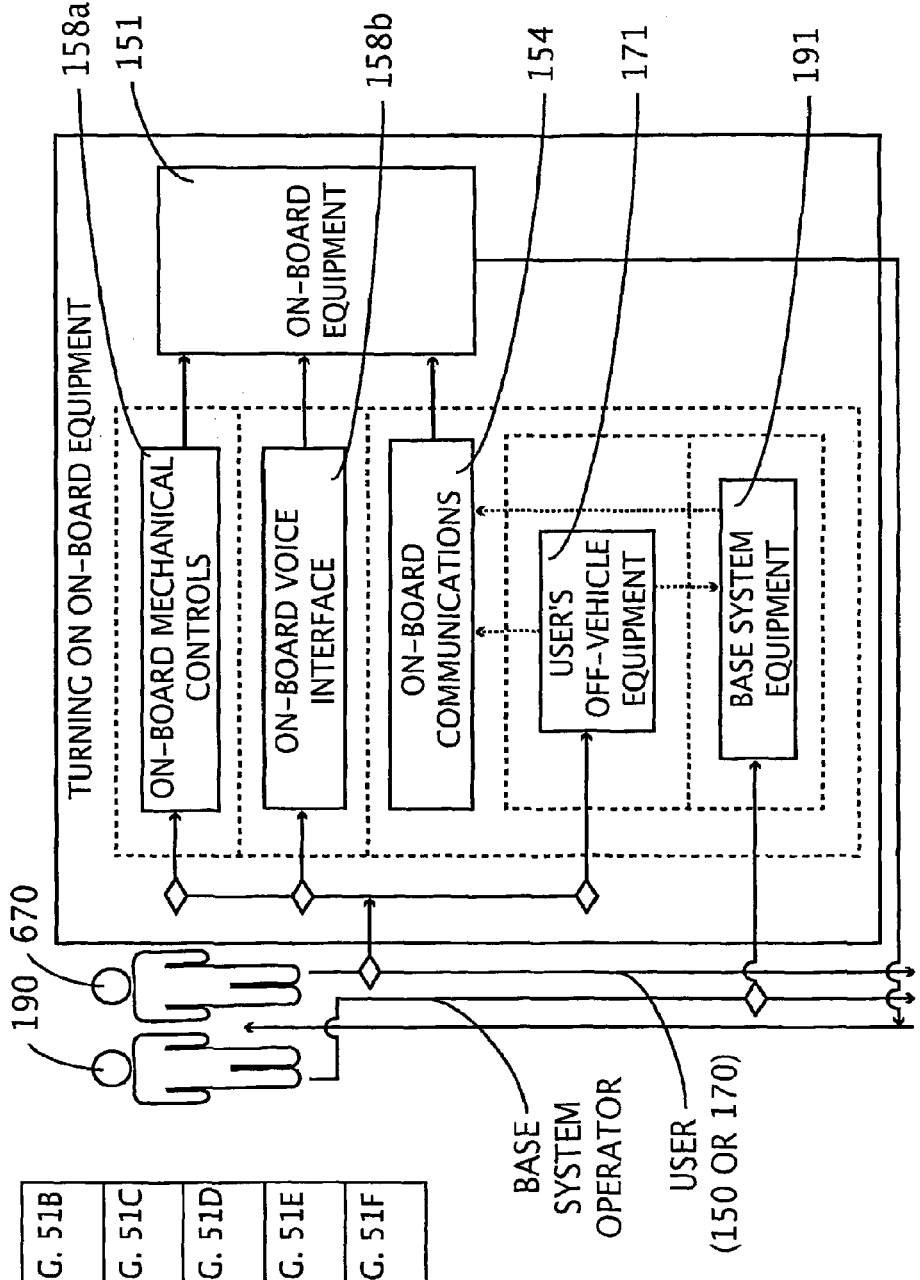

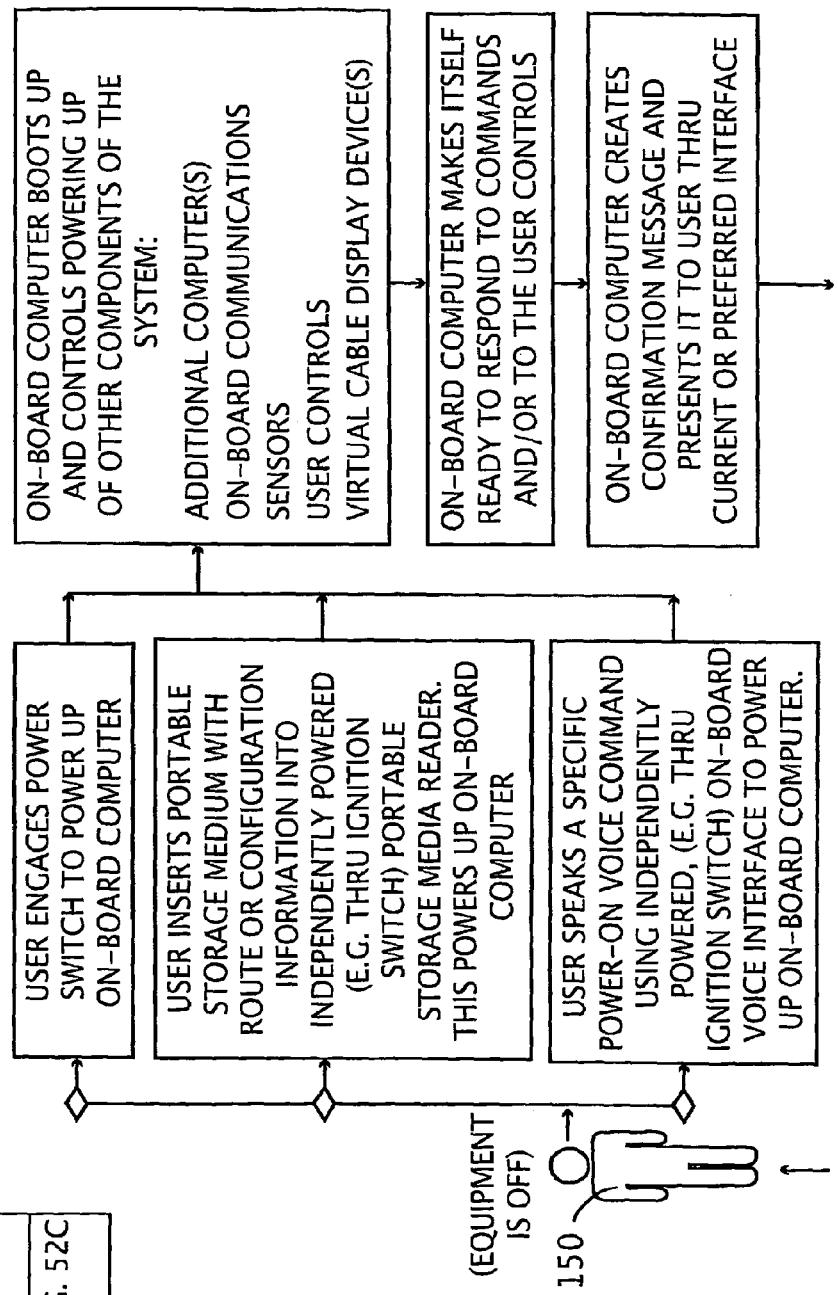

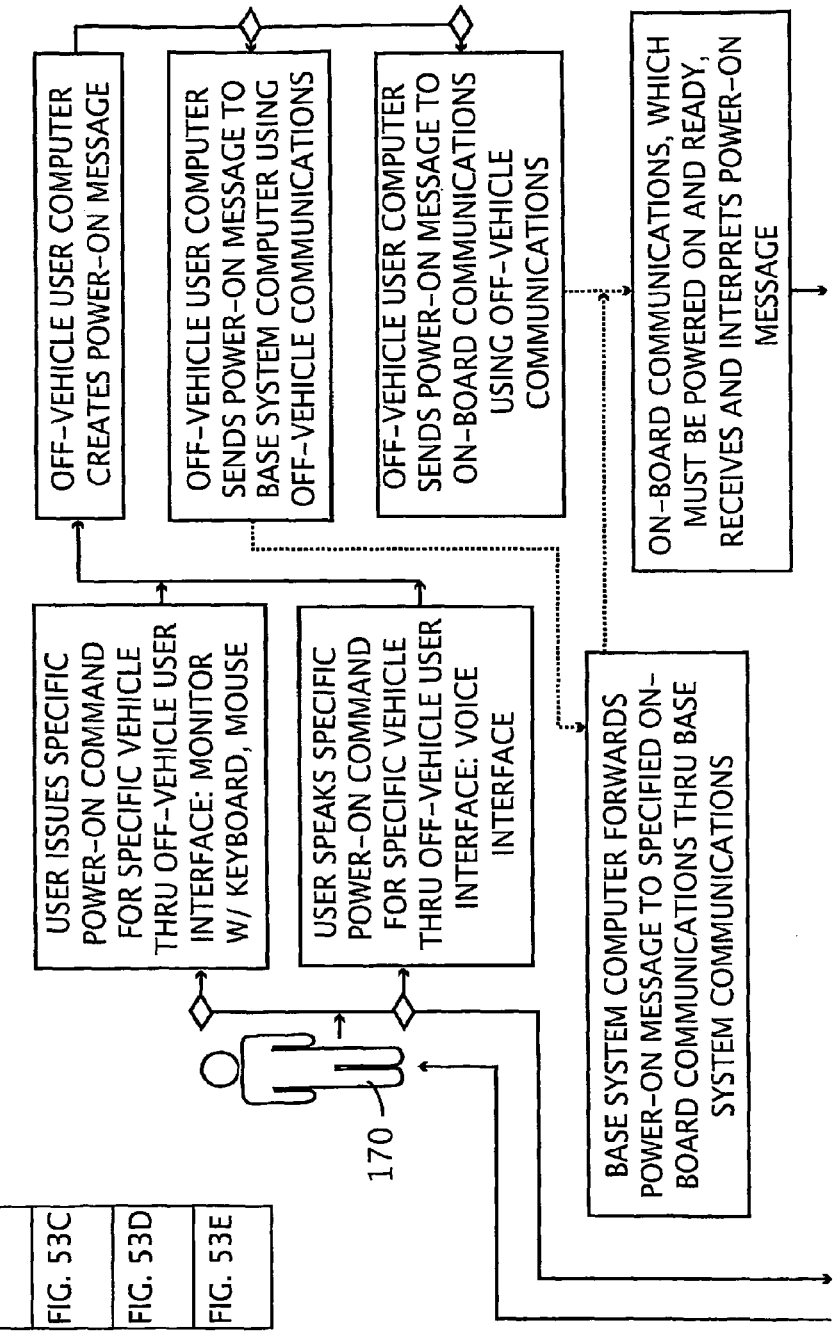

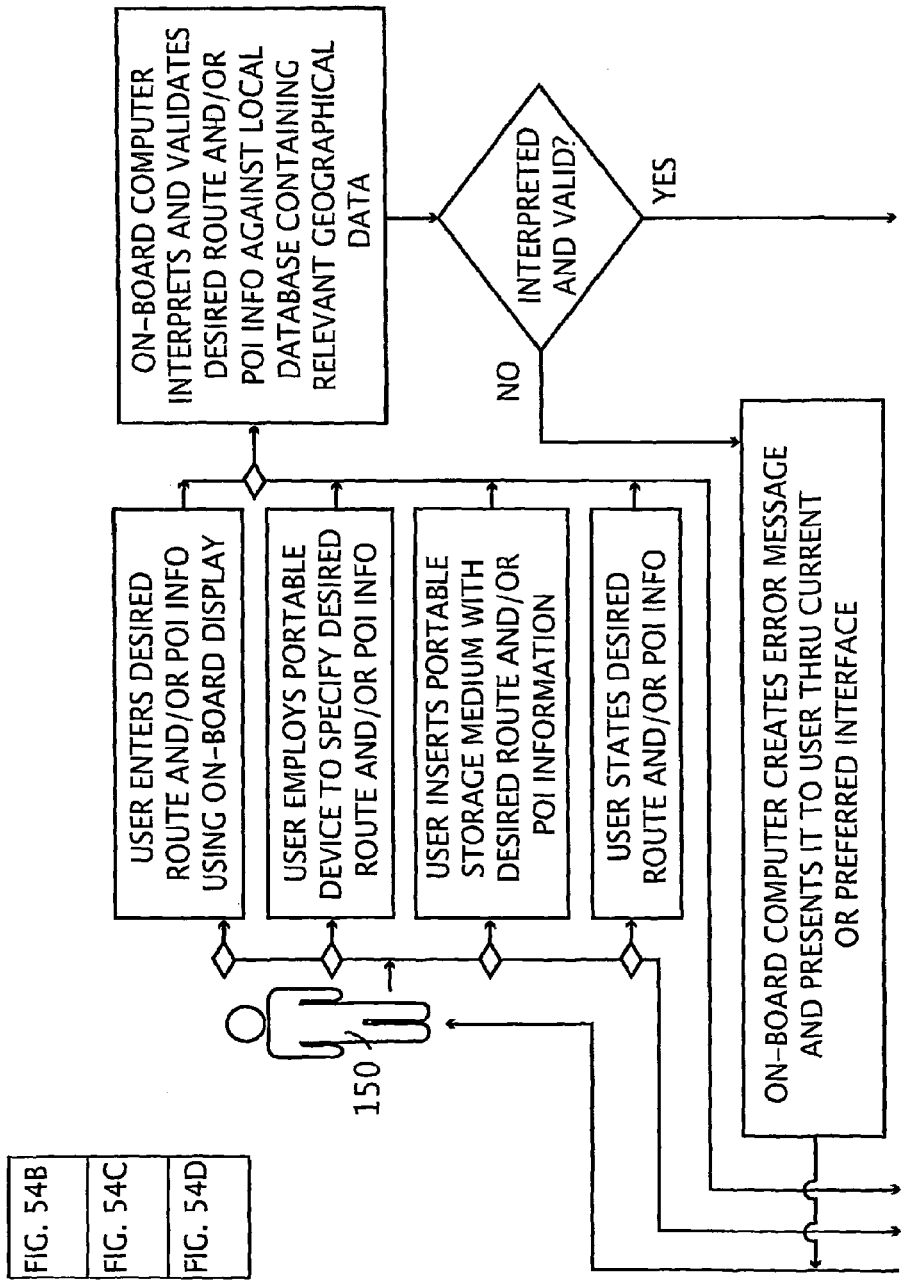

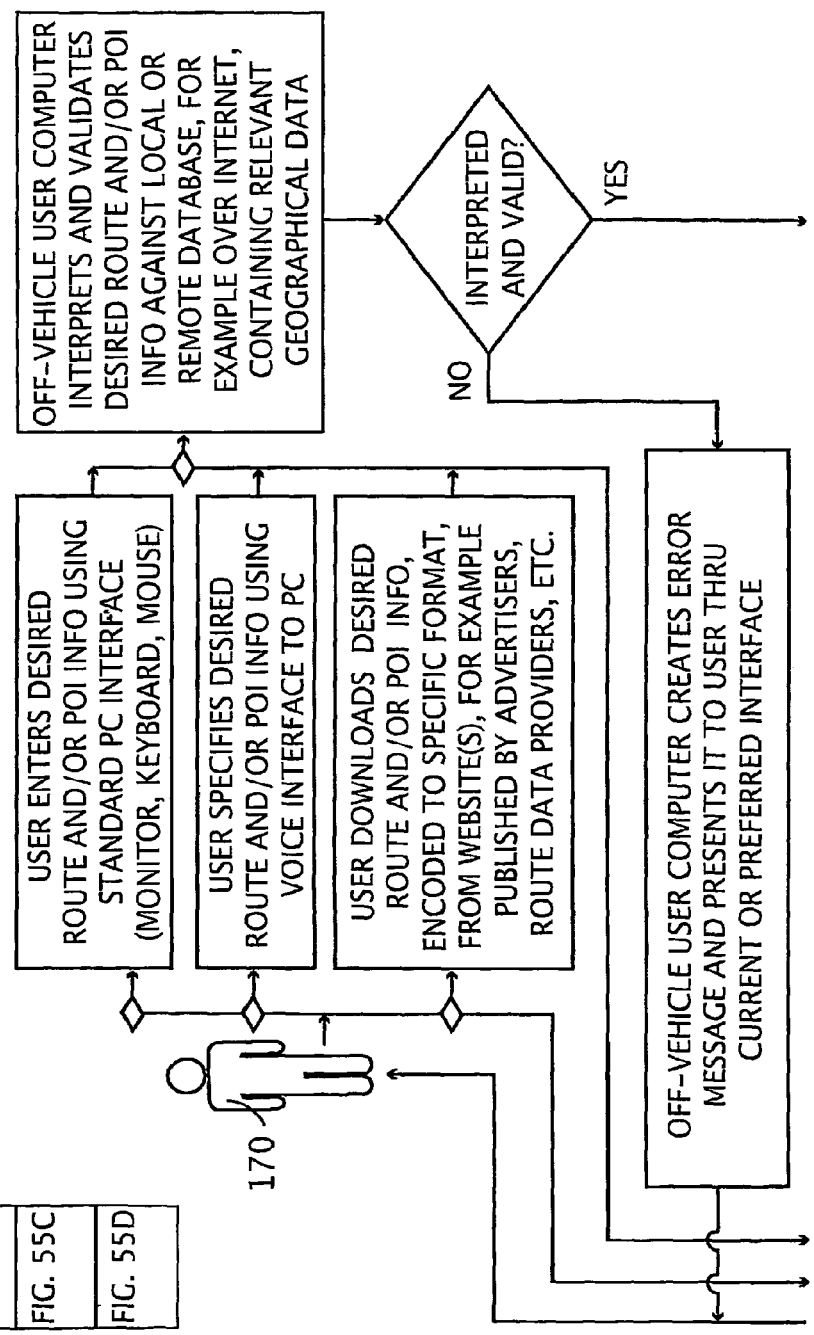

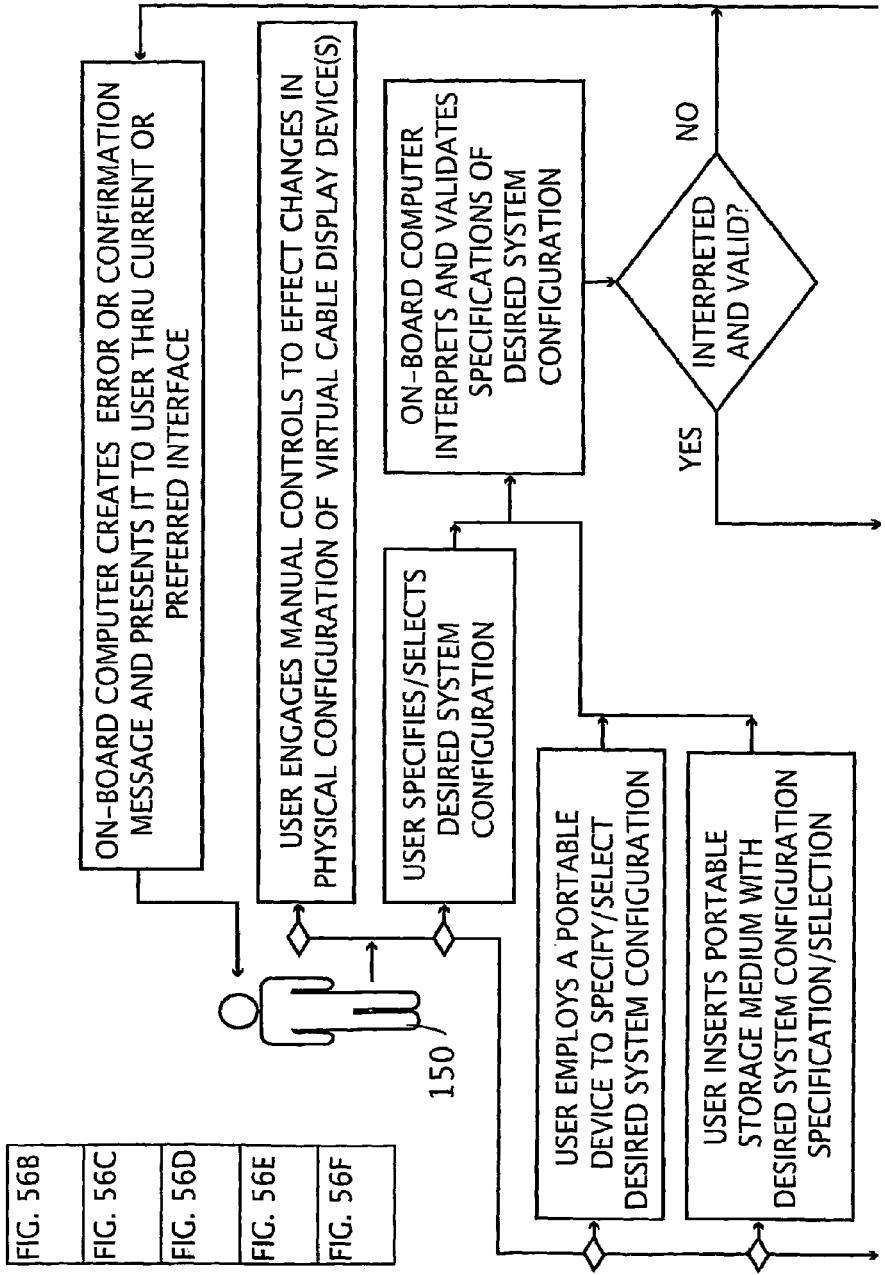

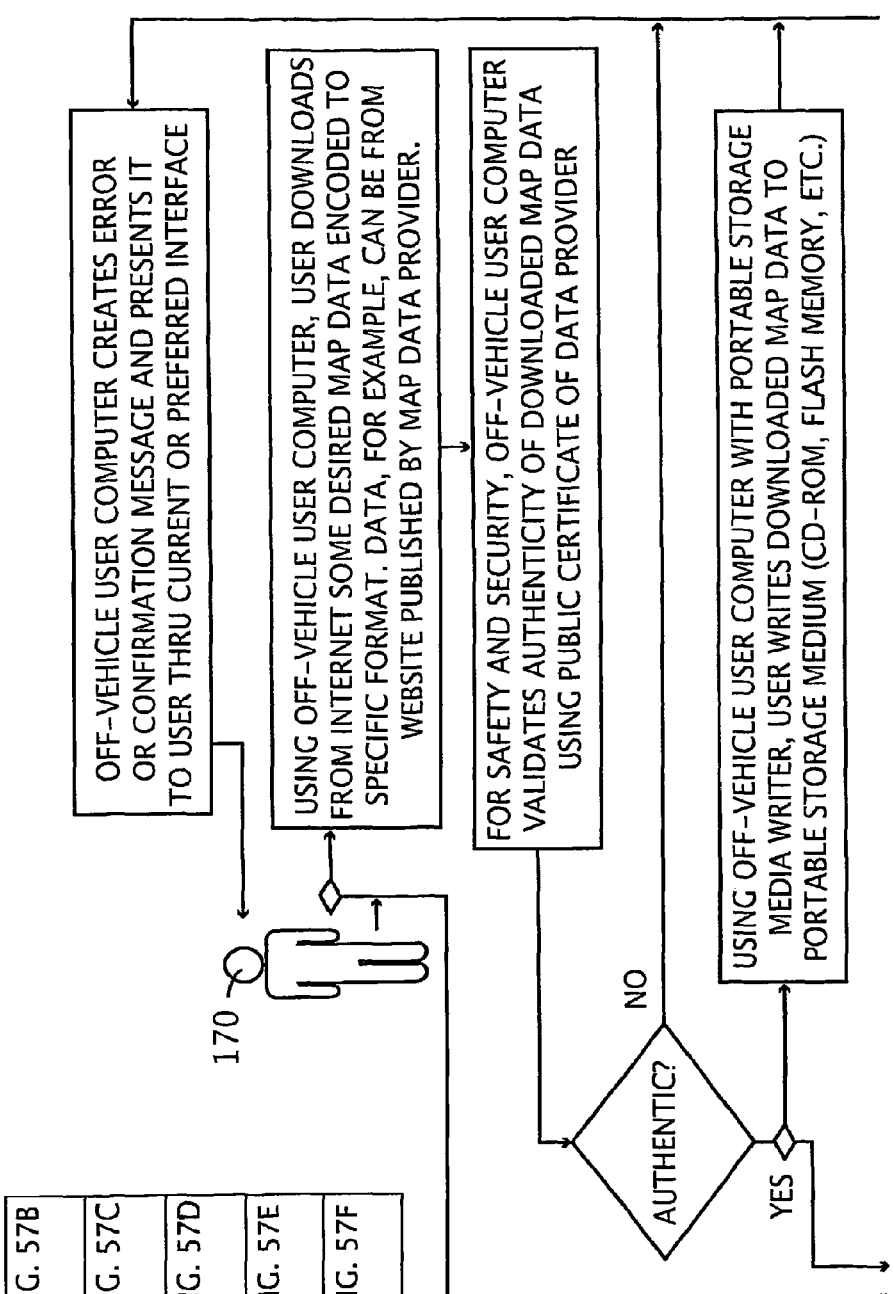

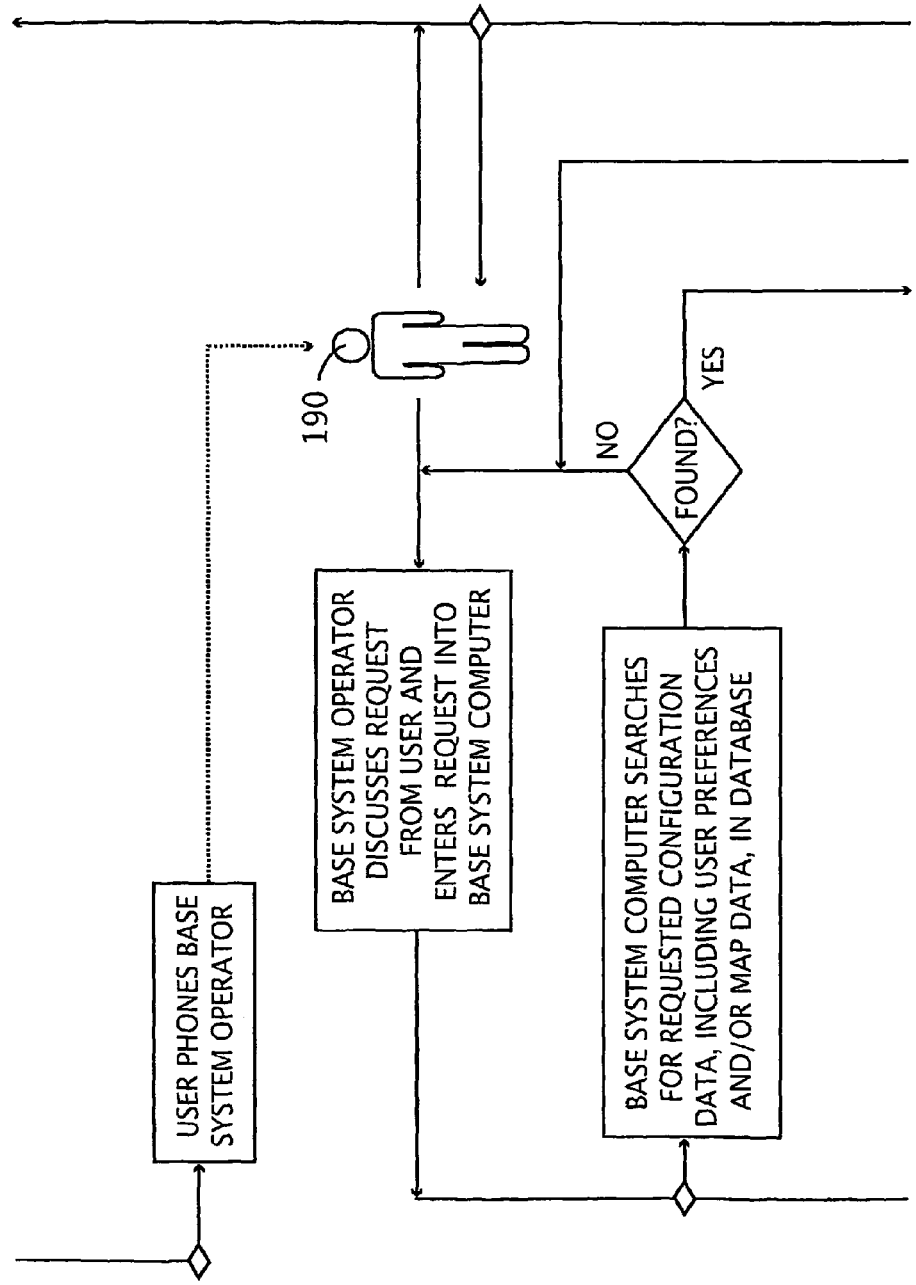

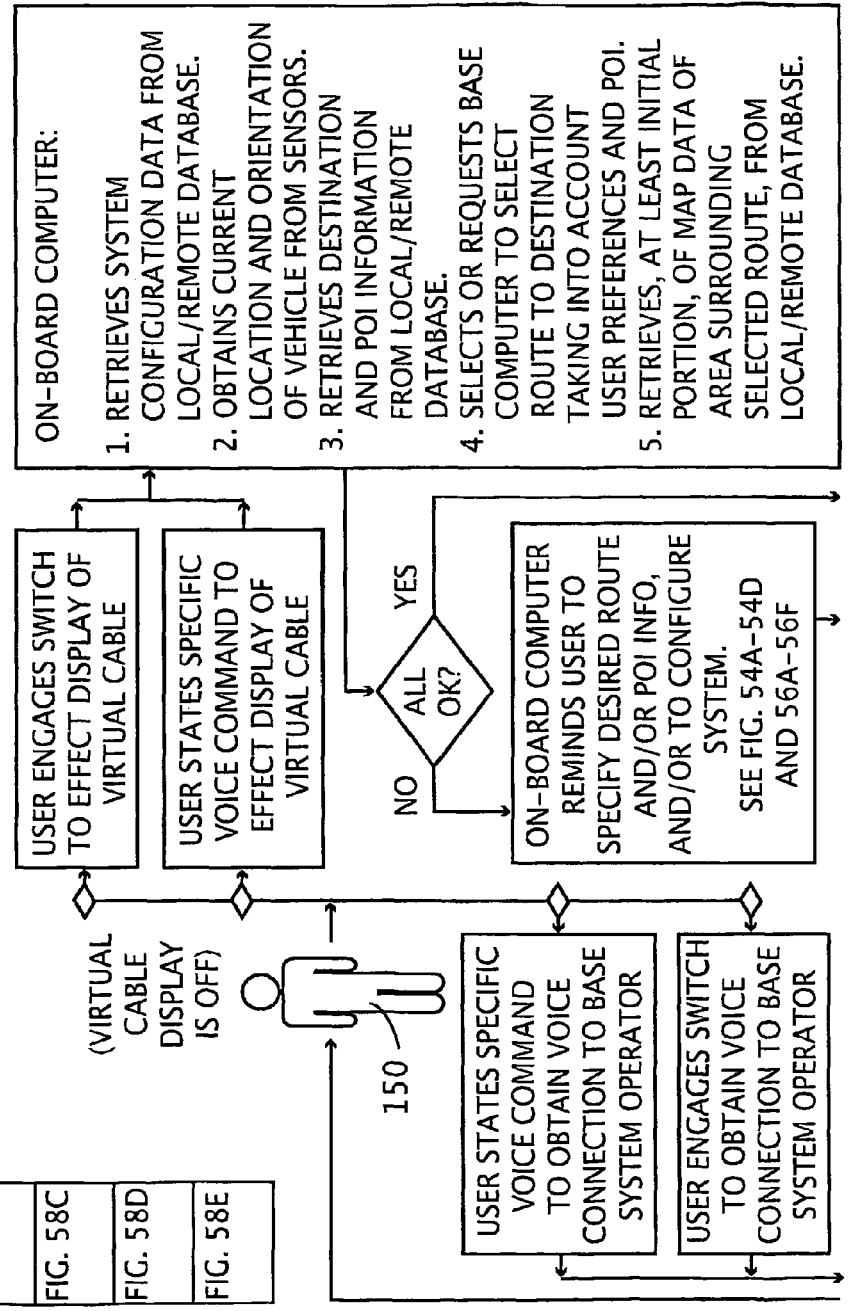

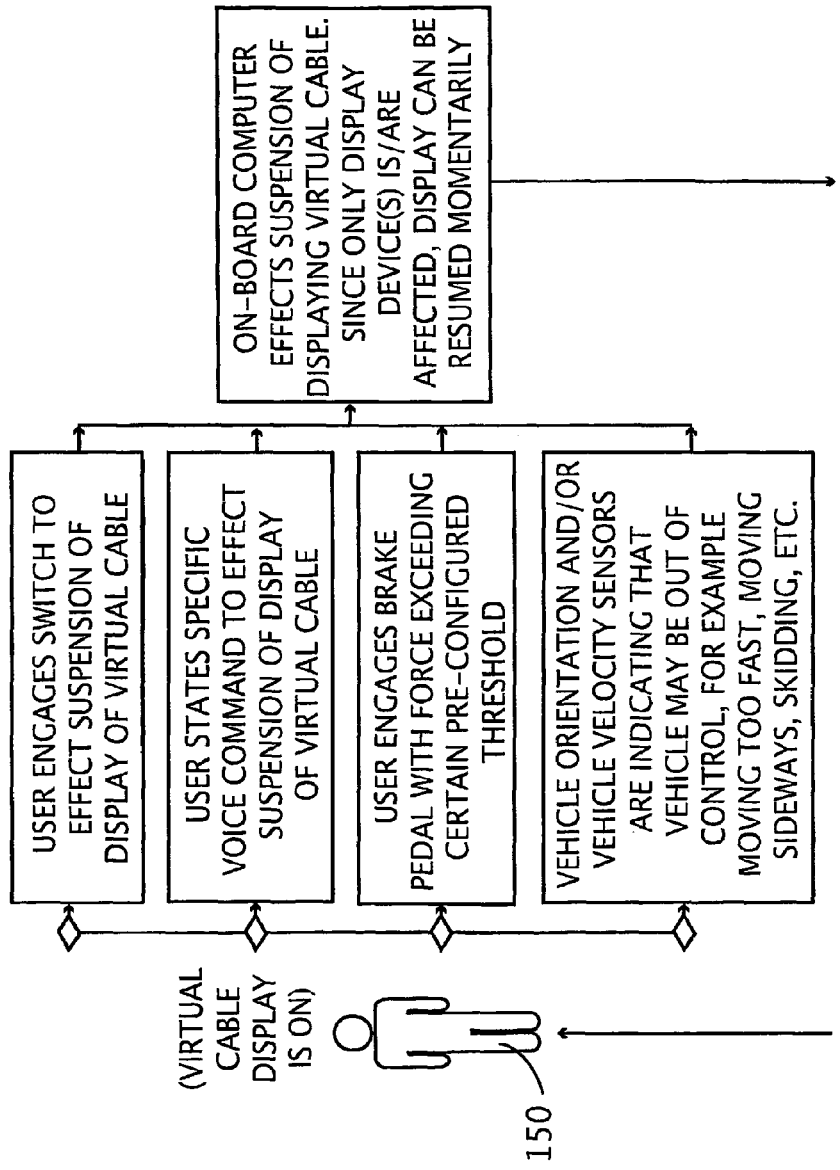

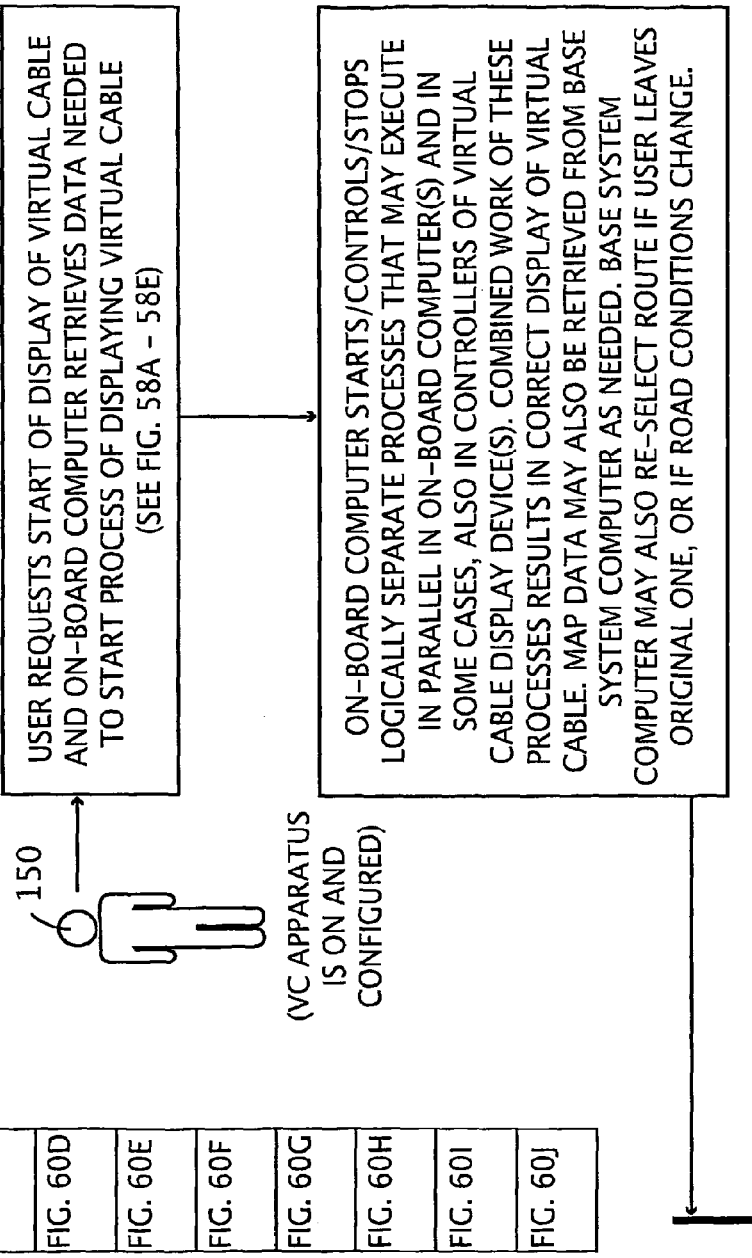

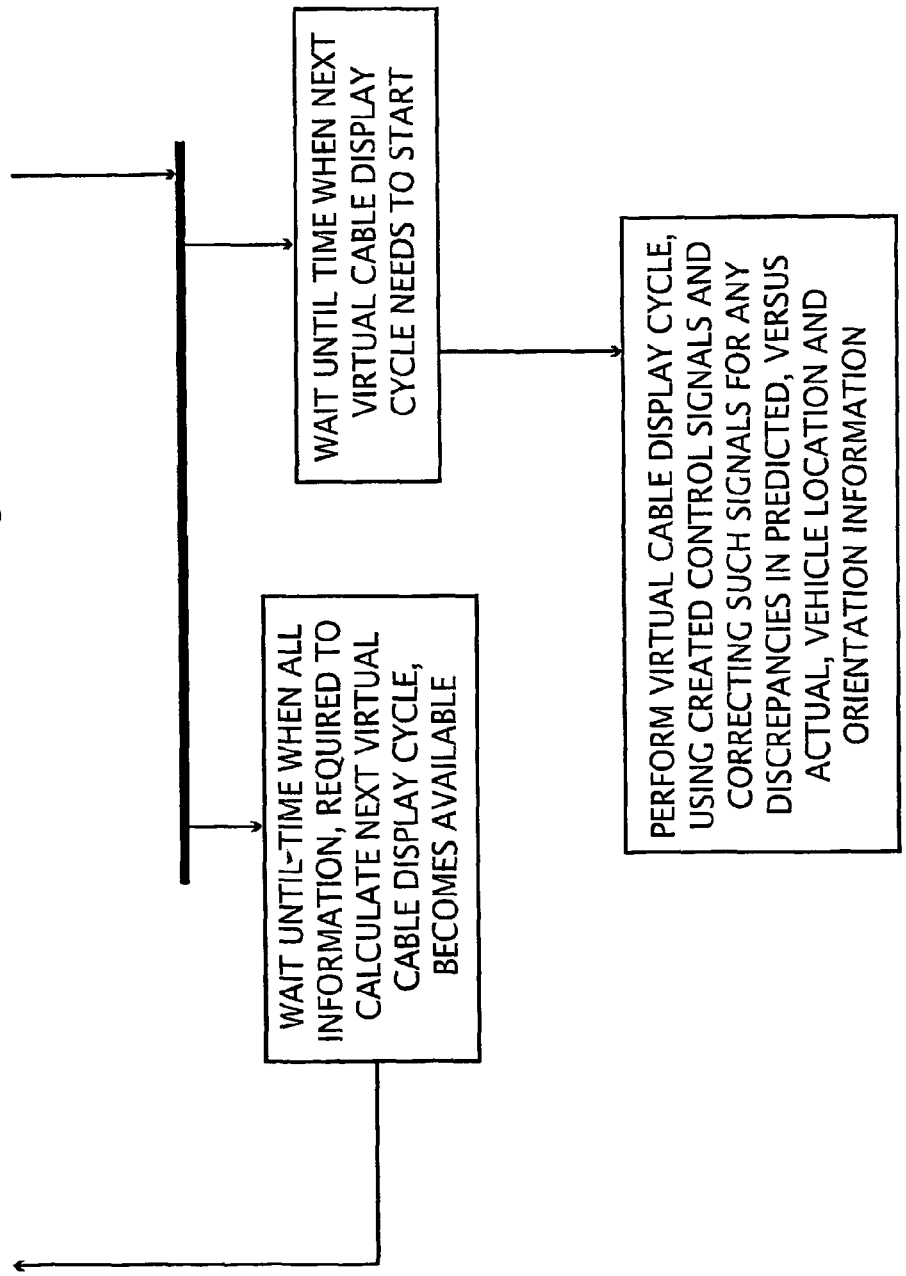

HEAD-UP DISPLAY

CROSS-REFERENCE TO RELATED APPLICATIONS

This is a continuation of U.S. patent application Ser. No. 10/593,138 filed Sep. 8, 2008, which is the national stage of international application PCT/US2005/019446 filed May 28, 2005, which claimed the benefit of U.S. Provisional Application 60/577,001 filed Jun. 3, 2004, the entire contents of which are hereby incorporated by reference as though fully set forth herein.

BACKGROUND AND SUMMARY

It is known to provide a so-called head-up display in, for example, an automobile so as to be able to present certain images to the driver or passengers while they are looking through the windshield.

The present invention is directed to head-up display apparatus that presents images for this, or other applications, volumetrically, meaning that the image appears to exist within a volume in the three-dimensional real world, even though it does not. A volumetric display achieves that appearance by presenting light rays to the observer that are substantially indistinguishable from light rays that would reach the observer from a real object in the real world. Such a volumetric display can imbue the overhead navigation cable with such depth cues such as stereoscopic disparity, motion parallax, convergence and focus.

A particular embodiment of our head-up display includes a projection screen, light projector apparatus configured to project one or more images onto the projection screen, viewing optics through which a viewer can view the projection screen, and a computer, wherein the projection screen is moveable under control of the computer in such a way as to adjust positions of the projection screen and to thereby adjust the distance between the projection screen and the viewing optics during at least a portion each of a succession of refresh periods. As a result, portions of an image projected on the projection screen appear to the viewer to be at particular respective different depths within a three-dimensional image based on the respective positions of the projection screen at the time that those portions are projected on the projection screen.

BRIEF DESCRIPTION OF THE DRAWINGS

FIG. 12A shows schematic examples of perceived brightness profiles across of virtual cable cross-section which can be used in order to implement three different "looks" for the virtual cable;

FIG. 12B shows in schematic, for each example in FIG. 12A, a corresponding brightness profile across of a cross-section of a laser beam spot used to produce such virtual cable;

FIG. 13A is a schematic showing an example of the laser beam spots produced by the laser beam free of spherical aberration;

FIG. 13B is a schematic showing an example of the effect of the spherical aberration of the laser beam on projected beam spots;

FIG. 14A demonstrates in exaggerated form the observable effect of virtual cable image focus varying with the distance, the view being when the eye is focused at a close part of the outdoor scene;

FIG. 14B demonstrates in exaggerated form the observable effect of virtual cable image focus varying with the distance, the view being when the eye is focused at a further part of the outdoor scene;

FIGS. 15B-15E, when arranged as shown in FIG. 15A, comprise a block diagram of a system for displaying the virtual cable;

FIG. 36A presents an example, in schematic, of the driver's view of the road and of virtual cable in a typical driving situation;

FIG. 36B presents in schematic an image "painted" onto the display device's projection screen, corresponding to FIG. 36;

FIG. 36C presents in schematic, illustration of timing of painting of the image from FIG. 36B using constant laser beam spot speed;

FIG. 36D presents in schematic an illustration of timing of painting of the image from FIG. 36B using optimized variable laser beam spot speed;

FIGS. 51B-51F, when arranged as shown in FIG. 51A, present a main logic flow diagram, encompassing the main functions of the disclosed illustrative system;

FIGS. 52B-52C, when arranged as shown in FIG. 52A, present a logic flow diagram showing the process of turning the on-board equipment on and off by the driver or other user who is on board the vehicle;

FIGS. 53B-53E, when arranged as shown in FIG. 53A, present a logic flow diagram showing the process of turning on the on-board equipment by a user who is not on-board the vehicle;

FIGS. 54B-54D, when arranged as shown in FIG. 54A, present a logic flow diagram showing the process of specifying and/or changing route and/or point of interest information by the driver or other use who is on-board the vehicle;

FIGS. 55B-55D, when arranged as shown in FIG. 55A, present a logic flow diagram showing the process of specifying and/or changing route and/or point of interest information by a driver who is not on board the off-board vehicle FIGS. 56B-56F, when arranged as shown in FIG. 56A, present a logic flow diagram showing the process of performing system configuration by a driver or other user who is on-board the vehicle;

FIGS. 57B-57F, when arranged as shown in FIG. 57A, present a logic flow diagram showing the process of performing system configuration by a user who is not on-board the vehicle;

FIGS. 58B-58E, when arranged as shown in FIG. 58A, present a logic flow diagram showing the process of implementing virtual cable display start and stop functions:

FIGS. 59B-59C, when arranged as shown in FIG. 58A, present a logic flow diagram showing the process of implementing virtual cable display suspend and resume stop functions; and FIGS. 60B-60J, when arranged as shown in FIG. 60A, present a logic flow diagram showing the process of displaying the virtual cable;

DETAILED DESCRIPTION 1.0—Overhead Navigation Cable

The following is a detailed description of an illustrative embodiment of the invention. The illustrative embodiment involves the use of the invention in a motor vehicle context. Indeed, we expect that the invention will find its main use in motor vehicles. Thus for consistency of terminology and to keep the description simple, the term "driver" is principally used when referring to the human user of the system to whom the virtual cable is displayed. However, as noted above, the invention is potentially useful in other, non-motor-vehicular applications for which the "user" may not be a "driver." Moreover, some operations that may be performed during the use of disclosed system, such as downloading of information, may be carried out in a motor-vehicular application but not by a person who is then driving the vehicle and/or may be performed outside of the vehicle altogether. Thus the term "driver" is used herein only for illustrative purposes and is not intended to mean that the invention is limited to motor vehicle applications or to use by a person whom one would call a "driver."

1.1. Navigation Cable

Figure 1:
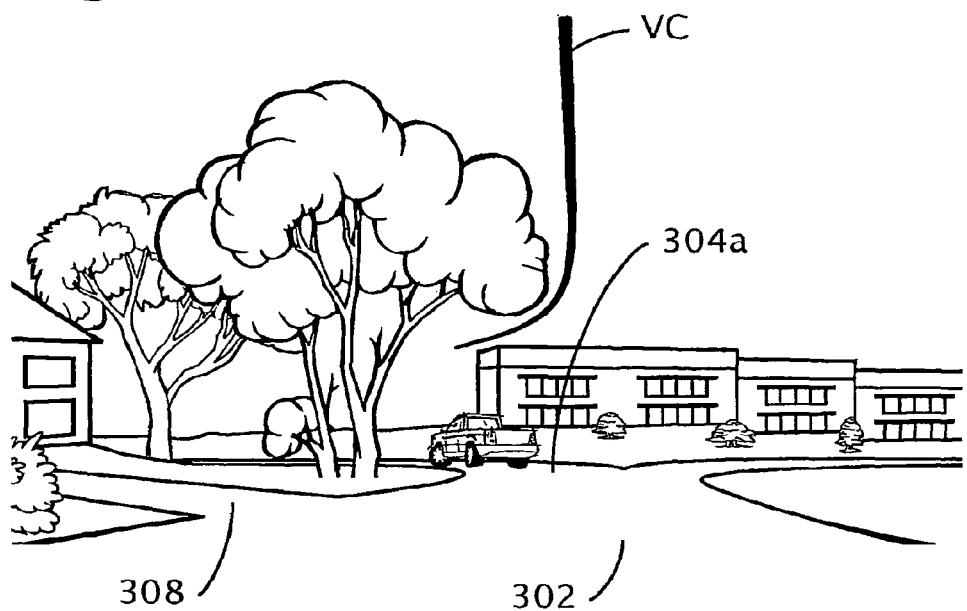
FIG. 1 shows a virtual cable that can be displayed volumetrically by the apparatus of the present invention.

FIG. 1 shows a roadway 302 and surrounding terrain, or landscape, as seen through an automobile windshield. An en-route navigation object VC is displayed to the driver by an on-board navigation system, illustratively using a head-up display system that reflects an image of the navigation object from the automobile windshield to the driver. The driver has previously input into the system a desired destination. The system, using a) stored map data and possibly other stored data, and b) the vehicle's current position determined from the global positioning satellite (GPS) system (and possibly by other means) has computed a route over roadways to the desired destination. That computed route is herein referred to simply as "the desired route" or sometimes just "the route."

The en-route navigation object appears to be a cable extending so far above the roadway that it can be said to be displayed "overhead" relative to the driver—much as a trolley cable extends above the roadway or trackway over which it travels. More particularly, what we mean by "overhead" is that—for at least a portion of an object that appears to be close to the driver—the object is presented high enough in the driver's visual range that it does not overlay any objects that are close to the driver and to the road. Another way to say this is that the object is not displayed in the driver's primary area of sight. Thus as can be seen in FIG. 1, the navigation object overlays the sky and the far hillside but does not overlay the near roadway—nor indeed does it overlay any of the roadway, for that matter, in this particular case.

We refer to an en-route navigation object that has this over-the-head quality as being a "overhead navigation cable." Like a trolley cable, the shape of the overhead navigation cable is determined by the shape of the route. Thus as seen in FIG. 1, the overhead navigation cable appears to bend to the left above the point on the roadway denoted 304a, indicating that the roadway turns left at that point. The image of the overhead navigation cable is continually updated by the head-up display as the vehicle moves along the roadway so that the bend appears to be stationary over the roadway bend as the vehicle moves forward.

The use of a displayed cable as an en-route navigation aid may be here contrasted with, for example, the use of a voice-command based system which might, at the point in time depicted in FIG. 1, issue the command "turn left." The driver might well be confused by such a command, wondering if the command "turn left" indicates the first left turn 308 or the second left turn 304a. The driver may become frustrated or stressed to the point of distraction, creating dangerous situation. There is further danger if the driver were to try to clarify such ambiguities by diverting his attention from the road to a navigation screen or a paper map.

Figure 2:
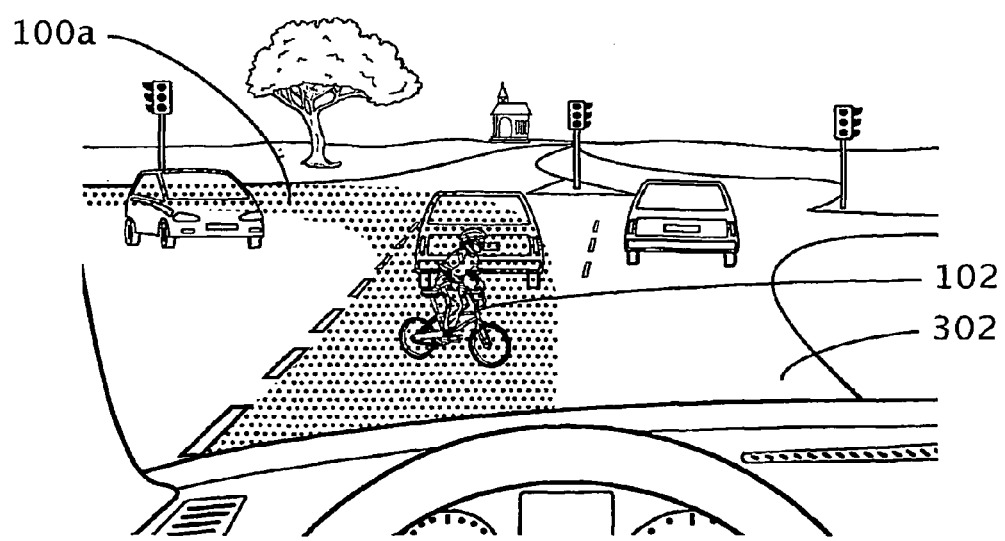
FIG. 2 shows a head-up-display-based en-route display.

A system that shares with the present disclosed arrangement the benefit of not relying on potentially confusing voice commands is shown in FIG. 2. Here the route to be followed is indicated by a navigation object in the form of a swath that appears to overlay the traveled surface. As can be appreciated from FIG. 2, there are significant drawbacks with such an arrangement. A wide swath 100a superimposed on the roadway 303 may camouflage or otherwise obstruct the driver's view of a pedestrian, or a cyclist 102, crossing in front of the vehicle, creating a dangerous situation—more so if the pedestrian's clothing is the same color as the swath. In addition to obstructing the view of pedestrians or other real objects on the traveled path, images superimposed on the roadway may be distracting or annoying to the driver, since there are constantly in his area of sight. Also, the farther away parts of such images are extremely foreshortened due to being seen at very shallow angle, so their exact shape can be lost to the observer. In addition, such images require very high precision of vertical positioning. Small errors in such positioning can result in a pronounced errors of radial registration of such images with the related landscape features.

1.2. Overhead Navigation Cable Displayed Volumetrically—the "Virtual Cable"

Our overhead navigation cable as described above could be "painted" by the head-up display as a simple thin line of a certain shape. Or rather than being painted by a head-up display, such a line could be presented on an on-board video screen overlaid on a real-time video image of the roadway captured by an on-board camera. The presentation of such an overhead cable as an en-route navigation aid can provide a number of safety and driver convenience advantages, as discussed above.

However, we regard a preferred form of overhead navigation cable as one that is displayed volumetrically, with an optic flow consistent with the optic flow of the surrounding landscape, with perspective depth cue and with the dimming depth cue. If in some implementation the image of the overhead navigation cable is displayed briefly and then turned off or blinked, it is not appropriate to talk about the "optic flow" of such image. In order to maintain an impression of reality, however, the changes in such image due to the movement of the observer should still be consistent with the "motion parallax" depth cue. By displaying the overhead navigation cable volumetrically and with an optic flow consistent with the optic flow of the surrounding landscape, and with other depth cues, it appears to the driver to be real. That impression of reality provides significant advantages in a number of realms, not the least of which are ease of use, convenience and safety. Those advantages are described hereinabove and need not be repeated here.

We refer to this preferred form of en-route navigation object as a "virtual cable." Indeed, the balance of this specification describes our overhead navigation cable and its implementation in terms of that preferred form. A great deal of the balance of the specification presents topics that are only relevant to an overhead navigation cable that is also a virtual cable, notably the equipment that "paints" the cable volumetrically. However, those skilled in the art will recognize certain topics and discussions that apply to the cable whether it is presented volumetrically or not, such as the topics of cable positioning and cable color as described below.

1.3. Continuous Depth Navigation Object

Another aspect of the disclosed system is the use of a particular class of objects displayed as en-route navigation objects. That class of objects are objects that are displayed not only volumetrically but also with continuous depth, as defined above. Our virtual cable is but one example of such an object, which we refer to as a "continuous depth navigation object." A continuous depth navigation object pursuant to this aspect does not necessarily have to be in the form of a cable nor does it necessarily have to be displayed overhead.

Examples of possible continuous depth volumetrically displayed en-route navigation objects that are not cables could include an image of a vehicle that the driver should follow to the destination, an image of a bird flying above and ahead of the driver and showing the driver the correct route, a spot of light that repeatedly appears above the driver and moves ahead for a certain distance over the correct route and then disappears, a virtual road sign that appears to be stationary relative to the route, a set of virtual milestones, etc.

2. Calculation and Positioning of the Virtual Cable

In this section we describe the calculation and positioning of the virtual cable.

2.1. Virtual Cable Path

We here introduce the notion of the virtual cable path. We also introduce a certain kind of terminology that is used throughout the specification in referring to the virtual cable and its properties.

The virtual cable does not really exist, of course. It is an image presented to the driver in such a way that it appears to the driver that there is a cable on, or extending out along, the route. Thus strictly speaking the virtual cable does not "extend" along the route. It does not have a particular height above the roadway—or at least not the height that it appears to have. One cannot literally follow or drive under the virtual cable, since the light rays that the driver perceives as a cable extending outside and away from the front of the vehicle are, in actuality, wholly contained within the vehicle, emanating from, in the disclosed embodiment, an on-board laser source, and reflecting off the windshield (or other combiner) into the eyes of the driver.

Strictly speaking, then, one would not say, for example, that the virtual cable is located at a certain place or is at a particular height above the roadway or that it bends in a certain way. What one can say is that there is in the real world a virtual cable path, this being a path through the air where the virtual cable appears to be. It is the virtual cable path that bends, extends along the roadway and so forth, albeit that the virtual cable path itself cannot be seen.

Nonetheless, for pedagogic convenience, the description not only in this section but throughout the specification sometimes attributes the physical characteristics of the virtual cable path to the virtual cable. Hence the specification does talk in terms of the height of the virtual cable as being at a particular height, such as above the traffic light level in particular embodiments. It states at various points in the description that the virtual cable is "directly overhead" and in terms of the driver "following" the virtual cable. The reader will appreciate from the context that such references to the virtual cable may, in a more strict sense, be references to the virtual cable path.

2.2. Calculation of the Route of the Virtual Cable

A method of calculating the virtual cable is based on stored maps and GPS data, described below. Calculation of the virtual cable includes computing data that ultimately controls the head-up display, as described below, in such a way as to present the image of the cable to the driver.

The GPS signal, and any augmenting signal (e.g. differential GPS for improved accuracy), are obtained, substantially continuously (i.e. except when view of the sky is obstructed), from appropriate sensors on board the vehicle. If the augmenting signal is available, both signals are combined, as known in art, and converted to location and, in some GPS receivers, speed and antennae orientation data stream. Then GPS coordinates of such data stream are converted to some other absolute three-dimensional space (by an absolute three-dimensional space herein, we mean some Earth-centered, Earth-fixed three-dimensional coordinate system e.g. XYZ Cartesian) coordinates, for easier calculations, thus creating new "raw XYZ location" data stream.

This "raw XYZ location" data is combined with data from other vehicle sensors (gyroscopes, accelerometers, odometer etc.) and fed to a computer executing a data fusing routine. Such routine typically utilizes such known methods as Kalman filtering and so-called "road matching" to estimate current vehicle position, orientation, speed (linear and angular) and acceleration (also linear and angular) in our chosen absolute three-dimensional space. The near-future vehicle position, orientation and speed (linear and angular) can also be estimated at this time, based on current values and the acceleration data. We can call this a "best vehicle position and motion estimate" data stream.

Based on this "best vehicle position and motion estimate" data, the computer obtains from map data storage (periodically, as needed), or calculates, a digital representation of the three-dimensional shape and position and orientation of the section of the route right ahead of the vehicle, in other words, the section of the route over which the virtual cable needs to be displayed now or very soon (e.g., illustratively, within next several seconds).

Then, checking the user settings, the computer calculates a digital representation, as a set of coordinates in our absolute three-dimensional space, of the three-dimensional shape and position and orientation of the section of the virtual cable which needs to be displayed at the present time (illustratively, during the next refresh cycle of the display device, e.g. starting within next $1/30$ of a second). This calculation, as well as the calculations mentioned below in this section, are repeated for every refresh cycle of the display apparatus, e.g., illustratively, 30 times per second, every time using the most current (i.e. updated since the last refresh cycle) vehicle location and orientation estimate. Such calculation (e.g. calculating length of a curve, or shifting the curve in some direction (e.g. 5 meters up)) is a simple matter of analytic geometry calculation, well known in the art.

Then, knowing the most current (i.e. updated since the last refresh cycle) estimate of vehicle position and orientation relative to such section of the virtual cable (again, all in our chosen absolute three-dimensional space), both the digital representation of the perspective view of such section of the virtual cable from the driver position, as well as set of distances from the driver to all the points such section of the virtual cable can easily be calculated. These newly calculated results are expressed in a new, car-centered, car-fixed coordinate system, e.g. a spherical coordinate system with its origin (center) near the driver's eyes and its "0 latitude, 0 longitude" direction toward the front of the vehicle. Such perspective calculations are, in essence, the coordinate systems conversion calculations and are well known in art of geometry, and can be done in a very short time (e.g. in less than $1/30$ of a second) when using modern computer hardware.

Based on optical properties of the display apparatus, including its longitudinal magnification and its inherent image distortions, an appropriate conversions (including scaling and pre-distortion) are applied to these spherical coordinate values, to produce the digital representation (expressed using separate, local coordinate system (e.g. XYZ Cartesian, screen-fixed, screen centered)) of the image of the virtual cable which is to be painted onto the apparatus internal projection screen, painted in such way that the view of this image through the apparatus and combiner becomes the undistorted virtual cable. By screen-fixed, screen-centered coordinate system we mean a coordinate system with its origin positioned at some fixed position relative to the viewing optics, not relative to a moving projection screen, e.g. a coordinate system with its origin positioned where the center of the screen would be in when the screen is in its "nearest" position relative to the relay lens.

In particular, the scaling part of the conversion mentioned above may involve simple substitutions (e.g. using well known lookup-table method) where a distance "r" to each specified point of a virtual cable is converted effectively into the needed displacement "z" for the screen actuator, and original angular coordinates (i.e. longitude and latitude angles) are converted effectively into on-screen position coordinates "x" and "y".

The power and focus of the beam which is also calculated for each point, taking into account the geometry of the beam projector and the screen, and data from the ambient light sensor, in order to achieve brightness and diameter of the painted line which would, at each point, correspond to distance to the virtual cable and driver presets.

It is a straightforward application of well known formulae of optics to devise such image pre-distortion and distance-to-displacement calculating algorithms.

The brightness and the thickness of the line painted onto the screen needed to achieve the apparent thickness and brightness of the virtual cable being in accordance with driver presets is calculated for each point of the visible virtual cable. The brightness calculations take into account the current data from the ambient light sensor.

Then the beam focuser and beam profile adjuster setting is calculated for each point (x,y) of the line to be painted onto the projection screen, based on the thickness of this line at (x,y), on values of "x" and "y" and screen displacement "z" at (x,y), on geometry of the beam projector and the screen, and on optical properties of the beam projector and the viewing optics.

It is a straightforward application of well known formulae of geometry and optics to devise such brightness, beam focus and beam profile calculating algorithms.

The new data, in digital form, can be sent to appropriate device controllers (also referred to as "device drivers") which generate analog signals directly used to steer the laser, focuser, scanner and the actuated screen (all described below), to paint the desired image.

However, as discussed herein in the section "Painting the Virtual Cable", it is preferable to further alter such digital data to optimize devices control, before sending it to appropriate device controllers Later herein, in the sections "5.1.4. Sensors" through "5.1.4.4. Vehicle Operation Sensors 156$d$" there are mentions of techniques for obtaining real time position, orientation and movements estimate for a vehicle, e.g. techniques employing GPS, accelerometers, "road matching" and "Kalman filter", which are well known to those skilled in the art. The section "5.1.4.5. Note on Calculations Performed in Response to Sensor Data" discloses principles of calculating, based on such real-time data, the control signals needed to "paint" the virtual cable; the detailed mathematical formulae (and their implementation in computer algorithms) for geographical/Cartesian coordinates conversion, for perspective projection, for optical image size, distance and position and other geometry calculations, and calculations for controlling, or "steering," a mechanical scanner and mechanical screen actuator, and other needed calculations are well known in the art. Combining those calculation into one chain of successive calculations, and (optionally) simplifying such chain by eliminating some intermediate steps, are also well known in the art.

FIGS. 58A through 60J also contain information related to how the virtual cable can be calculated and displayed.

2.3. Left-and-Right Positioning of the Virtual Cable

We here define the term "centerline of a route". By this we mean an imaginary line on the route's surface that the body of the driver ideally should, but not necessarily will, substantially be navigated over to the destination. By the term "route's surface" herein we mean the surface of the landscape that the driver travels on, or near it, while following such route. Such centerline is not necessarily the actual centerline of the road or a driving lane. Since the position of a body of a driver inside a vehicle is usually in a substantially fixed relationship to the vehicle, the "centerline" of a particular route may also be defined as an imaginary line on the route's surface that a certain fixed point of the vehicle, for example the center of a steering wheel, ideally should, but not necessarily will, be navigated over to the destination.

In reality the driver will divert from the exact centerline of the desired route. For example it is normal for a vehicle in a driving lane on a highway to drift a little bit left and right within the boundaries of a lane. For example, when the centerline of the desired route is identical with the centerline of the traffic lane, the vehicle normally drifts slightly left and right relative to such centerline.

If, on the other hand, the driver has decided to move away from the present centerline of the desired route by a distance that is more significant, for example by moving the vehicle to a different traffic lane, the navigation system of the embodiment recalculates the position of the virtual cable to be over the new centerline and the recalculated virtual cable is displayed over that centerline. Recalculation would also be necessary if the driver decided to abandon the road designated as the desired route and, for example, decided to take an exit from a highway different from an exit that the system had calculated.

Figure 6A:
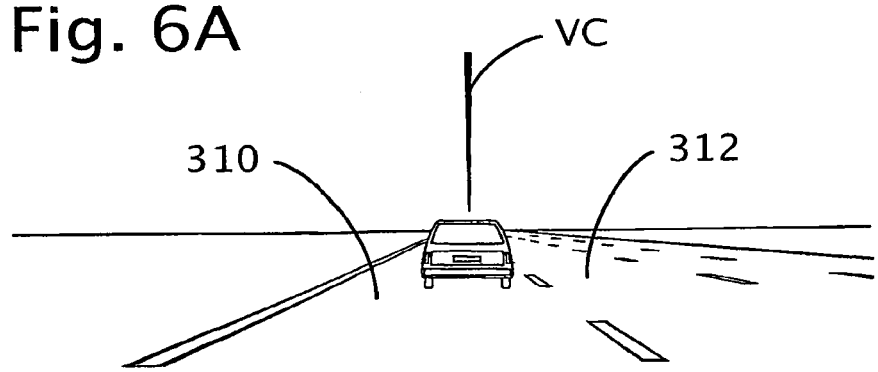
FIG. 6A is a schematic example of virtual cable VC as it is seen by a driver driving on a multi-lane highway.
Figure 6B:
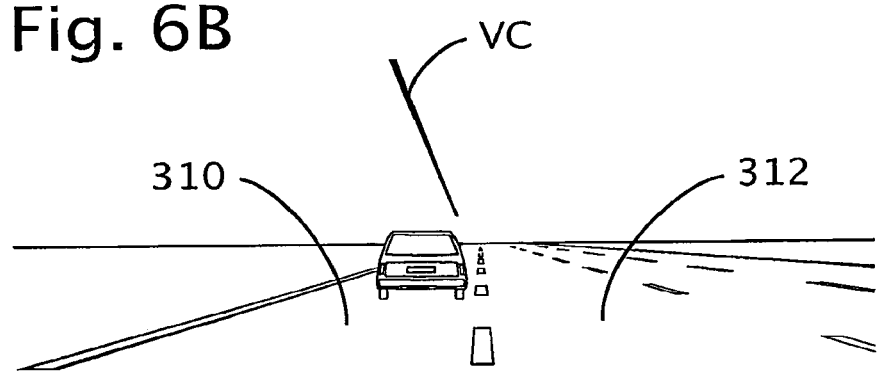
FIG. 6B shows the same scene after the driver has started a lane change maneuver on the highway.
Figure 6C:
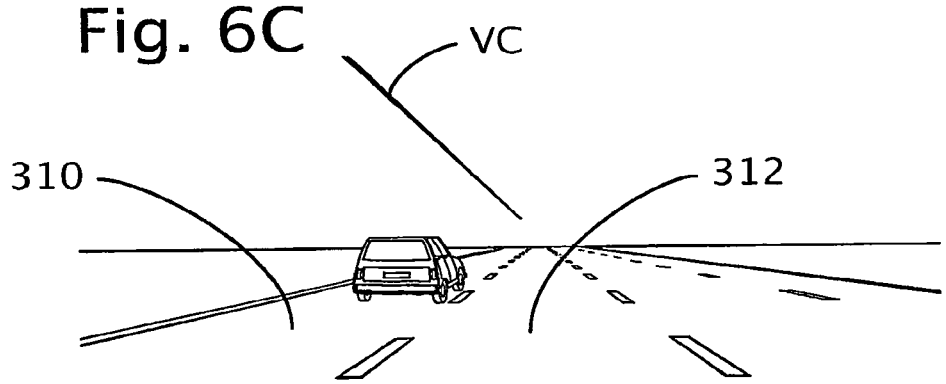
FIG. 6C shows the same scene just after the driver has completed the lane change maneuver.
Figure 6D:
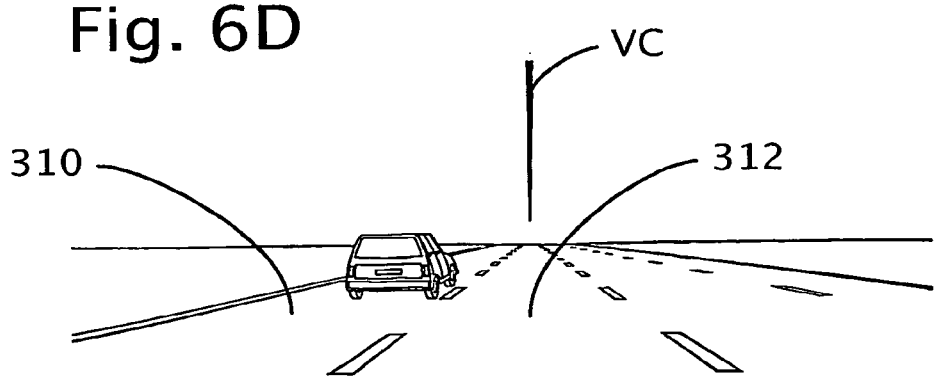
FIG. 6D shows the same scene some time later, demonstrating the repositioning of the virtual cable to the new lane.

Whenever the centerline of the route changes, the position of the virtual cable path is slowly and smoothly (or discretely) adjusted to reflect such change. This phenomenon is schematically shown in FIGS. 6A though 6D. The driver has been driving in traffic lane 310 for some time and, as shown in FIG. 6A, virtual cable VC is directly overhead. FIG. 6B is a view of the roadway wherein the vehicle is in the process of moving from traffic lane 310 to traffic lane 312. The virtual cable is still positioned above the centerline of the most recent route, which in this case was the centerline of the traffic lane 310. FIG. 6C shows the location of virtual cable VC immediately after the vehicle has completed moving from the traffic lane 310 to the traffic lane 312. The virtual cable is still positioned above the centerline of the most recent route, which in this case was the centerline of the traffic lane 310. FIG. 6D shows the location of virtual cable VC some relatively short amount of time, for example 7 seconds, after the vehicle has completed moving from the traffic lane 310 to the traffic lane 312. The virtual cable is now positioned above the centerline of the new route, which in this case is the centerline of the traffic lane 312.

The time that the vehicle has been out from under the virtual cable and its distance away from the virtual cable in a left/right sense determine when the virtual cable is moved to a new location relative to the vehicle as in the scenario presented in FIGS. 6A-6D.

In particular, the minimum amount of time that would, in combination with significant change in the vehicle position, trigger recalculation of the new virtual cable path, may be driver-adjustable within, for example, a 6 to 60 seconds range. The higher range may be preferred by drivers who do not want certain driving maneuvers, such as passing another vehicle on a two-way road, to result in corresponding changes in the position of the virtual cable relative to the path that the vehicle has been on. Moreover, if it could reliably be determined that the driver is traveling on the wrong side of the road—such as during passing of a vehicle on a narrow road—then it might be desirable for the virtual cable to not change position relative to the roadway while such a maneuver is taking place, regardless of the driver time settings.

In addition, the minimum change in vehicle position relative to the existing virtual cable path that, by itself or in combination with the amount of time that would trigger recalculation of a new virtual cable path, could be driver-adjustable. The range of change that would trigger such a recalculation could be in the 1 to 20 meter range, depending on, among other things, the accuracy with which the system is able to determine the vehicle's position relative to the centerline of the route.

The nature of changes in the position of the virtual cable may, in practice, be dependent on the type and accuracy of sensors and techniques used to determine the true vehicle's position relative to the centerline of the road. The current state of the art for determining position of a vehicle involves combining GPS position sensors data with data coming from inertial sensors (e.g. gyroscopes and accelerometers). This technique, in combination with road matching algorithms, can allow sufficiently accurate measurements of the vehicle position for the virtual cable position changes as described above. But if the vehicle travels in terrain that does not allow for the road matching corrections to be applied (e.g. traveling through a desert, etc.), then slowly accumulating deviations from the centerline of the route may not be detectable by neither the GPS nor the inertial sensors. It is recommended that under those condition the virtual cable always originates directly ahead of the driver, regardless of any deviations from the centerline of the route.

Rather than having the virtual cable always be positioned relative to the centerline of the route, it may be desirable for the closest part of the virtual cable to be positioned relative to the driver and/or vehicle, especially during start-up, i.e., when a particular driving session commences, or when the road matching corrections can not be applied. The path could always begin, for example, 12 meters ahead of the vehicle, in the direction of the desired route's centerline, and 4 meters above, and aligned with, the driver's head. This approach may compromise the impression of virtual cable always adhering to a "trolley cable over the road" paradigm, i.e., that the cable is really there, since the virtual cable may not initially be positioned over a roadway (for example, while leaving a large unmarked parking lot, the shortest route to the exit as shown by the virtual cable may actually be blocked by parked cars and the driver needs to take that into account). However, there may be countervailing considerations that make this desirable.

Firstly, the precision then required to determine the actual position of the vehicle relative to the desired route's centerline may be lower than the precision required when the virtual cable is positioned relative to the centerline of the route. This is because if the virtual cable is initially positioned relative to the vehicle, the knowledge of the exact position of the vehicle relative to the width of the road is not necessary Thus displaying the virtual cable as initially being aligned with the driver's head irrespective of the centerline of the route may be particularly desirable when GPS accuracy is no better than 10 meters—which is typical for systems using standard GPS—without any other means of enhancing the vehicle position accuracy. Under such conditions the virtual cable would always appear to the driver in a predictable location, thus avoiding possible driver confusion or frustration.

Another reason is safety. Given sufficient accuracy and precision with which virtual cable is presented to the driver, the driver may become habituated to the idea of using the virtual cable as an exact delineator of the road surface underneath it in the same way the road curbs or painted lane dividers are exactly delineating the road surface or lane. In poor visibility conditions, such as for example during a snow storm, or when the road surface and the area around it are completely covered by deep snow, some drivers may try using the virtual cable as a substitute for the normal delineators of the road, such as the road curbs or painted lines. Such behavior would be inherently dangerous, since if the road surface itself could not be clearly visible, then neither would people, vehicles or other objects located on it. If the virtual cable begins in a substantially fixed relationship to the driver, and not to the road, the driver would quickly learn that he or she couldn't rely on the virtual cable as the means of exactly delineating the actual road surface. In other words, the virtual cable should serve as delineator of the route rather than the exact delineator of the road surface or a driving lane. If, in the future, a reliable system could be developed to show all significant road objects in poor or no visibility conditions, and the current position of the vehicle can be accurately known, such system could be combined with our method to allow the driver to drive in "instruments-only mode".

2.4. Height and Endpoints of the Virtual Cable

The virtual cable is presented in such a way that it appears to be suspended close enough to the surface being traveled on as to be easily visible—for example just above traffic-light-level—but high enough that the overhead navigation cable appears above the driver's area of sight. During on-going operation, as opposed to start-up and other circumstances as described above, all points of the virtual cable are in a substantially fixed relationship to the best current estimate of the centerline of the route and are located above the route's surface at the same distance above the corresponding points of the centerline located directly below them for the entire visible virtual cable. By the term "above the desired route's surface" we mean that the virtual cable is located on the same side of the route's surface as the driver. For example, if the virtual cable were displayed over a roller coaster rider's head, then at the top of a roller coaster loop, when a person is upside down, the virtual cable would be located below the roller coaster's surface, relative to the ground below. If the virtual cable path is not positioned directly above the centerline, such as in a start-up situation as described above, then the virtual cable should be at the same height nevertheless.

The implication of the virtual cable being at a fixed height relative to the surface means that in a hilly terrain the virtual cable will follow the significant curvatures of the route's surface in an up-and-down sense, similar to the way a trolley cable would. The significance and desirability of this feature can be understood by comparing FIGS. 3A and 3B.

Figure 3A:
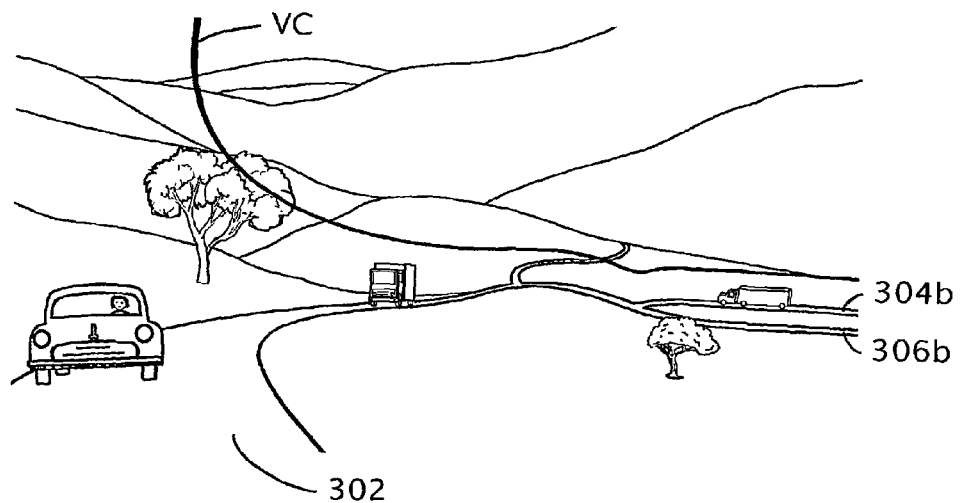
FIG. 3A presents a schematic example of virtual cable VC as seen by the driver in a hilly terrain.

FIG. 3A shows the VC presented at a constant height over the roadway 304b. Note how the virtual cable VC dips "down" in the distance in conformance with the roadway also dipping down in the distance and in such a way that is consistent with the laws of perspective. The driver can thus clearly see that adhering to the desired route requires taking the road 304b to the left, and not the road 306b to the right.

Figure 3B:
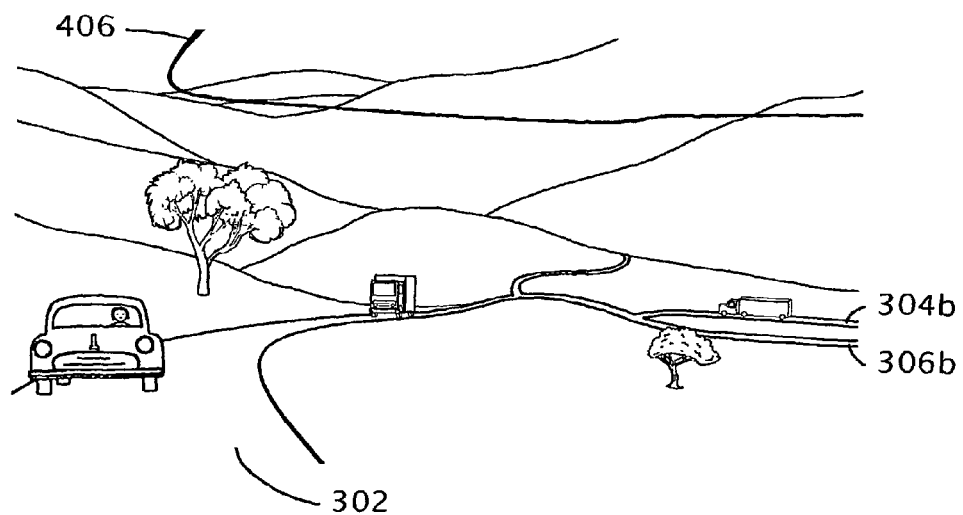
FIG. 3B is a schematic of a route display (however shown lower and in better alignment to the ground than suggested in the prior art route display) as seen by the driver in the hilly terrain shown in FIG. 3A.

In FIG. 3B, the overhead navigation map-line 406 is not imbued with these characteristics. As such it cannot be easily correlated by the driver with the desired road to the left 304b and instead could be mistakenly correlated with the road to the right 306b.

Figure 4:
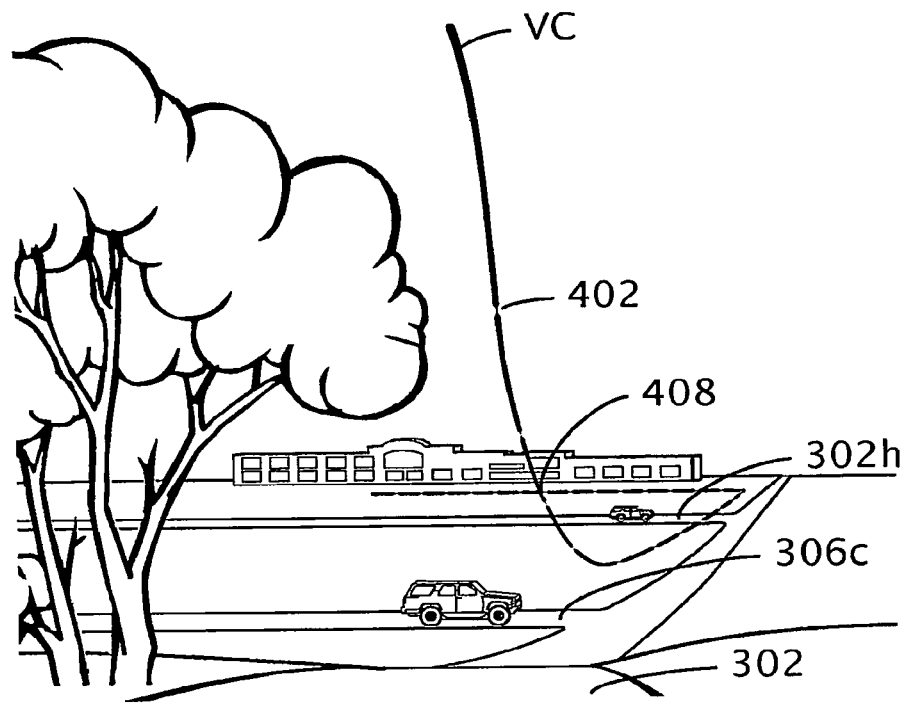
FIG. 4 is another example of the virtual cable as seen by the driver in a hilly terrain.
Figures 5A, 5B:
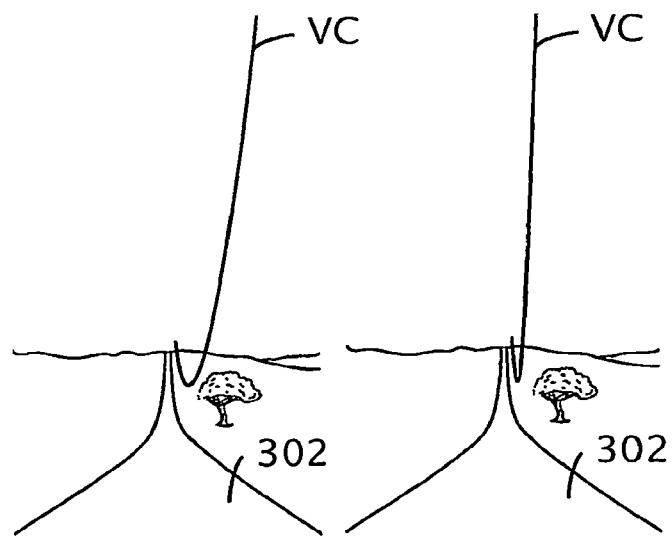
FIG. 5A is a schematic of another example of a virtual cable as seen by the driver in a hilly terrain.
FIG. 5B is a schematic of the scene of FIG. 5A seen from a viewpoint several inches to the right of the viewpoint from FIG. 5A, showing an effect of three-dimensional nature of the virtual cable.

FIG. 4 shows another example of a terrain where a line not imbued with the characteristics discussed would not be very useful. But the virtual cable VC shown in FIG. 4 does, in fact, give the driver unambiguous information as to the correct route ahead, which is the road 302h and not the closer road 306c. FIGS. 5A and 5B give an example of a terrain where a overhead navigation cable not having the above-described characteristics could give the driver correct navigation information, but would be distracting, since it could not form the correct optic flow within the landscape.

Figure 11A:
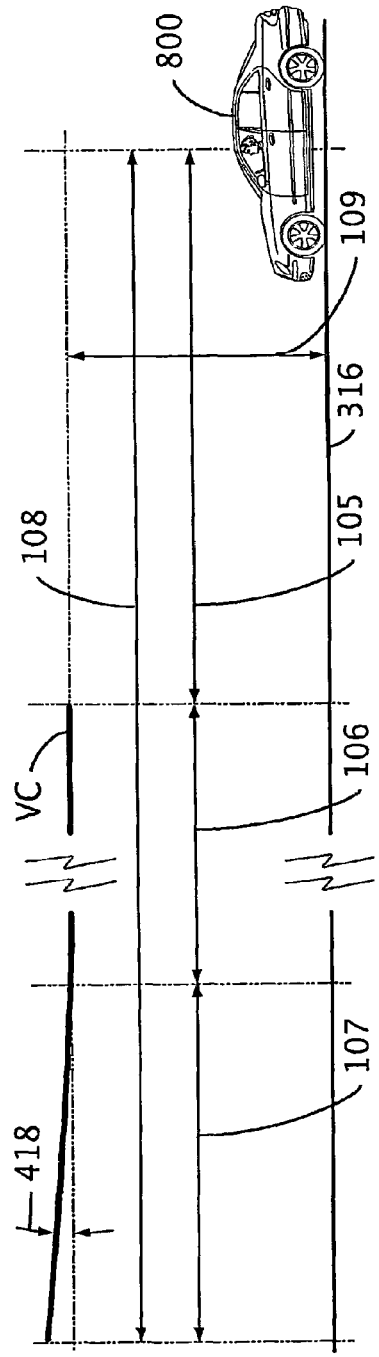
FIG. 11A shows various aspects of the apparent position of the virtual cable.

FIG. 11A shows various aspects of the positioning of virtual cable VC relative to a vehicle 800. This is a virtual drawing in that it depicts distances and dimensions for the virtual cable as they would be perceived by the driver. In this sense, the distances and dimensions shown in FIG. 11A are, in actuality, characteristics of the virtual cable path as defined above, i.e., the path the that the virtual cable appears to be on.

As shown in FIG. 11A, the virtual cable appears to begin at a certain distance 105 in front of the vehicle. It appears to end a certain distance 108 from the vehicle. These distances can be made adjustable under driver control. We believe that about 10 to 25 meters is a good choice for distance 105 for a typical passenger car. The distance 108 may driver-adjustable in the range of around 100 to 500 meters. The two end points of virtual cable VC appear to be moving with the driver. However, it is desirable for the distance 108 to be no greater than the distance of the vehicle to the destination. In other words, the length of virtual cable VC should be reduced to zero when the vehicle reaches the destination so that the virtual cable does not overreach the destination.

The height of virtual cable VC could be made continuously adjustable by the driver over a range of heights as part of the normal system operation. We believe, however, that it may be more desirable for the system to provide only a very few height settings, such as only three settings that might be called "normal", "low" and "high." Providing the driver with the ability to change the height over a continuous range may compromise the driver's ability to judge distance using the virtual cable. We believe that a useful height for the "normal" setting would be not too far above the standard roadside traffic lights or road signs, at around 5 to 10 meters above the roadway, for a typical passenger car and could be somewhat higher for taller vehicles such as for example trucks or buses, but preferably no more than 20 meters.

By the "low" setting we mean about 3 meters—the height about twice the distance between the drivers head and the road surface. When using the navigation cable for collision avoidance (as described later), such height provides, in the relative short distance from the vehicle, the most intuitive ("immediate") correlation between the navigation cable and the road surface. Another application for the "low" setting may be slow navigation through a crowded parking lot, where the driver needs to see the navigation cable relatively close to the vehicle and any turns that are relatively far away are of no immediate concern. As a safety feature, the low setting could be automatically disabled when the vehicle exceeds speeds typically safe in parking lots and the like (e.g. 5 to 15 mph), or the known (from map data) maximum legal speed for some slow-driving area. This could have additional benefit of "forcing" (at the penalty of getting lost) the driver to maintain safe speed in such areas.

Under certain driving conditions the driver may wish to have the virtual cable delineate the desired route relatively far away from the driver, up to the driver's horizon. For example a tourist in the Monument Valley in Arizona may use such a feature to see how the road that is not visible, for example hidden behind a hill, or located very far ahead, is positioned relative to the large rock formations far away. In this way the driver could ascertain whether the designated route would get him near those rock formations or not.

There are at least two ways in which this can be accomplished.

First, virtual cable VC may be raised to a much greater height, i.e. set to the "high" setting, for example to 50 or more meters. Then the distance 105 could be, for example, at least 120 meters and the distance 108 could be driver-adjustable in the range of at least few thousand meters. Alternatively, the initial segment 106 of virtual cable VC could remain at the normal height, of say 5 to 10 meters, but the farther segment 107 would gradually increase in height by some small angle 418. This would prevent the virtual cable from blending into the landscape far away from the driver. A drawback of this approach, however, is that the farther away segment 107 of virtual cable VC would not appear as being fixed to the ground, but it would be moving forward with the driver. We believe that the attributes of virtual cable VC, such as the length of the initial segment 106 of the virtual cable, the height 109 of the virtual cable above the road surface 316 and the angle 418 of increase in the height of the virtual cable above the road surface 316, should be in a relationship such that when the road surface is substantially flat, then for any two points $p_1$ and $p_2$ on virtual cable VC, if the point $p_1$ is closer to the driver than the point $p_2$, the part of the virtual cable at the point $p_1$ should be seen by the driver as appearing above the part of the virtual cable at the point $p_2$.

3. Color and Geometry of the Virtual Cable

In this section we describe the color and various aspects of the geometry of the virtual cable.

3.1. Color of the Virtual Cable

The virtual cable may be displayed as an object that is solid and in any color that the display apparatus being used could be made to provide. We believe, however, that even more useful than a solid appearance for the virtual cable is a dense but somewhat transparent glowing rod having a fog-like translucence. Such a red, fog-like appearance would provide a number of advantages. It would be easy to distinguish the virtual cable from any real objects likely to be found near or above the road, such as wires or cables. Its color is not very common in nature and thus easy to spot, allowing for relatively lower light intensity of the image than if other colors were used. In particular it is readily visible against blue or cloudy sky. As the result of being easy to notice due to color, the perceived thickness of such cable could be made relatively small, thus minimizing visual obstruction of any real objects. Because of its glow, the cable would be visible even in total darkness. Red is less blinding to the human eye in low light conditions than other colors. Even if, on occasion, the red cable were to be mistaken for a red traffic light, such error would result in the driver mistakenly slowing down or even stopping. By contrast, if the cable were green, for example, there is a chance that under certain conditions the driver could take it for a green traffic light, even where no traffic light was present at all, or where the traffic light was red or yellow. Moreover, red can be produced at sufficient intensity by a relatively inexpensive red laser.

3.2. Cross-Sectional Diameter of the Virtual Cable

The virtual cable of the present embodiment has a noticeable and substantially uniform diameter pre-set at an apparent value of illustratively 5 to 20 centimeters, or angular size (at the closest point) of illustratively 0.25 to 1.0 degree of angle. Having a noticeable diameter adds to the perception of reality, since such three-dimensional virtual cable could be created in the same perspective as the surrounding terrain, getting thinner with distance as a real cable would. This diameter may be made proportionally larger if the virtual cable is raised to a height above 10 meters. As is explained below, the displayed thickness of the virtual cable may be slightly higher towards the far end of the virtual cable than calculations strictly based on laws of the linear perspective would dictate.

We believe that the angular size (at the closest point) should not exceed 3 degrees of angle. Any larger size would be too distracting and obtrusive. It would also require a more powerful light source to project against light backgrounds.

3.3. Configuration of the Virtual Cable

Figure 10:
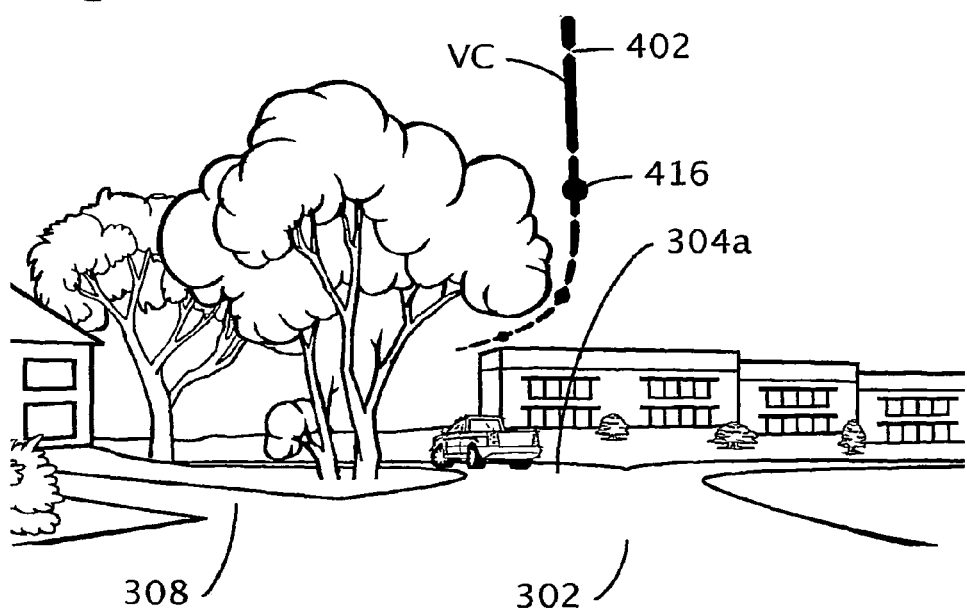
FIG. 10 is a schematic example of another alternative embodiment of the virtual cable as seen by the driver, the virtual cable having gaps and marker beads.

Virtual cable VC may have configurable gaps 402 (or decreases of luminosity), as schematically shown in FIGS. 10 and 4. Such gaps may allow the driver to judge his speed and to judge his distance from objects ahead. Gaps 402 may also enhance the illusion that the virtual cable is real by strengthening the stereoscopic effect and improving the optic flow effect. Since some drivers may find such gaps distracting or annoying under certain circumstances, the system may have the ability for the driver to switch between a smooth virtual cable and the one with gaps.

If the driver chooses the virtual cable with gaps 402 to be displayed, such gaps 402 should appear in apparently equal intervals along virtual cable VC (i.e., in actual equal intervals along the virtual cable path) and they should be in fixed position relative to the ground. Such interval size and gap size could be made to be adjustable by the driver as part of the normal system operation, but we believe that in a preferred embodiment these sizes should be fixed at the system configuration time at the factory according to some common standard. Since the distance between such gaps can be used by the driver to judge the distances on the road, for example the distance from the vehicle ahead, when changing vehicles the diver might misjudge such distances if the gaps are laid out differently from the previous vehicle. If the driver could change these sizes frequently, the driver's ability to judge distance and speed by using the virtual cable could be compromised. We believe that a good gap interval size should be comparable with the width of a typical road, probably around 5 to 20 meters and with the gaps being only so large that they can be noticed by the driver. The part of the virtual cable far away from the driver would usually be seen at a similarly shallow angle as the road underneath it. Therefore if the gap interval size of the virtual cable was similar to the width of a typical intersecting road, even a driver lacking stereoscopic vision would be able to judge which part of the virtual cable is positioned close to such intersection. This would help the driver to correlate the virtual cable with crossroads ahead. A scenario where this might be useful is schematically shown in FIG. 4, where the driver with poor stereoscopic vision may be confused whether virtual cable VC shown there pertains to the road 302h or the road 306c.

The size of the virtual cable gap 402 should be relatively small and comparable with the perceived width of the virtual cable. We believe that it should range from 1 to 10 of such widths. Since the far-away part of the virtual cable may be visible at a small angle and/or may be very thin, it may be useful to progressively increase the size of the perceived size of virtual cable gaps 402 along virtual cable VC away from the driver to make them easier to notice. We believe it to be preferable, however, for the gap interval size to remain constant.

Figure 8:
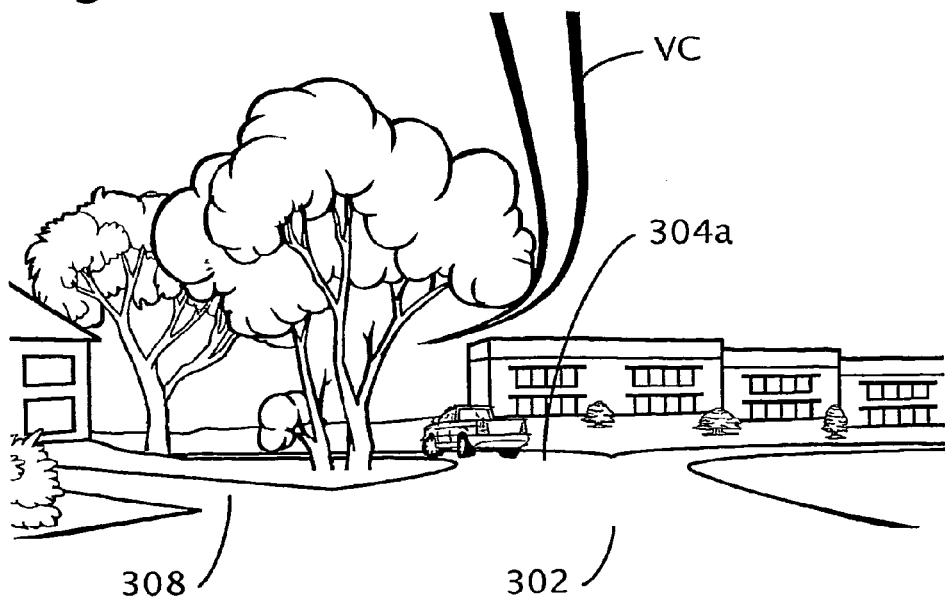
FIG. 8 is a schematic example of another alternative embodiment of a virtual cable as seen by the driver, the virtual cable being two parallel lines.

The virtual cable could be in a form other than that of a single round cable. For example, it could be made to appear as a flat ribbon. Or the virtual cable could be made up of a number of seemingly parallel lines, each shaped like the single-line virtual cable. This is shown in FIG. 8, where the virtual cable consists of two such lines, $VC_1$ and $VC_2$. Such a virtual cable shape could enhance the linear perspective depth cue described below.

Figure 7:
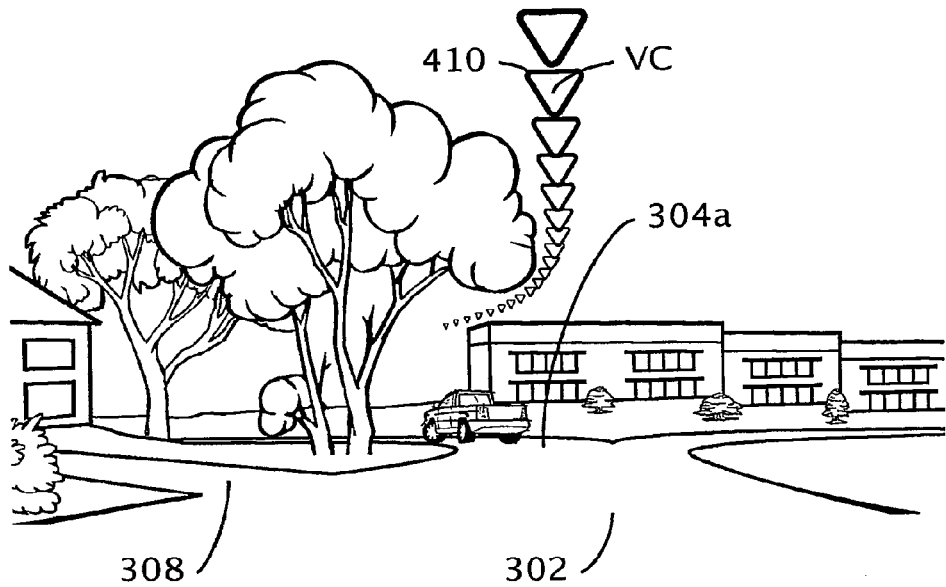
FIG. 7 is a schematic example of an alternative embodiment of a virtual cable as seen by the driver, the virtual cable being a set of discrete symbols which are lined up along the virtual cable path.

If desired, the virtual cable can have an appearance other than that of a cable per se. For example, as shown in FIG. 7, virtual cable $VC_3$ may comprise a series of graphic objects 410, centered on the virtual cable path. The shape of such objects could carry some meaning and could change over the course of time according to such meaning. For example, having the graphic objects 410 shaped as triangles, as shown in FIG. 7 could signify that a crossroad being approached has the right of way. To get the driver's attention in dangerous situations—for example when the vehicle is approaching such an intersection at excessive speed—the change of the form of the virtual cable could be augmented with a sound or voice message. The graphic objects 410 should be displayed in such a way that preserves the depth cues as described below. In particular, it is desirable to show correct perspectivic foreshortening of such objects 410. The graphic objects 410 in the FIG. 7 are shown as triangles positioned perpendicularly to the path of virtual cable. Therefore, in addition to the perspectivic foreshortening of their height (due to the increasing distance from the observer), such triangles should also be perspectivicly foreshortened in their width (due to the increasing angle at which the observer sees the far-away part of the virtual cable). In this description, the term virtual cable is intended to refer to any of these or other alternative forms of the navigation object regardless of its actual shape or whether it is comprised of more than one line.

4. Three-Dimensional Properties of the Virtual Cable

In order for an image superimposed on an observer's view of the environment to appear to either a stationary observer or to a moving observer as augmenting the environment—that is, perceived as being an integral part of such environment—the image must appear as being three-dimensional. Our virtual cable does actually appear to be three-dimensional because it is displayed volumetrically. This means that the virtual cable is displayed in a way that makes it appear to exist within some volume of the three-dimensional real world, even though it does so only as a "virtual optical image".

The perceived three-dimensionality of an image depends on the number and the type of the so-called depth cues present in such image, and the degree of fidelity of such cues. The apparatus disclosed herein imbues our virtual cable with a sufficient number and type of depth cues and with sufficient fidelity of those cues as to, in fact, cause it to be perceived as actually extending out along the roadway.

The extent to which the perception of three-dimensionality has, in fact, been achieved in a given situation is difficult to quantify since the influence of any particular cue on human perception of image reality varies greatly from one person to another. For example, to people who have one eye that is significantly more optically correct than the other, stereopsis is not critical in judging relative distance of objects. Such people may be accustomed to instead employ the motion parallax cue for this purpose, practically disregarding the binocular disparity cue. In any event, human perception can be forgiving when dealing with an imperfect image. Advantageously, then, an even somewhat less-than-perfect image—which can be produced by mostly conventional optical means, such as those described herein—can be more than adequate to produce the perception that the cable is real.

The present embodiment, in particular, implements the depth cues described below. Equipment that displays the virtual cable in such a way as to imbue it with these depth cues is described in a later section. Other depth cues that one might wish to implement, albeit not implemented in the present disclosed embodiment, are also described in a later section.

The cues that are implemented in the present embodiment are as follows:

Accommodation: This is the inducing of a change in focal length of the lens of the driver's eye as it focuses on different segments of the virtual cable, the focal length change being a function of the perceived distance of such segments from the driver. Although this cue is provided in the present embodiment, at farther distances along the virtual cable this cue has little impact. This depth cue is inherent in volumetric displays.

Convergence: This is the inducing of inward and outward rotation of the driver's eyes as they focus on different segments of the virtual cable, as a function of the perceived distance of such segments from the driver. This depth cue is inherent in volumetric displays.

Binocular disparity: This is the difference in the view of the virtual cable by the driver's left and right eye, resulting in stereopsis. FIGS. 5A-B show an example of the position of virtual cable VC as seen by the left and the right eye of the driver. This depth cue is inherent in volumetric displays.

Motion parallax: This is the change in view of the virtual cable in response to the driver's movement relative to the surrounding landscape. Such movement may involve small changes in the driver's head position. If the driver moves his head left and right, or up and down, while fixating his gaze in a constant direction, the portion of an object that appears to be closer to him moves a greater distance in the observer's field of vision than a portion of the object that appears to be further in the distance The relative apparent movement of the closer portion of the object is in the opposite direction to the movement of the driver's head. If the driver's head moves forward or backward, the angular size of a portion of an object that appears to be closer to him changes more rapidly in the observer's field of vision than the angular size of a portion of the object that appears to be further in the distance.

All such image changes are provided in the present embodiment and are substantially consistent with the motion parallax that would be observed by the driver if the virtual cable were a real cable suspended over the ground and located where the virtual cable was perceived to be.

When limited to head movements within the "eyebox" of the display apparatus, this depth cue is inherent in volumetric displays.

A motion parallax that is noticeable as a result of a continuous movement of the observer is frequently referred to as "optic flow". Optic flow is a primary depth cue that is used for spatial orientation by people incapable of stereoscopic vision. This "primordial" depth cue is also used by many living organisms, such as certain insects, that normally do not posses stereoscopic vision. Therefore the optic flow depth cue is very strong and can be experienced with little or no cognitive brain activity required. If the driver, together with the virtual cable apparatus, moves along the traveled path at a normal vehicle speed, the optic flow can be very pronounced. The consistency of the optic flow of the virtual cable with the optic flow of the surrounding landscape is critical to the accuracy of the driver's perception that the virtual cable is in fixed position relative to such landscape, as well as to the degree of the perceived three-dimensionality of the virtual cable. The consistency of the optic flow of the virtual cable with the surrounding landscape is maintained by frequent (about 30 times per second) re-calculations of the required perceived position of the virtual cable. These re-calculations, based on the best-estimate of the vehicle location, orientation, speed, etc. (relative to the surrounding landscape as defined by the map data), result in such adjustments of the perceived position of the virtual cable (relative to the moving vehicle housing the display device) that the virtual cable appears to be substantially stationary relative to the surrounding landscape.

Linear perspective: This is primarily the change in the perceived angular thickness of segments of the virtual cable as a function of the perceived distance of such segments from the driver, consistent with the linear perspective of the surrounding landscape. It is desirable for the virtual cable to appear substantially parallel to the delineated route. This poses the additional requirement that the linear perspective of the virtual cable distance from such route be substantially consistent with the linear perspective of the surrounding landscape. It is instructive to note that the above-discussed navigation swath 100*a* of the prior art as depicted in FIG. 2 does embody this one depth cue. One can see how the width of swath 100*a* narrows as a function of distance along the roadway. However, unless such a display implemented with a whole suite of depth cues, as with our virtual cable, there is little chance that swath 100*a* will be perceived as real. As a result, the driver would have to devote a significant amount of attention and cognitive effort to the display in order to "make sense" of what would otherwise appear to be (in this example) a flat crescent shape reflecting off the windshield. Like the optic flow, the linear perspective depth cue is not an inherent feature of our volumetric display, and as such it must also be re-calculated as frequently, and in agreement with the optic flow.

Retinal image size: This is comparison, by the human brain, of the relative image sizes of known-sized objects. For example, if a dog is observed having the same angular size as a horse (observed simultaneously), then based on the observer's knowledge of the usual difference in the actual sizes of these two animals, the observer will conclude (subconsciously), that the horse is farther away from him than the dog. In the case of virtual cable, after some time of observing it, the driver will be able perceive the distance of a particular segment of the virtual cable based on subconscious comparison of its perceived thickness with other known-sized objects observed simultaneously. Also the known interval between the cable gaps described above can be subconsciously compared to sizes of objects in the surrounding landscape (e.g. road, people, other vehicles, etc.). This depth cue is closely related to the linear perspective and as such does not require any special processing or calculations.

Dimming: This is the lowering of the perceived intensity of the virtual cable as a function of the perceived distance from the driver. This depth cue is not an inherent feature of our volumetric display. It is produced by the (laser) projector described below in conjunction with other components of the display device, based on frequent (e.g. 30 times per second) re-calculations by the computer (in concert with the other computed depth cues).

It may also be noted at this point that the perceived quality of a navigation objects—including is unobtrusiveness, immediacy, brightness and other attributes is dependent on the following factors: consistency of the optic flow of the navigation cable with the optic flow of the surrounding landscape; consistency of the optic flow of the navigation cable with the other depth cues; and consistency of the depth cues with one another. In general, it is better for a particular depth cue to be missing entirely than to be shown inconsistently with the other depth cues and/or the optic flow. This is because it is usually less distracting for the human brain to "imagine" the existence of the missing depth cue than to reconcile any inconsistencies. For example, a two-dimensional screen can produce convincing impression of depth with just the optic flow and the perspective depth cue. But if we presented such image "stereoscopically" (using two such screens), but in a way where the perceived stereoscopic depth was inconsistent with the perspective depth cue, then (to many observers) it would produce a distressing and annoying effect.

4.1. Note on the Depth Cues Presented in the Head-Up Volumetric Display

In our head-up volumetric display device, the virtual cable, while being rendered in accordance with laws of perspective as described before, is at the same time presented in a three-dimensional fashion with a number of depth cues present. The display device works by "painting" the image of the cable onto its internal projection screen with a laser beam in a stroke (also known as vector graphic) mode, and magnifying and reflecting the resulting image off the vehicle windshield into the driver's eyes. The virtual optical image thus seen by the driver appears superimposed on the real scenery seen through the windshield. The volumetric property is accomplished, in short, through continuously (during each scan period), adjusting a distance between that projection screen and the device's viewing optics. This action, because of a large longitudinal magnification of the viewing optics, results in the virtual image of the laser beam spot continuously changing its distance to the driver during each scan period, typically from some 10 to 20 meters to up to hundreds of meters. The viewing optics allow the driver to see the same virtual optical image with both his eyes. The perceived virtual cable can be thought of as the sum of all the instances of the virtual image of the laser spot through the scan period, and is perceived as a line because of the persistence of the human vision. Each position on the virtual cable, corresponding to a virtual image of the laser beam spot at some instant of time during the scan period, virtually emits a cone of light toward the observer. When hitting the observer's eyes, the light from a given spot is divergent, and a degree of this divergence is related to the optical distance from the observer to a given spot's virtual image in space, and therefore varies along the virtual cable. In other words, the wavefronts of the light coming from different positions along the virtual cable have different curvatures, with radii equal to the distance to each position.

One result of this varying divergence is parallax—the phenomenon of image perspective shift when observer eye moves across an exit pupil of the display device. The parallax results both in stereopsis (i.e. the stereoscopic view), since each of the observer's two eyes is in different position within the device exit pupil, as well as in "head motion parallax"—the view of the virtual cable will change slightly as the observer moves his head (left to right, up and down or any other direction) within the exit pupil of the display device. And, unlike other three-dimensional displays which separately compute an image for each eye and for each new view-point, there is inherently no time lag (i.e. delay) between a movement of the observer's head and an corresponding change in the look of the virtual cable.

Yet another direct result of this varying divergence is that focus of the virtual cable changes with apparent distance along its length. FIG. 14A and FIG. 14B illustrate this. For pedagogic purposes, the effect as shown is exaggerated compared to an effect which an observer using unaided vision would be seeing. A reasonable depiction of a viewer's actual experience of this focus change effect is that seen by looking through the viewfinder of a single-lens-reflex camera equipped with a large aperture lens. If an eye (or the camera) is focused to close distance, e.g. 15 meters, then the nearby volume of space 318a, containing section of virtual cable VC, which is displayed about 15 meters away, together with those elements of the real scenery (here: trees) which are about 15 meters away from the observer, is rendered in-focus (sharp). But the far-away volume of space 318b, containing the section of virtual cable VC that is displayed about 50 meters away or more, together with those elements of the real scenery which are about 50 or more meters away from the observer, is out of focus (blurry). That situation is depicted in FIG. 14A. The FIG. 14B shows opposite situation where the observer's eye (or a camera) is focused at the far distance, e.g. 50 meters or more. Now the nearby section of virtual cable VC, as well as the nearby scenery, are rendered blurry, and the far-away objects, beyond the imaginary "near-far boundary" 110, including the far section of the virtual cable. are rendered sharp.

Note that because stereoscopic effect, head motion parallax and varying focus along the virtual cable are all direct manifestations of the same phenomenon (i.e. varying divergence of light), all three are consistent with each other in every respect, which in turn reinforces a strong illusion of reality for the virtual cable.

5. Overall System Description

Figure 15C:
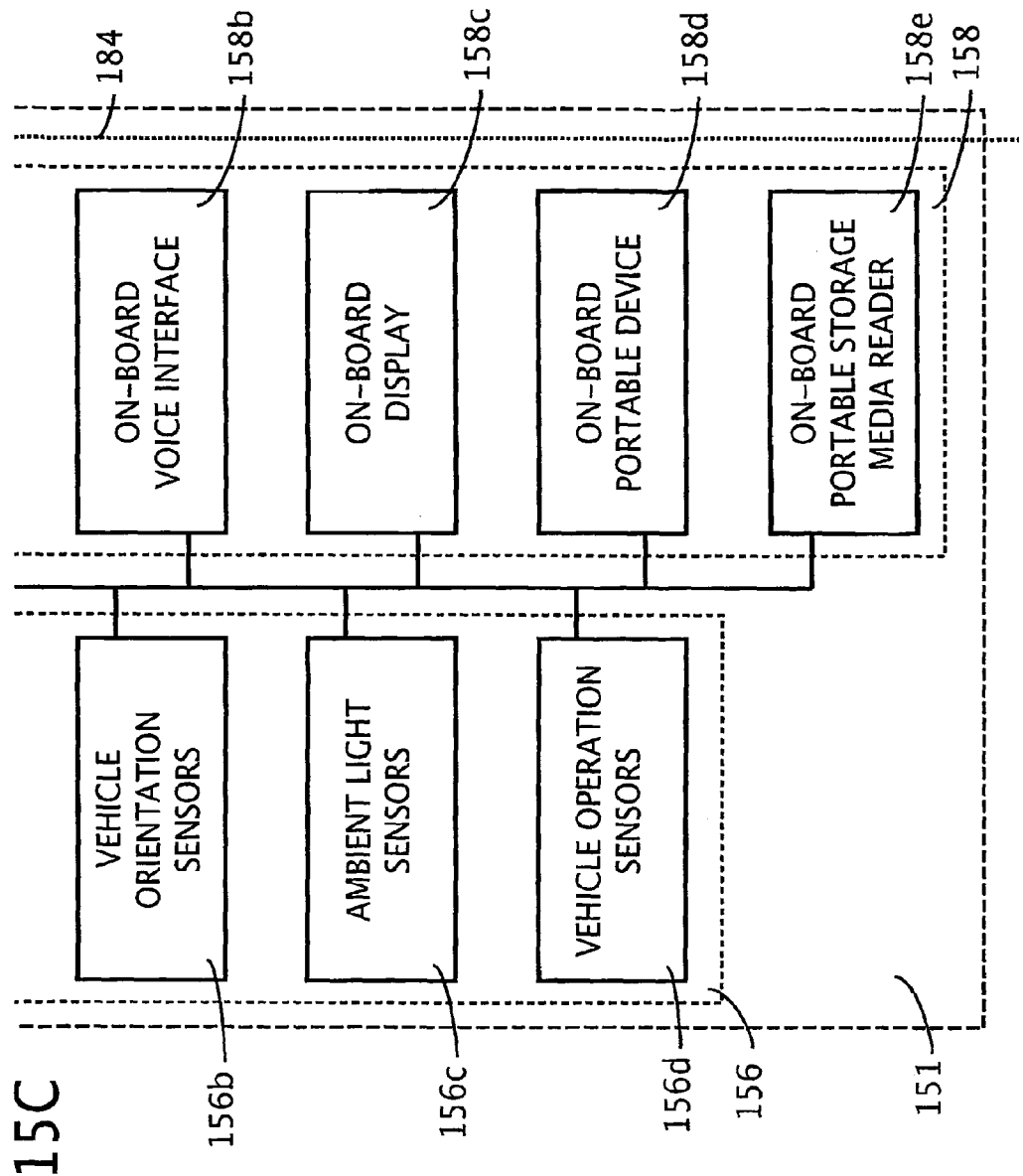
Figure 15D:
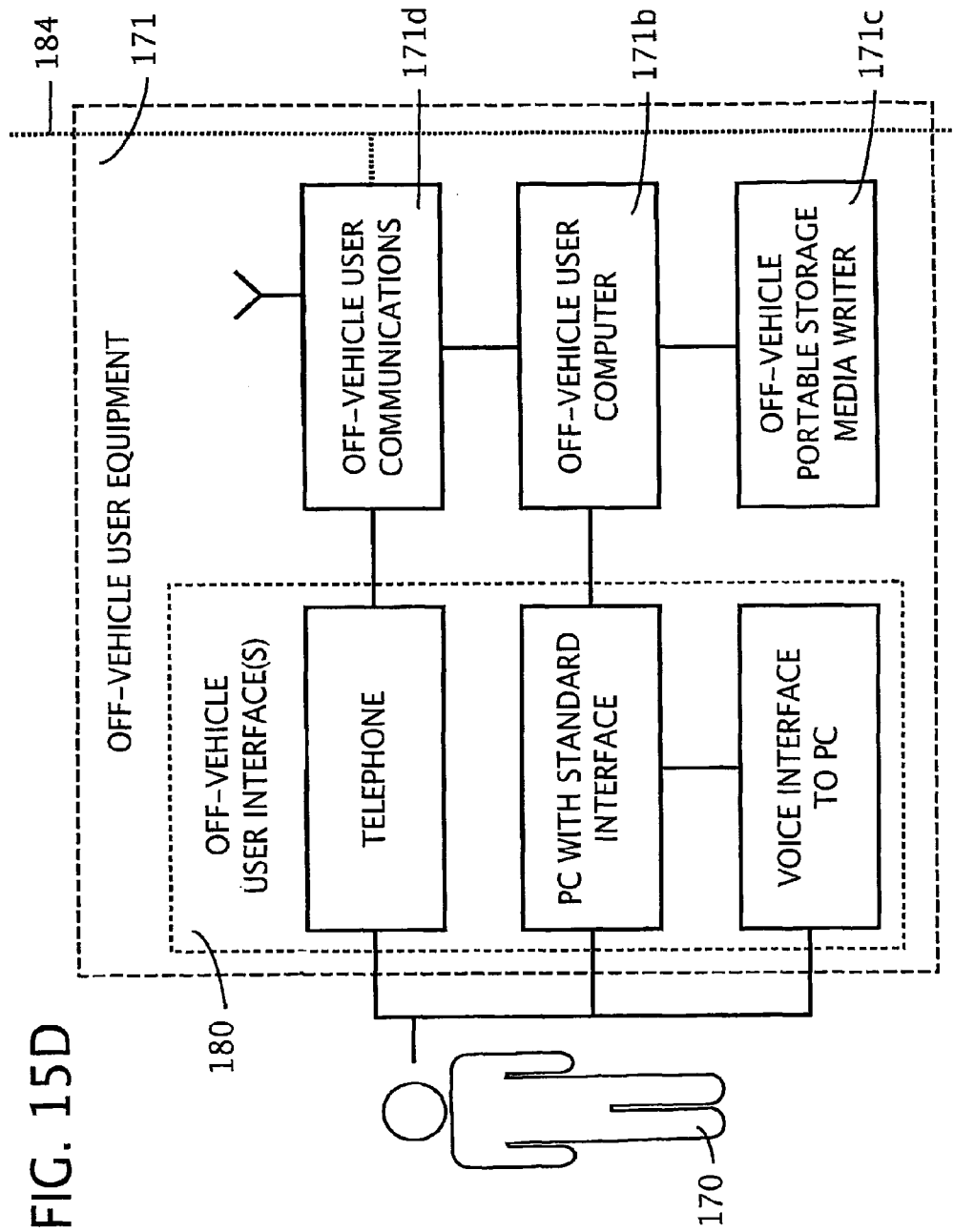
Figure 15E:
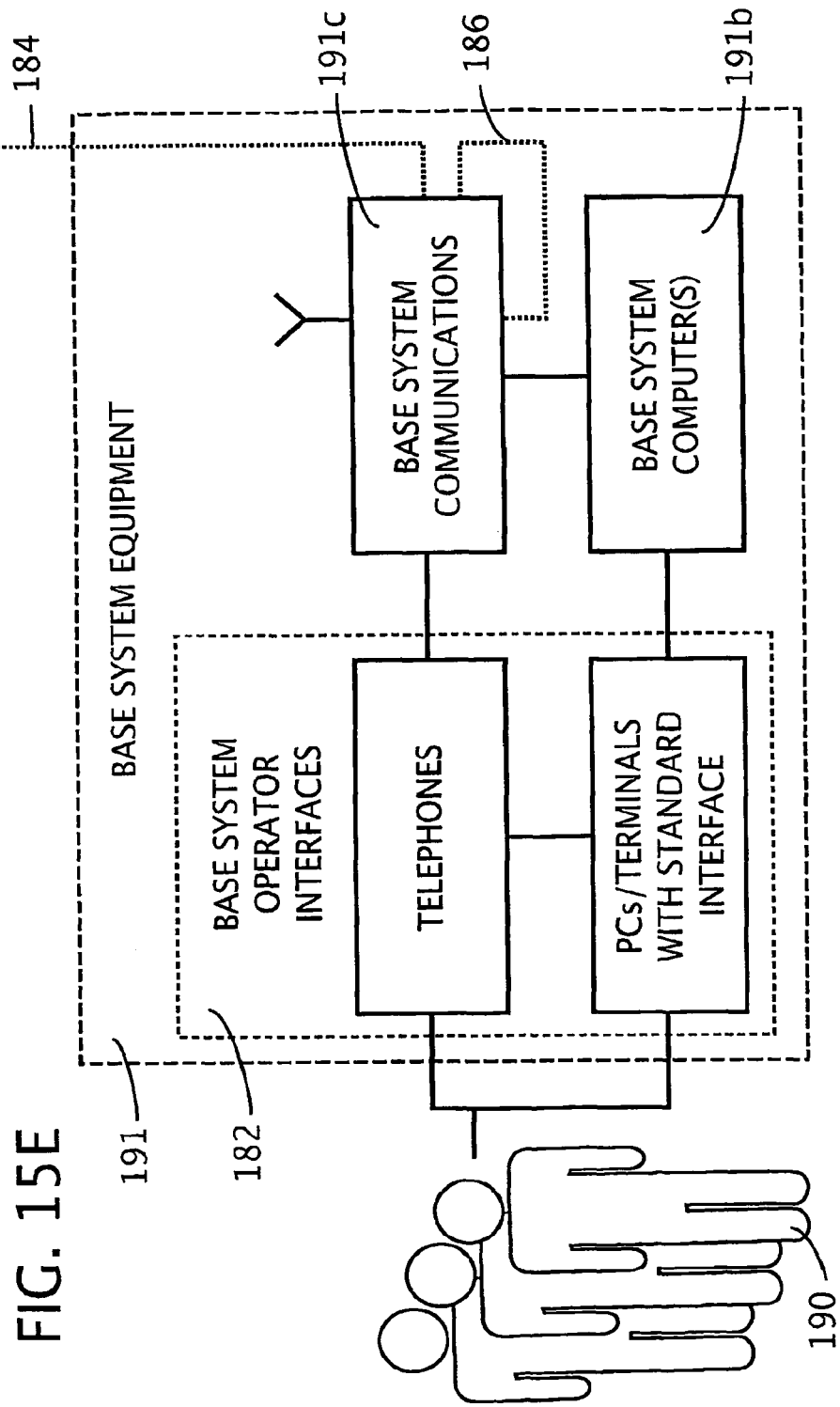

FIGS. 15B-15E, which arranged as shown in FIG. 15A comprise a schematic diagram presenting all of the major components of a system embodying the principles of the invention. As seen, the system includes three major components; on-board equipment 151, base system equipment 191 and driver's off-vehicle equipment 171. A dashed-line box marks grouping of components, for example, the on-board equipment 151 or base system operator interfaces 182. Particular embodiments or uses of the invention may not include and/or involve the base system equipment and/or driver's off-vehicle equipment. Although the use or involvement with the base system equipment and driver's off-vehicle equipment may enhance or simplify functionality of the on-board equipment, it may be desired in a particular implementation to forego such enhancement or simplification for technical or business reasons. In such a case, the on-board communications component 154 (described below) of the on-board equipment 151 may not be needed, as its function is to provide a way of communicating with the base system equipment and/or driver's off-vehicle equipment.

The thick solid lines between the boxes indicate the presence of some form of local communication between the components represented by the boxes. The dashed lines indicate some form of remote communication between the sets of equipment, such as between the on-board equipment 151 and the base-system equipment 191. Of course such communication links are only required if the communicating elements are present and/or used.

It may also be noted that certain components of the base system equipment and/or driver's off-vehicle equipment may require presence of other such component or components, creating interdependencies among the secondary components. Although some such dependencies may be discussed explicitly herein, a manner of their implementation is within the skill of those in the art.

5.1. On-Board Equipment

Figure 18A:
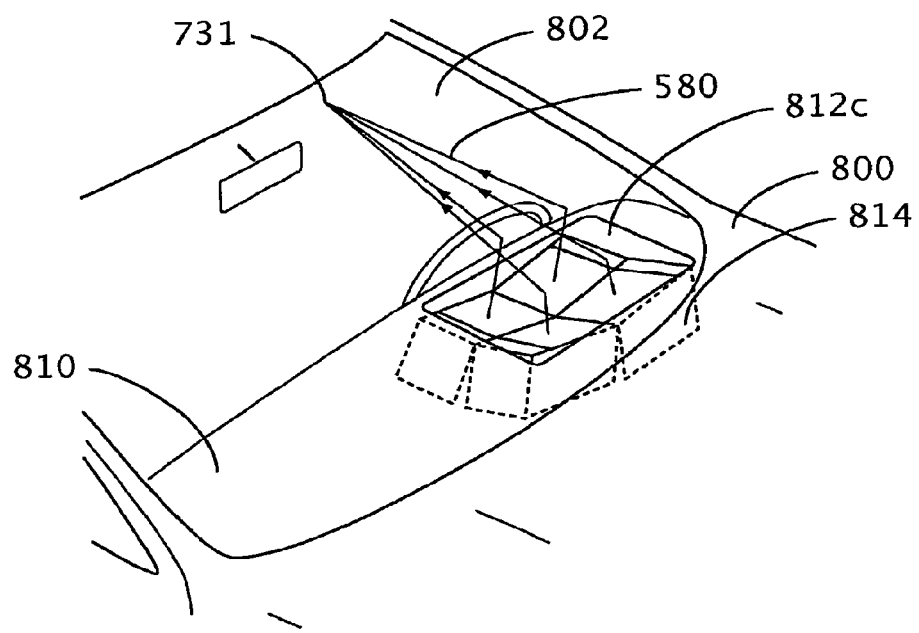
FIGS. 18A-18B present an oblique view of the vehicle showing in schematic the positioning of the display device within a vehicle, when a mosaic of several separate display sub-units is used as the display device. Oblique schematic view of an example of an embodiment of a display sub-unit.

As seen in FIGS. 15B-C, the primary components of the on-board equipment 151 are virtual cable display device 804, or multiple devices 804 when the array of such devices is employed, as in FIG. 18A; combiner 760; on-board communications 154; on-board computer 152, driver control or interface devices 158 and sensors 156.

On-board equipment 151, together with the software controlling operation of a number of components of the on-board equipment is referred to herein as the "virtual cable apparatus". The software needed to operate the virtual cable apparatus may be executed in on-board computer 152 and/or in a controller of a particular component. All software required to operate the virtual cable apparatus can be developed by those skilled in the art using standard software-development techniques.

5.1.1. Virtual Cable Display Device and Combiner

Virtual cable display device 804 and combiner 760 are used to generate and display the virtual cable to the driver. Display device 804 is illustratively a laser-based device that "paints" an image of the virtual cable onto combiner 760. The latter may be, for example, the windshield of the vehicle or may be a separate element. Two illustrative light rays $R_1$ and $R_2$ of the total ensemble of light rays comprising the image of the virtual cable are shown emanating from display device 804, and reflecting off of combiner 760 to the eyes of the driver 150. The FIG. depicts how those rays are then perceived by the driver as having emanated from beyond combiner 760, typically out above the roadway, to give the impression that that is where virtual cable VC exists.

Although reference is made throughout this description to there being a single virtual cable display device 804, it should be understood that in particular embodiments it may be possible or desirable to carry out the described functionality of device 804 using two or more separate virtual cable display devices operating and being controlled in coordination.

Various illustrative alternative implementations of display device 804 and combiner 760 are presented hereinbelow.

5.1.2. On-Board Communications

The on-board communications 154 comprises apparatus for communicating with base system equipment 191 and/or the driver's off-vehicle equipment 171. On-board communications 154 is needed if the system implements the various features described herein involving interaction among the on-board equipment, the base system equipment 191 and/or the driver's off-vehicle equipment 171. In communicating with the base system equipment, on-board communications 154 may establish a wireless connection to the public phone network and/or the Internet, similar to, for example, the wireless connection capabilities of a modern cellular phone. Or it may establish a dedicated wireless connection, for example by using a radio link. In communicating with the driver's off-vehicle equipment 171, on-board communications 154 may establish a wireless connection to the public phone network and/or the Internet, similar to, for example, the wireless connection capabilities of a modern cellular phone. When on-board equipment lacks the capability of direct communication with the non-on-board equipment, a physical means of data "communication", i.e. data transfer, can also be used, such as portable storage media such as DVDs, CD-ROMs, flash memory and others. In this scenario, a PDA or a laptop computer equipped with some short-range communication technology (e.g. Bluetooth®, etc.), which does not require a physical connection to the on-board computer (also equipped with such technology) could also be considered a form of a portable storage medium. Note that such device could also play the role of the on-board portable device 158*d* (described later).

5.1.3. On-Board Computer

On-board computer 152 can be any of a number of known, commercially available computers capable of executing software that implements the functions of computer 152 described herein. If desired, more than one computer could be used to carry out those functions, many of which functions can be performed in parallel. Thus although reference is made throughout this description to there being a single on-board computer 152, it should be understood that in particular embodiments it may be possible or desirable to carry out the described functionality of computer 152 using two or more separate computers operating and being controlled in coordination.

The main functions of on-board computer 152 is now listed. Some of those functions are presented at this point in summary form. As necessary, further details as to those functions are presented at a more opportune point later in the description.

- Storage in and retrieval from a persistent data store, such as a computer hard disk, of the location data, in the chosen absolute three-dimensional space (i.e. expressed in a three-dimensional, earth-centered, earth-fixed coordinate system), of available destinations and/or points of interest, such as addresses of residences, businesses, schools, parks, etc., for a certain geographical area chosen by the driver. Portable storage media, such as DVDs, CD-ROMs and flash memory may be used in combination with on-board portable storage media reader 158*e*, to store and/or update the abovementioned data in the persistent data store of computer 152.
- Storage in and retrieval from the persistent data store of the following data related to the centerline or centerlines of the available routes for a certain geographical area chosen by the driver: route(s) centerline location data in the chosen absolute three-dimensional space, traffic direction data, maximum speed data and vehicle restriction data applicable to the vehicle. Portable storage media, in combination with the on-board portable storage media reader 158*e*, may be used to store and/or update the abovementioned data in the persistent data store of computer 152.
- Storage in and retrieval from the persistent data store of the system configuration data: physical configuration attributes of the virtual cable display device 804, the driver preferences related to the visual aspects of the virtual cable, the driver preferences related to the criteria for informing or not informing the driver of the availability of alternate routes and/or proximity of certain points of interest, association of a configuration switch with a particular system configuration, etc. Portable storage media, in combination with the on-board portable storage media reader 158*e*, may be used to store and/or update the abovementioned data in the persistent data store of computer 152.
- Control of and/or participation in some aspects of the system configuration process, as described later and as depicted in FIGS. 56B-56F and FIGS. 57B-57F.
- Control of the human interface, facilitating initial specification, or a later change, of the destination and/or point of interest or a particular route, by the driver. Such activity may involve an on-board voice interface 158*b*, an on-board display 158*c*, such as an LCD flat-panel display with a touch screen and/or a keyboard with a pointing device, or the on-board portable device 158*d*, such as a notebook computer, PDA, cell phone or other similar portable apparatus.
- Selection of a presumed best route, or several alternative routes, based on driver-specified criteria, such as the desired destination, any point of interest along the way, shortest travel time or the shortest travel distance.
- Collection and processing of data obtained from the vehicle location sensors 156*a*, vehicle orientation sensors 156*b* and the ambient light sensors 156*c a*.
- Calculation of the movement of projection screen 602 described below.
- Calculation of the X and Y movements of the scanning laser beam 550 described below.
- Calculation of the focus, profile and others properties of the scanning laser beam 550, as well as the direction and degree of change of such properties, as described below.
- Calculation of the brightness of the scanning laser beam 550, as well as the direction and degree of change in brightness, as described below.

5.1.4. Sensors

All sensors are described herein in terms of their required functionality rather than in terms of a particular technical design. There are many ways known in the art, by which each sensed measurement utilized by the virtual cable apparatus—such as a vehicle location measurement—can be obtained. In some cases, instead of obtaining a particular measurement directly from a sensor, such measurement can be calculated from other known measurements. For example, a change in location can be calculated from measurements of speed over time. Also, the accuracy of most sensed measurements, such as a vehicle location measurement obtained from the "raw" GPS data, can be considerably improved by combining it with other known measurements obtained by other means, such as in the case of the GPS example, the vehicle location, obtained by measuring the vehicle's travel distance, along a known road, from the latest accurately known location. Such accurately known location could be determined with good accuracy by road matching. The travel distance itself could be obtained, for example, by combining measurements obtained from the vehicle's odometer and speedometer with measurements obtained from accelerometers. Such techniques of combining multiple measurements obtained by independent means, such as for example a Kalman filter, are well known to those skilled in the art.

5.1.4.1. Vehicle Location Sensors 156*a*

Vehicle location sensors 156*a* provide a measurement of the location of some chosen fixed point of the vehicle, in some chosen absolute three-dimensional space, at a particular moment in time. By some absolute three-dimensional space herein, we mean some Earth-centered, Earth-fixed three-dimensional coordinate system. Since the position of the body of the driver inside of a vehicle is in a substantially fixed relationship to the vehicle, such chosen fixed point of the vehicle may correspond to the approximate position of the view point of the driver (such as view point 731 discussed below). Location of such view point relative to the vehicle may vary between drivers, but we believe that such differences will be too small to be of any practical consequence.

The location information of the view point of the driver can be combined with the following other known information: the location (i.e. the set of coordinates), in the same absolute three-dimensional space, of the centerline of the desired route; the desired preset height of the virtual cable above the traveled surface; and the desired preset thickness and any other desired geometrical attributes of the virtual cable, such as whether it should appear as a line or as a string of geometrical objects.

With such combined information, on-board computer 152 is enabled to carry out several functions. These functions include calculation, by geometrical calculations known in the art, of a) the shape of the virtual cable and the distance of the starting point and the ending point, along the path, in the same absolute three-dimensional space, of the virtual cable from the view point of the driver at a particular moment in time, and b) the apparent thickness and the apparent shape, from the view point of the driver, (i.e. a "flattened" shape, as e.g. a camera, located where the driver is, would record it), as well as the distance at each point of the entire visible virtual cable at a particular moment in time. Another such function is for the on-board computer 152 to anticipate, i.e. calculate ahead of time, changes to the abovementioned values, based on the anticipated position of the view point of the driver in the near future. Such near-future position can be estimated, by methods known in the art, from the vehicle's current location and the vehicle's current speed and acceleration. Such speed and acceleration may be known by observing changes in vehicle's location over time, and/or may be obtained directly from relevant sensors.

5.1.4.2. Vehicle Orientation Sensors 156b

Vehicle orientation sensors 156b provide a measurement of the orientation of the vehicle in some chosen absolute three-dimensional space, at a particular moment in time. Herein we define the terms "orientation of the vehicle" or "vehicle orientation" as the orientation of an imaginary straight line stretching between two fixed points of the vehicle, chosen in such a way that the straight line connecting such points is parallel to the lines traveled by the fixed points of the vehicle when the vehicle travels straight on a flat surface, as well as "roll" angle, usually small, of the vehicle around such chosen line.

The vehicle orientation measurement can be combined with the following information: the driver view point location; the known position and orientation of the combiner 760 relative to the vehicle; the known position and orientation, relative to the vehicle, of the virtual cable display device 804; the known relevant characteristics of the virtual cable display device 804 and its components, such as the optical properties, and others; the intensity of the ambient light in front and above the vehicle, obtained from the ambient light sensors 156c described below.

With such combined information, on-board computer 152 is enabled to calculate, by geometrical, optical and other calculations known in the art, various functions described in this specification: the movement of the projection screen 602 described below; the movement of the scanning laser beam 550 described below; the focus and the profile of the scanning laser beam 550, as well as the direction and degree of change of such properties; the brightness of the scanning laser beam 550, as well as the direction and degree of change in brightness.

5.1.4.3. Ambient Light Sensors 156c

Ambient light sensors 156c measure the intensity of the ambient light in front and above the vehicle, where the virtual cable appears to be located. This information is used to adjust the intensity of the virtual cable in such a way that it will be visible, but not blinding, under the most common range of the ambient light conditions experienced by drivers of motor vehicles. Under certain extreme conditions, such as in direct sunlight shining in the driver's eyes, the virtual cable may not be visible. Driving under such conditions poses a more serious problems than the issues of the visibility of the virtual cable. When it is safe to drive, but the virtual cable is poorly visible, the driver may rely on the navigational cable displayed on a dashboard screen, shown superimposed onto a real-time camera-view of the forward scenery. For easier correlation, it is preferred that such image would substantially match the perspectivic view of the virtual cable against the real scenery.

5.1.4.4. Vehicle Operation Sensors 156d

Vehicle operation sensors 156d provide the measurement of the pressure, if any, applied by the driver on the brake and the gas pedals. If the brake pedal pressure exceeds a preset level, the brightness of the virtual cable is lowered until the driver releases the break pedal. But if the pressure increases to yet another level, the virtual cable display is suspended until the driver presses the gas pedal again. This is a safety feature designed to reduce or eliminate distraction that may be caused by the virtual cable at a time when the driver is likely to be preoccupied with avoiding collision or any similar maneuvers that require maximum attention from the driver. This safety feature is not applicable to use of the virtual cable in collision-avoidance systems.

5.1.4.5. Note on Calculations Performed in Response to Sensor Data

The abovementioned description of the calculations of the attributes of the virtual cable and the state of the virtual cable display device 804 is not meant to imply that such calculations should be performed in precisely the manner described and/or in the order described. There are many ways, known in the art, by which such calculations could be consolidated and optimized. For example, it may not be necessary to actually calculate the shape of the virtual cable in some three-dimensional coordinate space as some intermediate stored result used in further calculations. It may be preferable to devise an algorithm where the vehicle location and orientation information is combined with the location of the centerline of the desired route and the attributes of the virtual cable display device 804 to result in direct computations of the required steering data for the virtual cable display device 804 controllers. By "steering data" we mean a set (usually as a continuing "data stream") of encoded instructions and/or numeric data produced by computer 152 and designed to "steer", i.e. direct a given device in accordance with such instructions and/or numeric data. By "controller" we mean any device that is designed to interpret such data and, based on such interpretation, produce signals (usually electric currents of certain characteristic), necessary to control behavior of various electro-mechanical or electronic devices, such as projections screen 602 or laser 502.

The accuracy and the perceived reality of the virtual cable display are affected by the accuracy of the measurements of sensors 156a, 156b and 156c, as follows:

The accuracy of the perceived location of the nearby portion of the virtual cable relative to the centerline of the desired route is limited by the accuracy of the vehicle location measurement relative to such centerline of such desired route. Typically the far-away portion is affected primarily by the orientation accuracy (see the next bullet). If, for a particular embodiment of the location sensors 156*a*, the maximum accuracy of the vehicle location measurement, relative to the centerline of the desired route, is $M_1$ meters (where $M_1$ may be 1 meter, for example), then the maximum accuracy with which the virtual cable apparatus could render the location, relative to the centerline of the desired route, of the nearby portion of the virtual cable could not be greater than $M_1$ meters. This is because the location of the virtual cable, relative to the vehicle, is calculated based on the vehicle location information, relative to the centerline of the route. By "accuracy of $M_1$ meters" we mean that the distance between the correct and the actual location measurement is normally less than the distance of $M_1$ meters. Of course any errors in the location data of the centerline of the desired route could also have similar impact on the accuracy of the perceived location, relative to the true centerline of the desired route, of the nearby portion of the virtual cable. Any brief changes in the vehicle location, relative to the centerline of the desired route, for example due to bumps on the road, will normally have practically negligible impact on the accuracy of the perceived location of the virtual cable, even if such changes are ignored. Such changes, however, if not accounted for, may have a considerable negative impact on the correctness of the optic flow and the motion parallax of the virtual cable relative to the surrounding terrain, especially in the part of the virtual cable that is closer to the driver. Imagine that the vehicle location, due to an unaccounted bump on the road, is briefly raised by 10 centimeters, relative to the centerline of the desired road. Such change, if unaccounted for, would raise the height of the virtual cable by the same distance. Such movement could be noticeable by the driver if there were any terrain objects, such as wires or trees in the vicinity of the virtual cable, thus spoiling the impression that such virtual cable is in a fixed position relative to the surrounding terrain. Therefore, regardless of the accuracy of the vehicle location of the virtual cable in the chosen absolute three-dimensional space, the accuracy of the measurements of so-called high frequency changes in the vehicle location should be comparable to the thickness of the virtual cable. There are many ways known in the art in which this can be accomplished.

The accuracy of the perceived orientation of the virtual cable relative to the centerline of the desired route is limited by the accuracy of the vehicle orientation measurement relative to such centerline of such desired route. If, for a particular embodiment of the orientation sensors 156*b*, the maximum accuracy of the vehicle orientation measurement, relative to the centerline of the desired route, is $D_1$ degrees of angle (where $D_1$ may equal 1 degree, for example), then the maximum accuracy with which the virtual cable apparatus could render the orientation, relative to the centerline of the desired route, of the virtual cable generally could not be greater than $D_1$ degrees of angle. This is because the orientation of the virtual cable relative to the vehicle is calculated based on the vehicle orientation information, relative to the centerline of the road. By "accuracy of $D_1$ degrees of angle" we mean that the angle between the correct and the actual orientation measurement is normally less than the $D_1$ degrees of angle. Of course errors in the centerline data of the desired route could also have impact on the accuracy of the perceived orientation, relative to the true centerline of the desired route, of the virtual cable. The accuracy of the vehicle orientation measurement, relative to the centerline of the desired route, should be such that the virtual cable should appear to be oriented substantially the same as such centerline of the desired route. In other words, in the preferred embodiment of the virtual cable, it should appear substantially parallel to the centerline of the desired route. Any brief changes in the vehicle orientation, relative to the centerline of the desired route, for example due to bumps on the road, if not accounted for, may have a major negative impact on the accuracy of the perceived orientation of the virtual cable. Such changes will have most impact in the part of the virtual cable that is farther away from the driver. Imagine that the vehicle orientation, due to an unaccounted bump on the road, is briefly changed by 1 degree of angle, relative to the centerline of the desired road. Such change, if unaccounted for, would move the part of the virtual cable located 100 meters from the driver by around 1.75 meters relative to the corresponding part of the centerline of the desired route. Such movement could be easily noticeable by the driver, thus spoiling the impression that such virtual cable is in a fixed position relative to the surrounding terrain. Therefore, regardless of the accuracy of the vehicle orientation of the virtual cable in the chosen absolute three-dimensional space, the accuracy of the measurements of so-called high frequency changes in the vehicle orientation should be comparable to the angular thickness of the virtual cable at its far end. There are many ways, known in the art, in which this can be substantially accomplished.

5.1.5. User Controls

User (driver, passenger, etc.) controls 158 include on-board mechanical controls 158*a*, on-board voice interface 158*b*, on-board display 158*c*, on-board portable device 158*d* and on-board portable storage media reader 158*e*. Only a certain subset of these controls may be needed to provide the functionality of the virtual cable apparatus, depending on which of the functionalities described herein, or other functionalities, are implemented in a given embodiment.

Any combination of the abovementioned, or any other similar controls, can be considered sufficient to support the requirements of the disclosed embodiment if such controls collectively facilitate a number of functionalities.

One of those functionalities is turning on/off on-board equipment 151. This can be accomplished by means of on-board mechanical controls 158*a* or on-board voice interface 158*b*.

Another functionality is to allow initial specification or a later change of the destination and/or point of interest or a particular route, by the driver or other user, such as a passenger. Such activity may involve on-board voice interface 158*b*, on-board display 158*c*, such as an LCD flat-panel display with a touch screen and/or a keyboard with a pointing device, or on-board portable device 158*d*, such as a notebook computer, PDA, cell phone or some other similar portable apparatus.

Yet another functionality is to perform system configuration, which includes a number of things. These are:

Changes in the physical configuration of the virtual cable display device 804, such as adjusting the orientation of the virtual ray 584 (described below) at approximate center of the field of view of the virtual cable display device 804 in order to accommodate to the sitting position of a particular driver, by adjusting the position of such virtual cable display device 804 and/or the position of the combiner 760. This can be accomplished by means of the on-board mechanical controls 158*a*, or the on-board voice interface 158*b*, the on-board display 158*c* or on-board portable device 158*d*.

Initial specification or a later change of the driver preferences related to the visual aspects of the virtual cable, such as the height at which the virtual cable appears to be displayed, the length of the visible portion of the virtual cable, the perceived thickness of the virtual cable, and others. This can be accomplished by means of the on-board display 158*c* or the on-board portable device 158*d*.

Initial specification or a later change of the driver preferences related to the criteria for informing or not informing the driver of the availability of alternate routes and/or proximity of certain point of interest. This can be accomplished by means of the on-board display 158*c* or the on-board portable device 158*d*.

Loading data into the persistent data store, as described above in connection with the description of on-board computer 152.

Associating a configuration switch with a particular system configuration. A driver could then select a particular system configuration by using such switch. A particular configuration could be set or selected by means of the on-board mechanical controls 158*a*, or the on-board voice interface 158*b*, the on-board display 158*c* or the on-board portable device 158*d*, such as a notebook computer, PDA, cell phone or some other similar portable apparatus.

5.2. Base System Equipment

The on-board equipment 151 and/or the driver himself or other user, such as a passenger, can interact with a base system that comprises base system equipment 191, the base system software and the base system operators 190. There may be multiple locations within the base system for the base system equipment 191 and the base system operators 190. Reference numeral 186 denotes a wide area communication link between the multiple locations of the base system equipment 191.

The base system equipment 191 comprises base system operators' interfaces 182, base system computer or more likely computers, 191*b*, and base system communications 191*c*.

Base system operators' interfaces 182 include computer terminals or PCs with keyboards and pointing devices, connected to the base system computer 191*b*, and voice headsets. The operators' interfaces are used by the system operators 190 to communicate with the driver 150 or other base system user 170 who may be located either on-board or off vehicles equipped with the virtual cable apparatus. (The user 170 as depicted in the drawing might or might not be the same person who is the driver 150.) The operators' interfaces also operate the base system software designed to facilitate the driver support and other functions, as described herein.

Base system computer or computers 191*b* runs the base system software.

Base system communications 191*c*, is used by the base system equipment to facilitate communications with various entities. These entities include a) on-board equipment 151 which is may be communicated with via a connection to the public phone network and/or the Internet, or via a dedicated wireless connection, for example by using a radio link, and/or b) the driver's off-vehicle equipment 171, which may be communicated with via connection to the public phone network and/or the Internet. Base system communications 191*c* may also be used by the base system equipment to facilitate communications between the system operators 190 and the system users 150 and/or between multiple locations of the base system equipment, if such multiple locations exist.

The fact that the on-board equipment and/or the driver is enabled to communicate with base system operators and their equipment provides a number of advantages, as will now be enumerated.

The base system computer 191*b* can store and deliver to on-board computer 152 as needed the above-mentioned location data mentioned above in connection with the description of on-board computer 152. A particular advantage of this capability is that the abovementioned data can be kept up to date without any involvement of the driver. Another is that the required capacity of the persistent storage of the on-board computer can be reduced.

The driver 150 can verbally specify the destination and/or point of interest to the base system operator 190. Advantageously, the verbal specification can be made in far more general and ambiguous terms, and using more poorly pronounced language, than it would be practically possible by using on-board voice interface 158*b* with on-board computer 152. If the driver request is unclear, such system operator 190 can be more capable to resolve such confusion faster and at lower frustration level of the driver than a reasonably complex software program would. Another advantage is that the system operators 190 may possess, or have access to, knowledge about many areas of interest, such as dining, shopping, sports, entertainment, arts, etc., and be able to give an intelligent and informed advice to the driver 150.

Our navigation method is so easy to use that following any unfamiliar route to an unfamiliar destination by means of the virtual cable is not unlike following a familiar route to a familiar destination. The driver does not need to have any special skills or training in using other means of specifying the destination and/or point of interest information, such as on-board display 158*c*. In contrast to the computerized voice interface, the driver 150 does not need to memorize any verbal commands to effectively communicate with the base system operator 190.

The driver 150 can request that the base system perform certain operational and/or configuration tasks required by the virtual cable apparatus, such as downloading the required data from the base system computer 191*b* to on-board computer 152. This may be advantageous in that if such a request is specified verbally to the base system operator 190, the driver 150 does not need to have any special skills or training in using other means to perform such operational and/or configuration tasks. In contrast to the computerized voice interface, the driver 150 does not need to memorize any verbal commands to effectively communicate with the base system operator 190.

The virtual cable apparatus's configuration and/or the driver preferences data can be stored in the base system computer 191*b* and then downloaded to on-board computer 152 when the driver 150 requests it. This way the same configuration and/or the driver preferences, associated with a particular driver, can easily be set in any vehicle equipped with a compatible virtual cable apparatus. Such feature may be of a great convenience to people who frequently change vehicles, for example by renting them or getting a vehicle from a fleet.

The base system may be aware of status and location of the vehicle. As a result, the vehicle can easily be tracked when stolen. In addition, the base system may be able to be automatically notified of collisions, for example when the accelerometers in the virtual cable apparatus detect the level of acceleration/deceleration typically associated with collisions. The base system may then attempt to contact the driver and if not successful, then automatically relay such information to the police or other emergency services.

5.3. Off-Vehicle User Equipment

The off-vehicle user environment comprises the user's off-vehicle equipment 171 and the required software. The user's off-vehicle equipment 171, in turn, includes user interfaces 180, off-vehicle user computer 171b, off-vehicle portable storage media writer 171c, and off-vehicle communications 171d.

Off-vehicle user interfaces 180 include for example, a computer monitor with a keyboard and a pointing device, a computer voice interface and a telephone. The user interfaces 180 are used by the user 170 located off the vehicle to communicate with the base system operators 190 and operate the software, executing in the off-vehicle user computer 171b and designed to facilitate the user support and other functions as described herein.

The off-vehicle user computer 171b runs the required software.

The off-vehicle portable storage media writer 171c is a device capable of writing to portable storage media types that can be read by on-board portable storage media reader 158e.

The off-vehicle communications 171d facilitates communications with on-board equipment 151. This may involve a connection to the public phone network and/or the Internet, or portable storage media that can be read by on-board portable storage media reader 158e. It also facilitates communications with the base system equipment 191. This may involve a connection to the public phone network and/or the Internet. It also facilitates communications between the system user 170 and the base system operators 190. Reference numeral 184 denotes a wide area communication link between the user's off-vehicle equipment 171 and the base system equipment 191.

Combining the virtual cable apparatus with the above-mentioned off-vehicle user environment can provide the functionality of the retrieval of the location data, in the chosen absolute three-dimensional space, of the available destinations and/or point of interest, such as addresses of residences, businesses, schools, parks, etc., as well as the location data related to the centerline or centerlines of the available routes in the same chosen absolute three-dimensional space, for a certain geographical area. The retrieval can be carried out from, for example, any appropriate Internet-based source, can then be stored in the off-vehicle user computer 171b and can then be delivered to on-board computer 152 as needed.

The system as just described has a number of ramifications. For example, it makes the system easy to use. Indeed, following any unfamiliar route to an unfamiliar destination, by means of the virtual cable, is no less convenient or cumbersome to the driver than following a familiar route to a familiar destination. This places many more potential destinations, such as restaurants, stores, tourist locations and others, within easy reach of the driver. This, in turn, will create demand for the route guidance information for such destinations. Such information could be delivered in a way that is integrated with our method, saving the driver the trouble of having to specify the destination information himself or herself. There may also be a business opportunity involving delivery of advice regarding various points of interest, together with the corresponding route guidance information, to the interested drivers. Such information could be available on the Internet. The point of interest information could be presented in any of the ways used in Internet publishing. The route guidance information could be encoded in some standard way and made available for download. This would be conceptually similar to the map links on a web site describing a particular point of interest today, but instead the interested driver would download the encoded route guidance information. In addition, the user 170 may prefer, at least sometimes, to learn of various points of interest by browsing or searching the Internet rather than talking to the base system operator 191.

6. Head-Up Volumetric Display 6.1 Overview

Illustrative systems embodying the principles of our invention embodiments use a volumetric head-up display device having a number of novel, independently inventive features to present a virtual optical image of a virtual cable to the driver, such image being of high perceived quality and brightness, and imbued with several major depth cues, such as stereoscopic disparity, motion parallax (free of any significant time lag), convergence, focus, perspective and dimming, all those cues being consistent with each other. The following describes the display device illustratively used herein as a particular embodiment that incorporates the aforementioned novel, independently inventive features. The illustrative embodiment of the display device is designed specifically to produce a non-pixelated, smooth, sharp and bright volumetric moving image of a line (or a few lines). At any point in time, a displayed line can have thickness gradually changing along the length of the line and can be very thin, and can have changing brightness along the length, and can follow any path "weaving" in three dimensions through a large volume of space in front of the driver. Such path can be arbitrarily shaped and positioned, including having a few "sharp" turns, as long as the "complexity" of such shape is reasonable (for example, having a number of sharp turns less then about 5, and having a number of broad turns, or "ups" or "downs", less than about 20). Since, in practical terms, there is no need to display the virtual cable so far ahead as to show more then a few upcoming sharp turns, such characteristics of a display device are particularly well suited for displaying the virtual cable for road navigation in a motor vehicle.

The illustrative embodiment of the display device employs a compound-microscope-type optical system (i.e. a system using two separated lens groups, a relay lens group (an "objective") and a large eye-side lens group (an "eyepiece")) as its viewing optics. The optics are illustratively "binocular", i.e. the device has a single exit pupil which is large enough to accommodate both eyes of the driver, with some room for head movements. The light leaving the eye-side lens group is illustratively reflected of a windshield, or, alternatively, a separate "combiner", toward the driver, who, as the result, sees a virtual three dimensional image of the cable being superimposed onto the outside landscape or scenery, seemingly extending far (e.g. hundreds of meters) from the vehicle. The primary image (i.e. the image which, when seen through the viewing optics, becomes the virtual image of the cable) is a real volumetric image created by rapidly scanning a laser beam onto an internal projection screen. In the illustrative embodiment this primary image is repetitively "painted" in a vector graphic, or "stroke" mode, typically at least 30 times per second. During each cycle, while the laser beam is moved across the surface of the projection screen, the position of the screen relative to viewing optics along the optical axis is being continuously and precisely adjusted by a speaker-like device. This continuous adjustment is done in coordination with the scanning motion of the laser beam spot on the screen surface, and the adjustment motion is specifically tailored to the particular image being painted. Both motions together, and the persistence of human vision, result in the primary image being volumetric (and more specifically, being a line which can be bent in all three dimensions). The depth (i.e. the extend along the optical axis direction) of this primary image is illustratively less than an inch, but because of the extremely high longitudinal magnification of the viewing optics illustratively employed, the resulting final virtual optical image can extend from, illustratively, little more then 10 meters all the way to hundreds of meters from the driver. The size, profile and brightness of the laser spot projected onto the projection screen is, in the disclosed system, continuously varied through continuous refocusing the laser beam during each scan cycle in coordination with the scanning motion of the laser beam spot on the screen surface while the primary image is being painted; This results in a virtual cable having the apparent thickness conforming to proper perspective. The above-mentioned independently novel features, and other novel features of the laser projector, the projection screen and viewing optics—as well as novel methods employing these—are described in detail below.

6.2. Some Definitions

It is important to note that the purpose of the definitions given below is not at all related to the fact that the virtual cable is not a "real" (i.e. material) object. Indeed, if we were to describe certain geometrical and visual properties of a section of a real, steel cable suspended in front of an observer, the definitions given below would be just as useful. Instead, the purpose of the following definitions is to avoid ambiguities when describing thickness, length, direction, position and brightness of a three dimensional object, to differentiate between two quite different, yet equally commonly used, meanings of each of those words. Those definitions will then apply to all the subsequent text of this document.

Let's first use an example, not related to virtual cable, to explain the two different meanings of each of those words.

Imagine that there are two spherical marbles, $M_a$ and $M_b$, both glowing uniformly. Marble $M_a$ is 1 inch in diameter, 100 inches north of the observer $O_v$ and at his eye level, and is emitting 1 lumen of light. Marble Mb is 2 inches in diameter, 200 inches north of the observer $O_v$, with it's center 2.1 inches above observer's eye level, and is emitting 4 lumens of light.

On one hand, the marbles are located in three-dimensional space, where their "separation" is about 100 inches from each other, and one is twice as far from the observer $O_v$, twice the "size" and 4 times "light-output" (understood as luminous intensity, in any direction) then the other. The "brightness" per unit of surface (understood as luminance), however, is the same for both of them. Here the terms "separation", "size", "light-output" and "brightness" are used in what we will call the first meaning.

On the other hand, the observer $O_v$ sees the same scene in perspective, and therefore he may notice more readily that both marbles $M_a$ and $M_b$ are of the same apparent "size" (each has an apparent angular diameter about 0.57 degrees of angle) and both glow with the same apparent "light-output" and also with same apparent surface "brightness", even as one marble ($M_b$) appears further away than another. To our observer $O_v$ they also appear very "close" to each other (marble $M_b$ just "above" marble $M_a$, with almost no "separation"). Here the terms "separation", "close", "above", "size", and "light-output" are used in what we will call the second meaning.

To clarify which of the just described two popular meanings of term "size" (or "separation") is used, it is a standard method to refer to the "size" in a former sense as "actual" or "linear" size and measure it in, for example, inches, and to refer to the "size" in a latter sense as "apparent" or "angular" size and measure it in, for example, degrees of angle. When a quantitative description of a scene is called for, it is a standard method to employ a three-dimensional Cartesian coordinate system when referring to "actual" values, but to employ a spherical coordinate system with origin point at $O_v$ when referring to "apparent" values.

However, in our case, using such spherical coordinates, to describe the "apparent" view is awkward.

Therefore instead of using spherical coordinates, we can, in our case, define our own "custom" coordinate system. It will allow very simple definitions of thickness, length, direction and brightness of a virtual object in the third sense, and that third meaning will be a simple, precise and adequate substitute for the above mentioned second meaning of those terms.

Figure 11B:
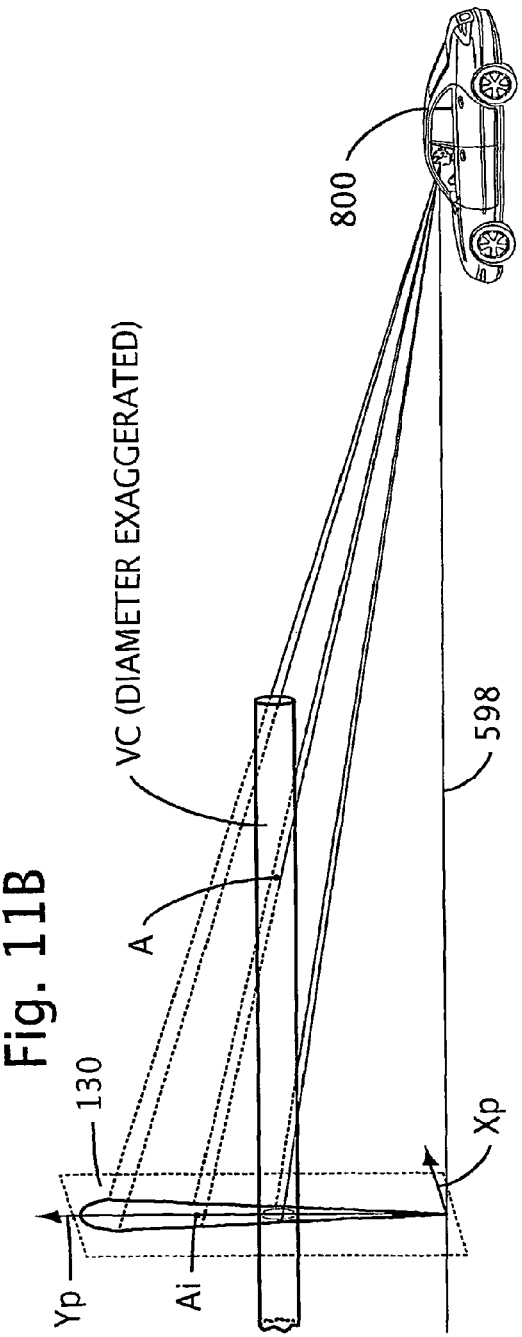
FIG. 11B illustrates how we construct our custom coordinate system.

FIG. 11B illustrates how we construct our custom coordinate system and how a virtual cable relates to it. The field of view of the display device described further is small, typically not much over 20 degrees. This allows us to use a perspective projection to project, with negligible distortion, all of the space visible to the observer inside the field of view onto a flat view plane 130, also known as a perspective plane. There is some inherent distortion of angles and areas in perspective projection—for example a projected image of a hypothetical spherical marble will be slightly elliptical when the marble is near the edge of our field of view, but this is of no consequence to our further description. The view plane 130 is positioned in front of the vehicle 800, 100 meters from point 731, is vertical and perpendicular to the longitudinal axis 598 of the vehicle 800 body. We also choose a local two-dimensional planar Cartesian coordinate system within the view plane 130, which origin (0,0) is straight in front of point 731, $X_p$ axis is horizontal oriented toward the right, and $Y_p$ is vertical pointing upward, and (0,1) and (1,0) points are each 1 inch from (0,0). For a given point A in space within the field of view, we can project it along a straight line through the point 731 to the point Ai of intersection of such line with the view plane 130. We say that point Ai is a projected "image" of the point A.

Now our custom coordinates for a given point A would be ($x_p$, $y_p$, r) where $x_p$ and $y_p$ are coordinates of the projected image $A_i$ of the point A onto the view plane 130, in the above mentioned two-dimensional planar Cartesian coordinate system, and r (radius) is the distance of A from the point 731, in inches.

Having defined our custom coordinate system, we may now define the third meaning of the term "size": size of a given object in the field of view means the size of the object's projected image on the view plane 130, that latter "size" meant in usual sense (i.e. the size as normally defined on standard two-dimensional flat Euclidean plane; with our Cartesian coordinate system it is expressed in inches). The same principle applies to defining the third meaning of terms "thickness", "separation", "distance", "length" and "area".

Similarly, the third meaning of "angle" between any two given lines is defined as an angle between projected images of those lines onto view plane 130.

Let's also define the third meaning of the relative position terms like "above" ("left of", "near" etc): point A is "above" B if projected image of A on the view plane 130 is above projected image of B in the standard sense.

The third meaning of "luminance" (or surface "brightness") of a given luminous object is defined as (standard) luminance that the surface of the view plane 130 would have to have toward the point 731 to match apparent luminance of that given object, point by point, as seen from point 731, In other words, if we pretend that all the light which is coming from the given object is instead coming from projected image of that object, then the luminance meant in the standard way of that projected image toward the point 731 is what we mean by luminance in the third sense of the given object. Take notice that in this sense an object without a well defined surface, for example cloud of glowing fog, will have well defined luminance. Also take notice that for any large solid object radiating uniformly in every direction, the luminance in the first and the luminance in the third sense are always identical. The luminance in the third sense is measured in the same units as the standard luminance, for example candelas per square foot.

The "light-output" is not a standard photometry term, but we have mentioned it before referring to it's two meanings. Now we will define the third meaning of "light-output" as follows: for a given luminous object in the field of view of the display device, the "light-output" in the third sense is defined as integral of luminance over the projected image's surface area. That luminance is of the surface of the view plane 130, which it would have to have to match apparent luminance of that given object, point by point, as seen from point 731. The "light-output" in the third sense is therefore measured in candelas.

Having made the above definitions of three meanings of the above mentioned terms, let's from now on use the following convention: for each term relating to size, distance, area, angle, brightness or position, if we prefix the term with "linear-definition-" then we are using the first meaning of the term, if we prefix the term with "visible-definition-" then we are using the third meaning of the term (we will not use the second meaning of the term any more). Here is a hypothetical example of such usage: "In this scene, the virtual cable is 200 meters linear-definition-long and 5 inches linear-definition-thick for it's entire length. It also is visible-definition-perpendicular to the horizon and, because the road is straight and slightly up-hill, the virtual cable is so foreshortened that it is only 5 meters visible-definition-long."

6.3. Positioning of Display Device within the Vehicle

Figure 16A:
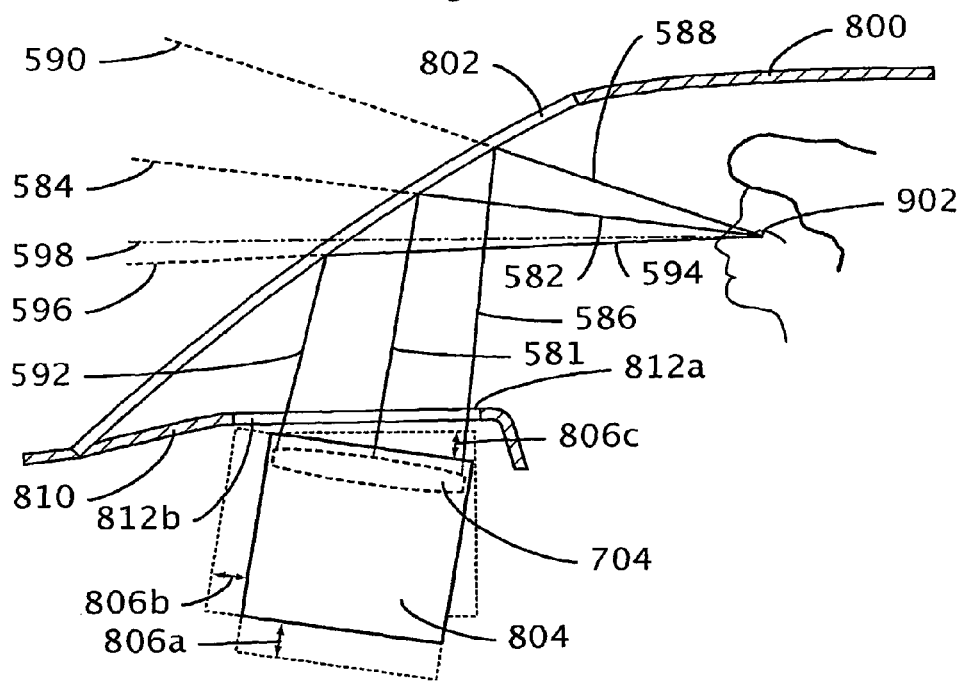
FIG. 16A is a schematic vertical cross-section of a vehicle in which a system embodying the principles of the invention is installed, the cross-section being taken through a plane parallel to longitudinal axis of the vehicle and which includes driver's position, showing the positioning of a display device in the vehicle and showing the rays delimiting the vertical field of view of the display device, when the vehicle's windshield is used as the display device's combiner.
Figure 16B:
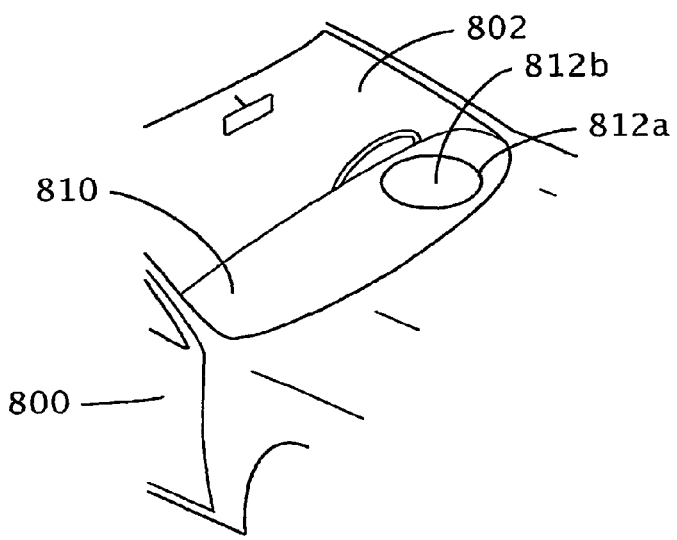
FIG. 16B is a schematic oblique view of the vehicle showing the size and location of the optical opening in the dashboard above the display device, when the vehicle's windshield is used as the display device's combiner.

FIG. 16A shows a schematic vertical longitudinal cross-section of the dashboard area of a vehicle 800 in which on-board equipment 151 is installed. FIG. 16B shows a schematic oblique view of the vehicle showing the size and location of the optical opening 812a in the dashboard 810 above the display device. These FIGS. show the driver's position, vehicle's windshield 802 used as the display device's combiner, and the display device 804 positioned under the top of the dashboard 810. As noted above, the combiner is that component of the head-up display system that combines the view of real objects, such as the road ahead, as seen through the combiner with the image of some object or objects, such as the overhead navigation cable, that are reflected from the combiner, so that the reflected image is superimposed over the real view.

Also depicted in FIG. 16A are certain light rays emanating from display device 804. These are "along-axis" ray 581 (i.e. a ray approximately coincident with optical axis of the display device) and the rays 592 and 586 delimiting the vertical field of view of display device.

The display device 804 is schematically depicted as wholly contained within its enclosure. The optical exit aperture of display device 804 is located is on top surface of the enclosure. The aperture is illustratively either round, near-round or near-rectangular and has a diameter sufficient to provide about 20 or more degrees of field of view in both horizontal and vertical direction. In a typical passenger car this would be about 12 or more inches in diameter.

Dashboard 810 has an opening 812a in its top surface to allow the light from display device 804 to pass toward windshield 802. Opening 812a preferably is covered by an optical window 812b. Both opening 812a and optical window 812b can also be seen in FIG. 16B. For drawing clarity, optical window 812b is shown as being a little larger than opening 812a and disposed on top of the dashboard. It will be understood, however, that the window could be installed in such a way that it is flush with the top surface of the dashboard.

Optical window 812b is illustratively colored deep red (i.e. is a narrow spectral bandpass filter tuned to the laser light from display device 804). As a result, only the small percentage of ambient light, e.g. sunlight, illuminates the inner parts of display device 804. Those parts will thus be effectively be hidden from the direct view and from the reflected view (in the windshield), resulting in a more esthetic device. Additionally, on those occasions when the relative positioning of the sun and the vehicle leads to the direct sunlight entering the device, the blocking of most of the wavelengths of sun light by optical window 812b helps avoid heat damage to display device 804 that focused sunlight might otherwise cause. Optionally, for esthetic reason, the opening 812a can also be covered by mesh or micro-louvers. However, this will lower the clarity of the display somewhat. The position of display device 804 is adjustable and opening 812a is large enough to accommodate all the light generated by display device 804 in any of its possible positions.

Since different drivers sit in different positions, there is a need to adjust the position of the exit pupil of display device 804 to match position of driver eyes. This can be accomplished by providing adjustment means to move the enclosure of the display device 804 in direction 806a substantially up and down along the optical axis to move reflected exit pupil horizontally back and forth, together with providing adjustment means to move the enclosure of the display device 804 in direction 806b substantially back and forth perpendicular to the optical axis to move reflected exit pupil vertically up and down. Additionally a tilting adjustment 806c can be provided, as well as left to right adjustment (not shown). Such adjustments could be made by servo-motors that are controlled by the driver through appropriate dashboard control switches.

Since the car windshield generally is not optically neutral (i.e. it is not flat), such adjustments slightly alter the optical properties of the display system as a whole (i.e. display device together with the windshield). This can be compensated for by simultaneous adjustments of the position of a windshield-curvature-compensating element or elements within the display device, together with adjusting of distortion compensating formulae in graphic generating software.

The design of such elements and software is within the abilities of those skilled in the art.

The rays 592, 581 and 586 reflect from the windshield 802 and continue as rays 594, 582 and 588, respectively, toward the driver 902. The reflectivity of the windshield preferably is enhanced in the narrow wavelength range around the wavelength which is used by display device 804's projector laser. This can be accomplished by incorporating a dielectric layer(s) on or within the windshield, such layer(s) acting as an interference reflective film being tuned to the wavelength and impingement angle of the laser light being used. Since more of the laser light is reflected by this interference film then by the glass/air boundary, which is left uncoated, using such a film also renders less noticeable the slight "double image" effect from the double reflection of light (i.e. reflection from both the front and the back surface of the windshield). Instead of a plain dielectric interference filter film, a film incorporating a thin metallic coating may be used, similar to one used in solar control Sungate® windshields by PPG Industries, Inc.

The driver perceives rays 594, 582 and 588 as being a continuation of virtual rays 596, 584 and 590, respectively, coming from outside of the vehicle. The vertical field of view defined by the rays 596 and 590 is oriented slightly upward from a horizontal direction 598, so most of the vertical field of view extends above the horizon. In a passenger car, the typical values could be elevation angles from 5 degrees below horizontal to 20 or more degrees above horizontal.

Figure 17A:
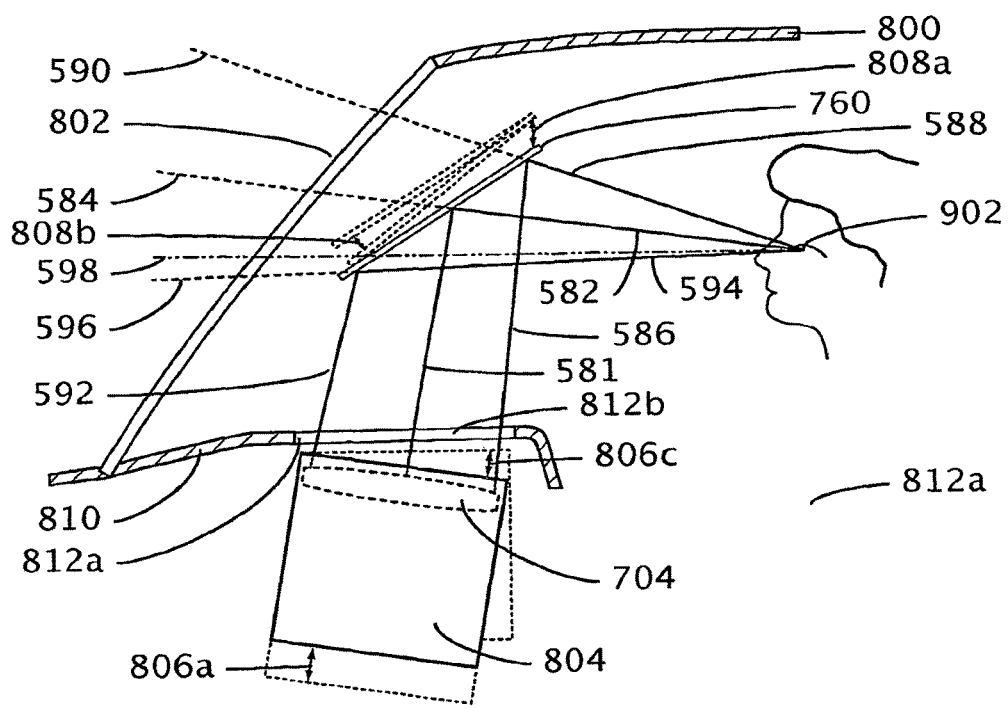
FIG. 17A is a schematic vertical cross-section of the vehicle taken through a plane parallel to longitudinal axis of the vehicle and which includes driver's position, showing the positioning of the display device and showing the rays delimiting the vertical field of view of the display device, when a separate combiner element is used by the display device.
Figure 17B:
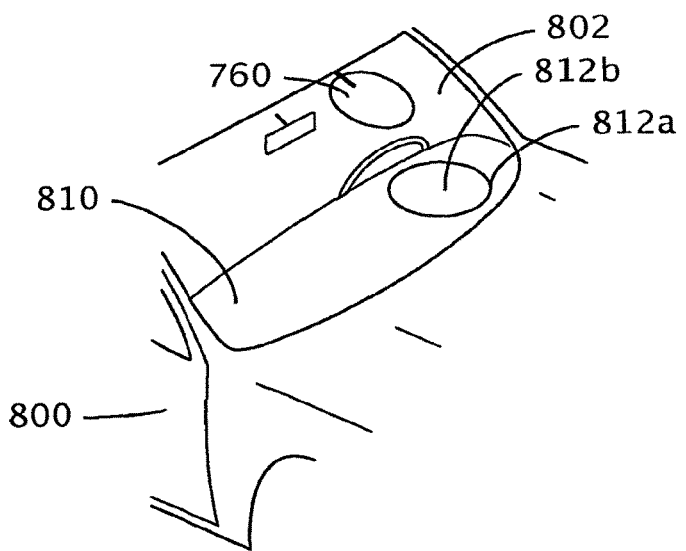
FIG. 17B is a schematic oblique view of the vehicle showing the size and location of the optical opening in the dashboard above the display device, when a separate combiner element is used by the display device.

FIGS. 17A and 17B present similar views of vehicle 800 with an alternative embodiment of the on-board equipment being installed. Specifically, here the vehicle's windshield 802 is not used as a combiner because, for example, the windshield is in wrong position to be easily used for that purpose. Rather, a separate combiner 760 is used. Because the combiner 760 is optically neutral (i.e. it is illustratively flat), the display device optics can be simpler because there is no need to accommodate the curvature of the windshield. Compared to the embodiment shown in FIGS. 16A and 16B, the size of the opening 812b can be relatively smaller, because some of the adjustments are now accomplished by moving the combiner 760.

The need to adjust the position of the exit pupil of the display device to match position of driver eyes can be accomplished by providing adjustment means to move the enclosure of the display device 804 in direction 806a substantially up and down along the optical axis to move reflected exit pupil horizontally back and forth, together with providing adjustment means to move both the enclosure of the display device 804 and the combiner 760 together in direction 808a substantially up and down along the optical axis to move reflected exit pupil vertically up and down. Additionally the enclosure of the display device 804 tilting adjustment 806c and combiner 760 tilting adjustment 808b can be provided, as well as left to right adjustments (not shown).

Since the combiner 760 is optically neutral (i.e. it is flat), such adjustments do not alter the optical properties of the display system as the whole (i.e. display device together with the combiner 760).

The rays 592, 581 and 586 reflect from the combiner 760 and continue as rays 594, 582 and 588, respectively, toward the driver 902. The reflectivity of the combiner preferably is enhanced in the narrow wavelength range around the wavelength which is used by the display device's projector laser. This can be accomplished by incorporating dielectric layer(s) on or within the combiner 760, such layer(s) acting as an interference reflective film being tuned to the wavelength and impingement angle of the laser light being used.

In an alternative embodiment of the display system as depicted in FIGS. 17A and 17B, the combiner 760 is not optically neutral, but it has some optical power. It can either be a thin meniscus which is substantially optically neutral for the transmitted light but has a concave semi-reflective optical surface, or it can be a flat transparent element comprising diffractive optics, such as a holographic optical element. Combiner 760 may also combine a holographic optical element with a curved surface. The viewing optics in the display device can be designed in a single design process with such a combiner to allow for more freedom for the optical designer. The other advantage of such a power combiner is that the diameter of the viewing optics within the display device 804 can be made smaller for the same or greater final field-of-view of the system. When using a holographic optical element, yet another advantage of such combiner is that the angle of incidence of impinging light may be made to differ from the angle of reflected light, thus allowing a more convenient positioning of the combiner. Those skilled in the art, when using an appropriate optical design software, will be able to devise an optical system incorporating those specifications. It should be noted, however, that the accurate positioning of such a power combiner is more critical than is positioning of a flat (neutral) combiner, and that combiners using a holographic optical element will introduce some glare (haze) in some driving situations.

Using a power combiner having relatively strong optical power allows for yet another embodiment of the display system (not shown), where the display device 804 takes up much less space than would otherwise be the case and could be located not under the dashboard but under the roof of the vehicle behind the combiner, with light being projected forward and down toward the combiner. Such a layout may allow an after-market version of the equipment to be sold and fitted into existing vehicles.

The combiner 760, in any of the embodiments described above, can be stowable against the roof of the vehicle when not in use, using for example any known linkage mechanism which is suitable for the task. This is in addition to any adjustments mentioned before. This stowing and readying of the combiner can be automatically controlled by the software (e.g. it can fold when the route to follow is along a long stretch of a highway, and then unfold right before the vehicle reaches a planned exit from that highway) or by an operator, for example via a voice command.

The display device 804 can comprise a) a single volumetric image generator which may comprise a single laser scanner projector unit and a single projection screen and b) a viewing optics comprising a single optical train possessing a common optical axis. In an alternative embodiment of the display device, however, there may be multiple display sub-units whose position within vehicle 800 is shown in FIG. 18A. In such an embodiment, each such sub-unit comprises its own separate volumetric image generator and its own separate viewing optics. Here there are four display sub-units 814 arranged in a rectangular seamless mosaic, tilted toward the common center so their optical axes, after reflecting from the windshield 802 used as a combiner, cross at one point 731. The opening 812c is large enough to accommodate adjustments of position of the display device underneath it.

Sub-units 814 are aligned to form a substantially seamless, contiguous mosaic, so the observer located in the appropriate position 731 can see a single continuous field of view. Each of the sub-units displays, in truly three-dimensional fashion, a generally different portion of the same virtual cable, but there is some overlap between portions virtual cable displayed by adjacent sub-units. All those portions of the virtual cable merge together to form one continuous three-dimensional virtual cable image when seen from point 731 or from any point within a few inches from point 731. The optical axes of all display sub-units substantially converge toward the point 731. At least two variations of this can be contemplated. In one variant all the axes cross at the point 731, which results in the whole mosaic field of view being visible from the point 731. In the second, alternative variant, optical axes are less convergent (or even are parallel) while there is more overlap (or, in parallel case, even total overlap) between portions virtual cable displayed by adjacent sub-units. This configuration variant results in generally only lesser part of the whole mosaic field of view being visible from the point 731 or any other point near 731 (i.e. the periphery of the field may be blanked out), but, at the same time, allows for the greater movements of the observer around the point 731 with some part of the field of view still visible.

Figure 18B:
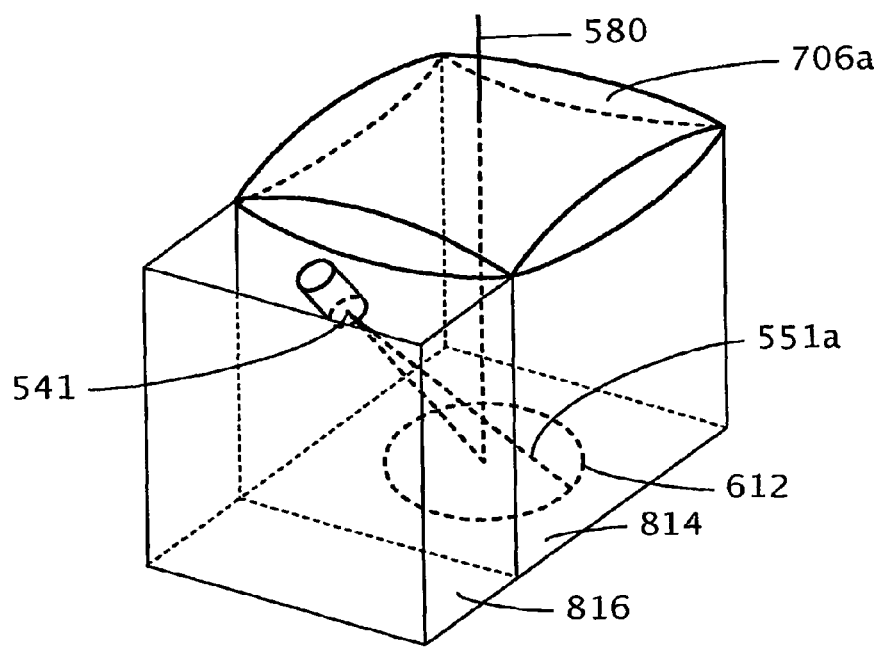

FIG. 18B shows details of one of the sub-units 814, described at a more opportune point hereinbelow.

6.4. Display Device Optics

Figure 19:
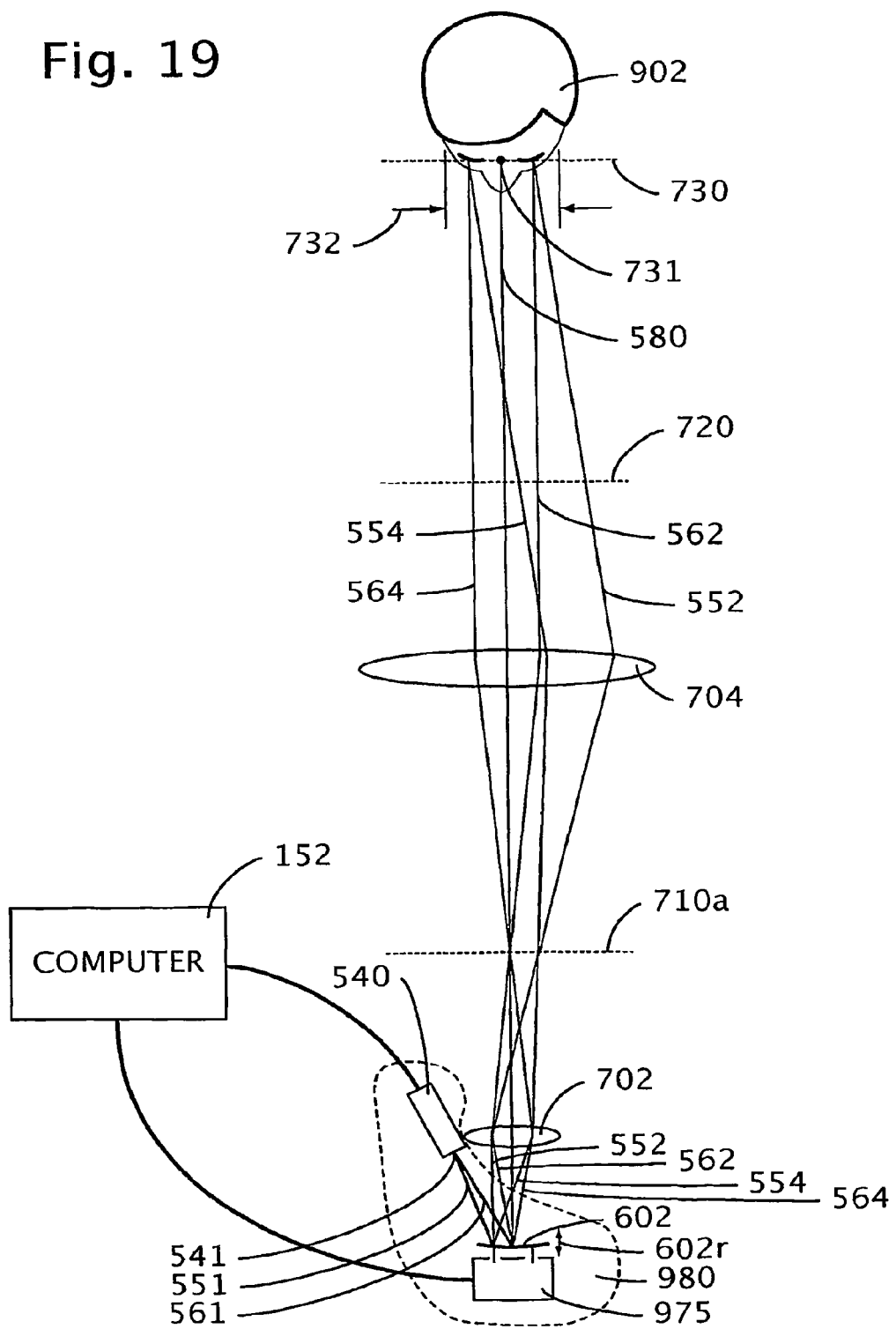
FIG. 19 is a schematic of one embodiment of the display device with compound microscope optics.

FIG. 19 shows a schematic of an embodiment of display device 804. The device shown is of singular (i.e. non-mosaic) type. It uses a compound microscope optical system (i.e. a system using two separated lens groups, a relay lens (also known as "objective") and an "eyepiece") as its viewing optics. For clarity, the folding of the optical axis by the combiner (which position in the light path is only indicated by dotted line 720) and by any folding mirror(s) is omitted (i.e. the system is shown having a straight optical axis). Also, the laser scanner projector unit 540 is shown schematically, for clarity, positioned to the left of the lens group 702, while in an actual display device it may be positioned at a different point at a periphery of the lens group 702 (e.g. if the tilted windshield correcting element (see element #1 in FIG. 21) is employed, the most appropriate positioning of the projector unit 540 would be at a point which, from the viewpoint assumed in drawing of FIG. 19, would be below the plane of the drawing, underneath the lens group 702). Also, for clarity, both lens groups are schematically depicted as single lenses, but may be referred to herein either as "lenses" as "lens groups", regardless if either one or both actually are single or compound lenses. Those skilled in the art, when using an appropriate optical design software, will be able to decide on the number of elements in each lens group, as well as on possibly employing any combination of the following: aspheric surface(s), diffractive surface(s), gradient index lens(es).

Computer 152 supplies coordinated steering signals to the projection screen actuator 975 and the projector unit 540, which together with the diffusion screen 602, constitute the primary volumetric image generator 980.

A sweeping laser beam, which is shown at two instances in two positions as beam 551 and beam 561, is emitted from the projector unit's exit aperture 541. The laser beam impinges onto the screen 602, creating a (moving) laser beam spot. The light from this laser beam spot is reflected and diffused by the screen, and the resulting light bundle is transmitted through the lens groups 702 and 704 and enters the eyes of observer 902. Two rays of a light bundle resulting from beam 551 are shown—a ray 552 which enters the left eye and 554 which enters the right eye of the observer. Similarly, the laser beam 561 results in light rays 562 and 564 entering the observer's eyes. Coordinated movement and modulation of the laser beam spot in vector graphic mode while the position of the screen 602 is continuously (and in coordination with said movement of said spot) adjusted by the screen actuator 975, paints, due to persistence effect of human vision, a real volumetric image—an image which is a representation of visible portion of the virtual cable. This real volumetric image is therefore contained within the "working volume" of the primary volumetric generator 980—a three-dimensional volume swept by the surface of the screen 602 during its movements. A virtual image created from that real image by the viewing optics and the combiner (which may be the windshield 802 or a separate combiner 760) is a visible portion of the virtual cable. We can therefore say that the virtual cable is contained within the display device's "virtual volume", which is the volume of three-dimensional space in front of the vehicle which is "optically conjugated" (thru the viewing optics) with the "working volume" of the primary volumetric generator 980. In our application, the image painted by the primary volumetric generator 980 is essentially a singular line (or, alternatively, just a few lines) having only a small number of "bends" (e.g. less than 20), and therefore it has relatively low demand on bandwidth of the projector's moving components. As long as an image places such low demand on the bandwidth of the projector components, the projector is capable of painting such image having arbitrary shape and being positioned anywhere within the "working volume" of the primary volumetric generator 980. Therefore, our virtual cable can be displayed, practically, arbitrarily shaped and positioned within the "virtual volume" of the display device. A sweeping laser beam is scanned onto the screen 602 in a vector graphics mode with sufficient refresh rate to avoid flicker. For most individuals, an image refresh frequency sufficiently high to avoid image flicker when the image is viewed directly with a steady gaze, is between 16 and 25 Hz. However, such refresh rate may still cause a noticeable flicker when the image is at the periphery of vision and/or when the observer's eye is moving rapidly (e.g. when the eye is scanning the surrounding scenery). Achieving a constant refresh rate which is much higher then 25 Hz may be substantially more costly, since all the display device's active components, including scanners, focuser and the screen actuator and their controllers, must have proportionally higher bandwidth than the bandwidth required for the 25 Hz display to maintain the same image quality. For this reason we think that if the refresh rate of the device is constant, then about 30 scans per second is a desirable refresh rate for the preferred embodiment of the display device when the device is built using currently available components. However, the refresh rate of the display device does not need to be constant. Employing a variable refresh rate is possible, particularly in light of the fact that there are no resonance-dependent mechanical components (like e.g. resonant scanners used in raster displays) used in this embodiment. The rate of refresh can be made dependent on complexity of the virtual cable to be displayed. In a large proportion of driving situations, the virtual cable is simply a straight or gently bending line. In such a case the laser scanner projector unit and the screen actuator are capable of refresh rates that are substantially higher (e.g. are equal to about 60 Hz or more) then when, for example, a number of sharp turns need to be included in the three-dimensional path of the virtual cable. Employing a variable refresh rate has substantial benefits; most of the time the driver can enjoy a view of a virtual cable which is totally flicker free, which is less speckled, which can be more stable (i.e. a virtual cable can be less prone to "shake" when the vehicle is jarred) and which movements can be rendered very smoothly, while the system is retaining the ability to display very complex scenarios accurately (although possibly with some noticeable flicker). When refresh rate is sufficiently lowered, even such complex imagery as a simple map drawing can be produced, without any hardware modification to the display device. A drawback of employing a variable refresh rate in the display device is that computer 152 needs to execute more complex software in order to steer the actuators, compared to the software designed for constant rate of refresh.

Due to properties of laser light, the image painted by the laser spot during any single sweep has somewhat speckled look. However, the suspension of the screen does not prevent the screen entirely from some small random side-to-side (i.e. non-axial) movements, which are induced both by the continuous adjustments of the screen by the screen actuator 975 as well as by random vehicle vibrations. Largely because of those random side movements, the resulting speckle patterns are different in each scan cycle during subsequent scans, and therefore the visible speckles are reduced in the perceived continuous image. If such a degree of reduction is deemed not entirely satisfactory, additional measures to reduce speckles, known in prior art, may be added.

The volumetric real image created by the scanned laser light projected onto screen 602 is imaged by relay lens group 702 into an intermediate volumetric real image 710*a*, which in turn is imaged by the eye lens group 704 into a distant volumetric virtual image viewed by the observer 902. The intermediate image is preferably magnified; if it is, then it is magnified both transversally and longitudinally. The virtual image is (further) magnified both transversally and longitudinally. The observer's eyes are located inside a so-called eye box—a volume of space centered around the point 731 (which is the center of the exit pupil of the display device's viewing optics) from where the virtual cable is visible. The display device's exit pupil lies in the plane 730 and has diameter 732 sufficient to accommodate both eyes of the observer 902 with some margins for head movements. This way the observer can see a volumetric presentation of the volumetric virtual image—that is he can see the image with both eyes, stereoscopically, and he can readily experience other depth cues as well, notably the motion parallax induced by any head movements within the eye-box (such motion parallax occurring here without noticeable delay and without need to track observer's head position, thus improving on prior art virtual reality displays). In a typical passenger car, the distance between display device's exit pupil plane 730 and back surface of the lens group 704 may be a little less than 1 yard, while a sufficient diameter 732 of the display device's exit pupil may be about 4 inches.

The projection screen actuator 975 moves the screen 602 attached to it in such a way as to continuously adjust the distance between the projection screen 602 and the stationary relay lens group 702 (the relay lens group 702 can also be thought of as the "microscope objective"). The movement of the screen 602 is in the direction along the optical axis 580 and is approximately cyclical with the period equal to the refresh period of the display (e.g. ⅓₀ of a second). The screen's surface is oriented toward the relay lens 702, is centered on optical axis 580 and is perpendicular to it where the axis crosses the screen. As disclosed later, a variant of the screen which is tilted (i.e. not perpendicular) to the axis may be preferable, however, for pedagogic purpose, we will assume here a symmetrical screen which is perpendicular to the optical axis. If the laser used in the display unit is powerful enough, then it is preferred that the screen surface be a very smooth (i.e. very fine grained pigment) white having uniform (i.e. lambertian) diffusing characteristics. Or, instead of being white, it may have a different color, e.g. red, as long as it is highly reflective to the light from the laser. However, the white surface is preferable for better protection from heat damage from focused direct sunlight, which may fall on the screen. The screen surface should, even when the surface is white, be heat resistant and should re-radiate heat efficiently (i.e. should be highly emissive in deep infrared). Alternatively, a laser can be used in the display unit which has less optical power than required with a lambertian screen, but then, for the increased efficiency of the display device, the surface should be non-lambertian (e.g. be an appropriate reflective diffractive (or holographic) diffuser, as known in prior art) diffuser and diffuse light incoming from direction of the laser projector's exit aperture 541 preferentially into the entrance pupil of the relay lens 702 and substantially uniformly within this entrance pupil. The use of a non-lambertian diffuser may somewhat increase local non-uniformity of the brightness (i.e. uneven appearance) of the displayed virtual cable, however. On other hand, such a non-lambertian diffuser may largely preserve linear polarization of the laser light; this may be advantageous since the reflection from the windshield (or the separate combiner, if used) can then be enhanced. In this case, the laser should be oriented (i.e. rotationally around the beam axis) precisely so the beam polarization is oriented in such a direction that the image reflection from the windshield or combiner is the strongest possible. The surface of the screen 602 may be flat, or, preferably, concave, as schematically shown. A moderately curved surface has several advantages over the flat surface. First, allowing a curved surface gives the designer more freedom to design the viewing optics, which can result in simpler and better performing design. The viewing optics can be designed without need to fully correct for field curvature, and then the screen 602 can be designed concave so its virtual image through the viewing optics (i.e. screen surface's conjugate surface) is essentially flat. Second, a concave curved surface of the screen can avoid the laser beam impinging at the surface of the screen at an excessively oblique angle (i.e. the angle measured between the normal to screen surface and the beam being too large) when the beam is directed toward periphery of the screen on the far side from where the laser projector is positioned. Even though the beam directed toward periphery of the concave screen on the same side where the laser projector is positioned will impinge at the somewhat more oblique angle (as compared to if the screen were flat), the overall geometry of the beam projection onto the screen can be improved. Third, the concave design of the screen 602 can result in lighter, more rigid screen, which allows the actuator 975 to move the screen more precisely, and with less sensitivity to external jarring and vibration. Forth, the voice-coil type of actuator and concave screen combination is very similar to modern dynamic loudspeaker and therefore can benefit from the loudspeaker design state of art.

A screen surface which is lambertian white and too deeply concave, however, will cause some significant percentage of diffused light from the beam spot fall onto other areas of the screen and cause a slight diffuse glow in the field of view of the display device.

The relay lens group 702 has an exit pupil which image by the eye lens group 704 forms the display device's exit pupil. Therefore, the diameter of the relay lens exit pupil needs to be large enough to result in the desired diameter (about 4 inches or more) of the display device's pupil, to accommodate both eyes of the observer with some room for head movements. The display device's exit pupil must be reasonably free from spherical aberration to avoid decreasing that room. The need for the large diameter 732 of the display device's exit pupil necessitates either a relatively large diameter of the relay lens group, or a relatively fast (i.e. having short focal length) eye lens group 704, or some compromise combination of both. The eye lens group 704 needs to have large enough size to allow for sufficient field of view of the device.

Here is an example of the first order layout (by layout herein we mean simplified lens data for the system, as given below, not a drawing) of the display device's optical system, with both lens groups treated as single lenses, the screen 602 positioned in the "infinity focus" position, and without including any folding mirrors:

The screen diameter is 70 mm, the relay lens 702 diameter is 72 mm, it's focal length is 72 mm, the distance between the screen 602 and the relay lens 702 is 103.4 mm, therefore the distance between the relay lens 702 and the intermediate image plane 710a is 237 mm; the distance between the intermediate image plane 710a and the eye lens 704 is 333 mm, the focal length of the lens 704 is also 333 mm, therefore the distance between the lens 704 and the exit pupil of the display device is 800 mm and the diameter of the display device's exit pupil is 100 mm; the diameter of the lens 704 is 320 mm. Those skilled in the art, when using appropriate optical design software, will be able to finalize this layout into detailed optical prescription. The design process should result in a display device's viewing optics, which has the exit pupil relatively free from "kidney bean" effect (i.e. the spherical aberration of the display device's exit pupil) as mentioned before. The design process should result in the relay lens group 702 having sufficient clearance between the screen 602 and the first optical element of this lens group to allow projecting the laser beam onto the screen 602 from the position beside the lens group 702 as schematically shown in FIG. 19. The design process should result in a viewing optics which produces the virtual image well corrected for spherical aberration, coma, and astigmatism within the whole field, and particularly well within the central area of the field of view where the most important information is most likely to be placed. The best correction of the spherical aberration should be designed for the virtual cable linear-definition-distance range which is most important for the average driver (we think it would be about 50 m to 100 m). Of the three aberrations mentioned, the spherical aberration is particularly detrimental to the performance of the display device, since a relatively small amount of it, so small that it may not blur the image noticeably, can still cause changes in stereoscopic effect (i.e. image "waving") with head movement within display device's exit pupil.

Astigmatism of the viewing optics needs to be well corrected, in order for the display device to be able do display a very thin line, regardless of the line's visible-definition direction and location within the field of view. Because of the "linear" nature of the displayed images, any remaining astigmatism, in addition to limiting the achievable thinness of lines in some cases, may cause a shift of perceived linear-definition-distance of the displayed line depending of such line's visible-definition-direction and location within the field of view. However, because of dynamic adjustability of the focus, the software can correct such shift of perceived linear-definition-distance by appropriately modifying the screen 602 position depending on both the direction of the painted line relative to the screen and the position of the painted line relative to the screen at any given point in time during the scan period. An person skilled in the art of optics and the software can easily devise an appropriate correcting algorithm.

The design process should take advantage of the following (a), (b), (c), (d) and (e):

(a) The light is monochromatic, preferably red about 635 nanometers wavelength, so achromatic optics is not needed;

(b) The intermediate image does not need to be corrected, so the whole viewing optics can be optimized together as one unit;

(c) Curvature of field can be left significantly undercorrected, since the screen 602 can be curved to compensate, as mentioned before;

(d) Distortion can be left significantly uncorrected, since the image on the screen 602 can be painted pre-distorted in the opposite way to compensate; that pre-distortion can be done by the graphic generation software in the computer using distortion correction maps stored in non-volatile memory. Those maps are fine-tuned individually for a given vehicle during installation and tuning of the apparatus, by observing the distortion of the appropriate test images and then estimating the correction to the maps and writing them to the nonvolatile memory. If needed, several iterations of this process will yield a desired accuracy of the maps;

(e) the angular field of view of the display unit is relatively small.

The layout of the optical system described above is preferred because it allows a relatively small screen 602 having a relatively small range of motions 602r. This allows for precise control of movements of the screen using relatively low-powered driving circuits, with benefits being low noise generation, low heat production and lesser sensitivity to external jarring and vibration. However, it requires the relay lens group 702 to have a relatively fast f-number of f/1 (at infinity). Alternatively, the relay lens group 702 can be designed with a longer focal length, to achieve an increased performance-to-cost ratio compared to the lens specified in our preferred layout. However, this will necessitate a larger screen 602 having substantially longer axial movement range 602r, and may also necessitate the laser source having a higher power, which is more costly and potentially dangerous. For example, the first order layout of the optical system can be changed from our example layout as follows: the screen diameter is 117 mm (67 percent larger than in the prior layout), the relay lens 702 diameter is 72 mm (unchanged from the prior layout), it's focal length is 100 mm (39 percent longer than in the prior layout), the distance between the screen 602 and the relay lens 702 is 173.0 mm (67 percent larger than in the prior layout), therefore the distance between the relay lens 702 and the intermediate image plane 710a is 237 mm (unchanged from the prior layout) and the rest of the layout is unchanged from the prior layout.

In both of the just-described versions of the viewing optics, if the eyes are separated by a typical distance of 66 mm and are positioned symmetrically on both sides of the display device's exit pupil center point 731, then the field of view seen by each eye will be about 22.6 degrees. The binocular horizontal field of view seen from such position (i.e. the field of view comprising the field seen together by both eyes as well as flanking left and right fields seen only by right and left eye, respectively) will be about 27.1 degrees.

The field of view is illustratively oriented slightly upward so the lowest 5 degrees (or so) of the vertical extend of the field of view is below the horizontal plane and the remaining vertical extend (17.6 degrees or so) is above the horizontal plane. If the eyes of the observer are 1.2 meters above the road, and the virtual cable is preferred 5 meters above the road then the closest to the observer point of the displayable portion of the virtual cable will be about 12.5 meters away from the observer (measuring from driver's eyes diagonally up to the closest displayed point on the virtual cable).

In the just-described embodiment using viewing optics that has the 70 mm diameter screen, the final virtual image of the screen moves from the infinity through all the intermediate positions to a position 12.5 meters from the observer if the screen 602 moves by 1.7 mm—from a position 103.4 mm in front of the relay lens 702 to a position 101.7 mm in front of the relay lens 702. However, in the just-described embodiment using viewing optics that has the 117 mm diameter screen, the screen would need to move 4.6 mm—from 173.0 mm to 168.4 mm in front of the relay lens 702, to achieve the same change in the position of the final virtual image of the screen 602. The working volume of the primary volumetric display It is an opportune point to return to FIG. 18B for a description of details of one of the sub-units 814 of the mosaic-type display device described above. The top of the enclosure of the sub-unit contains viewing optics 706a, here shown schematically as a single magnifying lens (a loupe). The lens covers the top of the sub-unit enclosure all the way to the edges of that enclosure (in illustrated embodiment, three sides of each lens extend that far), so, when multiple sub-units are mounted together, their lenses can create a seamless mosaic. The viewing optics 706a can, for better aberration correction than a simple lens can provide, be a compound lens, or utilize diffractive surface(s) or gradient index lens, in any combination, which be devised by those skilled in the art, when using an appropriate optical design software. Near the bottom of the enclosure of the sub-unit is a projection screen 612, moveable along optical axis 580 to provide volumetric image source in the same way as in an embodiment of a non-mosaic display device previously described and illustrated in FIG. 19, did the screen 602. A section 816 of the enclosure 814 located along one side of the enclosure of the sub-unit contains a laser scanner projector unit (for clarity not shown, except for the location of its exit aperture 541), which can be identical to any laser scanner projector unit described elsewhere herein. A laser beam 551a is emitted from the projector unit's exit aperture 541. The laser beam 551a impinges onto the screen 612, creating a laser beam spot. Movement and modulation of this spot in vector graphic mode while the position of the screen 612 is continuously adjusted, creates, or "paints," due to persistence effect of human vision, a real volumetric image, that is, an image which is a representation of an appropriate section of a visible portion of the virtual cable. A virtual image created from that real image by the viewing optics 706a and the combiner (which may be the windshield 802 or a separate combiner 760) is a section of visible portion of the virtual cable. The virtual images from all the sub-units have their focus, brightness, sizes and orientations finely adjusted so the resulting complete image of the visible portion of the virtual cable is seamless. These adjustments are carried out by on-board computer 152 from appropriate distortion correction maps stored in non-volatile memory. Those maps are created individually for a given vehicle during installation and tuning of the apparatus, by observing the discrepancies between the sub-unit appropriate test images and then estimating the maps and writing them to the nonvolatile memory. If needed, several iterations of this process will yield a desired accuracy of the maps.

Figure 20:
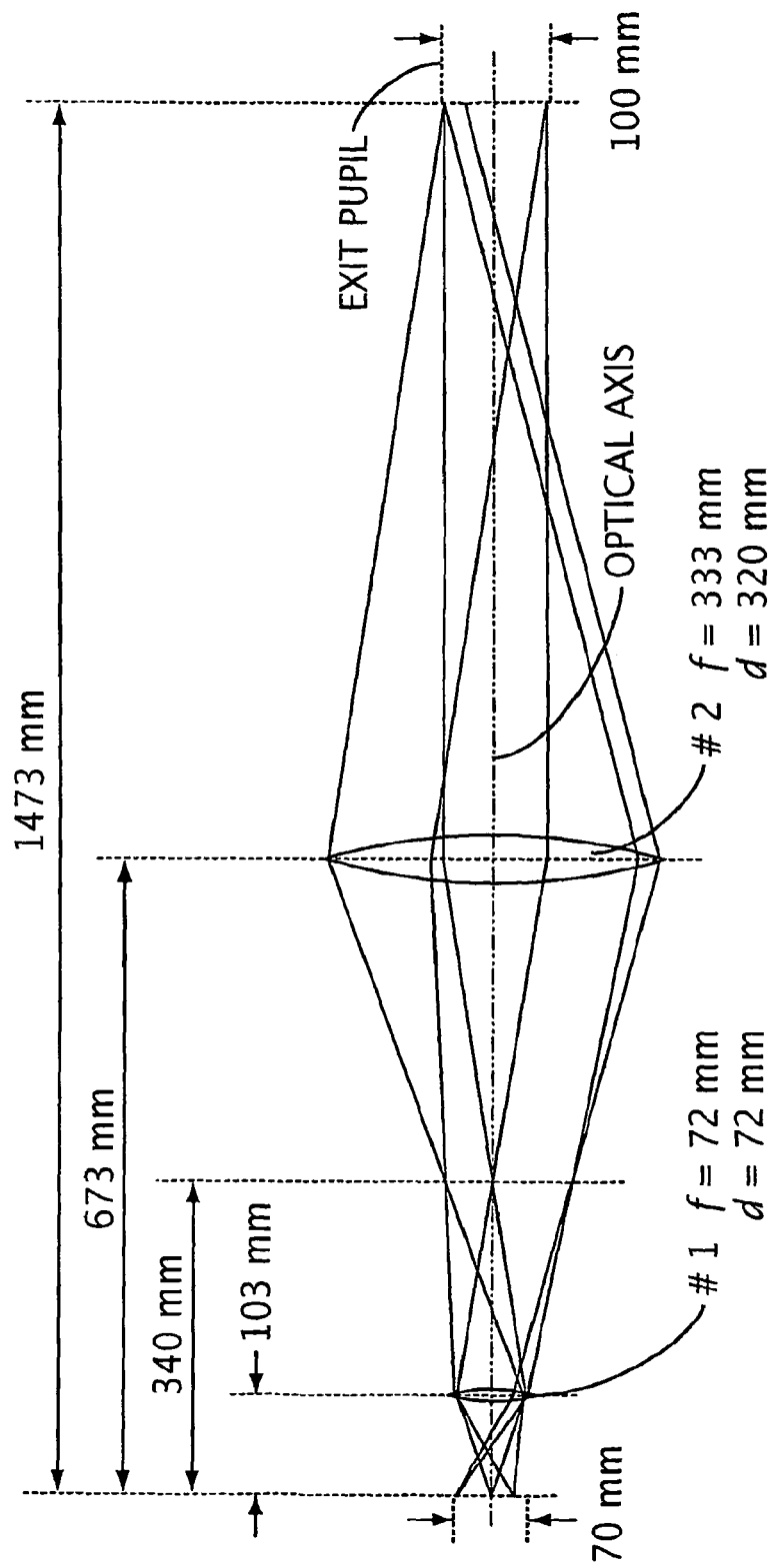
FIG. 20 is a schematic ray trace of the viewing optics from FIG. 19.
Figure 21:
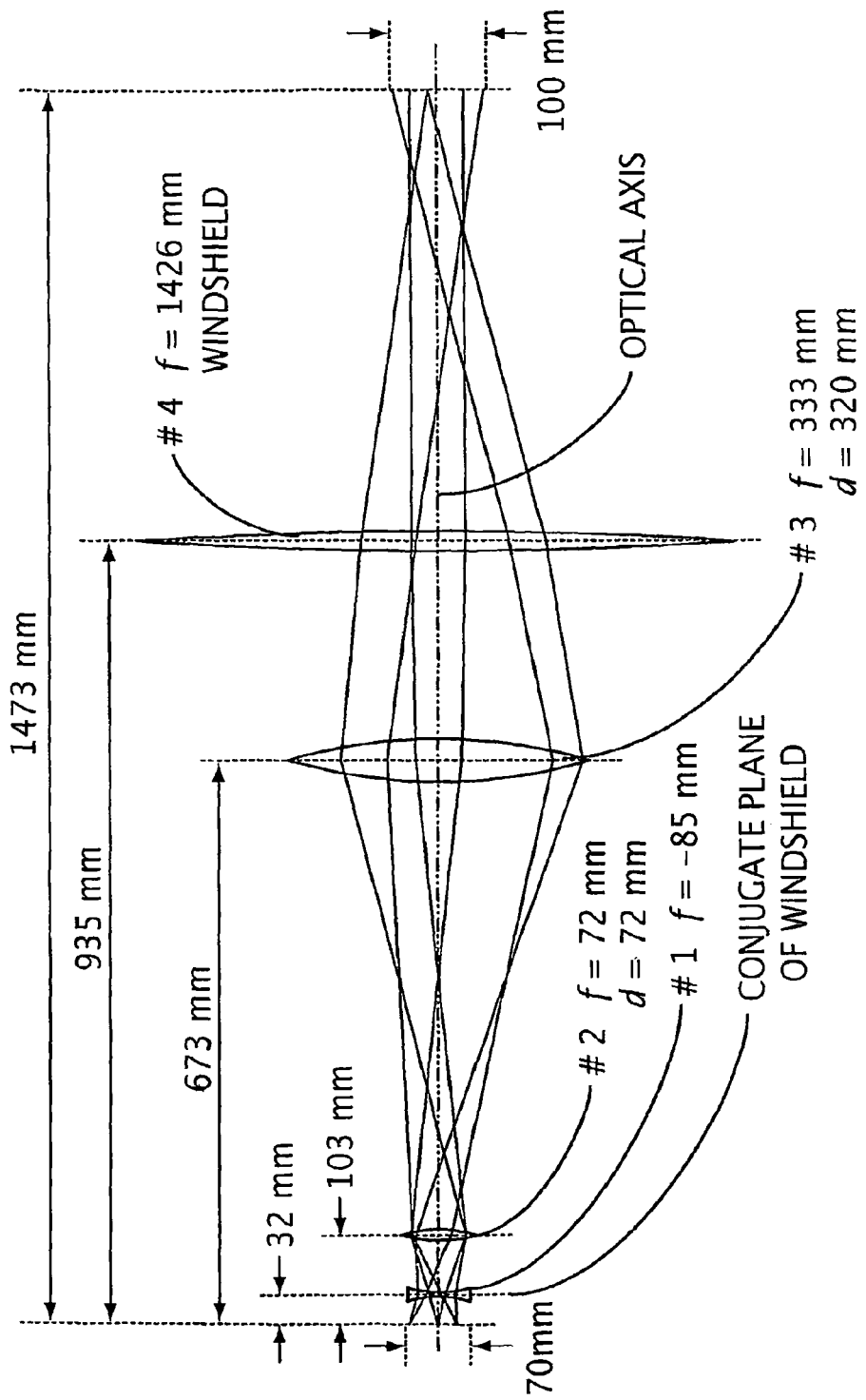
FIG. 21 is a schematic partial ray trace of one variation of viewing optics illustrating method of correcting for windshield curvature.
Figure 22:
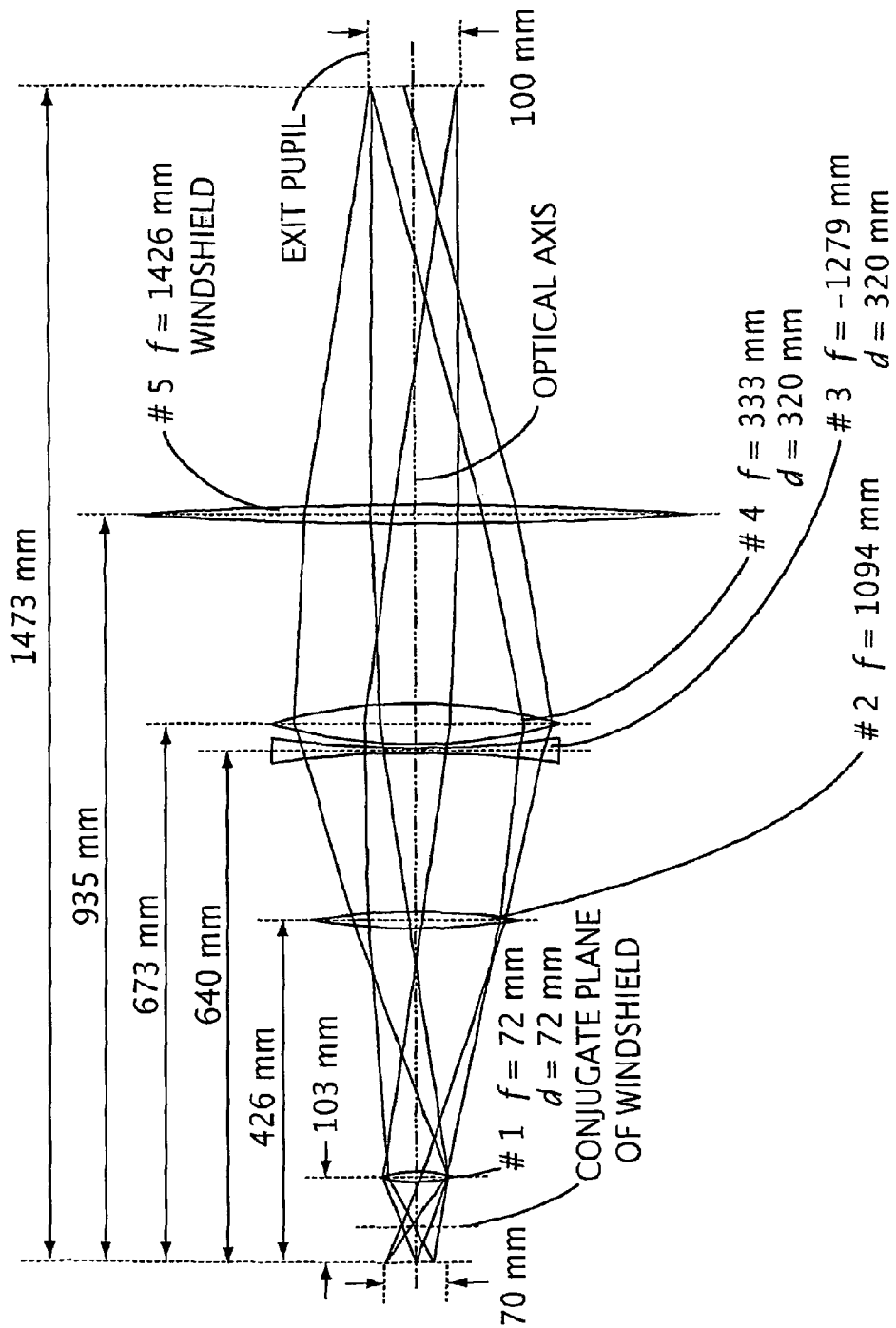
FIG. 22 is a schematic partial ray trace of another variation of viewing optics illustrating method of correcting for windshield curvature.

FIG. 20, FIG. 21 and FIG. 22 show the schematics of three variations of the viewing optics of the display device from FIG. 19. All three illustrate schematic ray traces (by ray trace herein we mean a simplified first order drawing of rays through the system) through the optics and show examples of first order optical layouts, except that in all three cases the ray traces are only shown for a single meridional plane. The optics illustrated in both FIG. 21 and FIG. 22 are astigmatic. Such optics have different ray traces in the second (i.e. perpendicular) meridional plane; those ray traces are not shown. FIG. 20, FIG. 21 and FIG. 22 are intended not as blueprints, but as illustrations of a design methodology which those skilled in the art can employ to prepare such blueprints, while using an appropriate ray tracing computer software, e.g. ZEMAX® software sold by ZEMAX Development Corporation, San Diego, Calif., and after taking into account particular shape and location of windshield used in a particular vehicle, and after taking into account particular economic considerations for a particular vehicle.

For clarity, the folding of the optical axis by the combiner and by any folding mirror(s) is omitted (i.e. the system is shown having a straight optical axis). In FIG. 21 and FIG. 22, which show the effect of the lens simulating the windshield of the vehicle (i.e. the lens positioned 935 mm from the left), the presented schematic view is combining a view from the upper front of the vehicle (for rays in front of the lens simulating the windshield) and then from the top of the vehicle (for rays past the lens simulating the windshield).

Any lens group which performs a single function (i.e. which acts as a single "perfect" lens for purpose of the first order layout, e.g. in FIG. 20 the lens #1 f=72 mm—the "relay lens" or lens #2 f=333 mm—the "eye lens") is schematically depicted as single lens, regardless if it actually is a single or a compound lens. On other hand, the lens performing two functions may be depicted as two adjacent lenses, regardless if it actually is a single or a compound lens (e.g. in FIG. 22 the lens #3 f=−1279 mm cylindrical and lens #4 f=333 mm spherical may be in actual physical implementation combined into one optical element).

FIG. 20 shows a schematic of the basic variant of preferred embodiment of the viewing optics of the display device from FIG. 19. This is the same optical arrangement, repeated here for pedagogic purpose, as the one shown in FIG. 19. The optical system is rotationally symmetrical, with no provision to counter any optical effects of the windshield. It is therefore suited to be employed when the windshield is optically neutral (i.e. acts as a flat partial mirror), or when a separate flat combiner is used instead of the windshield.

In a typical passenger vehicle, the windshield is not flat. The shape of the windshield is generally complex, but in many cases it can be approximated quite well by a toroidal surface. A toroidal surface is defined by two radii, a relatively small section of it can be thought of, in optical sense, as an spherical optical element combined with cylindrical optical element. In case of typical car windshield, the spherical component has very large radius compared to the cylindrical component, so in the first approximation the windshield is a cylinder, tilted relative to the optical axis of the display device. Such a substantially cylindrical windshield has an optical effect in one meridional plane, which is relatively much greater than its optical effect in the other (i.e. perpendicular to the first) meridional plane.

FIG. 21 shows a schematic of one variant of the viewing optics of the display device from FIG. 19 wherein the optical effects of the curved windshield are compensated for. The example windshield is shown schematically as a "windshield simulator" lens (lens #4, f=1426 mm) which is positioned where the windshield would intercept the ray bundles, that lens having the same optical power (i.e. optical power in the meridional plane of this drawing) as the hypothetical example windshield, working as a mirror, would, but without altering the direction of optical axis. The choice of the focal length of 1426 mm is arbitrary; because it is still shorter than typical reflective focal length of most windshields used in passenger cars, the effect of this "windshield simulator" lens on the traced ray bundles is exaggerated compared to an effect a typical windshield would have, which makes this illustration more clear. To counter the optical effects of the windshield (substituted by "windshield simulator" lens in FIG. 21), the additional lens #1 f=−85 mm is placed 32 mm from the screen (the screen is represented by the segment of the left edge of the Applet window, said segment marked "70 mm"). This is a location optically conjugate to the location of the "windshield simulator" lens #4, that is the image of the lens #1, when the lens #1 is imaged by the optical system comprising lenses #2 and #3, is coincident with the "windshield" (i.e. the lens #4). Also the opposite is true: the image of the windshield through lenses #2 and #3 is positioned in the said location; in this case we conceptually ray-trace the optical system from right to left (i.e. we "turn the optical system"). In a real car, this windshield image, due to the tilt of the windshield, is tilted relative to the optical axis; this tilt is not evident in the meridional plane corresponding to the plane of FIG. 21, and is not indicated in the drawing of the lens #1 of FIG. 21, which simulates here the correcting element. The optical element in this windshield conjugate position, when well aligned with the image of the windshield (including being tilted), can compensate any light bundle's wavefront alteration caused by the windshield by causing opposite alteration at its position. Such correction methodology is well studied and is used e.g. in adaptive optics employed in some astronomical telescopes, where a star image distorted by turbulent layer in the Earth's atmosphere can be corrected by applying compensating corrections in the image plane (i.e. conjugate position) of such atmospheric turbulent layer. However, for a deeply curved windshield such a corrective lens would have to be relatively thick, and it would have to be positioned between the screen and the relay lens where it could interfere with projecting the laser beam onto the screen. Also, the optical power of the windshield causes the position of the display device's eyebox to shift toward the front of the vehicle from where it would be if the windshield was optically neutral, and also causes an astigmatic-type distortion of the eyebox; such effects may be significant in case of a deeply curved windshield. Those two effects are not corrected by the above-described method of correcting for the windshield curvature. However, this method of correcting for the windshield curvature may work well if the windshield curvature is relatively very mild and uniform. In this case the optical power of the correcting element would be acceptably small, and, when the windshield curvature is uniform, the correcting element can be moved out of its theoretically best position (i.e. position optically conjugate with the windshield), closer to the to the relay lens and sufficiently so to be out of the way of the projected laser beam, and still perform acceptably. It would need to be re-optimized for the new location.

FIG. 22 shows a schematic of another variant to compensate for the optical effects of the curved windshield. Again as in FIG. 21, the example windshield is shown schematically as a "windshield simulator" lens (lens #5, f=1426 mm) which is positioned where the windshield would be. To counter the optical effects of the windshield (substituted by "windshield simulator"), the additional corrective lenses #2 and #3 are added to the basic optical system from FIG. 20. The following correction procedure is given for the meridional plane corresponding to the plane of FIG. 21, the same procedure should also be repeated one more time for the other (i.e. perpendicular to the first) meridional plane. For each one of those two correcting lenses, the obtained focal lengths will generally differ greatly between both meridional planes, which means both corrective lenses have strong cylindrical components to their optical power. The correction procedure is as follows: first, we begin the system with lenses #1 (the relay lens) and #4 (the eye lens). Then we add lens #5 (the "windshield") in position, and note the shift in the position of the exit pupil of the device toward the left. Then we position a negative lens #3 adjacent to the eye lens #4, and find at what power of the lens #3 a given point located on the "screen" (the screen is represented in FIG. 22 by the segment of the left edge of the Applet window, said segment marked "70 mm") is imaged by the whole system into a point at infinity. Such correcting lens thus counters the optical power of the windshield. However at the same time it changes the position of the exit pupil too much toward the right. To restore the proper position of the exit pupil of the device, we then add a positive lens #2 positioned at the real image plane of the screen (i.e. where the screen is imaged by the relay lens #1), and find at what power of the lens #2 the exit pupil of the device is moved back to its original position. This completes the correction procedure for this meridional plane. However, it may be preferred to avoid having a lens present in a real image plane, because then any dust or imperfection on such a lens is sharply in focus together with the screen to the observer. To avoid that, we may move the lens #2 slightly to the right and then adjust its focal length as well as focal length of lens #3 to again achieve both the proper focus and proper exit pupil position of the system. In our example, after such adjustments, the lens #2 has focal=1094 mm and the lens #3 has focal length=−1279 mm.

In FIG. 22, note that the positioning of the lens #2 and lens #3 does not depend on the curvature of the windshield. Also note that ray bundles crossing the device's exit pupil at sufficiently different angles reflect from different part of the windshield and cross different part of correcting lenses #2 and #3. All this means that, for a non-uniformly curved windshield, if the windshield curvature changes slowly and uniformly across the extend of the windshield, as is often the case, then it is possible to sufficiently correct optical effects of such a windshield by employing corrective lenses #2 and #3 which also change their optical power smoothly across their respective extends, so for each bundle of rays the corresponding areas of the lenses #2 and #3 correct the corresponding areas of the windshield, in a manner described before.

The methods illustrated in FIG. 21 and FIG. 22 may preferably be combined. In this case the additional corrector (analogous to lens #1 in FIG. 21), which is placed near the conjugate plane of the windshield as imaged by the whole train of all other optical elements in the viewing optics of the display device (said conjugate plane is shown as dotted line in FIG. 22), corrects only residual wavefront aberration not removed by the two primary correctors (analogous to the lenses #2 and #3 from FIG. 22). The additional corrector may therefore be relatively weak. During installation of the display device in the vehicle, measuring the residual aberration and then selecting said additional corrector element from some range of variations of such correcting elements available in the production facility for that purpose may be used to fine-tune the display device for windshield correction.

Note that the main goal in correcting the windshield curvature effect by optical compensatory means is to achieve that, in the turned system (i.e. the optical system in which, conceptually, the light direction is reversed), for any parallel bundle crossing the intended exit pupil of the device (i.e. the device includes the windshield) toward the device, such bundle is focused to a sufficiently small spot not exhibiting excessive astigmatism, coma nor spherical aberration, and such spot is located reasonably near the screen when the screen is located in its infinity position. It is not necessary that every such spot is located exactly on the screen, since if such discrepancies exist but are small and vary slowly across the screen surface, then they may easily be compensated by the computer. Such compensation may involve using appropriate in-memory lookup tables while calculating the signals to the screen actuator controller. Also note that if it is desired to compensate for geometrical distortion of the screen image caused by the windshield, this does not have to be done by compensatory optical means. Such distortion can typically be more easily compensated for by the on-board computer, by pre-distorting the image drawn on the screen in complementary manner, by using appropriate in-memory lookup tables while calculating the signals to the projector unit controllers.

6.5. Laser Projector

Figure 23:
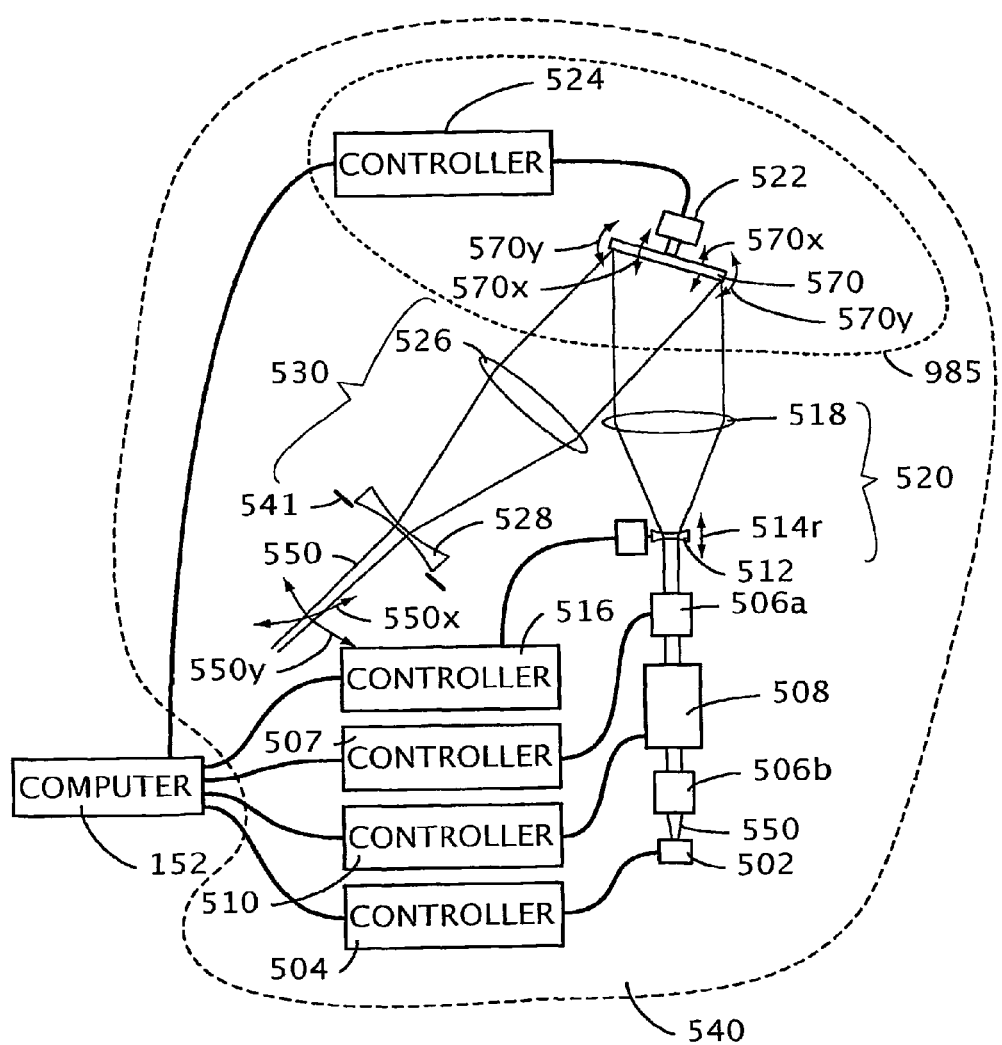
FIG. 23 is a schematic of one embodiment of the laser projector, with tip/tilt scanning mirror.

FIG. 23 shows a schematic of an illustrative laser scanner projector unit 540, including its controllers. The device employs a mechanical mirror scanner 985. The scanner uses a single tip-tilt, or "dual axis," fast steering mirror 570 actuated by the high bandwidth and high angular range scanner (i.e. actuator) 522.

Projector unit 540 employs a laser 502. The laser 502 is illustratively an edge emitting laser diode operating in a single transverse electromagnetic mode, emitting high quality (i.e. preferably having M-squared factor no more than about 1.2 after beam shaping) beam 550 of red light, the light illustratively having a wavelength of about 635 nanometers, and with a sufficient optical power to render the displayed virtual cable visible against bright day time sky, preferably sufficient to accomplish this with the screen 602 having the uniform (i.e. lambertian) diffusing characteristics.

For example, when a white screen with a lambertian diffusing characteristics is used together with the preferred previously described viewing optics, and when the windshield (or a separate combiner) has the red reflectivity (at 635 nanometers) enhanced to about 25% at the incidence angle used by the display unit, and the virtual cable is 5 cm linear-definition-thick, and 5 meters linear-definition-above the road stretching from 12.5 meters until 250 meters linear-definition-distant, then, according to our calculations, a power required is estimated to be at least about 20-30 mW to provide comfortable daytime contrast when the sky brightness is 10,000 cd/m2 or less.

The laser diode is powered through the controller 504, main functions of which are to protect the diode from damage and to precisely regulate the optical output of the diode using, for example, closed loop control involving the feedback signal from a photodetector which is housed together with the diode, in a manner well known to those skilled in the art. Optionally, but we believe preferably, the laser diode and the controller may be capable of direct analog modulation of the laser diode's light output in response to the steering signal from computer 152.

The beam 550 emitted from the laser 502 is conditioned into a substantially diffraction-limited beam by the beam conditioner 506*b*. The beam conditioner 506*b* may be an integral part of the laser module, as is often seen in the art. At a minimum, beam conditioner 506*b* contains beam shaper optics, well known to those skilled in the art, to circularize the beam, correct the wavefront astigmatism and collimate the beam into a substantially Gaussian beam, which has a diameter (defined as a diameter at which the beam intensity drops to 13.5% (i.e. $1/e^2$) of central (i.e. axial) beam intensity) of typically 1 to 4 millimeters and preferably about 2 millimeters, and which then is truncated preferably at its $1/e^2$ intensity diameter. If the external modulator 508, which is positioned in the beam paths following this conditioner 506*b*, employs any device (e.g. acousto-optic modulator) which requires a relatively very clean parallel Gaussian beam for the best performance, then a pinhole spatial filter, working with appropriate focusing and re-collimating optical elements, may also be included, and in this case the beam may be truncated preferably somewhat outside its $1/e^2$ intensity diameter, e.g. at 3 mm diameter.

The collimated laser beam 550 enters the external beam's intensity modulator 508, powered and controlled by the controller 510. If the laser controller 504 is used to directly modulate the optical output of the laser 502, then the modulator 508 with the controller 510 augments this function. In this case, computer 152 generates appropriate signals, coordinated in time, for both controllers. It is well within the abilities of those skilled in the art to decide how to assign (partial) modulation to each employed modulation device, based on each device's characteristic, and how to generate the appropriate time-coordinated modulation signals to each device.

Whether or not both direct and external modulation are employed, the end result should be such that the computer 152 should be able to effect analog modulation of the beam 550 with contrast (i.e. maximum to minimum optical power ratio) preferably about 100:1 or more at the low modulation frequencies, from the display refresh rate (e.g. 30 Hz) up to a few kHz. In addition, at the same time, the computer should be one that is able to modulate the beam with contrast preferably at least about 5:1 at the high modulation frequencies which are preferably in a range from about 10 kHz to about 200 kHz. In addition, at the same time, the computer should be one that is able to attenuate the beam's optical power (i.e. adjust the average power, averaged over a scan period) by a factor of from 1 to preferably, according to our calculations, about 50,000 or more, preferably within less than about 0.3 a second. In addition, the computer should be one that is able to cleanly and abruptly (preferably within about 20 microseconds) switch on the beam 550 once every scan cycle and later during the cycle switch off ("blank") the light rapidly and substantially completely.

The modulation in the low frequency range is desirable in order to adjust the brightness of painted line locally as needed during each scan cycle, for example to make the line visible-definition-dimmer with growing linear-definition-distance. The modulation in the high frequency range is desirable if one wishes to create the "gaps" or "beads" in the virtual cable that are described elsewhere herein without objectionable artifacts (e.g. "ringing"), in response to the steering signal from computer 152. The attenuation of the beam's optical power is desirable in order to adjust the overall brightness of virtual cable to accommodate different ambient light conditions (e.g. country road at night, cloudy sunset, sunny day). The blanking of the beam's optical power is desirable to allow, at the end each scan cycle, for the return of the scanning mirror to the starting position of the next scanning cycle without painting a perceptible line. This feature is desirable since, in the preferred embodiment, the line is painted only in one direction, e.g. from the linear-definition-near point to the linear-definition-far point of the virtual cable, in order to avoid registration errors which could be caused by any scanner or screen actuator hysteresis (i.e. to avoid any double line effect).

Figure 9:
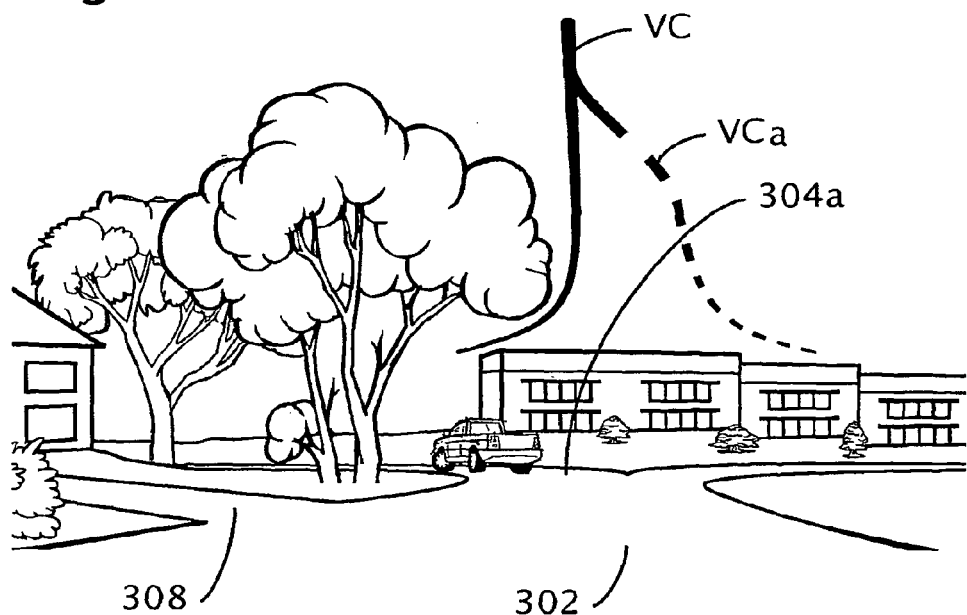
FIG. 9 is a schematic example of another alternative embodiment of virtual cable as seen by the driver, the virtual cable forking into two lines to indicate an alternate route.

While a single virtual cable path is painted only in one direction, nevertheless, when painting an image such as the image shown in FIG. 8 or the image shown in FIG. 9, it is preferred that each constituent line is painted during a different stroke of the screen, as described below, within the same screen movement cycle. For example the left-side line of the VC in FIG. 8 can be painted while the screen is moving away from the optics, starting from the top (i.e. linear-definition-closest-point), then, after the beam is blanked and repositioned, the right-side line of the VC can be painted from the bottom (i.e. linear-definition-the-farthest point) toward the top, while the screen is moving toward the optics, returning to near its starting position in the cycle. Such method allows a brighter, less flickering presentation than one possible when each constituent line is drawn on the receding stroke of the screen, and the beam is blanked out during the return stroke of the screen.

The blanking of the beam's optical power may be needed also to draw disjoined figures, like the triangles shown in FIG. 7. Such figures are drawn one complete figure at a time, preferably using a very fast scanner (e.g. acousto-optic scanner, but the fastest available galvanometric scanner could also be successfully used), with the beam being blanked out while being repositioned to paint the next figure in the series. Such method of drawing line images is widely employed by in laser shows, for example.

The external beam's intensity modulator 508 may comprise either a singular modulation device of any appropriate type known in the art (e.g. acousto-optic) or any appropriate combination of such modulation devices (e.g. acousto-optic modulator followed by an actuated continuously variable neutral density filter attenuator having a wide (e.g. 50,000:1) dynamic range). Those skilled in the art could choose a set of modulation devices, which is both economical and sufficient for the job as described herein. An example of combining a fast modulator with an independently controlled slower attenuator, the slower attenuator being a neutral density filter controllably moved in and out of the optical path with a stepping motor, is disclosed in U.S. Pat. No. 6,462,858 issued to MacDonald, et al. and entitled "Fast attenuator," which is hereby incorporated by reference.

The modulated beam 550 enters the beam shaper and conditioner 506a. If the beam 550 is not substantially Gaussian at this point, then it first passes through the optics to re-condition it appropriately. Any appropriate optics known in the art may be used for this job. The beam is truncated preferably at its $1/e^2$ intensity diameter (i.e. the truncation ratio is about 1 (one)). Then, the beam 550 enters a spherical aberration adjusting device, which we consider a part of the beam shaper and conditioner 506a.

The spherical aberration adjusting device is optional. It is used to enhance the look of the Visual Cable by rendering it in a way which is more pleasing to most drivers than a Visual Cable which could be rendered with such device omitted.

Figure 28:
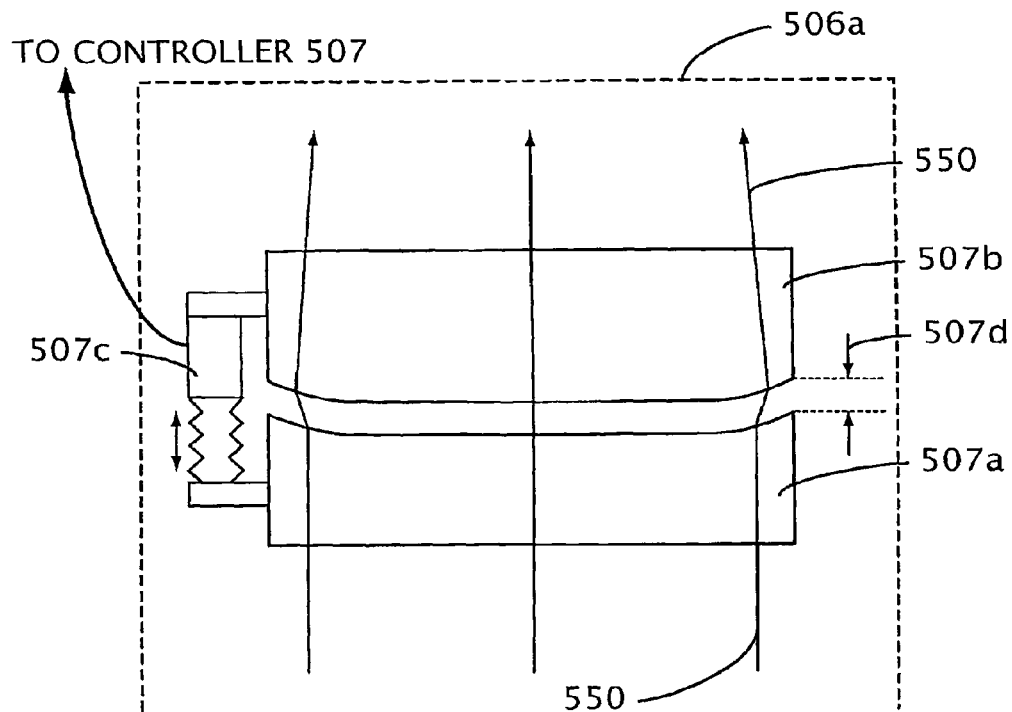
FIG. 28 is a schematic of the spherical aberration adjusting device.

The spherical aberration adjusting device is powered by the controller 507, which acts in response to the steering signal from computer 152. The adjusting device continuously adjusts spherical aberration of the laser beam 550 while the laser spot 401 is scanned across the projection screen 602 during each display refresh cycle. This adjusting device preferably comprises either a piezoelectric or a voice coil actuator 507c, and a pair of closely spaced optical elements 507a and 507b (referred to herein as the first and second compensation lens, respectively) located in the path of the beam 550 and coaxial with the beam, as shown in FIG. 28. The actuator 507c is mounted to axially adjust spacing 507d between these two optical elements in response to the signal from the controller 507, with an actuation bandwidth of preferably about 1 kHz.

Each optical element 507a and 507b is slightly larger in diameter than the beam and has overall optical power substantially equal to zero. In addition, each element has strong spherical aberration, but when both elements are brought to the close proximity, each substantially cancels the other element's spherical aberration. This is illustratively achieved through both optical elements having flat surfaces facing away from each other, and having purely aspheric and substantially complementary surfaces facing toward each other. Changing the spacing 507d between such elements changes substantially the overall spherical aberration of the pair, and therefore of the beam 550, without substantially changing the overall focus (i.e. average collimation) of the beam. The diameter of the beam 550 exiting the adjusting device changes only very slightly with the spacing 507d. In the preferred embodiment, the overall spherical aberration of the pair is substantially zero when the elements are at their closest position, and becomes positive and increasing as the elements are moved apart.

A desired adjustment capacity of such a spherical aberration adjusting device can be achieved using many different combinations of indices of refraction of the compensation lenses, aspheric curvatures, and ranges of motion. The question of which such combination is most economical may depend on a given manufacturer's technology. The exact optical prescription of the adjusting device, including the needed range of relative positions of the compensation lenses, to economically achieve a desired range of preferred distributions of visible-definition-brightness across the virtual cable, can be made by those skilled in the art, using an appropriate ray tracing computer software, such as the ZEMAX software mentioned above. An example of such adjusting device is disclosed in U.S. Pat. No. 6,115,192 issued to McDonald and entitled "Apparatus for adjustable spherical aberration correction", which is hereby incorporated by reference.

After exiting the beam shaper and conditioner 506a, the beam 550 is substantially collimated, is circular with about 2 mm diameter (as measured at $1/e^2$ intensity points), is appropriately attenuated (i.e. modulated), and has its spherical aberration appropriately adjusted. Now such a beam 550 enters the beam expander 520. The function of the expander is to substantially match the diameter of the beam 550 with the size of the scanning mirror 570. In the preferred embodiment, the beam expander 520 is of a Galilean type, i.e. it consists of a negative diverging lens 512, followed by a positive collimating lens 518, positioned with their focal points nominally coincident. The Keplerian type expander consisting of two positive lenses may alternatively be used. The expanded beam should have a diameter preferably very slightly smaller than both the diameter of the beam expander's collimating lens 518 and the diameter (i.e. minor projected diameter, accounting for the fact that the mirror is tilted relative to incoming beam) of the steering (i.e. scanning) mirror 570, so that substantially the expanded beam is not further truncated by the lens 518 nor by the mirror 570.

The diameter of the lens 518 and the projected minor diameter of the mirror 570 preferably should be matched (i.e. be substantially the same); in the preferred embodiment they are about 10 millimeters each.

In the preferred embodiment, the beam expander's diverging lens 512 has an additional function of being the focusing lens for the beam 550. The choice of this lens for the focusing function is dictated by the fact that it may be a small and simple lens, because it is positioned in the narrow and not yet steered portion of beam 550. Because of this, it may have a relatively very small mass, which in turn makes it easier to accurately move it using a relatively high bandwidth actuator 514.
The actuator 514 is powered by the controller 516, which acts in response to the steering signal from computer 152. The actuator 514 is mounted to axially adjust the position of the focusing lens 512 along the beam axis, and as a result adjust spacing between this lens and lens 518, and therefore the convergence of the beam 550 leaving the lens 518, in response to the signal from the controller 516. The actuator 514 preferably is piezoelectric or voice coil type, with an actuation bandwidth of illustratively about 1 kHz. For any given starting and expanded beam diameters, the maximum range of motion 514r the actuator should be capable of depends on (i.e. grows with) the focal length of the expander's collimating lens 518. It is therefore preferred for the expander to be relatively short; the lens 518 having 10 millimeters diameter should preferably have the focal length of no more than about 30 millimeters. It preferably is appropriately aspheric to minimize the overall spherical aberration of the expander 520. Even more preferably, the lens 518 is appropriately aspheric to minimize the overall spherical aberration of the expander 520 together with the average (i.e. averaged over possible positions of the beam 550 entering the telescope 530) overall spherical aberration of contractor telescope 530.

Here is an our estimate of the needed range of motion 541r of the focusing lens 512, based on an example of the approximate layout of the preferred primary volumetric image generator 980 of the display unit. For the sake of simplicity of these calculations, the spherical aberration is assumed to be adjusted to be 0 (i.e. fully corrected). The exit aperture 541 of the projector 540 is, for the purpose of this calculation, assumed here to be located 70 millimeters from the screen 602 about 35 millimeters to the side from the optical axis, in order to be substantially clear out of the light path from the screen to the relay lens group 702. The length of the optical path of the beam 550 between the projector's exit aperture 541 and the projection screen 602 therefore varies from about 70 millimeters to about 102 millimeters, because of the oblique projection geometry and screen movements. The focuser needs to focus the beam 550 in such a way as to produce a well focused spot (i.e. place the beam's waist, which $1/e^2$ intensity diameter, according to our calculations, ranges from about 0.07 millimeters at 70 millimeters focusing distance to about 0.1 millimeters at 102 millimeters focusing distance) on the screen at any of those distances to the screen, as well as to produce a defocused spot (by focusing further away than actual screen distance) on the of any diameter up to about 0.6 millimeters on the screen. For a converging beam having a diameter of about 1 millimeter right after leaving the lens 528, those requirements imply, according to our calculations, a need to focus the beam 550 at any distance from 70 to about 240 millimeters from the projector's exit aperture 541. Furthermore, the maximum range of motion 514r needed to focus the beam 550 through the needed range of convergences is, according to our calculations, about 0.1 millimeters. Those calculations assume that the expander 520 expands the beam 550 fivefold from 2 to 10 millimeters, and that the lens 518 is 10 millimeters in diameter and has 30 millimeters focal length.

After exiting the beam expander 520, the beam 550 is reflected from the fast steering (or "scanning") mirror 570 actuated by the tip/tilt actuator (or "dual axis mirror scanner") 522 powered by the controller 524 which acts in response to the steering signals from computer 152, with actuation bandwidth of preferably about 1 kHz. The tip/tilt actuator 522 can tilt (i.e. rotate) the mirror 570 independently around two orthogonal axes, which are located only slightly behind the mirror and are approximately parallel to the mirror plane. The respective motions of the mirror 570 are schematically marked as 570x and 570y in FIG. 23. Those motions can steer the mirror so a line normal to the mirror plane can be directed anywhere within some cone of possible positions. The tip/tilt actuator preferably comprises a number of a piezoelectric or voice coil linear actuators arranged to effect a tilting motions. There are preferably at least four such actuators. Such an arrangement is well known to those skilled in the art; it results in a precise and durable (since it has no friction bearings) device. An example is a S-334.2SL Piezo Tip/Tilt Platform sold by Physik Instrumente (PI) GmbH & Co. Karlsruhe Germany, which is capable of up to +−1.5 degree mechanical tilts under closed loop control and has resonant frequency of 1 KHz with a 10 millimeters diameter glass mirror attached; up to 12.5 mm diameter mirror also can be used. Another example is a FSM-300-01 Fast Steering Mirror sold by Newport Corporation of Irvine, Calif., which employs four voice coil actuators under closed loop control to achieve similar capability and which can support a larger (20 mm diameter) glass mirror. Such a performance of the actuator 522 allows the beam 550, after being reflected from the mirror 570 while the mirror is being tilted, to sweep across up to almost 5 degrees of angle and back during ⅓₀ of a second (i.e. during a single refresh cycle of the display), according to our calculations.

However, the desired range of sweeps of the whole projector 540 is greater. It is about 45 degrees when the layout of the primary volumetric image generator 980 matches the example given earlier. Such a range of beam angular motion is achieved by employing the beam contractor telescope 530. It should have just sufficient magnifying power to amplify the angular movements of the passing beam 550 to the desired range. According to our calculations, this would be a magnification factor of 10 in the preferred embodiment. Such a telescope will also make the beam 550 ten times narrower (i.e. in the preferred embodiment it will reduce beam diameter from 10 to 1 millimeter). The movements of the beam exiting the projector are schematically shown in two mutually perpendicular directions as movements 550x and 550y.

In the illustrative embodiment, the resulting beam diameter is still large enough to be able to produce a fine beam spot on the screen, a spot capable of painting a fine-looking virtual cable. However, because of the diffraction, a much narrower beam could produce a too large, fuzzy-looking spot. Therefore, when a tip/tilt mirror is used (for example the S-334.2SL mentioned before) which is only about 10 millimeters in diameter and has maximum tilt of only little more than one degree, then it is important that the laser beam be expanded to fill the diameter of the mirror 570 as much as possible without excessive truncation. This maximizes the diameter of the beam leaving the telescope having any given magnification, and therefore minimizes the ratio of the smallest obtainable beam spot size to its travel range on the screen.

The telescope 530 comprises the front, or "objective" lens group 526 having diameter slightly larger than the beam 550 diameter, to accommodate the range of transversal motions of the beam at this point, and a back lens group 528, which, again, must be large enough to accommodate the range of (even greater) transversal motions of the beam at its position. In FIG. 23, both lens groups are schematically shown as single lenses for clarity. The telescope may be of the Galilean (which is preferred) or a Keplerian type. It must be well corrected (i.e. to have substantially diffraction limited performance, possibly after the spherical aberration is externally corrected) for coma and astigmatism, because it has to handle oblique positions of the beam 550. Preferably, it should be corrected as one unit (i.e. both lens groups corrected together only) for greater design freedom. It does not need to be at all corrected for chromatic aberration, since the laser used is substantially monochromatic. It does not need to be well corrected for field curvature nor for distortion, since those aberrations can be accounted for and compensated by computer 152. It may not need to be very well corrected for spherical aberration either, if the remaining spherical aberration is such that it can be reasonably well compensated by the spherical aberration adjusting device mentioned before. Those skilled in the art, using an appropriate ray tracing computer software such as the ZEMAX® software mentioned above, can produce a detailed prescription of the telescope 530 according to these specifications.

Figure 24:
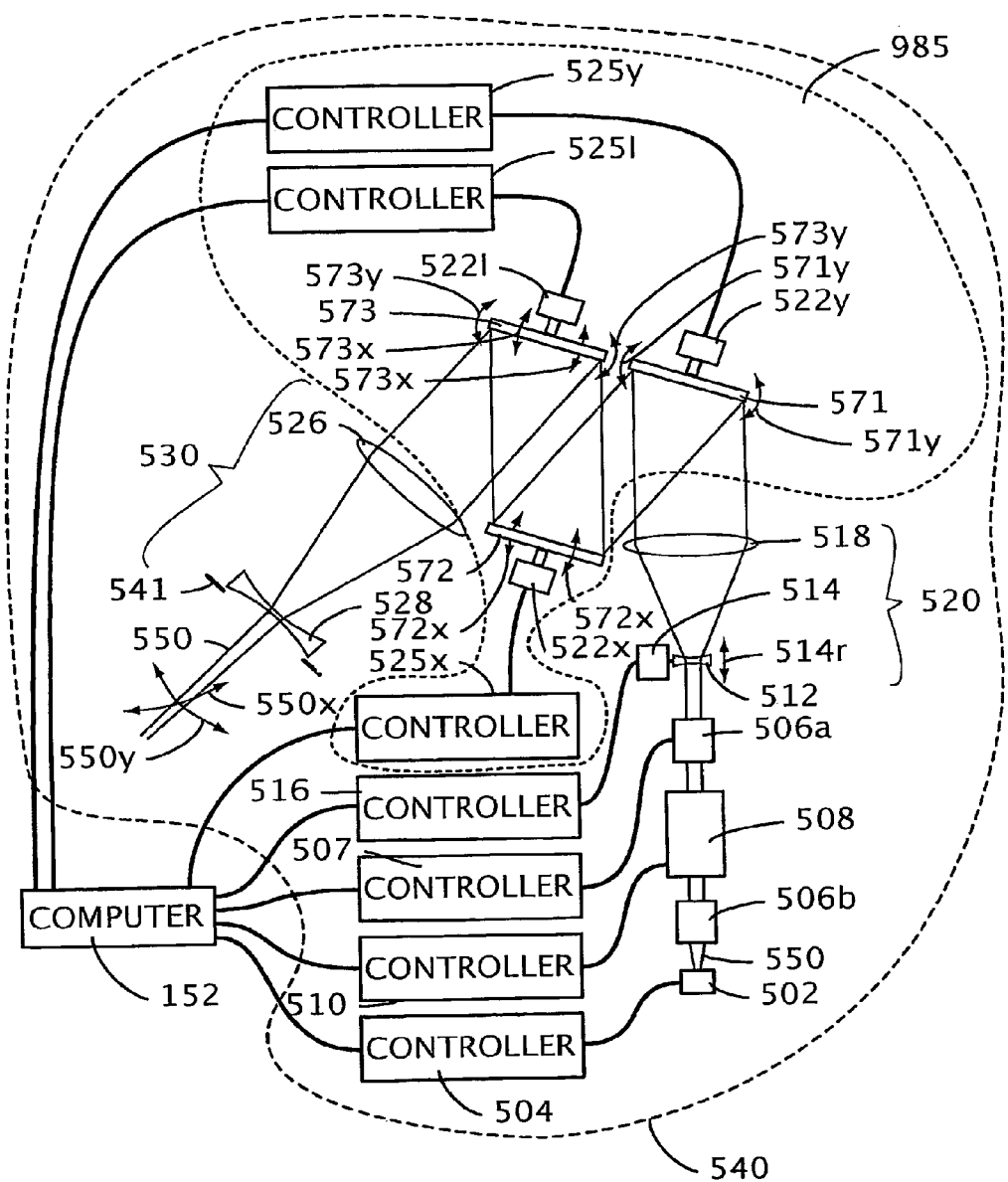
FIG. 24 is a schematic of another embodiment of the laser projector, with a train of several scanning mirrors.

FIG. 24 shows a schematic of another embodiment of the laser scanner projector unit 540, including its controllers. As in FIG. 23, the device employs a mechanical mirror scanner 985. In this embodiment, however, the scanner 985 uses a number of mirrors arranged in such a way that the beam 550 is reflected in sequence by each mirror, and each mirror reflects the beam once. The depicted arrangement comprises three mirrors 571, 572 and 573, actuated by actuators 522$y$, 522$x$ and 522$l$, respectively. Each actuator is powered by its separate controller 525$y$, 525$x$ and 525$l$, respectively. Each abovementioned controller acts in response to its steering signals from computer 152.

With the exception of the mirror scanner 985 as just described, the laser scanner projector unit 540 comprises the same set of devices as before: the laser 502 emitting a light beam 550, the beam conditioner 506$b$, the external beam's intensity modulator 508, the beam shaper and conditioner 506$a$ comprising a spherical aberration adjusting device, the beam expander 520, and the beam contractor telescope 530. In this embodiment of the projector unit 540, the function of the expander 520, beside focusing, is to substantially match the diameter of the beam 550 with the projected size (i.e. the size as seen by the beam) of the first scanning mirror 571, and the function of the beam contractor telescope 530 is to receive the beam after it is reflected from the last scanning mirror 573 and contract it just sufficiently that the maximum range of motion of the projected beam spot is matched to the size of the projection screen. The functions of all the other abovementioned components are the same as described in connection with FIG. 23).

The pictured three mirror arrangement is used here in order to achieve a required frequency response of the whole scanner 985 using simpler and possibly more economical mirror scanning devices than in the embodiment of FIG. 23. The first two scanning devices (where "first" means the scanning devices that first reflect the beam 550) in this arrangement are single axis, relatively low excursion, but wide bandwidth (i.e. non-resonant, with the maximum working frequency preferably above 1 KHz) mirror scanners, the first one comprising the mirror 571, actuator 522$y$ and controller 525$y$, the second one comprising the mirror 572, actuator 522$x$ and controller 525$x$. The third one is a relatively high excursion dual-axis, or "tip/tilt", mirror scanner comprising the mirror 573, actuator 522$l$ and controller 525$l$, which is generally similar to the tip/tilt mirror scanner described in the embodiment shown in FIG. 23, except that its maximum working frequency can now be substantially lower than 1 kHz.

The mirror projected sizes (i.e. the sizes as "seen" by the beam) are preferably similar, but since the maximum range of angular, and therefore transversal, displacements of the beam grows after each reflection, each consecutive mirror needs to be a little larger than prior one to accommodate the motions of the beam. Because of this, the high frequency mirrors preferably should be placed ahead of the low frequency high excursion mirror (meant in the order of reflection sequence of the beam 550) so the mirrors to accommodate a given diameter beam can be, on the average, a little smaller.

In each of the first two scanning devices, a mirror can tilt (i.e. rotate) around single axis, which is located approximately in the plane of the mirror. The motions of the mirror 571 (or 572 in the second device) are schematically marked as 571$y$ (or 572$x$ in the second device) in FIG. 24. The first two scanning devices are arranged in such a way that the beam, after being reflected by the mirrors 571 and 572 in sequence, can be steered in two mutually orthogonal directions, so the beam can be directed anywhere within some cone of possible positions. The first two scanning devices are used together to sweep the beam 550 with high frequency component of the desired motion of the beam 550. The remaining low frequency component of the desired motion of the beam 550 is handled by the third scanning device. Such an arrangement is somewhat analogous to that of a two-way speaker system, where there are separate loudspeakers for reproducing sounds generally below and for reproducing sounds generally above a certain "crossover" frequency. The rationale is in part analogous too: it is easier to build a mechanical device to able handle high frequency signals well if that device does not need to handle low frequency (and therefore, in a typical signal spectrum, much higher excursion amplitude) signals at the same time, and vice versa. In case of the scanning devices, having only a single axis of rotation is also conducive to achieving higher frequency bandwidth. The example of a low excursion high bandwidth single axis scanner is Nano-MTA, a single axis piezoelectric mirror tilt actuator sold by Mad City Labs, Inc. of Madison, Wis., which is capable of range of motion 2.2 mrad under closed loop control, has resonant frequency (unloaded) of 5 KHz, and which is designed for (up to) 0.50" optics. An example of a single axis scanner capable of even higher frequencies is disclosed in U.S. Pat. No. 5,251,056 issued to Lee and entitled "High-speed light beam deflector," hereby incorporated by reference.

The motions of all the mirror actuators used in the mechanical mirror scanner 985 are coordinated by computer 152, The software executed by computer 152 provides a logical function of an appropriate frequency crossover; the computer generates properly phased signals with appropriate frequency range for each actuator's controller 525$y$, 525$x$ and 525$l$. Each controller translates the signals it receives from the computer (and from optional motion feedback sensors which can be built into the actuator) into high power signals appropriate to drive the particular actuator. Preferably at least the high excursion scanning device contains a motion feedback sensors; the controller 525*l* receives feedback signals from those sensors which then are used to improve control of the device (i.e. improve its accuracy and lessen its sensitivity to outside interference (jarring, temperature etc.). High frequency actuators typically are stiffer and less prone to major disturbances than low frequency devices, and therefore employing a feedback loop for the high frequency actuators 522*y* and 522*x* typically would have less noticeable benefit on the overall performance of the mechanical scanner 985; still, in the more preferred embodiment, each of the three scanning actuators is under feedback control. Optionally, the feedback signals from the low frequency scanning device may also be sent to remaining (i.e. high frequency) scanner actuator controllers, either directly or through computer 152, so those faster mirror actuators may be used to counter the low frequency scanning device errors. It is within the ability of those skilled in the art to decide how to assign working motion frequencies to each employed scanning device, based on each device's characteristic, how to utilize the feedback signals, and how to generate the appropriate time-coordinated steering signals to each scanning device.

In an similar fashion to that described above, a mechanical mirror scanner 985 employing a different number of mirrors could also be constructed, for example, a scanner having two dual-axis tip-tilt scanning mirrors and one crossover, where the first mirror is capable of smaller angular displacements but substantially higher motion frequencies than the second mirror—for example the first mirror may be actuated by a piezoelectric actuator unit, while the second by voice-coil unit. Alternatively, a mechanical mirror scanner 985 employing two or more crossovers and three or more mirrors can be constructed.

Figure 25:
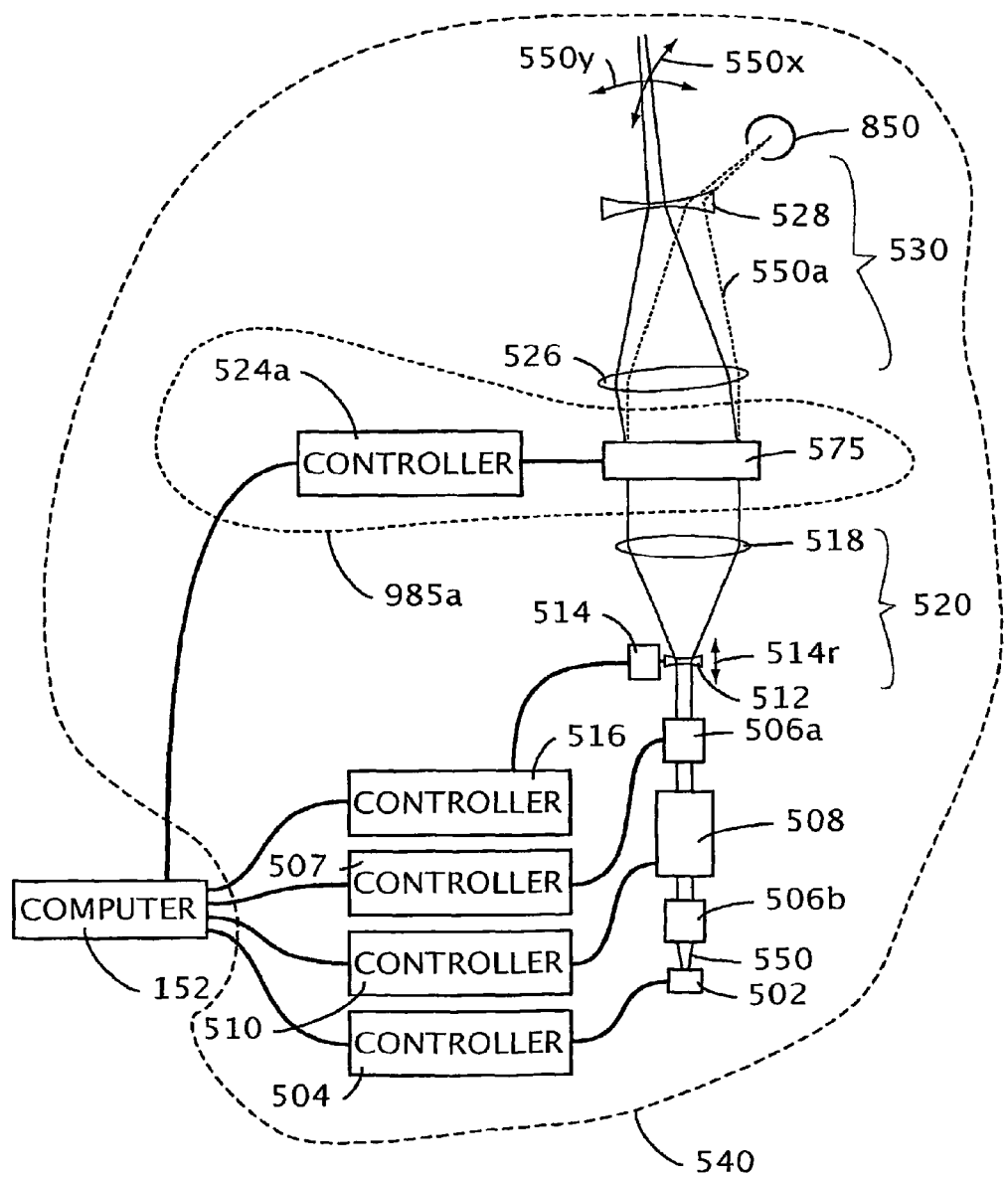
FIG. 25 is a schematic of yet another embodiment of the laser projector, with acousto-optic deflector, where the beam convergence and spherical aberration is being varied before the beam is input into acousto-optic deflector.

FIG. 25 shows a schematic of another embodiment of the laser scanner projector unit 540, including its controllers. This device employs an acousto-optic scanner 985*a*. In this embodiment, the scanner 985*a* uses a dual axis, or "x-y", acousto-optic deflector 575 powered by controller 524*a*, which acts in response to its steering signals from computer 152. A dual axis acousto-optic deflector typically is made of two crossed single axis acousto-optic deflectors, but for a sake simplicity of the following description we will refer to it as a single device.

The acousto-optic deflector provides excellent response time and very high maximum speed of beam sweeping, potentially allowing for higher, more desirable refresh rates of the display device, and simplifying the coordinated control of all the controlled actuators used in the scanner projector unit 540. Drawbacks, beside the high cost, are lower light throughput and the device's sensitivity to the quality of the input laser beam.

With the exception of the scanner 985*a* being different than the mechanical mirror scanner 985, the same set of devices is used as described above: the laser 502 emitting a light beam 550, the beam conditioner 506*b*, the external beam's intensity modulator 508, the beam shaper and conditioner 506*a* comprising a spherical aberration adjusting device, the beam expander 520, and the beam contractor telescope 530. In this embodiment of the projector unit 540, the function of the expander 520, beside focusing, is to substantially match the diameter of the beam 550 with the input aperture of the acousto-optic deflector 575, and the function of the beam contractor telescope 530 is to receive the diffracted beam from the acousto-optic deflector and contract it just sufficiently that the maximum range of motion of the projected beam spot is matched to the size of the projection screen. The functions of all the other above-mentioned components are the same as in the embodiment of FIG. 23.

By the nature of the acousto-optic deflectors, beside the desired doubly diffracted ("doubly first-order") output beam leaving the acousto-optic device, there is also a non-diffracted (or "doubly 0-order") beam and two singularly diffracted beams ("first order x 0 order y" and "0 order x first order y"), all latter three are useless in our application, and need to be disposed of. The blocking device, shown schematically in FIG. 25 as beam trap (or "beam dump") 850 intercepts all non-doubly-first-order beams 550*a* and absorbs them.

The example of an acousto-optic device which could be used in this embodiment of a scanner 985*a* is MODEL LS110A-XY, a dual axis acousto-optic deflector sold by ISOMET CORP of Springfield, Va., which is capable of accepting a circular input beam of red light (in LS110-633XY version) up to 9.3 millimeters in diameter, and which can work in a vector scanning mode producing the diffracted beam with range of motion 2.9 degrees by 2.9 degrees, and has throughput efficiency of over 35% (i.e. more than 35% of the incident laser beam is diffracted to the XY image plane, provided the beam is a collimated "diffraction-limited quality" Gaussian beam).

Figure 26:
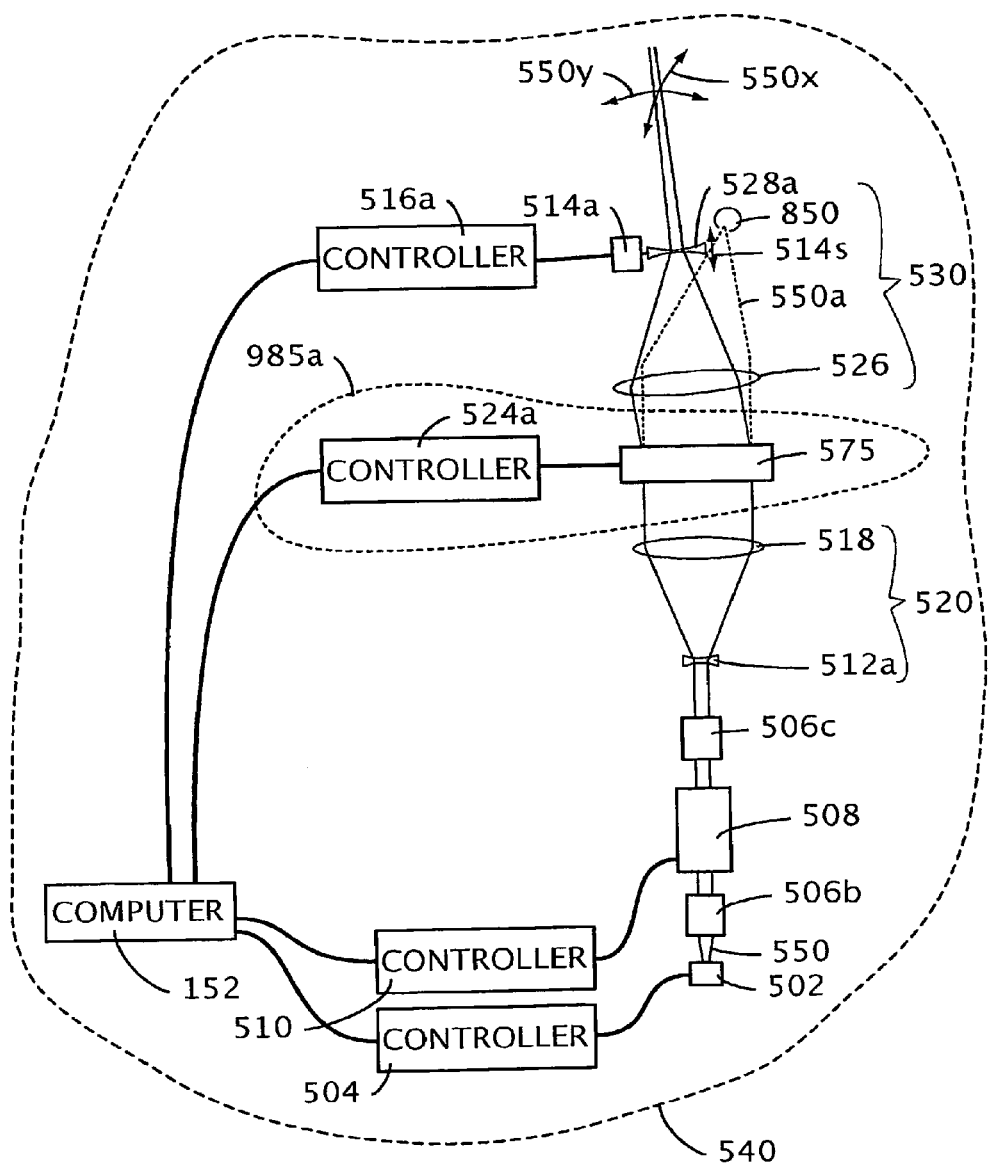
FIG. 26 is a schematic of yet another embodiment of the laser projector where a substantially Gaussian beam is input into acousto-optic deflector.

FIG. 26 shows a schematic of second embodiment of the laser scanner projector unit 540 employing a dual axis acousto-optic deflector 575. Unlike in FIG. 25, the beam, which is fed into an acousto-optic deflector 575*a*, is a collimated (i.e. non-focused), high quality (i.e. having no substantial spherical aberration present) Gaussian beam. Such an arrangement provides substantially constant, the maximum possible throughput efficiency of the acousto-optic deflector 575. In this embodiment a spherical aberration adjusting device is altogether omitted from the (optional) beam shaper and conditioner 506*c* (which is only used if the beam 550 is not substantially Gaussian after leaving the external modulator 508). The beam focusing is done by beam contractor telescope 530 second lens group 528*a*, after the beam is output from the acousto-optic deflector 575, rather than by the beam expander's diverging lens 512*a* as it was done in the previously described embodiments. The lens group 528*a* is actuated axially, with ranges of motion schematically shown as 514*s*, by a mechanical (preferably a piezoelectric or voice-coil) actuator 514*a* powered by the controller 516*a* in response to its steering signals from computer 152. A drawback of this embodiment, compared to the prior acousto-optic embodiment, is that the lens group 528*a* is larger and heavier than the lens 512*a*, requiring more powerful actuator to actuate accurately. Another drawback is that calculating the coordinated steering signals to all the actuators becomes more complex, since focusing of oblique beam also changes positioning of the beam. Another drawback is the omission of the spherical aberration adjusting device, which implies that the virtual cable profile is not adjustable in this embodiment.

Figure 27:
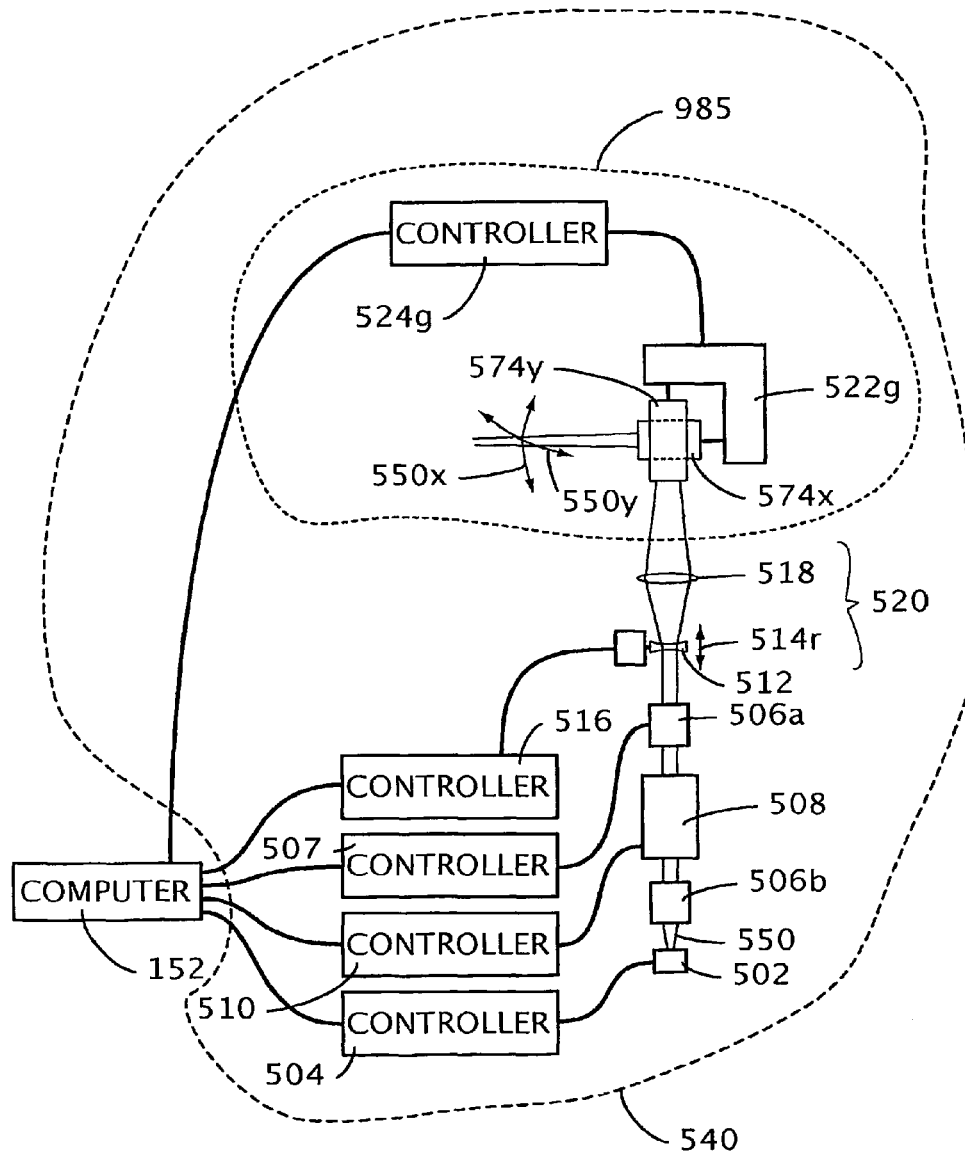
FIG. 27 is a schematic of yet another embodiment of the laser projector, with dual axis galvanometer based scanner.

FIG. 27 shows a schematic of another embodiment of the laser scanner projector unit 540, including its controllers. This device employs a mechanical mirror scanner 985 in which the scanner 985 uses a pair of mirrors actuated by rotary galvanometers. The depicted arrangement comprises two mirrors 574*x* and 574*y*, actuated by actuators (i.e. pair of galvanometers perpendicular to each other, shown as a single unit) 522*g*, powered by controller 524*g*, which acts in response to its steering signals from computer 152. A galvanometer can tilt a mirror practically as large an angle as needed, therefore, in this embodiment, the beam can be steered toward any point on the projection screen (by combining simultaneous movements in two mutually perpendicular directions schematically shown as 550x and 550y) without any need to employ any additional optics to expand beam's range of motions (e.g. the beam contractor telescope 530, which had to be employed in all the previous embodiments).

With the exception of 1) the omission of the beam contractor telescope 530 and of 2) the scanner 985 being different than the mechanical mirror scanner 985 employed in the first described embodiment of the projector unit 540, this version of the laser scanner projector unit 540 comprises the same set of devices as in the FIG. 23 embodiment of the projector unit 540: the laser 502 emitting a light beam 550, the beam conditioner 506b, the external beam's intensity modulator 508, the beam shaper and conditioner 506a comprising a spherical aberration adjusting device, and the beam expander 520. However, in this embodiment of the projector unit 540, the function of the expander 520, beside focusing, is to 1) substantially match the diameter of the beam 550 with the smallest projected size of either one of both mirrors 574x and 574y during their normal working range of tilts, typically only a few millimeters, and 2) focus (not collimate) the beam on the closest point on the projection screen when the focusing lens 512 is at its "close focus" position. The functions of all the other abovementioned components are the same as in the FIG. 23 embodiment.

The example of a dual axis galvanometer scanner which could be used in this embodiment of a scanner 985 is Model 6210 Moving Magnet Closed Loop Galvanometer Based Optical Scanner sold by Cambridge Technology, Inc. of Cambridge, Mass. It is a high excursion high-speed scanner designed for a laser beam 3 millimeters in diameter.

A disadvantage of using a galvanometer scanner is relatively high cost and possibly limited reliability of the scanner due to presence of friction in bearings. Another drawback is that calculating the steering signals to the scanner's actuators becomes more complex because of a presence of significant geometric displacement jitter inherent to this type of scanners. On other hand, this technology is widely used in laser show industry and it provides excellent results. Therefore, depending on economic and other considerations, this embodiment may be preferred.

6.6. Screen Actuator

As it was mentioned above, the volumetric property of our illustrative embodiment of the display apparatus is accomplished, in short, through continuously adjusting a distance between the projection screen and the viewing optics. Such continuous adjustment takes place during each scan period, while the laser beam is being swept across the screen surface to "paint" the cable-line, in coordination with such laser beam movement. To move the screen, in a well controlled manner, to achieve such continuous adjustments, the screen actuator is employed.

Figure 30A:
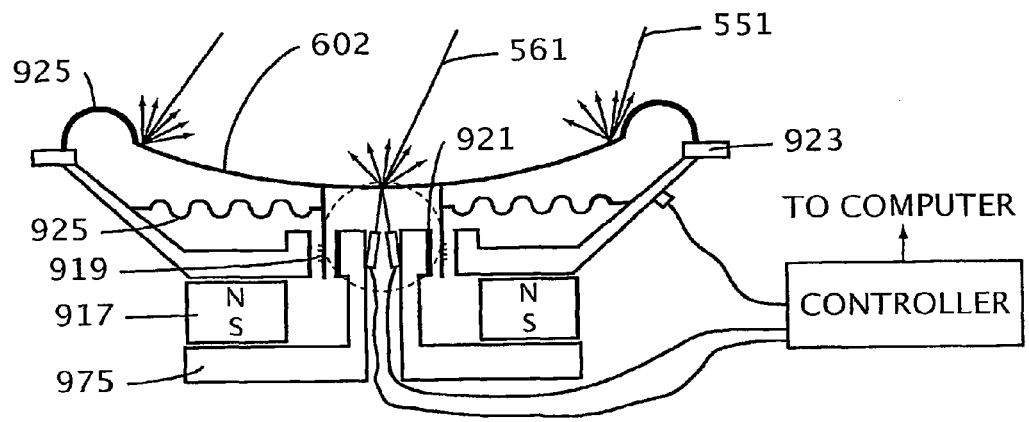
FIGS. 30A-30B is a schematic of a voice coil screen actuator and the detail showing the screen displacement sensor.
Figure 30B:
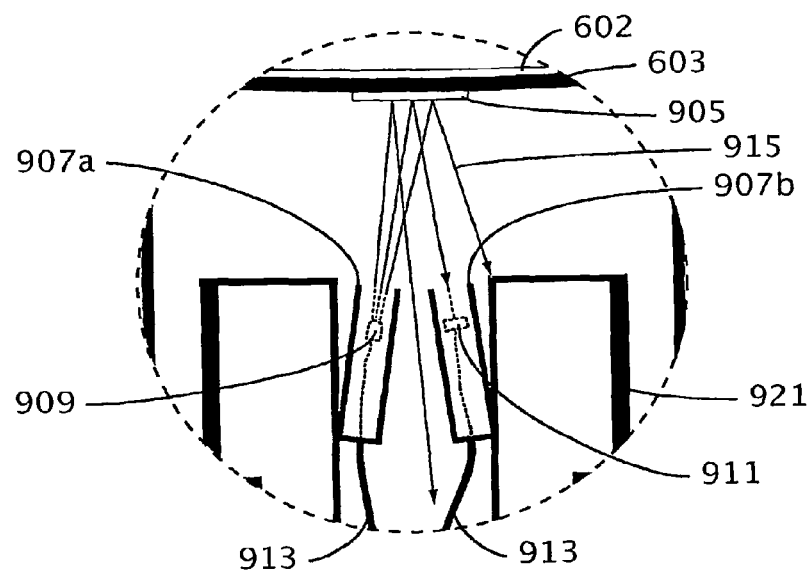

FIGS. 30A-30B shows a schematic of an illustrative embodiment of the projection screen actuator 975 with the projection screen 602 attached to it, and the screen actuator controller 924. The controller 924 powers the actuator in response to the steering signals from computer 152. In this embodiment, the projection screen actuator 975 is a voice coil screen actuator 923, closely integrated with the concave screen 602 into one unit. Its principle of operation and construction are similar to that of a modern dynamic loudspeaker with "inverted dome" (i.e. a concave membrane), a type well known to those skilled in the art. This similarity itself is advantageous, since the design of this type of actuator and screen combination can benefit from the loudspeaker design state of art.

There are significant differences as well. An acoustic speaker needs to respond to any frequencies in any combination within its specified bandwidth. In most applications (i.e. possibly except when intended for audiophile "high end" equipment) an audio speaker does not need to preserve time or phase relationships among different frequencies particularly well. Also, typically, the voice coil of an acoustic speaker is fed a purely AC signal, without any DC component present. On other hand, the screen actuator 923 generally is steered with the discrete set of frequencies within the working frequency range of the screen unit. The working frequency range of the screen unit extends from the refresh frequency of the display unit (i.e. about 30 Hz) to preferably at least 1 kHz. Typically, in the first approximation (i.e. assuming that the displayed virtual cable image changes very little from one cycle no the next) the screen axial movements are periodic with the period equal to the display unit refresh frequency (e.g. 30 Hz). Because of this periodicity, the constituent frequencies of the screen axial movements are, in the first approximation, a discrete set of frequencies the refresh frequency (e.g. 30 Hz) and its even and odd harmonics (e.g. 60 Hz, 90 Hz, 120 Hz etc.), present in varying proportions and phases, depending on the three-dimensional shape of the displayed virtual cable. The basic resonant frequency of the actuator should preferably not be too close to any of those frequencies. In typical display situations the higher harmonic frequencies have amplitudes diminishing quickly with increasing frequency, and frequencies well above about 1 kHz have relatively small impact on the visible appearance of the virtual cable and can be omitted from the steering signal. The accurate preservation of phase relationship between different frequencies is important in the screen actuator 923. For this reason the actuator 923 generates a feedback signal so that the absolute position of the screen can be monitored by the controller 924 in real time. Also, because linear-definition-distance range of a displayed portion of the virtual cable can vary greatly from one driving situation to another, the average position of the screen 602 during a given refresh cycle typically does not coincide with the neutral screen position (i.e. rest, or middle position of the screen, in the absence of any signal, determined by the screen suspension 925); therefore the projection screen actuator 975 uses a DC component of the steering signal to displace the average screen position as needed. An alternative method, which avoids the thermal load of the voice coil 919 caused by DC signal, is to not use any DC component in the steering signal to the voice coil 919, but instead to use an additional low bandwidth actuator (not shown) placed between the back of the screen actuator 975 and its supports 931; such an additional low bandwidth actuator should move the whole voice coil screen actuator assembly 923 to an appropriate position.

The voice coil screen actuator 923 is illustratively positioned at such a distance from the relay lens 702 that in the absence of any signal, screen 602 is at its rest position, which is illustratively 102.55 millimeters in front of the relay lens 702. Therefore screen 602 reaches the farthest from the relay lens 702 position (corresponding to virtual image being at "infinity") when it is displaced 0.85 mm from its rest position in the direction away from lens 702, and it reaches the closest to the relay lens 702 position (corresponding to virtual image being at the most "near" position to the driver) when it is displaced 0.85 mm from its rest position in the direction toward from the lens 702. As disclosed later, a variant of the screen which is tilted (i.e. not perpendicular) to the optical axis of the relay lens 702 may be preferable. When such a screen is at its rest position, different parts of the screen are in different distances from the "infinity" optical conjugate surface. Such tilting screen may be used to lessen amplitude of screen movements in the typical driving situations, as discussed later.

Examples of inverted dome dynamic loudspeakers which have similar construction (except no feedback and no heat resistant suspension) to the preferred embodiment of the voice coil screen actuator 923 with the screen 602 are NS3-193-8A sold by AuraSound, Inc. of Santa Fe Springs, Calif., which has a rigid low mass aluminum cone 70 millimeters in diameter capable of up to 5 millimeters (each way) excursion, and ACCUTON C2 89-T6 sold by Thiel & Partner GmbH of Pulheim, Germany, which has a very rigid low mass concave ceramic dome 90 millimeters in diameter capable of up to 3 millimeters (each way) excursion.

The voice coil screen actuator 923 illustratively has a magnet 917 that is as strong as practicable, providing magnetic field inside ring shaped magnetic gap. The gap may contain a copper induction sleeve 921 around the center pole to enhance the actuator's accuracy. Such sleeves are known and used in some loudspeakers (e.g. woofer in THIEL CS.5 Loudspeaker sold by THIEL of Lexington, Ky.). The voice coil 919 is preferably sufficiently shorter than the length of the magnetic gap to remain inside the gap even at the extreme working positions. It is attached to a former tube which in turn is attached to the screen substrate 603. Substrate 603 can be metal, ceramic, or any other suitable material.

The screen is concave and preferably conforms to the shape needed to substantially cancel the field curvature of the viewing optics of the display unit. As disclosed later, a variant of the screen which is tilted (i.e. not perpendicular) to the optical axis of the relay lens 702 may be preferable. Such a screen preferably has shape, generally concave, which, in addition to accounting for the field curvature of the viewing optics of the display unit, also accounts for the statistically typical positioning of virtual cable relative to the vehicle. To explain this intuitively, imagine that a large number of real cables are placed in front of the vehicle, each one where in some typical driving situation a virtual cable would be displayed. The tilted screen should preferably have a shape which puts it, when at "rest", as near as possible as many as possible "reverse" images of those real cables (note: it is a basic law of optics that if an object in position x is imaged in position y, the object placed in position y will be imaged in position x).

The former tube and the screen substrate 603 should be light, durable, and resistant to high temperatures. Highly elevated temperature may be occasionally caused by the direct sunlight being focused by the viewing optics onto the screen 602. Also, in the preferred embodiment, the voice coil 919 should be capable of handling the thermal load caused by AC and DC in the signal; for this reason it is preferable for the coil former tube to be made of a material which can conduct heat well, e.g. aluminum. Also, it is preferable for the screen substrate 603 and screen 602 to be an efficient heat sink for the coil 919 and coil former assembly, which can be accomplished by, for example, using aluminum for the screen substrate 603 material and by using as a surface for the screen 602 which is highly emissive in far infrared. The screen substrate 603 may be coated with a surface coating, providing the desired optical and thermal-radiative properties; the surface of this coat constitutes the screen 602. The screen substrate 603 should be rigid enough so that the whole screen can move substantially undistorted, with piston-like motion, at all the working frequencies. The suspension 925 for the screen and the coil former is similar to loudspeaker suspension, again, the high temperature handling is an additional requirement in this case.

The actuator 923 generates a real time screen position feedback signal for the controller 924; the detailed schematics of an illustrative embodiment of the feedback sensor are shown inside the insert of the FIGS. 30A-30B. The feedback sensor is contained within a center bore of the center pole of the magnetic armature of the actuator, and the leads 913 to the sensor components are routed to the controller 924 through the back end of the bore. The stationary light source (illustratively an LED) 909, shielded by the shield 907a emits a narrow divergent beam 915 of light (e.g. IR or visible) toward the center of the back surface of the substrate 603 of the screen. The screen back surface illustratively has at its center a white or more preferably a convex mirror-like reflective spot 905 (e.g. a polished area of the substrate 603, or a painted white spot, or a thin reflective film glued onto the substrate 603), that is illustratively large enough to intercept the whole beam 915. The beam is reflected by the spot 905 toward the photodetector 911, shielded from stray light by the shield 907b. For a given output of the light source 909, the illumination of the photodetector 911 is a function of the distance of spot 905 on the back of the screen 602 from the assembly of the emitter 909 and the detector 911, and therefore the absolute axial position of the screen 602 can be determined at any moment from the signal from the photodetector 911. The above described embodiment of the feedback sensor improves on the prior art (exemplified by an arrangement disclosed in U.S. Pat. No. 4,868,401 issued to Erickson, et al. and entitled "Method and means for measuring distance of a moving object from a fixed point of reference") by both the simplicity and by not employing any membrane-mounted sensor components (thus avoiding the need to increase the moving mass of the membrane).

The power stage of the controller 924 should preferably provide strong damping to the actuator. The screen position feedback signal is illustratively used for closed loop control, even when this signal is also utilized by other control methods, in order to quickly cancel any disturbance to the screen position caused by unexpected motion (i.e. jarring) of the vehicle. Also, since in typical driving situations the up-down directional component in a jarring motion of the vehicle is the strongest, it is preferable to configure the display unit optics so that the screen 602 is mounted in substantially vertical position and therefore is least affected by such jarring.

It is desirable for the controller 924 together with the software executing in computer 152 to be aware of dynamic characteristics of the actuator 923, like linearity and the frequency and phase responses. This awareness can be constantly re-calibrated by observing the signals from the absolute screen position sensor of the actuator, as is known in the art of control. Using this data, computer 152 together with controller 924 can calculate and generate a steering signal, which pre-compensates for distortions of the actuator, resulting in a well controlled movements of the screen 602.

Those skilled in the art will be able to design appropriate control algorithms and appropriate controller 924 circuits to accomplish precisely controlled movements of the projection screen.

Figure 30C:
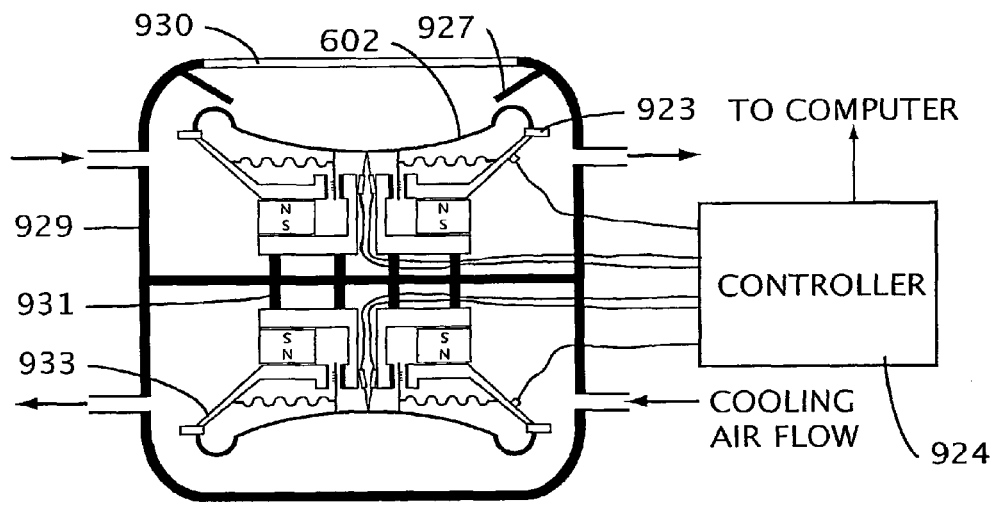
FIG. 30C is a schematic of a voice coil screen actuator with vibration balancing twin actuator unit and sound enclosure.

FIG. 30C shows a schematic of an illustrative embodiment of the voice coil screen actuator 923 within its sound barrier enclosure 929, together with a vibration balancing twin actuator unit 933, and the screen actuator controller 924. The balancing actuator 933 should preferably have as much as possible the same characteristics (i.e. moving mass, frequency and phase response, membrane area) as the main actuator 923; frequency response matching may be accomplished through selecting pairs of such actuators having most similar frequency response from a large pool of actuators available in a production facility. The balancing actuator 933 is placed in symmetrically opposed position on the same axis as the main actuator 923, by attaching each of them to an opposite side of the support member 931 within a substantially symmetrical enclosure 929. In one, simpler variation of the embodiment of balanced voice coil actuators (not shown), the balancing actuator 933 has no feedback sensor and is fed by the controller 924 with the same signal as the main actuator 923, with polarity such that forces acting on voice coils in both actuators are always equal but acting in mutually opposite directions. When both actuator are well matched in all respects, not only the acting forces, but also the movements of the corresponding moving parts of the screen actuator 923 and the balancing actuator 933 will be equal but opposite, leaving center of mass of the pair substantially motionless.

However, the balancing actuator 933 may have its own feedback sensor, identical to feedback sensor of the main actuator 923 as much as possible (e.g. through selecting matching pairs of such sensors for each pair of actuators from a large pool of sensors available in a production facility). It is powered by the controller 924 with a signal very similar to the signal fed to the main actuator 923; small difference between those signals may exist due to slight differences in two actuators response characteristics and the fact that the signal to the balancing actuator 933 is controlled independently from the signal from the main actuator 923, with the control goal to actuate the balancing actuator 933 in such a way as to produce feedback signal from the balancing actuator 933 being identical to the feedback signal from the main actuator 923. Under such condition, the movements of the corresponding moving parts of the screen actuator 923 and the balancing actuator 933 will be equal but opposite, leaving center of mass of the pair substantially motionless.

The enclosure 929 is fully closed and made of material soundproof enough to provide an effective barrier to sound generated by both actuators. In addition, acoustic fiberglass or any other appropriate sound absorbing material (not shown) may be placed inside the enclosure 929 to help absorb sound waves traveling inside the enclosure, as it is practiced in some loudspeaker enclosures. To effectively dissipate the heat generated by the voice coils as well as occasional heat generated on the screen 602 because of direct solar irradiation, the enclosure may be actively ventilated (i.e. cooled). The enclosure 929 is closed by an optical window 930 on the side adjacent to the projection screen 602. The suspension material surrounding the screen 602 is protected from direct exposure to any possible focused solar radiation by a heat resistant light baffle 927, which may be highly reflective.

Figure 29:
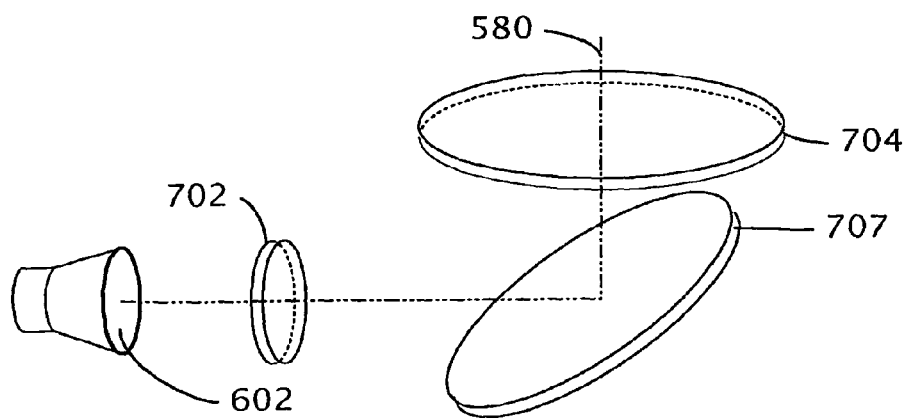
FIG. 29 is a schematic of an example of using a folding mirror in the optical path.

FIG. 29 shows a schematic of the one possible embodiment of the viewing optics employing a folding mirror 707. A use of an appropriately located folding mirror, a first surface flat mirror just large enough to intercept all image forming light rays, makes it possible for the voice coil screen actuator to be in the preferred position (i.e. so the screen 602 is substantially vertical, minimizing road induced vibrations of the screen 602) and makes the display unit more compact and easier to fit within dashboard area of the vehicle. The folding mirror 707 shown is positioned substantially under the display unit eye lens group, so the optical axis 580 changes direction between the display unit relay lens group 702 and the display unit eye lens group 704, and is horizontal between the screen 602 and the mirror 707. Additional folding mirror, or mirrors, could also be used to achieve even greater compactness of the display unit (not shown).

A variation of the optical layout presented in FIG. 29 (which is, in essence, a folded microscope with a very large binocular eyepiece) can be made by replacing both the flat mirror 707 and the eye lens group 704 by a single tilted concave mirror. Such a design may result in a lighter and more compact display unit, it may also be more economical, depending on a given manufacturer's technology. U.S. Pat. No. 5,825,553 issued to Chen and entitled "Eyepiece design" teaches how to design a microscope-type optical system with relatively large reflective eye-side element. Those skilled in the art could easily adapt the eyepiece design presented in that patent as the viewing optics for our display apparatus, essentially by scaling-up the design presented in that patent and positioning it appropriately under the top of the dashboard. When designing the viewing optics for our display apparatus, a designer using appropriate optical design software can take advantage of additional degrees of freedom. Those additional degrees of freedom are present in our case since there is no need to correct for chromatic aberration, and substantial amount of distortion and of the field curvature can be left uncorrected, for the reasons discussed before. At this opportunity let us note that an optical system which is employing tilted optical components, such as the one disclosed in the above mentioned patent, does not have an optical axis in the strict sense. In this document, however, we will use the term "optical axis" in an extended sense, defined here as follows: for a viewing optical system which is rotationally-symmetrical, the "optical axis" has the standard meaning; for a microscope-type viewing optical system which is not rotationally-symmetrical, the "optical axis" is hereby defined as the path of the ray which passes thru both the geometrical centroid of the entrance pupil and thru the geometrical centroid of the exit pupil of the optical system. When we will, later in this document, refer to a projection screen as being "tilted" relative to an "optical axis", we will mean this extended definition of "optical axis'.

Figure 31:
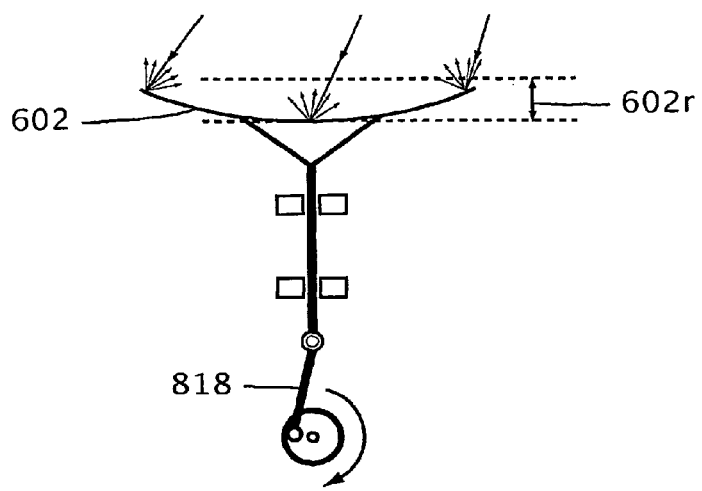
FIG. 31 is a schematic of a crank mechanism driven screen actuator.

FIG. 31 shows a schematic of another embodiment of the projection screen actuator 975 with the projection screen 602 attached to it. In this embodiment it is an electric motor driven crank mechanism 818, capable only of providing cyclic motions of a constant range 602r to the rigidly attached screen 602, with the period equal to the rotation time of the motor driving it (e.g. 1/30 second, but it also can be variable, with speed of the motor changeable by computer 152). It is simple and very resistant to any disturbances. It can be used with a fast scanner (preferably an acousto-optic based scanner) to provide acceptable results in most driving situations. However, within a single movement cycle, it is not capable of displaying a virtual cable which, along its length, is alternately linear-definition-receding and linear-definition-drawing-near.

6.7. Display Device Viewing Optics

Figure 32:
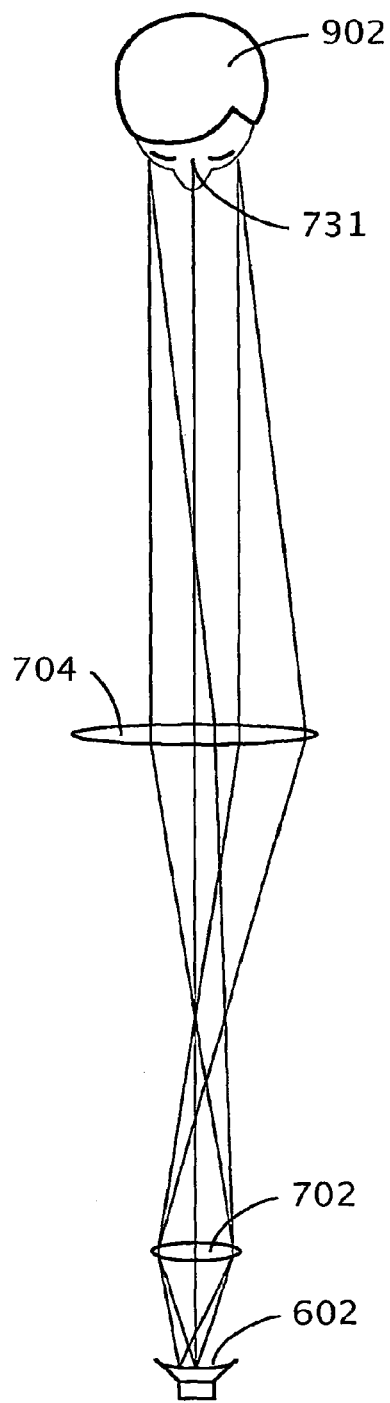
FIG. 32 is a schematic example of using a compound microscope as viewing optics.

FIG. 32 shows a schematic of an illustrative embodiment of the viewing optics of the display device shown in FIG. 19—a non-mosaic compound microscope optical system, shown for clarity without any folding of the optical axis by folding mirror(s) or a combiner, and with both lens groups 702 and 704 depicted and referred to as single lenses.

The axis ray as well as the marginal ray bundles coming from two different points on the projection screen 602 (one axial point at the center of the screen and one field about half a way toward the edge of the screen) are shown. The screen is depicted at its farthest position from lens 702 (i.e. "infinity" position), resulting in both ray bundles becoming substantially parallel bundles ("pencils") upon leaving the last optical element of the viewing optics (i.e. the eye lens 704). The intersection of those pencils on the observer's side of the eye lens 704 defines the eye box around the point 731. The driver's 902 eyes need to be positioned within that eye-box volume to properly see the display with both eyes.

Figure 33:
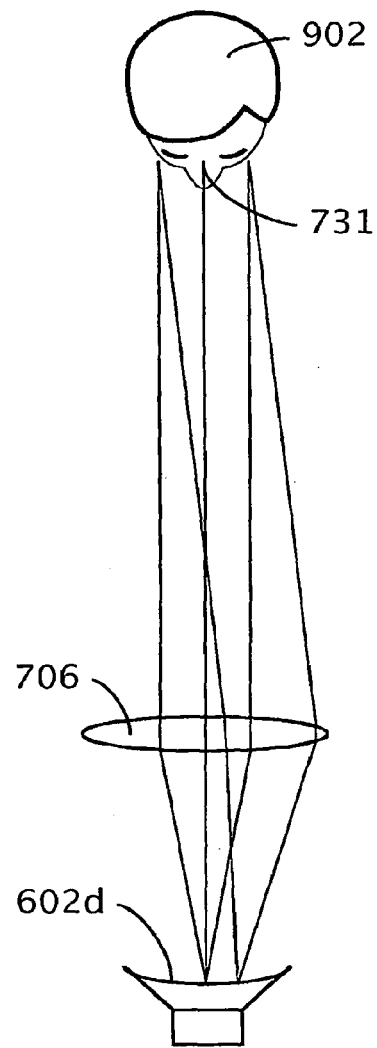
FIG. 33 is a schematic example of using a magnifier (i.e. a loupe) as viewing optics.

FIG. 33 shows a schematic of another embodiment of the viewing optics of the display device, a non-mosaic magnifier (or "loupe") optical system, shown for clarity without any folding of the optical axis by a combiner, and with all of the optical elements comprising the magnifier being depicted and referred together, as a single lens 706. The magnifier 706 is shown having substantially the same diameter as the eye lens 704 in FIG. 32, and the driver 902 is shown at the substantially same distance from the lens 706 as driver in FIG. 32 is from the lens 704; therefore the driver in FIG. 33 is seeing substantially the same field of view as the driver in FIG. 32.

As in FIG. 32, in FIG. 33 axis ray as well as eye-box-limit-defining ray bundles coming from two different points on the projection screen 602d are shown, and the screen is depicted at its farthest position from lens 702 (i.e. "infinity" position), resulting in both ray bundles becoming substantially parallel upon leaving the optics. A magnifier employed to view a physical object (or at least a physical object which is a lambertian emitter) does not have a distant "exit pupil" in a strict sense. However the eye box should be comparable in size to the eye box of the illustrative embodiment (i.e. preferably 100 millimeters or more in its maximum transversal diameter, to allow for some head movements of the driver 902). For the purpose of optical correction, the optical designer should only consider the light rays passing the eye box.

Like the viewing optics in the embodiment shown in FIG. 32, and for the same, discussed earlier, reasons, it is desirable for the viewing optics shown in FIG. 33 to be very well corrected (i.e. for the light rays passing the eye box) for spherical aberration, and well corrected for coma and astigmatism. On other hand, the field curvature and/or distortion can be left largely uncorrected. Chromatic aberrations do not need to be corrected at all.

Correcting a stand-alone magnifier is generally more difficult than correcting the eye lens in a closed compound microscope (i.e. compound microscope where the eyepiece and objective are non-interchangeable, so the intermediate image is not accessible and therefore does not need to be corrected), since there is no option to divide the correction of a given aberration between the objective and the eye lens group.

Correcting a stand-alone magnifier for spherical aberration, coma and astigmatism when the f-ratio number (i.e. ratio of focal length to lens diameter) is small (e.g. below 1.2) results in a relatively complex optical prescription; a well-corrected small f-ratio number loupe tends to be thick, heavy and expensive. The overly thick optics may, in this application, make it impossible to place the laser projector in a proper position to project a small laser beam spot anywhere on the screen 602.

Employing a magnifier having substantially larger f-ratio number, on the other hand, leads to another set of drawbacks. Using a long focal length magnifier results in a display device which is larger, necessitates using a brighter laser to achieve given brightness of the virtual cable, necessitates using a larger screen having a much larger range of motions to achieve a given linear-definition-extent of the virtual cable, which in turn necessitates a much more powerful screen actuator's controller, higher rate of actuator cooling, and shielding the vehicle from much higher levels of produced sound and vibration. Given a set of economic and/or technical requirements, those skilled in the art could find a focal length of a magnifier 706 which results in a good compromise in light of all the issues presented above, and build a viewing device employing such a magnifier.

Figure 34:
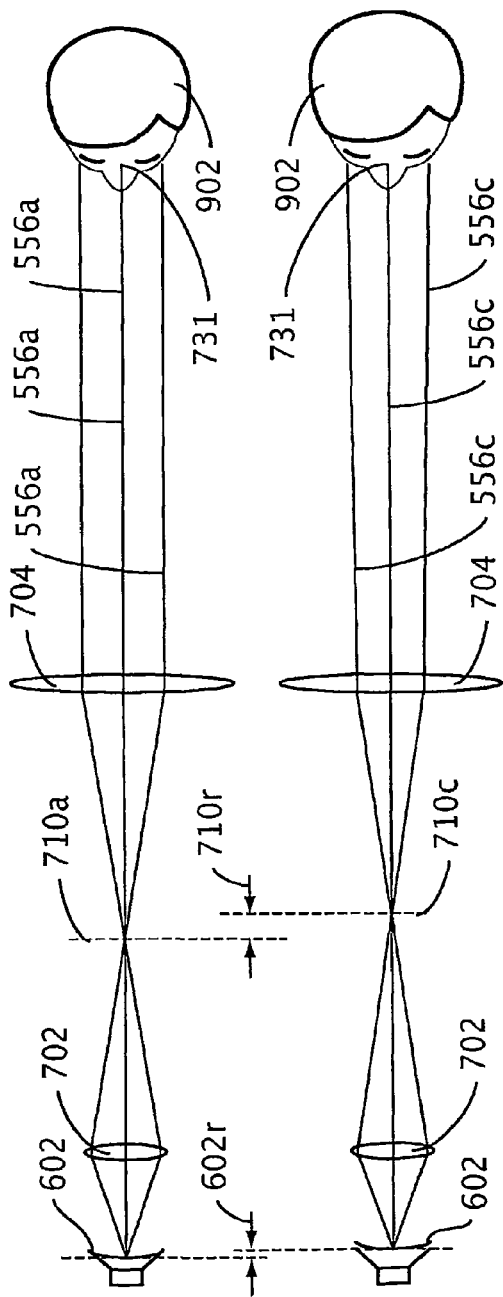
FIG. 34 is a schematic example a compound microscope focused to give the final virtual image at far distance (i.e. substantially at infinity) and the schematic example of the same compound microscope refocused to give the final virtual image at close distance (e.g. 12.5 meters)

The top portion in FIG. 34 shows, as FIG. 32 did, a schematic of an illustrative embodiment of the viewing optics of the display device shown in FIG. 19—a non-mosaic compound microscope optical system, shown for clarity without any folding of the optical axis by folding mirror(s) or a combiner, and with both lens groups 702 and 704 depicted and referred to as single lenses. The lower portion in FIG. 34, shown below the first portion and aligned with it, shows an additional schematic of the same viewing optics, and while the first schematic shows the screen 602 at its farthest position from the lens 702 (i.e. position corresponding to virtual image being at the "infinity" position), the second schematic shows the screen 602 at its closest position to the lens 702 (i.e. position corresponding to virtual image being at the most "near" position to the driver).

The axis ray as well as the marginal rays coming from the axial (i.e. central) point on the projection screen 602 are shown in both portions of FIG. 34.

In the top portion of FIG. 34, where the screen is depicted at its farthest position from the lens 702, the ray bundle becomes focused into the intermediate real image point, lying on the intermediate screen image surface 710a (which, for simplicity, is schematically shown as a plane, even though the intermediate image of the whole screen 602 may be curved), and then continues to eye lens 704 which substantially collimates the bundle 556a. A virtual extension of this bundle ahead of the vehicle constitutes a virtual bundle (not shown), which is virtually "focused" at infinity. The eye lens 704 thus acts as a magnifier, which re-images the real point lying on intermediate screen image surface 710a into a virtual point lying on virtual screen image which is positioned substantially at infinity.

In the lower portion of FIG. 34, where the screen is depicted at its closest position to the lens 702, the ray bundle again becomes focused, but into the new intermediate real image point, lying on the new intermediate screen image surface 710c, further away from the relay lens 702, and thus closer to the eye lens 704, and then continues to eye lens 704 which now does not quite fully collimate the bundle. The bundle 556c is slightly divergent, and a virtual extension of this bundle ahead of the vehicle constitutes a virtual bundle (not shown) virtually focused at some finite distance from the observer 902 (in the preferred embodiment, about 12.5 meters away from point 731). The eye lens 704 thus acts as a magnifier, which re-images the real point lying on intermediate screen image surface 710c into a virtual point lying on virtual screen image, which is positioned at some finite distance from the observer. Because the relay lens 702 magnifies the image both transversally and longitudinally, the difference in positions of image 710a and 710c, shown as shift distance 710r, is larger than the distance 602r by which the screen 602 moves when shifting from "infinity" to the most "near" position.

FIG. 34 illustrates rays traced at the extremes of the range of possible positions of the screen 602. An intermediate position of the screen 602 (not illustrated) would result in the correspondingly intermediate degree of divergence of the ray bundle exiting the eye lens 704, and therefore in the correspondingly intermediate distance between the observer and the virtual screen image.

6.8. Painting the Virtual Cable

Figure 35:
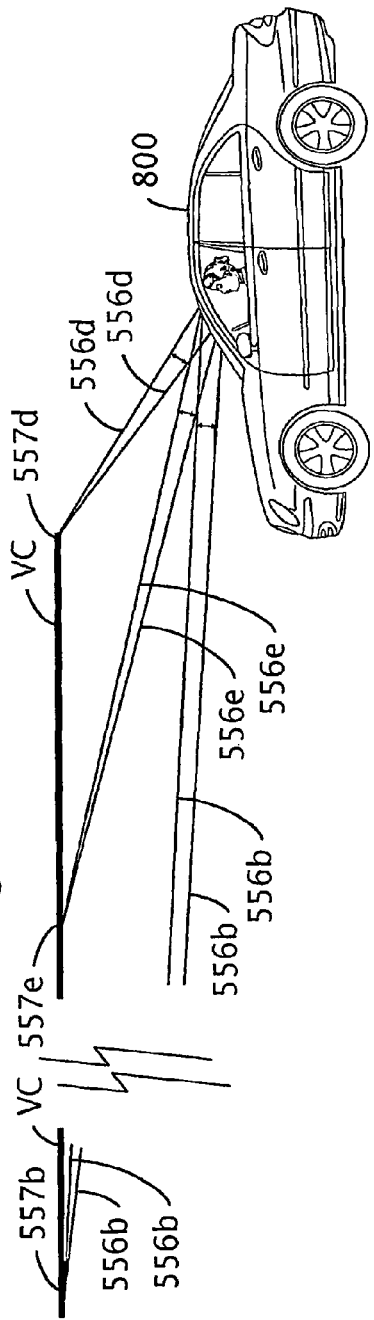
FIG. 35 is a schematic showing how the focus distance of the final virtual image changes at different points of the virtual cable.

FIG. 35 shows a schematic of the display device painting an example of virtual cable VC in three-dimensional space. Note that all the rays shown in FIG. 35 are virtual, and note that the virtual cable image is for illustrative purpose only; the virtual cable can not be seen from any viewpoint located outside of the vehicle 800, it can be seen only by an observer positioned within eye box of the display device, like the driver of the vehicle. Virtual cable VC is painted anew during each refresh cycle, illustratively about 30 times per second. Virtual cable VC is illustratively painted point by point along the virtual cable's path, starting at the point 557d closest to the vehicle 800 and proceeding toward the other end of the displayed segment of the virtual cable. At the starting moment of the display refresh cycle, when the point 557d is being painted, the screen 602 is adjusted to its most "near" position. The laser beam is projected onto such a location on the screen 602 which, when seen by the driver through the viewing optics (including the combiner), corresponds to the direction toward the point 557d in three-dimensional space. The shining of the laser beam onto the screen results in an illuminated spot—a real (i.e. "not a virtual"), bright light source. This real bright source is then imaged by the viewing optics (including the combiner). The real light bundle leaving the display device is relatively most divergent at this moment, and therefore the real light bundle reflected from the combiner (either the vehicle's windshield or a separate combiner) toward the driver is relatively most divergent, and therefore the virtual rays 556d, which are extensions of those real rays, when followed away from the driver are relatively most convergent. Those virtual rays define a virtual image of the beam spot, and this image is in a form of a luminous spot located in three-dimensional space at the point 557d, since both the direction and the distance toward the virtual image are the same as the direction and the distance toward the point 557d. Note that light rays comprising the image of luminous spot (and thus the virtual cable VC) that reach the observer appear to the observer to be light rays that originated from a "real" object existing in the landscape.

The display device's scanner keeps changing the direction of the laser beam which is projected toward the screen while the screen 602 position is being adjusted, so the resulting laser beam spot on the screen moves along a trajectory in three-dimensional space inside the display device which is optically conjugate with the three-dimensional trajectory of a point moving linear-definition-along the displayed virtual cable VC path toward the far end of the displayed segment of the virtual cable. For example, the point 557e is painted some time after the point 557d; at that time the screen is positioned farther away from the relay lens 702 than it was at the beginning of the refresh cycle, resulting in more parallel ray bundle 556e, and the laser beam is pointing toward a point on the screen which, when seen by the driver through the viewing optics (including the combiner), corresponds to the direction toward the point 557e in three-dimensional space. The resulting virtual image of the new laser beam spot is in a form of a luminous spot located at 557e, again aligned with the desired image of virtual cable VC. At the end of the working portion of the display refresh cycle (i.e. right before the laser is blanked out and the scanner, screen and focuser are moved back to the starting position for the next cycle) the point 557b furthest away along the displayed segment of the virtual cable is painted. In the example shown in FIG. 35 it is also most distant point from the driver, therefore when it is projected the screen is in its furthest position from the lens 702, resulting in nearly parallel ray bundle 556b. Note that the point being furthest away along the displayed segment of the virtual cable is not necessarily the most distant point of the virtual cable from the driver; for example when an U-turn is displayed the end of the virtual cable may be closer to the driver than some intermediate point of the virtual cable, but still it is the end of the virtual cable which is the last painted point during the refresh cycle.

Because of the persistence of human vision, the driver sees the virtual optical image of the moving laser beam spot not as a single moving luminous spot in front of the vehicle, but instead the driver sees it "smeared" into a continuously present, extended object, extending along virtual cable VC path. Inn short, the driver sees a virtual cable VC.

Whether the vehicle is standing still or is moving steadily along the indicated route, the virtual image of the laser beam spot, in a form of a luminous spot located above the roadway, is traversing substantially the same path relative to the roadway. Of course in the case of the moving vehicle, the section of such path which is being traversed by the luminous spot continuously changes—during every consecutive refresh cycle, the traversed section starts and ends a short distance ahead along the path, compared to the prior cycle section, to account for changed position of the vehicle—but both sections will be of substantially the same path and both will mostly overlap. Therefore, despite of the movement of the vehicle, the image perceived by the driver will be stationary relative to said roadway.

While painting virtual cable VC during the refresh cycle, the diameter, the brightness and the brightness profile of the laser beam spot projected onto the screen 602 is being continuously changed, so that virtual cable VC appears to the driver as being of a seemingly uniform linear-definition-diameter and linear-definition-brightness linear-definition-along its extent. As described elsewhere herein, the beam can be attenuated or boosted for very short time at certain moments to paint easily noticeable short gaps beads in the displayed virtual cable. The laser beam spot projected onto the screen when painting the point 557d (see FIG. 35) is the widest (i.e. most defocused), and then it is being focused into a narrower spot as its virtual image is moved farther linear-definition-away from the driver toward the point 557e and beyond. The beam focuser adjusts the focus continuously, and since the beam is being projected from an oblique angle onto the projection screen, the setting of the focus needs to take into account the screen's position, the beam spot's position on the screen, and how much defocus is needed. While the laser beam spot diameter is still substantially larger than its minimum achievable diameter, the diameter should be kept in substantially inversely proportional relationship to the linear-definition-distance to the spot's virtual image on virtual cable VC. When the laser beam spot diameter reaches its minimum achievable diameter while a receding virtual cable is being painted, then only laser beam spot's brightness is adjusted to keep dimming while the linear-definition-distance to the spot's virtual image on virtual cable VC is growing. For a given linear velocity with which the laser beam spot is scanned across the screen 602 at a given point, the power (i.e. total luminous flux) of the laser spot, regardless of its size, should be inversely proportional to the linear-definition-distance to the spot's virtual image on virtual cable VC.

The momentary "painting speed"—a linear velocity of the laser beam spot relative to the screen 602 when it is being scanned across a given point along its trajectory within the display device—may vary along its trajectory, as long as the total time of the sweep is less than the refresh cycle time (e.g. 1/30 of a second). The painting speed of the laser beam spot does not necessarily directly correspond to linear-definition-speed of its virtual image moving along the virtual cable path. For example if a given section of a virtual cable VC is aligned with line of sight from the driver, then for a period of time when painting such a section of a virtual cable the movement of the virtual image of the laser beam spot along the virtual cable is due only to changing of the distance of the screen 602, while the laser beam spot is substantially static (i.e. has substantially zero painting speed). For a given laser beam power and spot size, the momentary speed of the sweep at a given point on the screen 602 affects (i.e. is inversely proportional to) the perceived brightness of the displayed virtual cable at the virtual image of that point. Note that if the variable painting speed is used in a display device, the two-dimensional brightness of a virtual cable VC can be controlled by adjusting either one of two independent variables (or both combined in any ratio)—laser beam power and scanner painting speed. It is generally preferable to have non-uniform painting speed during a scan cycle, e.g. to have a relatively slow painting speed when painting the linear-definition-closest part of the displayed virtual cable (to achieve high brightness) or when painting a sharp turn of virtual cable VC (to avoid need for high bandwidth of the scanner). Illustratively, the momentary speed with which the laser beam spot is moved along its trajectory varies depending on the linear-definition-shape of the virtual cable and is decided for each case by computer 152.

Note that, as was mentioned earlier, while a single virtual cable path is painted only in one direction, both strokes of the screen can be utilized for painting the image when painting an image containing disjoined segments of the virtual cable.

FIG. 36A shows an example of a driver's view of a road and a displayed virtual cable in a typical driving situation, where the virtual cable has to show two consecutive right angle turns.

FIG. 36B shows the corresponding to FIG. 36A image painted on the device's projection screen 602 by the laser projector 540 in our preferred embodiment of the display device, in schematic. The image is shown time-integrated (i.e. complete, as it would appear to a human observer, showing the effect of the vision persistence). For pedagogic purposes and simplicity it is shown so its orientation and size matches the view shown in FIG. 36A, with any image geometrical distortion being ignored (i.e. not shown).

As it was noted earlier, there is more than one way to draw such an image, in a sense that the momentary "painting speed"—a linear velocity of the laser beam spot relative to the screen 602 when it is being scanned across a given point along its trajectory within the display device—may vary differently along its trajectory, and yet still result in the same perceived image. This is because the brightness of the painted line can be controlled by adjusting either one of two independent variables (or both combined in any ratio)—laser beam power and scanner painting speed.

Figure 37:
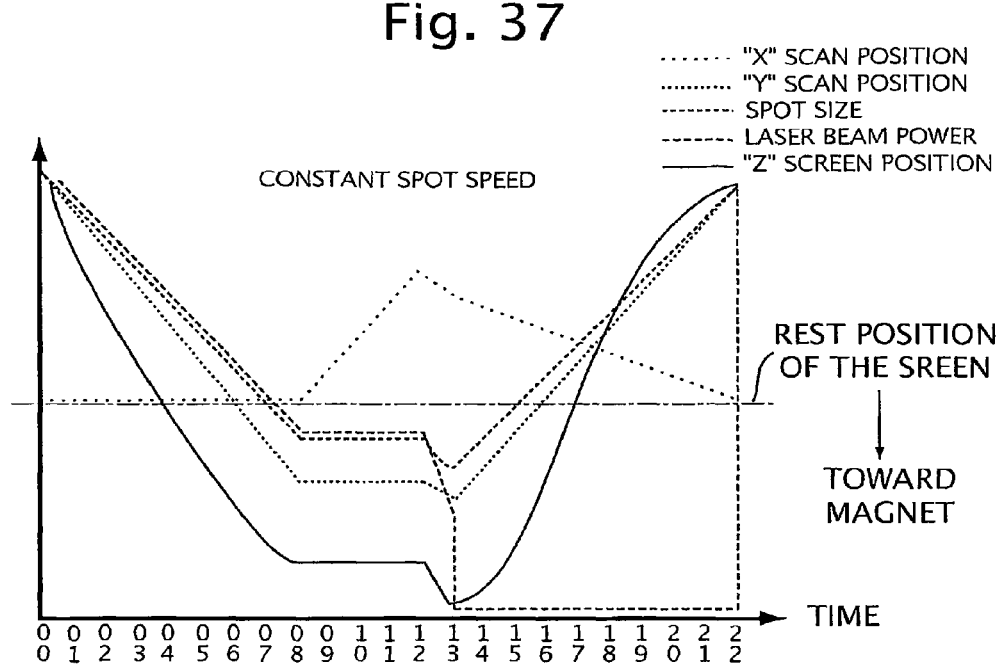
FIG. 37 presents, in schematic, a graph showing display device's variables as functions of time during one display refresh cycle, when the image from FIG. 36B is painted with timing from FIG. 36C.
Figure 38:
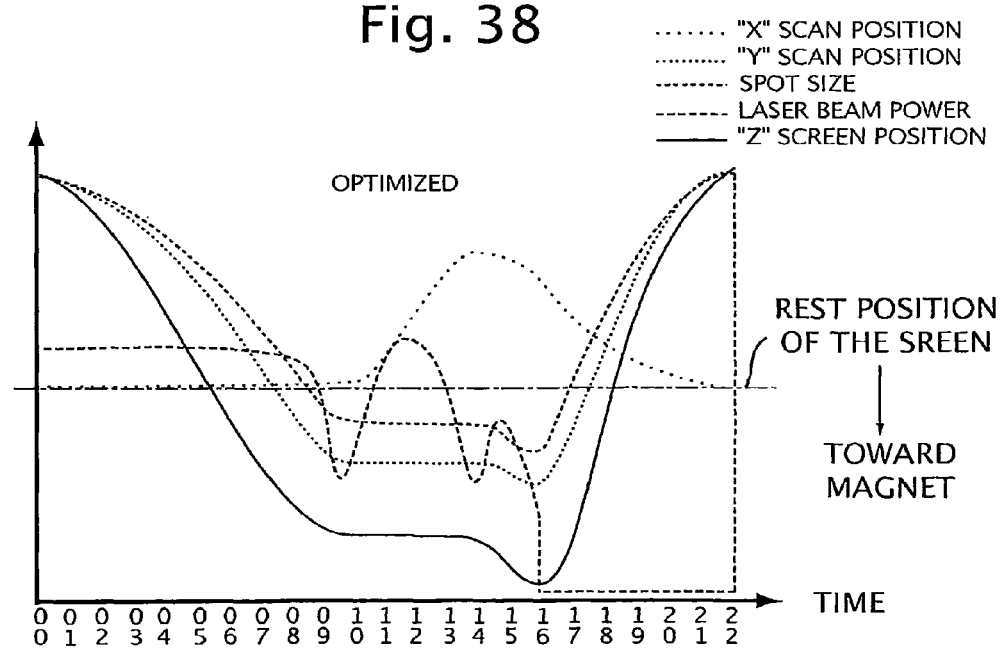
FIG. 38 presents, in schematic, a graph showing display device's variables as functions of time during one display refresh cycle, when the image from FIG. 36B is painted with optimized variable timing from FIG. 36D.

FIG. 36C with corresponding FIG. 37 and FIG. 36D with corresponding FIG. 38 show schematics of two examples of the control process of the display device. Both FIG. 36C and FIG. 36D illustrate schematic time sequence of laser beam spot trajectory across the surface of the projection screen 602, while FIG. 37 and FIG. 38 show in schematics the graphs of the main controlled device variables (i.e. longitudinal position of the projection screen, X and Y position of the scanned beam spot, beam spot size and laser beam power) as a function of time. In those examples, for illustrative purpose, the whole refresh cycle is divided into 22 equal time intervals, and the position of (the center of) the moving laser beam spot on the screen at the end of each interval is shown marked with a dot. Therefore, the if the refresh rate of the display device is 30 Hz, then each dot marks a beam spot position at 1/660 second (=about 1.5 millisecond) interval. Let's assign time "0" to the starting position of the beam within this refresh cycle (i.e. the top-most dot position in FIG. 36C and in FIG. 36D). Then FIG. 37 and FIG. 38 show, in a graph form, as a function of time, the corresponding positions of the "variables"—longitudinal position of the projection screen, X and Y position of the scanned beam spot, beam spot size and laser beam power. Here the time is indicated on the horizontal axis, with marks every 1/660 second; one whole refresh cycle is shown, including the blanked out part of the cycle ("return stroke"). The vertical axis shows only schematically approximate relative values of the variables.

In FIG. 36C the painting speed is constant during the scan cycle, therefore the dots are spaced uniformly along the painted line. In the corresponding FIG. 37 we can see that there are sharp turns to the graphs, indicating very high accelerations present in the actuated devices. This translates into high forces and large high frequency components in those devices, which is not desirable. Also, the laser beam power is much higher at the beginning of the cycle then what is needed for the rest of the cycle. To avoid those drawbacks, it is generally preferable to have non-uniform painting speed during a scan cycle. FIG. 36D and corresponding FIG. 38 show benefit of such an approach.

In FIG. 36D the painting speed is variable during the scan cycle, and the dots are spaced non-uniformly along the painted line. The "painting speed" is much lower where the line needs to be thick—at the beginning of the cycle, thus brightening the line without the need for extra beam power. The painting speed then is decreased near any sharp turn, avoiding the need for high accelerations of the scanners and screen actuator. Such momentary slowing of the "painting speed" does not result in local brightening of the line because this is compensated by rapidly decreasing the laser beam's power in concert with such slowing. Rapidly decreasing the laser beam's power is easy to do, because modulation of laser beam can be very rapid. In addition, the blanked return time can be decreased, lessening the flicker. FIG. 38 shows, in a graph form, the corresponding movements of the "variables". Now we can see that there are no sharp turns to the graphs, indicating lesser accelerations present in the actuated devices and smaller high frequency components in the signals needed to steer those devices, which is desirable.

Note that, in the example shown above, the projection screen needed to substantially stop its movement at some middle position within its range of movement in order to achieve the desired shape of the virtual cable. Indeed, an ability to achieve this momentary cessation of movement of the screen within a refresh cycle and at any chosen screen position is a major advantage of our display apparatus over the prior art.

The virtual cable overall brightness is adjusted according to ambient light level, measured generally in a broad area substantially corresponding to an upper field of view of the apparatus. The virtual cable brightness along its length is adjusted according to distance, to aid the perception of three-dimensional nature of the virtual cable. However, it may be desirable to modify the above paradigm, using data from an on-board camera positioned as near the observer as practicable, to insure that the virtual cable is both visible against the brightest parts of encountered background, and, at the same time, is not overly bright where it is visible against the darker parts of encountered background. In this case, it is recommended that, when the encountered background of the virtual cable rapidly changes luminance, as when, for example, the virtual cable crosses from being shown against the blue sky to being shown against the forest canopy, then the virtual cable changes its luminosity in a gradual fashion along its extend. In the above example of sky and forest canopy, the virtual cable should change from bright to dimmer not at one point, but gradually, e.g. within a half degree of angle along its visible-definition-length. This way it is not necessary to know exact position of the observer's eyes when calculating where to make this transition, since small registration errors of the virtual cable luminance transition with background luminance transition will not be very noticeable.

6.9. Alternative Embodiments of the Projection Screen

Figure 39:
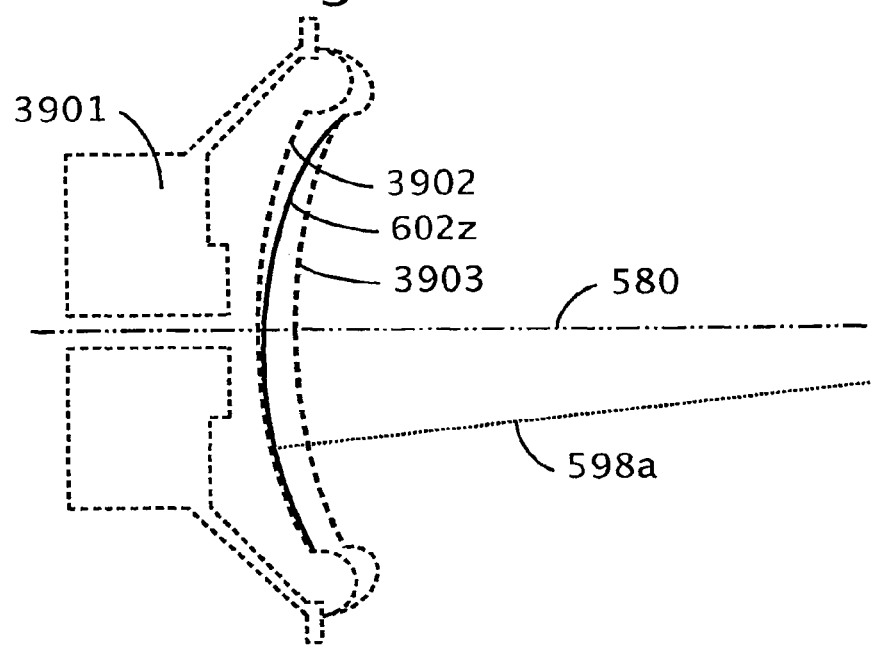
FIG. 39 presents, in schematic, an alternative simplified embodiment of the display device's projection screen, such screen being stationary, i.e. not actuated as the projection screen in FIG. 30A.

The illustrative embodiment of the projection screen 602 was described in detail before in this document, notably in the section "Display Device Optics". The screen actuator, which is an tightly integrated with said screen, was described in detail before in this document, notably in the section "Screen Actuator". In this section we will describe alternative embodiments of the projection screen (and its actuator, where it is relevant to do so). FIG. 39 shows a schematic of an alternative and simpler embodiment of the projection screen, designated 602z. Unlike the embodiment shown in FIGS. 30A-30B, this embodiment does not use an actuator. The two types of projection screens will thus be referred to herein as an actuator-based screen and a non-actuator-based screen.

For the purpose of explaining the shape of and positioning of screen 602z, it is shown compared to two positions of the actuator-based screen, designated 3902 and 3903, shown with a dashed line. The actuator apparatus that is used in the actuator-based screen is also shown with dashed line and is designated 3901. Screen position 3902 is the position of the actuator-based screen corresponding to (i.e. is optically, through viewing optics, conjugated with) "infinity" (i.e. the maximum linear-definition-distance from the driver at which the display device is designed to project the virtual cable. e.g. the infinite distance, or alternatively, e.g. about 250 meters). Screen position 3903 is the position of the actuator-based screen 602 corresponding to closest displayable linear-definition-distance to the virtual cable (e.g. about 12.5 meters).

The solid line 580 is the optical axis of the display unit viewing optics. The dash-dot line 598a corresponds to an approximate horizontal line of sight 598 of the driver. The extend of the screen 602z which is drawn above the line 598a corresponds to the larger part of the field of view of the apparatus which extends above the horizon.

At this moment lets refer back to FIG. 11B and its description, which discusses our custom coordinate system. The custom coordinates for a given point A linear-definition-laying on the virtual cable would be $(x_p, y_p, r)$ where $x_p$ is the visible-definition-distance from straight ahead point toward the right to the bearing of the point A, and $y_p$ is the visible-definition-distance from straight ahead point upward to the elevation of the point A.

If we would look at a statistically large sample of randomly selected instances of displayed virtual cable in typical driving situations, we would find that in the set of all points which are laying on (any of) those virtual cables, the horizontal coordinates $x_p$, elevations $y_p$ and distances r are statistically correlated, with especially strong correlation between elevations $y_p$ and distances r. For example, it is intuitively obvious that if a direction toward some point $A_1$ laying on some typical virtual cable is toward the uppermost edge of he field of view of the display device (i.e. $A_1$ has large (about maximum) $y_p$, and has small $x_p$), the point X is most likely located close to 12.5 meters away (i.e. has r=about 500 inches=12.5 meters), but, on other hand, if the point $A_2$ lies close to horizon on some typical virtual cable (i.e. $A_1$ has small $y_p$), then it is most likely very linear-definition-far away (i.e. has very large r).

In the actuator-based-screen, when the virtual image of a laser beam spot projected onto the screen 602 is located at the distance r, the screen must be located at some corresponding position, which we will designate as having "z" axial coordinate. Analogously, the $x_p$ and $y_p$ coordinates of a virtual image point correspond to some x and y coordinates of that point optical conjugate on the screen surface. Therefore there exists 1 to 1 function transforming outside space coordinates $(x_p, y_p, r)$ of a given point laying in the outside space into ("its") screen coordinates (x, y, z). For a large sample of points taken from a large sample of instances of typical virtual cables, the screen coordinates (x, y, z) of those points are statistically correlated. Because of the way the coordinates (x, y, z) are correlated, we should be able to find a most likely z for any given pair of partial coordinates (x, y), using well-known mathematical tools.

Then we can find a smooth surface bent and tilted to cross near most of such (x, y, z) points, using well known surface-fitting mathematical techniques. We then may substitute a moving screen 602 with a stationary screen 602z having a shape and positioned substantially as the above found surface. Note in FIG. 39 that below the line 598a the new screen 602z conforms to the actuator-based screen in its "infinity" position, and then gently bends toward the relay lens as we follow it upward toward places corresponding to high elevation of the virtual image, resulting in a screen, which is overall, tilted relative to the optical axis of the viewing apparatus.

When a laser beam spot is painted on such a screen 602z, the resulting virtual cable is painted on an unchanging three-dimensional surface. This surface, when linear-definition-near the car, is approximately linear-definition-flat and linear-definition-horizontal, and is elevated preferably about 5 meters above the road at the near point (which is preferably about 12.5 meters linear-definition-away from the driver).

The benefit of this simplified embodiment of the projection screen is that no screen actuator is needed, nor associated controller, enclosure, cooling system etc.; also the software executed in computer 152 can be substantially simplified. A drawback is that the three-dimensional presentation of the virtual cable is only approximate at best. In some situations, like for example when the virtual cable visible-definition-crosses itself (see point 408 in FIG. 4), the virtual cable can not be displayed with all spatial cues presented, since near the crossing point both crossing segments of the virtual cable will be displayed at the same distance.

However, this simplified embodiment of the projection screen may work acceptably for many people: if car-motion-induced optic flow of the virtual cable and virtual cable thinning and dimming are presented accurately, stereopsis can be inaccurate yet still contribute to a good three-dimensional presentation. That will work well because the stereopsis is most sensitive at close distances where the relative error of substituting the moveable screen 602 with fixed, tilted screen 602z is likely to be relatively small, and is relatively insensitive at the far distance where the gross relative errors are more likely to occur.

Figure 40:
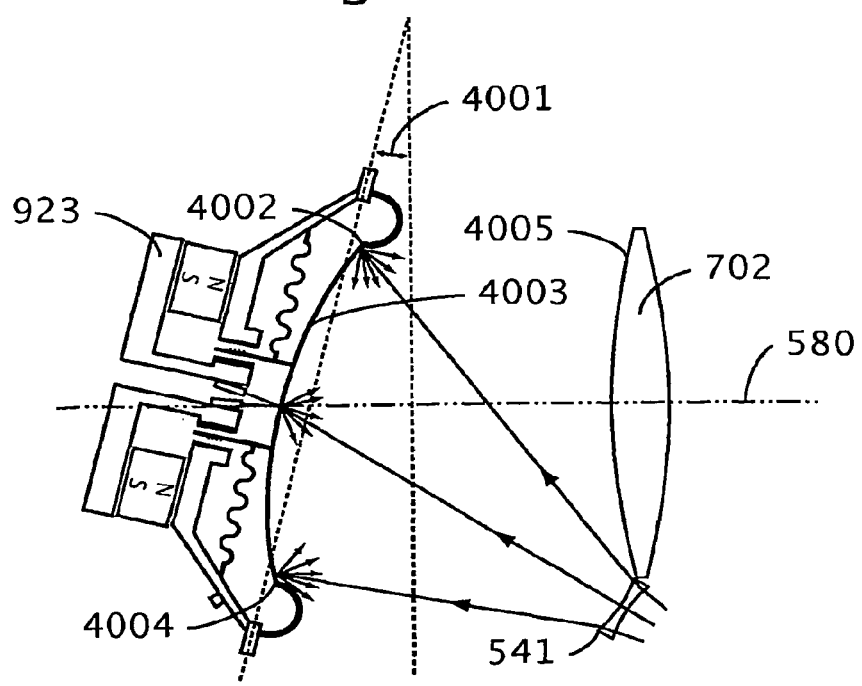
FIG. 40 presents, in schematic, a cross-section view of yet another alternative embodiment of the display device's projection screen, where a voice coil screen actuator assembly 923 is tilted relative to optical axis at an angle 4001, shown exaggerated.

FIG. 40 shows a schematic of yet another alternative embodiment of the display device's projection screen. This projection screen uses the same voice coil screen actuator assembly with concave dome screen as was described earlier and shown in FIGS. 30A, 30B and 30C. But here the assembly is tilted relative to optical axis, instead of being positioned as it was shown in FIG. 29, i.e. with its axis of symmetry being coincident with optical axis 580 of the viewing optics.

This slight tilt, shown schematically as an angle 4001, causes the point 4002 of the screen 4003 corresponding to uppermost point of the apparatus field of view to be the closest to the display unit relay lens group 702 (of which the first lens surface, the one closest to the screen, is marked as 4005), and it is closer to lens surface 4005 than it would be if the tilt would not be present. The tilt will also cause the point 4004 of the screen corresponding to lowest point of the apparatus field of view to be moved the most away from the lens surface 4005. The purpose of this tilt is to lessen the amplitude of the screen periodic movements in the most typical driving situations (in particular, when driving the leveled vehicle on the flat terrain). This is accomplished because, in typical situation, during the virtual cable painting cycle, the screen needs to be the closest to the lens surface 4005 when the laser beam strikes near the point 4002, and the furthest when the beam strikes the portion of the screen corresponding to points near the horizon and below, which are typically near the point 4004.

The position and tilt of the screen actuator assembly should be chosen such that, on one hand, the average power needed to drive the actuator is as low as possible, but on other hand, such that the actuator, using movements within its allowed range of motion, can, for any given point on the screen 4003, cause that point to be focused by the viewing optics at any chosen distance ranging from some reasonable close distance (for this point) all the way to the infinity. What is reasonably close distance may depend on which direction in space the given point corresponds to; for example, a point near the top of the field of view need to be focusable to closer distance (e.g. 12 meters) that a point in a direction below the horizon which, in practical driving scenarios, does not need to be shown this close.

The exact shape of the dome of the screen 4003 may be re-optimized (as compared to the shape optimal for the non-tilted position, which was mostly determined by the optical field curvature of the viewing optics, as previously described herein) for this new position. The shape of the screen 4003 is still a figure of rotation, for ease of manufacture of the screen actuator assembly. The exact calculation as to the optimal shape, position and tilt of the screen actuator assembly can easily be carried out by those skilled in the art based on assumptions on what are likely driving scenarios, on particular optics used and on specs of the screen actuator.

The tilting of the screen may have an additional benefit: the geometry of the beam projection, as shown in FIG. 40, is improved (as compared to the same shaped non-tilted screen), because the impinging beam, on average, strikes the screen more perpendicularly to its surface.

Figure 41:
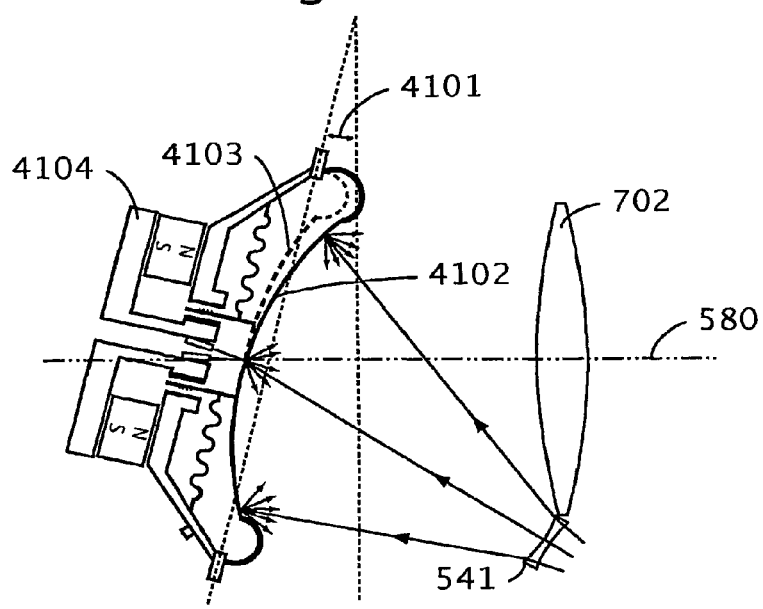
FIG. 41 presents, in schematic, a cross-section view of yet another alternative embodiment of the display device's projection screen, where a voice coil actuator assembly 4104, similar to 923, contains a screen surface 4102 that is not rotationally symmetrical.

FIG. 41 shows a schematic of yet another alternative embodiment of the display device's projection screen. It is similar to the projection screen shown in FIG. 40 in that it uses a voice coil screen actuator assembly 4104 which, generally, is tilted relative to optical axis 580 (the tilt is shown as an angle 4101, exaggerated). However, in this case the screen 4102 itself has different shape, which is no longer a figure of rotation. It makes manufacture of the screen actuator assembly 4104 more demanding, but it has benefit of being even more optimized (as compared to rotationally symmetrical tilted screen from FIG. 40, which illustratively would be in position 4103 shown with a dashed line) in regard to minimizing the power needed to drive the screen actuator under typical driving condition. Since the criteria for "typical driving conditions" are somewhat arbitrary, there are many possible "good" shapes the designer can choose from for the screen in this embodiment. An example of a good shape of the screen would be the shape described previously for a non-moving screen 602z shown in FIG. 39.

A screen with just such a shape can be fitted into the voice coil screen actuator assembly which is substantially the same as the assembly 923 described before and shown in FIGS. 30A, 30B, 30C and 40, except for minor changes in the coil formers cutout profile where the former is attached to the screen and in the shape of the surround part of the screen suspension. Because the screen is not symmetrical, if the screen's edge (i.e. circumference) is substantially aligned with a plane perpendicular to the coil axis (i.e. so the basket of the actuator may be left unaltered), then the screen will not, in general, be substantially perpendicular to the coil axis near that axis. And vice versa: if the screen is substantially perpendicular to the coil axis near the coil axis, then the screen's edge will not be generally aligned with a non-altered basket. The skilled designer of the actuator can find the proper compromise how to position the screen within actuator, to preserve good actuator's performance and at the same time avoid drawbacks of having excessively non-symmetrical basket and the surround.

Such an actuator with such fitted screen of the shape described previously for a non-moving screen 602z shown in FIG. 39 may be slightly tilted (i.e. coil axis tilted relative to optical axis) in order to position the screen, when the actuator is not powered, exactly as the corresponding non-moving screen described previously and shown in FIG. 39 would be positioned. It is obvious from the previous description of the non-moving screen shown in FIG. 39 that such a screen, in typical driving situations, needs to move only a little, much less than a symmetrical non-tilted screen would have to, in order to properly draw the virtual cable in three-dimensional space. However, the designer still should, as was the case in the embodiment shown in FIG. 40, ensure that the actuator, using movements within its allowed range of motion, can, for any given point on such a screen, cause that point to be focused by the viewing optics at any chosen distance ranging from some reasonable close distance (for this point) all the way to the infinity.

Also, just as it was the case with the embodiment shown in FIG. 40, the geometry of the beam projection is improved (as compared to the symmetrical non-tilted screen), again because the impinging beam, on average, strikes the screen more perpendicularly to its surface. Yet another advantage of this embodiment is that in an event of screen's actuator failure, the display apparatus can still show approximately proper positioning of the virtual cable in the three-dimensional space. in many typical driving situations.

For the reasons just presented and/or depending on economic factors, it may be preferred to use the projection screen shown in FIG. 40 rather than that shown in FIG. 41.

Figure 42A:
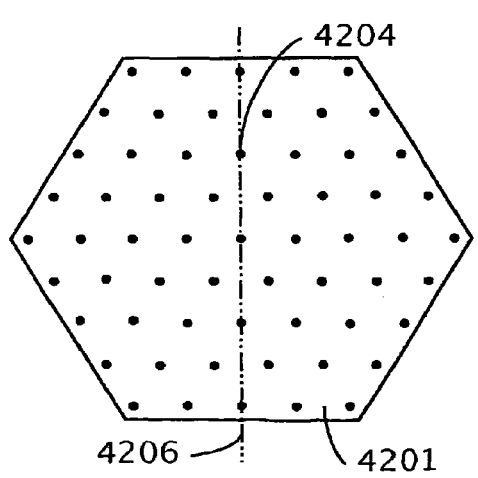
FIG. 42A presents, in schematic, yet another alternative embodiment of the display device's projection screen, same as shown in FIG. 42B, showing position on screen 4201 of plurality of linear actuators 4203 for shifting, tilting and reshaping the screen surface 4201.
Figure 42B:
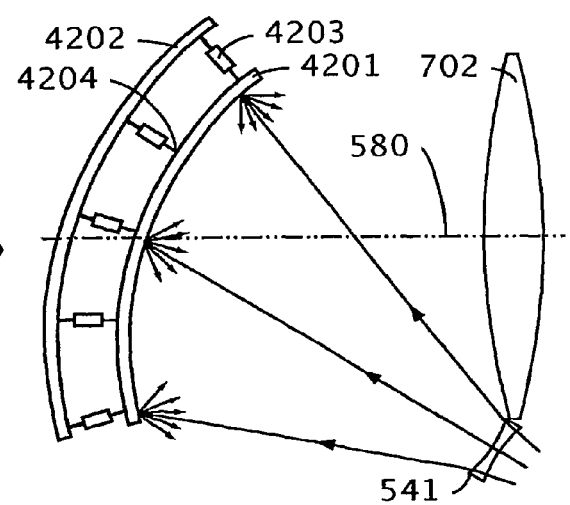
FIG. 42B presents, in schematic, a cross-section (along the dissecting plane 4206) view of the embodiment of the display device's projection screen shown in FIG. 42A, with a plurality of linear actuators 4203 for shifting, tilting and reshaping the screen surface 4201.

FIGS. 42A and 42B show "front" (i.e. from the direction of the lens 702) and side view schematics of yet another alternative embodiment of the display device's projection screen. In particular, the projection screen 4201 is placed on a surface of a thick elastic substrate (e.g. rubber). The substrate rests on a plurality of linear actuators 4203, which themselves are attached to the anchor plate 4202. The actuators are arranged to create a dense hexagonal pattern of adjustment points 4204 across the substantially whole screen surface. Because of this hexagonal arrangement, the screen is not substantially round, but hexagonal and slightly oversized; this way it can be supported by the actuators all the way to its margins. The pattern may alternatively be different than hexagonal, e.g. may be a square grid. Those linear actuators are so arranged for shifting, tilting and reshaping the screen surface. This arrangement is designed to keep tilting and reshaping the screen so the displayed virtual cable can conform (at least partially) to the changing topography of the terrain ahead of the moving vehicle and can appear stable despite changes in the vehicle orientation relative to the terrain (e.g. a wobble due to bumps on the road). The time scale of the change of the screen shape and position is generally greater than the scan period of the laser scanner painting the line onto the screen (i.e. the movements of the actuators are generally slower then movements of the screen in the preferred embodiment previously described). This embodiment is not designed to move the whole screen in a substantially periodic motion synchronized with painting of the virtual cable by the scanner's laser beam, as was described earlier herein.

The shape of this screen at any given moment is related to the topography of the terrain over which the virtual cable is being displayed. The signals to the controller of actuators 4203 are generated in computer 152. The computer, knowing the vehicle's position and orientation in three-dimensional space, calculates first the visible-definition-shape of the virtual cable and linear-definition-distance to each point along the virtual cable to be displayed. Those linear-definition-distances are then used to calculate needed displacements (i.e. deformation) of the screen surface from its "neutral" shape and position (i.e. the shape and position assumed by the screen when all the actuators are fully contracted). This deformation is calculated for the portion of the screen which lies along the laser beam spot trajectory when the virtual cable will be painted on the screen by the laser projector. Computer 152 then calculates which actuators 4203 will be close to the such laser beam spot trajectory, and then it calculates how to adjust those actuators so the resulting shape of the portion of the screen traversed by the laser beam spot will be a good fit to the needed displacements of the screen. If a sufficient number of actuators is used then an acceptable fit can be obtained. The displacements of the remaining actuators are then calculated to effect such a screen surface which avoids undue stresses in the screen substrate. Those calculations, and other aspects of controlling such system, can be programmed by those skilled in the art. The use of plurality of linear actuators to accurately deform an elastic surface is known in the art; in many installations worldwide, there are flexible mirrors in use for adaptive optics to counter atmospheric turbulence effects in astronomical telescopes.

It must be noted here that in some driving situations a perfectly shown virtual cable in three-dimensional space would appear to be "crossing itself", the sections involved being at two different distances from the driver, such as at the "point" (which also can be thought of as a linear-definition-direction) 408 in FIG. 4. The corresponding point on the screen would need to have different displacement when each of the two crossing sections of the virtual cable are painted by the laser beam spot. If the employed actuators are fast enough, this may be accomplished by rapidly adjusting during each single scan period those (and preferably only those) actuators which are relatively nearby under such corresponding point on the screen. However, if the actuators employed are too slow for this, another words, if the actuators employed are not designed to move in a periodic motion substantially synchronized with painting of the virtual cable by the scanner's laser beam, then it will be impossible to show such a scene accurately. Still, in most typical driving situations even such slower actuators may be adequate to show a virtual cable which is a good visual approximation of a properly linear-definition-positioned virtual cable.

Figure 43A:
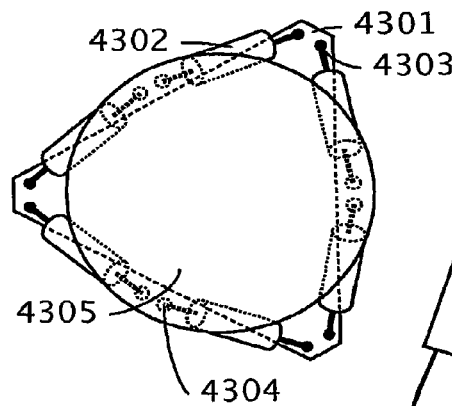
FIG. 43A presents, in schematic, yet another alternative embodiment of the display device's projection screen, same as shown in FIG. 43B, with a set of six linear actuators 4302 arranged for shifting and tilting the screen surface.
Figure 43B:
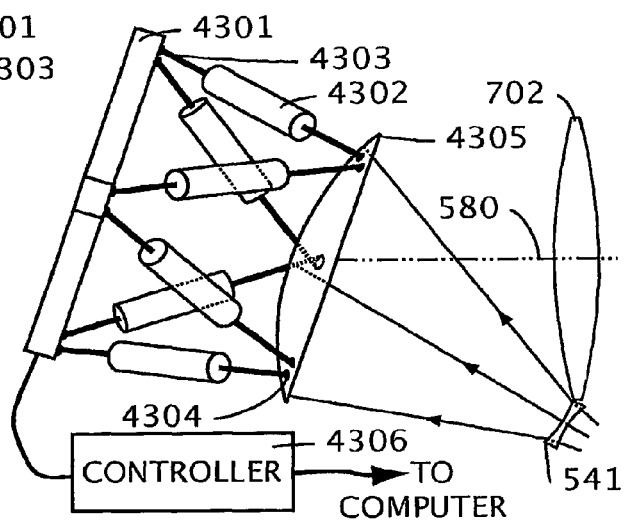
FIG. 43B presents, in schematic, the side view of the embodiment of the display device's projection screen shown in FIG. 43A, with a set of six linear actuators 4302 arranged for shifting and tilting the screen surface.

FIGS. 43A-43B show "front" (i.e. from the direction of the lens 702) and side view schematics of yet another alternative embodiment of the display device's projection screen. In particular, the projection screen 4305 is on a surface of a rigid substrate. The substrate is attached to linear actuators 4302, which themselves are attached to the anchor plate 4301, substantially as shown. At the attachment points 4303 and 4304 there are either universal joints, ball joints or some other such joints, but preferably, for simplicity, there are elastic joints. The actuators are arranged to create a "hexapod" pattern, well known to those skilled in the art. Such hexapod arrangement generally would allow limited adjustments of the whole screen surface with six degrees of freedom. We, however, need only three degrees of freedom to be used in our application: two tilts (i.e. rotations around two perpendicular axis, each parallel to the anchor plate) and the piston movement (i.e. linear movement toward and away from the anchor plate).

Preferably, for some set of positions of the actuators (which may be referred to as the "neutral" position of the hexapod), the whole screen conforms to the shape and position (relative to the viewing optics) which is the same as the shape and position described previously for a non-moving screen 602z shown in FIG. 39.

This embodiment is designed to keep tilting the screen so the displayed virtual cable can partially account for changing topography of the terrain ahead of the moving vehicle and can appear stable despite changes in the vehicle orientation relative to the terrain (e.g. a wobble due to bumps on the road). The time scale of the change of the screen position is generally greater than the scan period of the laser scanner painting the line onto the screen (i.e. the movements of the actuators are generally slower then movements of the screen in the preferred embodiment previously described). This embodiment is not designed to produce a virtual cable with an arbitrary three-dimensional path by moving the whole screen in a substantially periodic motion synchronized with painting of the virtual cable by the scanner's laser beam, as was described earlier herein. Instead, it is designed to produce a virtual cable which appears to be, in three-dimensional space, contained within some imaginary two-dimensional surface which appears substantially linear-definition-flat linear-definition-nearby and appears to be kept at all times reasonably parallel to the road at some preset distance above the road (e.g. 5 meters). If the terrain is not flat, then the imaginary two-dimensional surface may be linear-definition-tilted appropriately to appear more in agreement with the terrain over which the virtual cable is shown than a non-linear-definition-tilted (i.e. a horizontal) imaginary surface would. What such tilt would be most appropriate (i.e. most pleasing and least confusing to the driver) in a given driving situation is determined by computer 152 based on the sensor and route data using some heuristic algorithm; such an algorithm can be designed by those skilled in the art after gathering data with number of human subjects (potential drivers).

The above mentioned imaginary two-dimensional surface is an optical conjugate of the screen surface. In order to achieve the chosen linear-definition-orientation of this imaginary surface in space, and then to keep it stable despite the vehicle bouncing (i.e. changing its orientation relative to the terrain), computer 152 continuously adjusts the position of the screen relative to the anchor plate by adjusting the six actuators in the coordinated fashion, thru control signals sent to the controller 4306. The control signals are calculated for each of the six actuators 4302. The computer, knowing the vehicle's position and orientation in three-dimensional space, calculates first the linear-definition-shape of the visible part of the "perfect" virtual cable (i.e. not constrained by the limitations of this embodiment) which needs to be displayed over the route. Then the computer finds (i.e. calculates) such a position of the projection screen for which the screen's optical conjugate surface is linear-definition-positioned in three-dimensional space in such a way that a virtual cable having the same visible-definition-shape and position as the "perfect" virtual cable would but linear-definition-positioned within this surface is visually a "good" fit to such a "perfect" virtual cable. The merit function to decide if a given fit is "good" is a part of the above-mentioned heuristic algorithm. Those calculations, and other aspects of controlling such system, can be programmed by those skilled in the art.

It must be noted here that in some driving situations (such as one shown in FIG. 4), there will remain major discrepancies between appearance of above mentioned "perfect" virtual cable and a virtual cable this embodiment can produce. Still, in most typical driving situations an adequate three-dimensional presentation of the displayed virtual cable can be obtained with this embodiment.

The hexapod arrangement of the linear actuator may also be used in yet different embodiments. For example, it can be used in conjunction with the speaker-type screen actuator (e.g. the one shown in FIG. 41) to continuously keep pre-positioning, using a relatively low frequency steering signals, the entire speaker-type actuator assembly (containing the projection screen) to substantially eliminate a DC component from that actuator's signal and to further lessen amplitude of that actuator's motion.

Alternatively, it may be used together with the embodiment similar to one shown in FIGS. 42A-42B. In this case the hexapod would move the base plate, corresponding to the anchor plate 4301 in FIGS. 42A-42B, to continuously keep pre-positioning, using a relatively low frequency steering signals, the entire grid array actuator assembly (including the attached elastic screen). Again, such an arrangement can lessen the needed range of motions of each actuator in the grid, since they now need only to change the shape of the screen, and not its overall position and tilt anymore.

Figure 44:
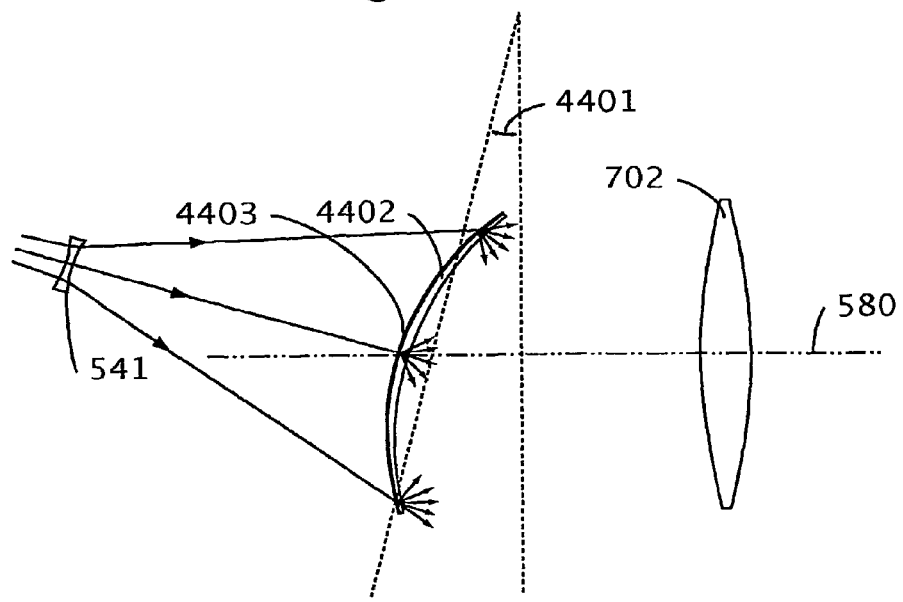
FIG. 44 presents, in schematic, a cross-section view of yet another alternative embodiment of the display device's projection screen where the diffusing screen 4402 is illuminated from the side opposite the relay lens group 702.

Alternatively, it may be used together with yet another alternative embodiments of the display device's projection screen, where a diffusing screen which is illuminated from the side opposite the relay lens group 702 as in FIG. 44. This is because the hexapod actuators leave a large central part of such screen clear (i.e. not obscured); the screen needs to be only slightly oversized to have an adequate clear diameter.

Alternatively, it may be used together with the embodiment of the volumetric image generator based on chromostereoscopy, described elsewhere herein. In this case the hexapod would continuously move, using a relatively low frequency steering signals, the projection screen to keep the needed range of chromatic shifts of the laser beam spot image as low as possible. This can substantially lessen the required wavelength tuning range of the laser source, and therefore its cost. Again, in such an arrangement the chromatic shifts need only to account for the three-dimensional shape of the displayed virtual cable, and not virtual cable's overall linear-definition-position and linear-definition-tilt anymore.

FIG. 44 shows a schematic of another alternative embodiment of the display device's projection screen. The screen here is not a white reflective (lambertian) surface any more, instead it is a transmissive diffusing screen, to be illuminated from the side opposite the relay lens group 702.

Preferably, the projection screen is on a surface of a rigid substrate 4402, made from an appropriate optical material (e.g. clear polycarbonate). The substrate may be curved. The curvature may be non-uniform across its surface, e.g. it may conform to the shape substantially as the shape of the screen 602z described previously and shown in FIG. 39. The screen advantageously may be tilted relative to optical axis 580 (the tilt is shown as an angle 4401, exaggerated). The substrate may be of varying thickness, to act as the lens to direct the light mostly toward the entrance pupil of the viewing optics. One side 4403 of the projection screen has diffusing characteristics, and preferably is a holographic diffuser with well controlled diffusion characteristics, to substantially uniformly fill the entrance pupil of the viewing optics with the diffused light while preventing directing that light outside that pupil.

Optionally, such screen can be actuated, e.g. using a hexapod similar to one shown in FIGS. 43A-43B and relatively low frequency steering signals, as mentioned when discussing the hexapod arrangements.

Optionally and preferably, such screen can be (in addition) actuated with high frequency motion substantially tangent to its surface to lessen the apparent speckling of the laser generated image; such a method of laser speckle reduction is well known to those skilled in the art.

The rear projection afforded by such embodiment has an advantage that the space between the screen and the first optical surface of the lens group 702 can be greatly reduced, since that space needs no longer to clear the laser beam being projected onto the screen, as is the case in e.g. FIG. 41.

This allows for greater design freedom for the lens group 702. A relatively thicker multi element lens may be preferable for good correction at different wavelengths in the chromostereoscopic embodiment of the display device mentioned elsewhere herein.

6.10. Alternative Embodiments of Laser Source

Figure 45:
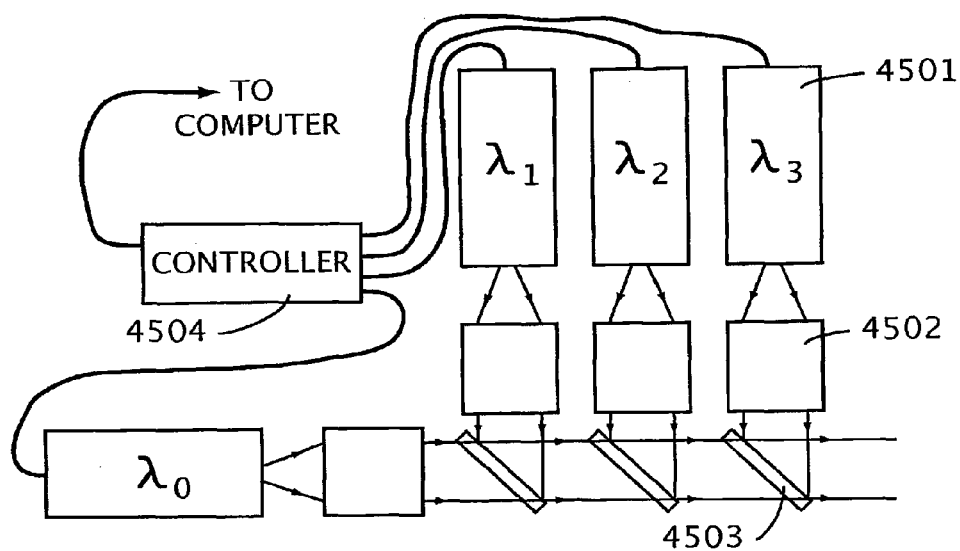
FIG. 45 presents, in schematic, an alternative embodiment of the display device's laser source, with a set of tunable lasers 4501 arranged to produce a single beam having an extended tuning range.

FIG. 45 shows a schematic of an alternative embodiment of the display device's laser source. It is meant to be used in place of a single laser diode in the laser scanners shown in FIGS. 23, 24, 25, 26 and 27. This embodiment is most useful for use with a chromostereoscopic embodiment of the display device mentioned elsewhere herein. Such an chromostereoscopic embodiment of the display device requires a laser source which wavelength can be changed ("tuned") in a controlled fashion during each scan (refresh) period. To achieve a large range of achievable linear-definition-distances of virtual cable in any given direction (i.e. for any given visible-definition-position) using the viewing optics of reasonable complexity, the quite large tuning range of the laser source is preferred, e.g. 660 nm to 630 nm. To achieve such a range with the rapid tunability required, the number of tunable laser diodes 4501, each one having its own beam forming optics 4502, can be combined as shown. Each laser has different tuning range, and together those ranges cover the desired tuning range of the laser source. The beams from each consecutive laser is combined with the beam from the prior laser in the train using a dichroic mirror 4503, tuned (at 50% reflectance) to the wavelength lambda$_n$ which is at the end of the prior laser's range and at the beginning of the given laser's range. The light leaked or reflected from each mirror in the "wrong" direction is absorbed by a beam dump (not shown).

The lasers are meant to be used one at the time (possibly except when switching from one laser to the next) to produce light of the single wavelength at any given moment. The tuning and switching of the lasers is coordinated by the controller 4504.

Figure 46:
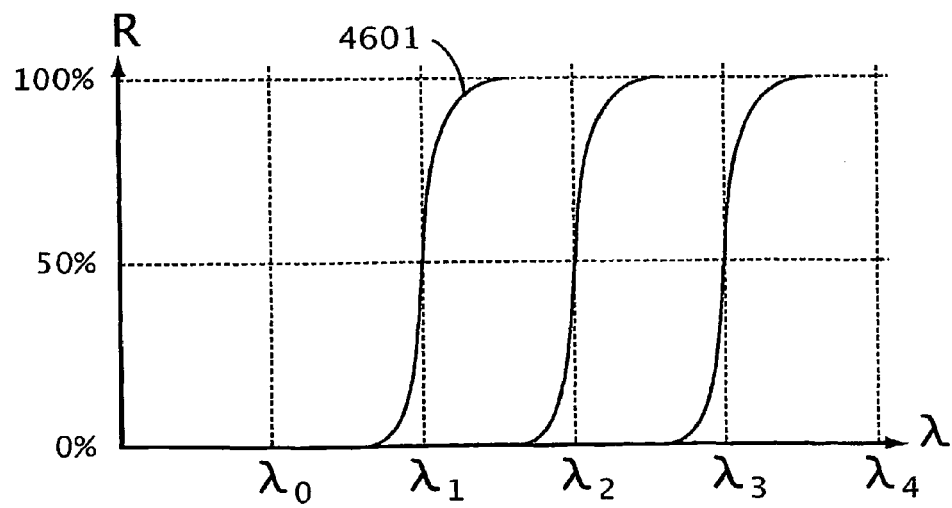
FIG. 46 presents, in schematic, set of curves 4601 showing reflectance, as a function of light's wavelength, of dichroic mirrors used in the arrangement shown in FIG. 45.

FIG. 46 shows, in schematic, the set of reflectance curves 4601, i.e. reflectance as a function of light's wavelength, for the dichroic mirrors used in the arrangement shown in FIG. 45. Note that there is one less mirrors than number of lasers, and each mirror needs to change from transmission to reflectance only once in its working wavelength range, and for each mirror its working wavelength range needs to encompass all "prior" lasers' wavelengths for its transmission but only the single "next" laser range for reflection ("prior" and "next" in the sense of left to right direction in FIG. 45)

Figure 47:
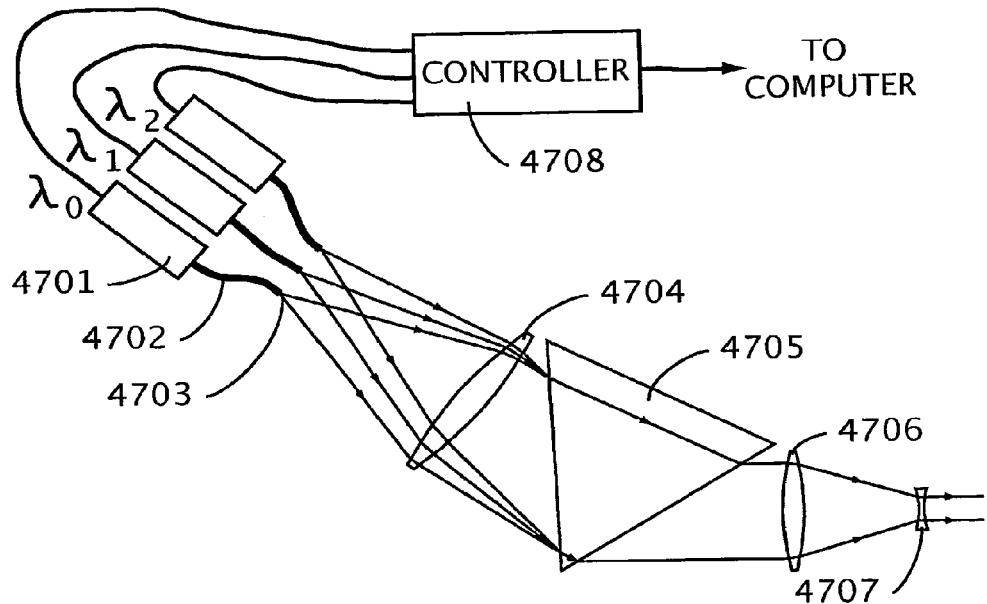
FIG. 47 presents, in schematic, yet another alternative embodiment of the display device's laser source, with a set of lasers 4701, each emitting light of different wavelength, arranged to produce a single beam.

FIG. 47 shows, in schematic, yet another alternative embodiment of the display device's laser source, with a set of lasers, each emitting light of different wavelength, arranged to produce a single beam. It is meant to be used in place of a single laser diode in the laser scanners shown in FIGS. 23, 24, 25, 26 and 27. In this embodiment, the lasers 4701 are not tunable, and each one emits light having different wavelength. In this schematic, each laser output the light into a fiber 4702, the other end 4703 of such fiber is positioned where the a light of the wavelength equal to given laser's wavelength would be focused by the lens 4704 if the depicted apparatus were optically "reversed", i.e. if the white light beam would be shone into the apparatus from the direction of the output beam. Such white light would be re-collimated by the lenses 4707 and 4706, then dispersed by the dispersion element 4705, which is, in the depicted embodiment, a prism, and then focused substantially into different points by the lens 4704. Alternatively, a dispersing element different then a prism could also be used, notably a diffraction grating. From this it is obvious than for each wavelength of the laser light, a position exists that when the emitting end of the fiber is placed in that position, all the light from all the fibers will be put into one light beam. In essence, this apparatus works similarly to multiplexer/demultiplexer. Optical multiplexer/demultiplexer devices are known in prior art and used in the field of telecommunications.

Alternatively, the laser diode array has a large number of individual lasers (e.g. 100 or more) and their emitting apertures are directly positioned where the emitting ends of fibers would be in the pictured and above described embodiment, thus dispensing with the fibers altogether.

When such a laser source is used with a chromostereoscopic embodiment of the display device mentioned elsewhere herein, the individual lasers are selected by the controller 4708 and used substantially one at the time (possibly except when switching from one laser to the next) to produce light of the single wavelength at any given moment during each scan cycle. Of course, since the lasers are not tunable, there is no continuous change of projected light wavelength; however, if individual lasers are continuously selected out of large enough number of different wavelength lasers, the perceived image of the virtual cable may appear substantially contiguous and smoothly spanning the desired three-dimensional extent.

Figure 48:
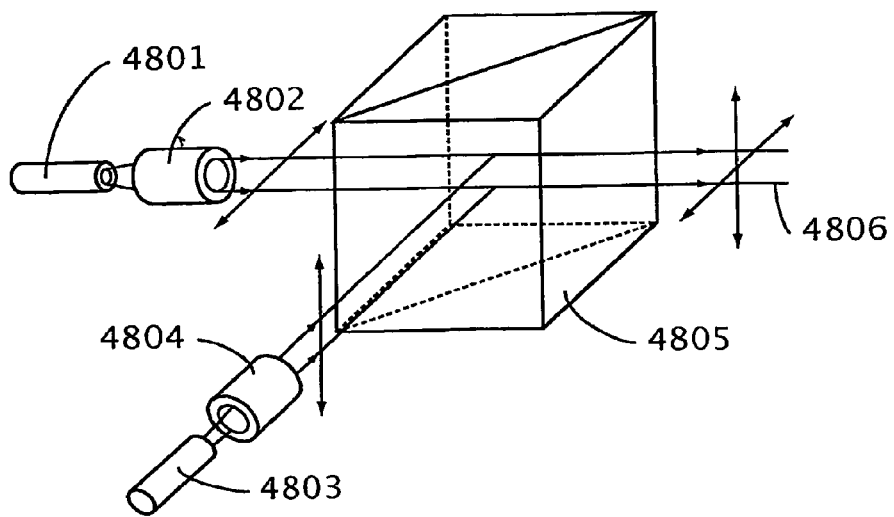
FIG. 48 presents, in schematic, yet another alternative embodiment of the display device's laser source, with a pair of lasers 4801 and 4803, each emitting linearly polarized light, arranged to produce a single beam.

FIG. 48 shows a schematic of yet another alternative embodiment of the display device's laser source, with a pair of lasers, each emitting linearly polarized light, arranged to produce a single beam. It is meant to be used in place of a single laser diode in the laser scanners shown in FIGS. 23, 24, 25, 26 and 27, together with any embodiment of the display device mentioned herein which has an opaque (lambertian reflective) projection screen.

The polarizing beam splitter cube 4805, in an arrangement well known in prior art, is working here as beam combiner, allowing two collimated beams from two preferably substantially identical linearly polarized lasers 4801 (with beam forming optics 4802) and 4803 (with beam forming optics 4804) to be combined into a "single" beam 4806 with twice the power of each single beam. Both lasers, in the preferred embodiment, emit the light having the same wavelength, well matched to each other to avoid chromatic aberration in the viewing optics.

Since the above mentioned opaque projection screen has lambertian diffusing characteristics and therefore typically scrambles (i.e. does not preserve) polarization of the reflected light, the light reaching the observer does not change in any important way when it is produced by two lasers in such arrangement instead of one, except it is doubled in power.

This arrangement may be less costly than employing a single laser with twice the power. Additional benefit of this arrangement may be slightly less noticeable speckling in the laser spot image.

6.10. Alternative Embodiments of Laser Projectors

Figure 49:
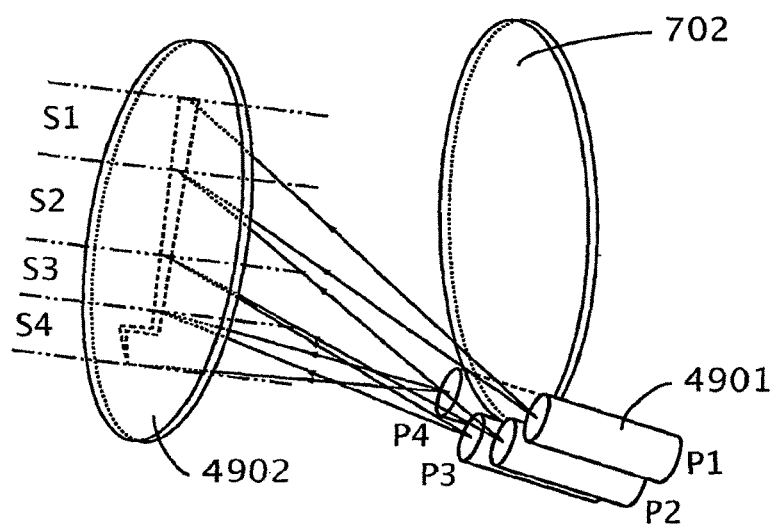
FIG. 49 presents, in schematic, yet another alternative embodiment of the display device, with plurality of laser projectors 4901, each painting different portion of the virtual cable.

FIG. 49 shows a schematic of yet another alternative embodiment of the display device, with a plurality of laser projectors, each painting different portion of the virtual cable. This alternative embodiment of the display device still employs a single screen 4902, but employs a plurality of laser projectors 4901 (each one P$_n$ comprising a separate laser source, a separate scanner and separate beam forming optics) to paint the image of virtual cable onto a single projection screen. In this case each projector P$_n$ paints only the portion (e.g. a segment S$_n$ of the image of virtual cable onto the projection screen. The segments are painted in such a way that their corresponding ends overlap to form seamless contiguous image.

If the projection screen used is a stationary screen shown in FIG. 39, or is a slowly actuated screen shown in FIGS. 42A and 42B or FIGS. 43A and 43B, then the advantage of using a plurality of laser projectors, each painting different portion of the virtual cable, is that the average available total laser power is increased, since all the lasers can be working concurrently. Another advantage of using a plurality of laser projectors in those embodiments, each projector painting different portion of the virtual cable, is that the bandwidth (and thus cost) of each single beam scanner can be decreased, since in a given refresh cycle each single beam scanner is painting less complex image. Conversely, the refresh rate may be increased.

The advantages of using multiple projectors are less clear if the screen used is a rapidly actuated screen as e.g. shown in FIG. 41. In this embodiment, preferably, each scanner should be able to paint each portion of the virtual cable in either one of the two possible directions. In those complex driving situations where a virtual cable is alternately linear-definition-receding and linear-definition-drawing-near along its length, being able to paint different portions of the virtual cable each in either direction may enable the painting of the entire virtual cable using less movements of the screen. For example an U-turn virtual cable could be painted this way using only a receding motion of the screen. The control software would need to be able to "intelligently" segment the virtual cable, for this reduction of screen movements to be possible.

A plurality of separate laser projectors can be used to greater advantage in the volumetric image generator based on chromostereoscopy with continuously tunable lasers. In such an embodiment the need for combining the individual laser beams using dichroic mirrors, as in FIG. 45, may be eliminated if each tunable laser has its separate projector. In such an embodiment all those projectors which can be used to paint a given particular virtual cable can be painting their respective segments concurrently, which may be utilized to achieve faster refresh rate and brighter display.

The disadvantage of using a plurality of laser projectors, each painting different portion of the virtual cable, is the need to align the ends of individual segments spatially and, if using rapidly moving screen within speaker-type screen actuator, temporally. The proper alignment could be facilitated by using a camera (not shown) "watching" the screen and software to interpret the camera image looking for poor registration of segments. This issue, and the before mentioned "intelligent" virtual cable sectioning task, adds to the complexity of the control software.

6.11. Alternative Volumetric Image Generator

We have described, as the illustrative embodiment, a volumetric image generator consisting of an oscillating screen, actuated by a speaker-like device, and a laser scanner capable of painting a desired line onto that vibrating screen.

The volumetric image generator needed to implement the virtual cable could, however, be built using a different principle, chromostereoscopy—a technique for converting color into stereoscopic depth. In such a "chromostereoscopic" embodiment of the display device, the screen is fixed in position, but the magnifying optics employed to display the virtual cable have a very high level of longitudinal (i.e. axial) chromatic aberration in the red part of the spectrum, while the laser used to generate the virtual cable image is agile (rapidly) tunable in that part of the spectrum. In such an embodiment we can set the distance to a given point on the virtual cable by tuning the laser to an appropriate wavelength instead of positioning the screen. Therefore by slightly changing the color of the laser light while painting the line during a refresh cycle we can display the virtual image of such line at the desired varying distance.

The needed very large longitudinal chromatic aberration can be achieved by combining lens elements made of different optical materials, in analogous but opposite way to the well known way a reduction of such chromatic aberration is achieved (in well known "achromatic" optical devices). Those skilled in the art, when using an appropriate optical design software, would be able to devise an optical system exhibiting appropriately exaggerated chromatic aberration by combining different optical materials. Other means he can use to achieve the exaggerated chromatic aberration may include using binary optics (i.e. employing one or more optical surfaces containing diffractive lenses) and/or using Mangin mirrors (a lens-mirror hybrids) in the optical system; such methods can also be combined.

The laser used in such an embodiment would need to be rapidly tunable (i.e. able to be tuned through its range within one refresh cycle) in a quite wide range of wavelengths, for example from 630 to 650 nanometers. There are well known solutions to provide agile tunability to a semiconductor diode laser, using an external tunable cavity. One is using a diffraction grating in the Littrow configuration, with piezo-electric actuators to change rapidly the geometry of the external cavity.

Several such lasers, as needed, can be combined using an optical multiplexer to produce a single beam tunable to a wide range of wavelengths.

In such embodiment of the display device, since there is no need to have any actuator behind the screen (because the screen is not actuated), the screen can be a transmissive diffusion screen illuminated from behind, instead of a white screen illuminated from the front (i.e. from the side of the viewing optics) as was the case in our previously described embodiment. This allows for some elements of the viewing optics to be located very close to the screen, giving more options to the optic designer.

The combined use of rapidly wavelength tunable laser source in a scanning display together with viewing optics having deliberately large longitudinal chromatic aberration, to produce volumetric images, improves on prior art volumetric displays. Such an arrangement allows for more complex images to be displayed than the images the prior art volumetric displays (e.g. swept-volume type displays) generally can produce (assuming that both are using beam deflectors having comparable bandwidth). Additionally, the substitution of a moving projection screen with a stationary projection screen improves reliability of the display and may have other benefits, depending on application.

Note that the hereby described alternative volumetric image generator based on chromostereoscopy principle can be adopted by those skilled in the art for building volumetric displays practical for uses other than vehicle navigation, e.g. for use as an engineering CAD workstation or architect's workstation. For such an adaptation it would be especially advantageous if a fast scanner, e.g. acousto-optic deflector, or, alternatively, plurality of slower (e.g. mechanical) scanners, is employed within its laser projector. This is because tuning the wavelength of a some tunable laser sources can be accomplished fast enough to allow for generating images more complex than a virtual cable, e.g. wire-frame models. An adaptation of our alternative volumetric image generator for use as a workstation could advantageously retain its ability to generate very large (illustratively, full scale, building sized) images and/or its ability to superimpose such images onto real landscape using a combiner; either or both such abilities could be useful, e.g. in the practice of the art of architecture.

6.9 Notes on the Display Device

Finally, a few notes relative to the display device.

The display device described herein is, in most general sense, a volumetric image generator. The device disclosed relies on presenting another ("primary" or "source") volumetric image generator, one which can produce an image only a few millimeters thick, in front of a viewing optics having a large longitudinal magnification, large enough to stretch that source image, which is few millimeters thick, into a virtual image hundreds of meters thick. The image that such a primary volumetric image generator has to produce generally consisting of an adequately bright three-dimensional line having variable thickness and brightness along its length.

It should be noted that, in the embodiments described, the primary volumetric generator operation is based on a common general principle. This principle is that the focus of the viewing optics is continuously changed in synchrony with stroke-method painting of the virtual cable image during scan period, so the resulting magnified virtual image is in effect painted in three-dimensions. In some described embodiments of the display device this is accomplished by moving the projection screen away or toward the relay lens, in other merely by having the stationary screen being positioned in such a way that it (and thus some extended image projected onto it) crosses different focus zones of the viewing optics. In the image generator based on chromostereoscopy the focus of the viewing optics is also continuously changed in synchrony with stroke-method painting of the virtual cable image during scan period, in this case this is accomplished by continuously changing the wavelength of the light, and thus, because of the intentionally large chromatic "aberration", optics effective focus.

There can be yet different ways to change focus of the viewing optics in synchrony with painting of the virtual cable. One is to move one or more lens in the viewing optics. Another is to continuously change appropriate tilts and positions of (flat) folding mirrors within the train of the viewing optics. Another is to employ a varifocal (deformable and thus having changeable optical power) mirrors within the optical train of the viewing optics. And yet another is to use lenses made with material having changeable refractive index (fast acting electro-active lenses with continuously adjustable focal lengths are discussed in U.S. Pat. No. 6,517,203 B1 issued to Blum et al. and entitled "System, apparatus and method for correcting vision using electro-active spectacles.")

7. "Looks" of the Virtual Cable

We expect that many drivers will prefer the virtual cable to have a look evoking an easily imaginable real (i.e. material and familiar) object, at least in some respects, because then it will be more natural and effortless for the driver to mentally and subconsciously integrate a virtual cable having such a look with the outside scenery.

Here we will describe three types of virtual cable "looks", which we call "round cable", "Gaussian line" and "ribbon" virtual cable. The differences among three looks relate to how virtual cable's visible-definition-luminance varies across its width.

7.2. The Three "Looks"

This section describes three above-mentioned types of virtual cable "looks" which we refer to as "round cable", "Gaussian line" and "ribbon" virtual cable.

As noted above, the three looks relate to how does virtual cable's visible-definition-luminance varies across its width. More specifically, let's assume that the driver is in a stationary vehicle, and we present a virtual cable to the driver three times in succession, where each time virtual cable has the different above mentioned "look", but otherwise is the same: has the same total light output, follows the same path in space, and has substantially the same perceived linear-definition-thickness. Additionally, let assume that the path of the virtual cable encompasses whole range of linear-definition-distances from the observer (who is at the point 731), including as far away a distance as is the maximum the display is preset to show. Because of the perspective effect, such three presentations of the virtual cable would not differ substantially at farthest distances from the observer, where all three would show a visible-definition-thin (ideally, when virtual cable is far enough, imperceptibly thin) glowing line, progressively visible-definition-dimming with the growing linear-definition-distance. But such three presentations of the virtual cable would differ substantially on the portion of the presented virtual cable that appears close to the observer, where the visible-definition-thickness of the virtual cable is intended to be easily noticeable to the driver's eye. The presentations would differ in perceived visible-definition-brightness profiles seen across a cross section of the virtual cable in each presentation, as shown in FIG. 12A. The cross section $x_1$-$x_2$ is on the view plane in visible-definition-direction perpendicular to local visible-definition-direction of the virtual cable at that point. The brightness means a perceived additional visible-definition-luminance (i.e. visible-definition-luminance of the virtual cable light, added to the visible-definition-luminance level of the local background 208).

The top graph in FIG. 12A shows in schematic the perceived visible-definition-brightness distribution profile across the virtual cable cross-section having the shape which gives the virtual cable look evoking a glowing round cable, another words, the perceived luminance profile is reminiscent of a glowing translucent rod. The visible-definition-brightness level is greatest along the virtual cable's apparent centerline 958 and drops smoothly and only moderately toward the intended edges 960 and 962 of the virtual cable. At the apparent edges the visible-definition-brightness drops quickly. This rapid drop of visible-definition-brightness at the apparent edges of virtual cable enhances visibility of virtual cable's apparent edges, and therefore makes virtual cable appear sharper, which is esthetically pleasing and which aids the stereoscopic perception.

The bottom graph in FIG. 12A shows in schematic the perceived visible-definition-brightness distribution profile across the virtual cable cross-section having the shape which gives the virtual cable look evoking a glowing ribbon. The visible-definition-brightness level is substantially constant between the intended edges 960 and 962 of the virtual cable. At the apparent edges visible-definition-brightness drops quickly, which, again, enhances visibility of virtual cable's apparent edges, and therefore makes virtual cable appear sharp.

The middle graph in FIG. 12A shows in schematic the perceived visible-definition-brightness distribution profile across the virtual cable cross-section having "Gaussian"-like shape. The visible-definition-brightness level is greatest along the virtual cable's visible-definition-centerline 958 and drops smoothly and quickly toward the intended edges 960 and 962 of the virtual cable. The apparent edges are not well defined here. Therefore, linear-definition-close-by to the observer (i.e. at its visible-definition-widest portion) the virtual cable appears fuzzy.

A "Gaussian"-like cross-section is the easiest to accomplish in some embodiments of the display apparatus. Also, in all the embodiments of the display apparatus disclosed later, this profile may be preferable to any other for the linear-definition-farthest from the observer portion of the virtual cable (i.e. where the virtual cable is visible-definition-thin). If a substantially TEM00 laser beam is used to produce this line by the method described below, such a profile may allow for a very fine line visible-definition-width (i.e. allow for a line only slightly wider then the minimum possible for a given beam f/ratio, as dictated by diffraction theory); at the same time such a line has least of undesirable artifacts (e.g. has no diffraction "ghosts"—dimmer lines visible-definition-close to the intended virtual cable and visible-definition-parallel to it).

We expect that many drivers may prefer either "round cable" or "ribbon" look for the linear-definition-close portion of the virtual cable.

The illustrative embodiments of the display apparatus disclosed later will employs a laser beam 550 scanned onto the screen 602 in a vector graphics mode with sufficient refresh rate to avoid flicker, for example at 30 scans per second. For sake of clarity, let's disregard for now how we will make displayed virtual cable truly three-dimensional as to provide stereoscopic experience to the driver. The laser beam produces a beam spot 401 upon impinging on the white surface of the screen. The rapid sweeping movement of this spot across the surface of the screen along the intended path of the line will, due to persistence of vision, produce ("paint") an apparent glowing line. This screen with the line painted on it is viewed by the driver through appropriate viewing optics, the virtual image of the line seen through said optics is the virtual cable.

FIG. 12B shows in schematic the perceived brightness distribution profiles across the laser spot 401. The spot is moving rapidly along trajectory 970. The resulting spread out motion blur, when seen through viewing optics, results in perception of corresponding virtual cable VC shown in FIG. 12A. The laser spot 401 is shown here "frozen in time" while crossing line $x_1$-$x_2$. In other words, it is shown as it would be seen by a hypothetical observer with vision similar to ours except who had no vision persistence and who had vision so fast that he could see the moving laser spot 401 without any motion blur. For sake of clarity, the spot's 401 luminosity is adjusted to be comparable in perceived visible-definition-luminosity to the corresponding fragment of virtual cable VC as seen by an observer with a normal human vision.

The laser spot 401 is produced by the laser scanner projector unit 540 and has substantially round shape (i.e. is a figure of rotation); we may disregard here, for sake of clarity, that in some of embodiments disclosed later there may be some distortion of round shape due to astigmatism and coma in optics of projector's beam contractor 530, and due to somewhat oblique angle between the beam and the screen. Because of this round shape, the brightness distribution profiles across the perceived diameter 964a of the laser spot 401 must differ from the intended visible-definition-brightness distribution profiles across the perceived diameter 964 of the resulting virtual cable. If the spot has substantially an uniform brightness profile ("top-hat"), similar to shown in top graph 952a of FIG. 12B, then the resulting virtual cable has a visible-definition-brightness profile 952 which is substantially a half-ellipse, similar to shown in top graph of FIG. 12A. This is because, in short, the round spot is widest along the centerline 958 in the direction of its motion, so it takes most time there to cross the line $x_1$-$x_2$, making the center point of the cross section the brightest. Those skilled in the art will be able to calculate the virtual cable profile from the spot profile or vice versa.

Similarly, the middle graph 954a and bottom graph 956a in FIG. 12B each shows in schematic the perceived brightness distribution profile across the laser spot 401 which produces a virtual cable shown at the corresponding (i.e. middle 954 or bottom 956) graph in FIG. 12A.

To achieve the impression of virtual cable visible-definition-thinning with growing linear-definition-distance from the observer according to the laws of perspective, the line displayed on the screen 602 will have a width which generally changes along the path of said line. Also, the line will get generally visible-definition-dimmer with growing linear-definition-distance, in a sense that for any given 1 inch visible-definition-long section of the virtual cable (measured along the length of the virtual cable), that given section's visible-definition-light-output will be inversely proportional to its linear-definition-distance from the observer, but that will be discussed elsewhere. To achieve the line width change, during each scan period the beam projector 540 will be changing continuously focusing of its optics, and therefore the convergence of the beam, while painting the line on the screen 602. In other word, to produce thicker section of the line about a given point, the laser beam will be defocused more when crossing this point during each scan period, so the defocus blur diameter of the beam spot 401 on the screen 602 will correspond to the desired line width at that point on the line. The brightness distribution profile within the beam spot 401 should also change, smoothly and in concert with the beam spot size, during each scan period. This will allow for both the pleasing visible-definition-brightness profile of the linear-definition-nearby section of the virtual cable (e.g. "round cable" or "ribbon" look evoking) and for the Gaussian-like profile of the linear-definition-farthest section of the same virtual cable for a visible-definition-thinnest possible (nearly diffraction limited) and artifacts-free line.

To achieve the continuous change within the laser beam spot's 401 light distribution profile during each scan period, the laser beam 550 will have continuously changeable spherical aberration. The aberration will be set to be substantially absent (nearly fully corrected) in order to achieve near-Gaussian laser beam and therefore near-Gaussian light distribution profile within the beam spot 401. The aberration will be set to be positive (under-corrected) in desired degree in order to achieve brightness distribution profile within the beam spot 401 similar to that shown in FIG. 12B top graph or, alternatively, bottom graph.

Let's explain this a little more. FIGS. 13A and 13B show, in schematic, a well known effect of positive spherical aberration on appearance of a laser beam spot. The laser beams are assumed here to be converging (a rapidly converging cone of light is shown here for pedagogic purpose), and to have, when near it's source, cross section intensity profile about half way between Gaussian and top-hat. The beam spots are shown schematically, with diffraction fringes, as cross-section brightness profiles. In each of the FIGS. 13A and 13B, two beam spots are shown, one ("focused") which would result from the beam being intercepted by an imaginary plane 602a located at the paraxial focus point of the beam, and another one ("defocused") which would result from the beam being intercepted by an imaginary plane 602b located at some distance in front of (i.e. before reaching, or "inside") the beam focus.

In FIG. 13A, the three sections of the picture show, from bottom to top, in schematic, the defocused beam spot profile 401a, the converging beam ray bundle, and the focused beam spot profile 401b (at the geometrical focus) of a spherical-aberration-free beam of light. The defocused beam spot profile shows light level changing moderately across most of the visible diameter, and then gradually dimming. If such a spot would be used to paint a visible-definition-thick portion of virtual cable, the virtual cable would not appear sharp. However, such a beam focuses to a small spot at its geometrical focus, and, if the laser beam is an only slightly truncated Gaussian beam, diffraction rings around the central spot are very weak. Such a focused spot can be used to paint visible-definition-thin portion of virtual cable which is particularly fine and without noticeable artifacts.

In FIG. 13B, the three sections of the picture show, from bottom to top, in schematic, the defocused beam spot profile

401c, the converging beam ray bundle, and the focused beam spot profile 401d (at the paraxial focus) of a spherically aberrated beam of light. The defocused beam spot profile shows light level which are lower across most of the visible diameter of the spot then near its periphery, and which are then dimming relatively rapidly outside of the peripheral bright "ring" of concentrated light. If such a spot would be used to paint a visible-definition-thick portion of virtual cable, the virtual cable would appear much sharper (the diffraction fringes would be "smeared over" and would have very little visible effect on the appearance of the virtual cable). However, such an aberrated beam focuses to a spot at its paraxial focus having very pronounced halo of diffraction rings around the central spot. And at the narrowest point of the beam ("the circle of least confusion" which lays slightly "inside" from the paraxial focus, in a position which in FIG. 13B would be slightly below the plane 602a), the spot size is still larger then in the geometrical focus of non-aberrated beam shown in the FIG. 13A. Therefore, a spherically aberrated beam does not focus to a spot which could be used to paint visible-definition-thin portion of virtual cable which is particularly fine and without noticeable artifacts.

We can therefore achieve all the laser beam spot profiles and corresponding virtual cable visible-definition-brightness profiles shown in FIG. 12B and FIG. 12A, as well as profiles which are intermediate between those shown, merely by adjusting the focus and the spherical aberration of the laser beam.

The overall brightness (visible-definition-light-output per visible-definition-inch-of-length) of the virtual cable will be varied along its visible-definition-length by means of continuously adjusting the laser beam power, or adjusting the momentary speed (in inches per second) with which the laser beam spot 401 is sweeping across the screen 602 during scan cycle, or any combinations of both.

8. System Operation

Activity Flow Diagrams

Various aspects of the operation of the disclosed system are depicted by activity flow diagrams in FIGS. 51A through 60J. These diagrams do not specify any error processing beyond errors that can be caused by human beings. The implementation such other error processing is within the abilities of those skilled in the art.

Figure 50:
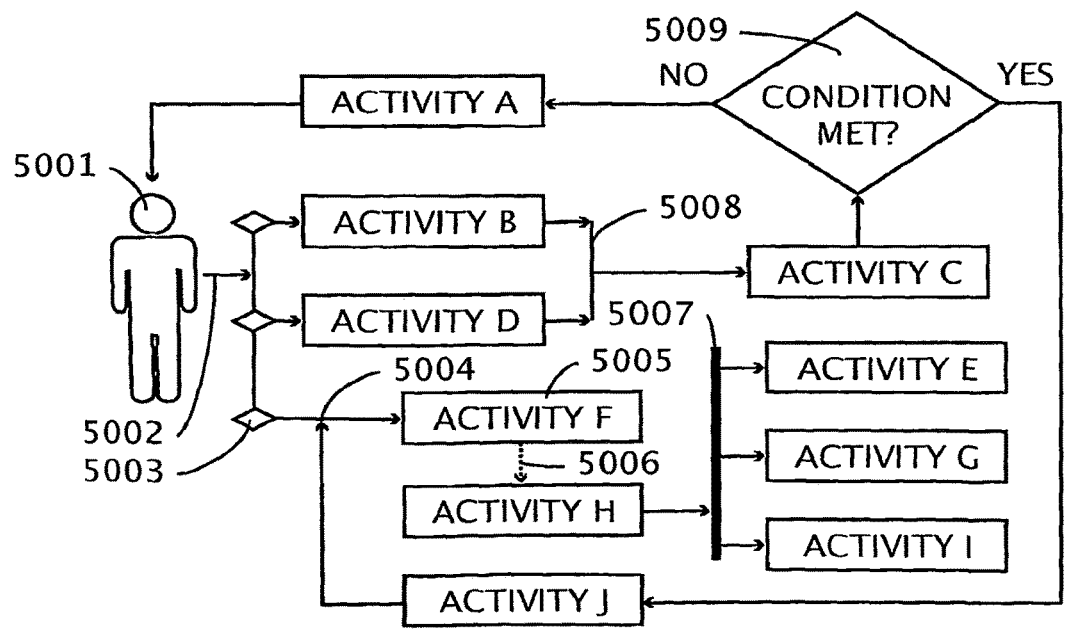
FIG. 50 is an action flow diagram helpful in explaining the symbology employed in the FIGS. that follow.
Figure 51C:
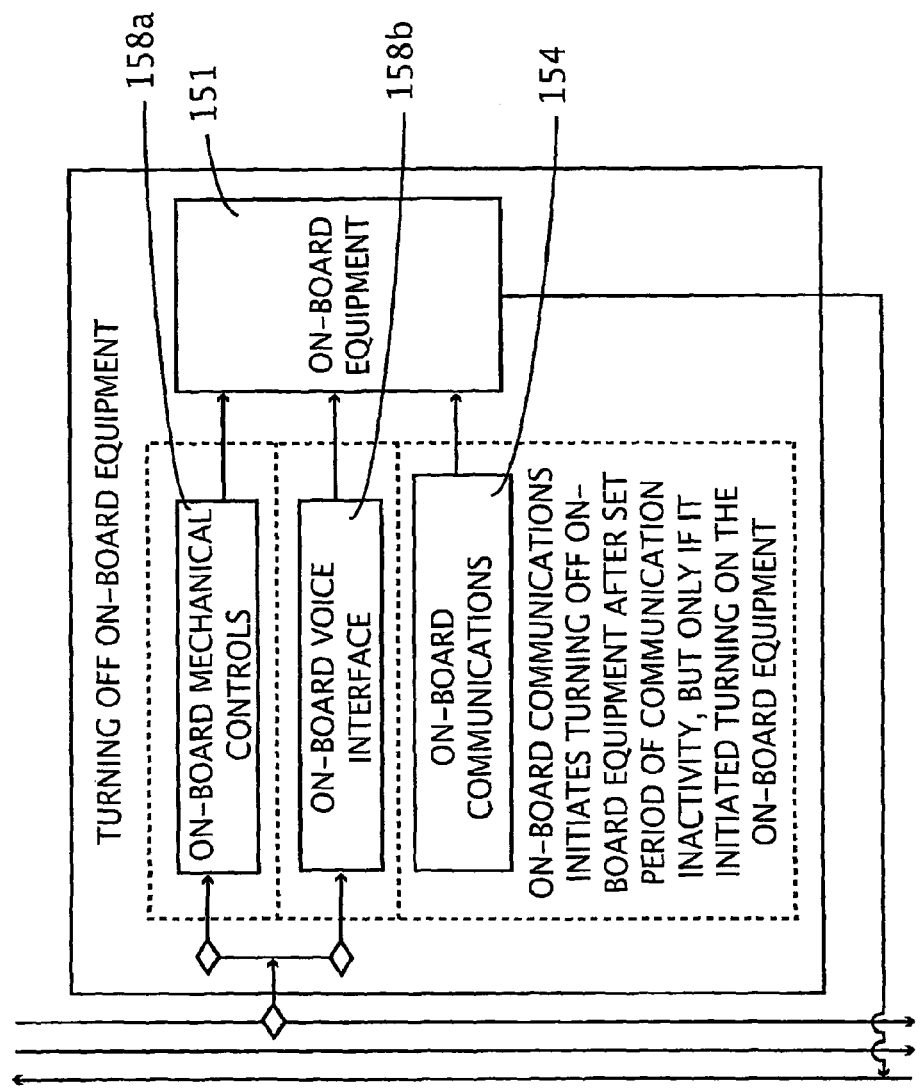
Figure 51D:
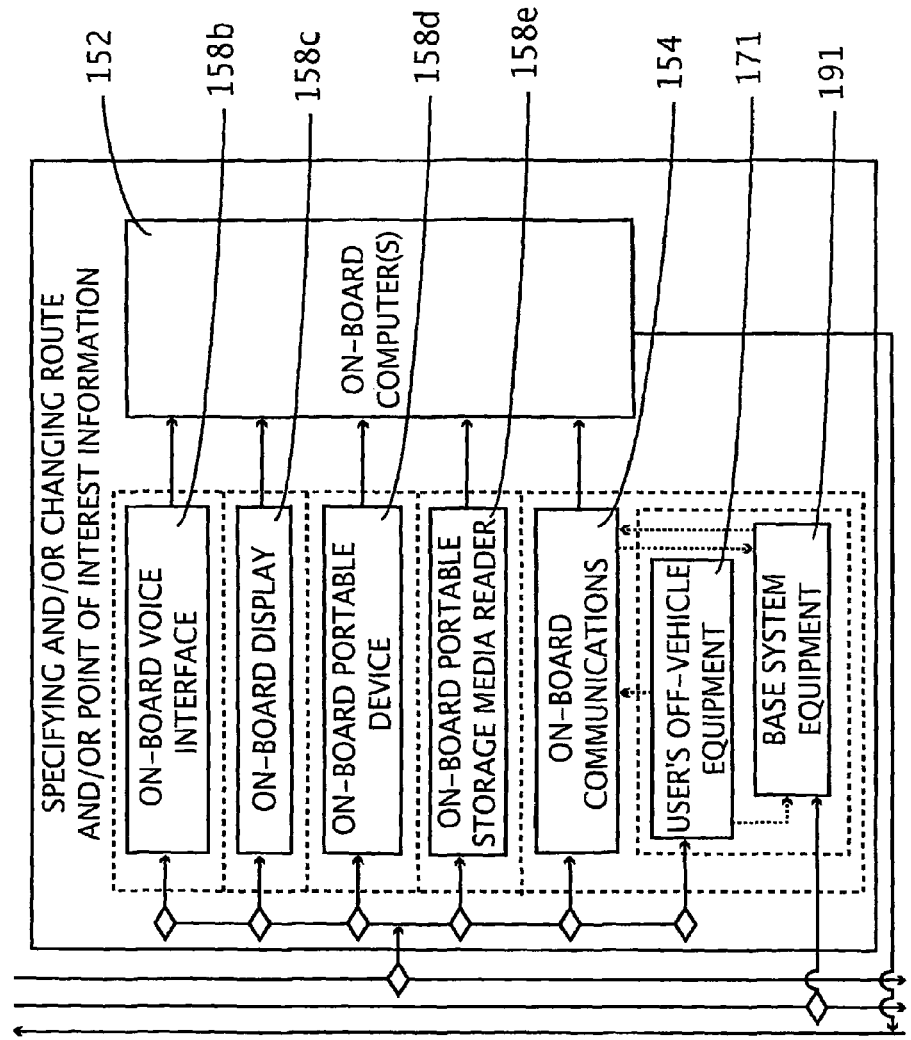
Figure 51E:
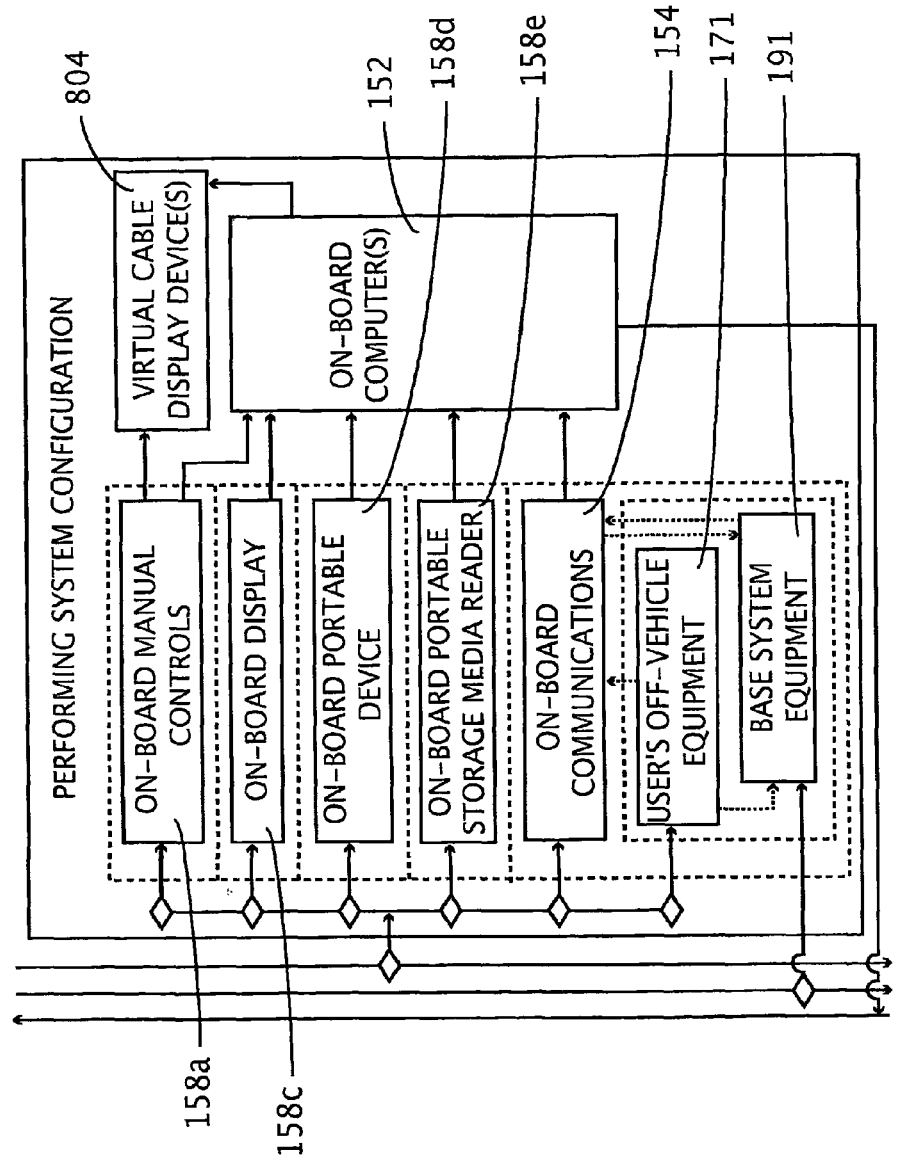
Figure 51F:
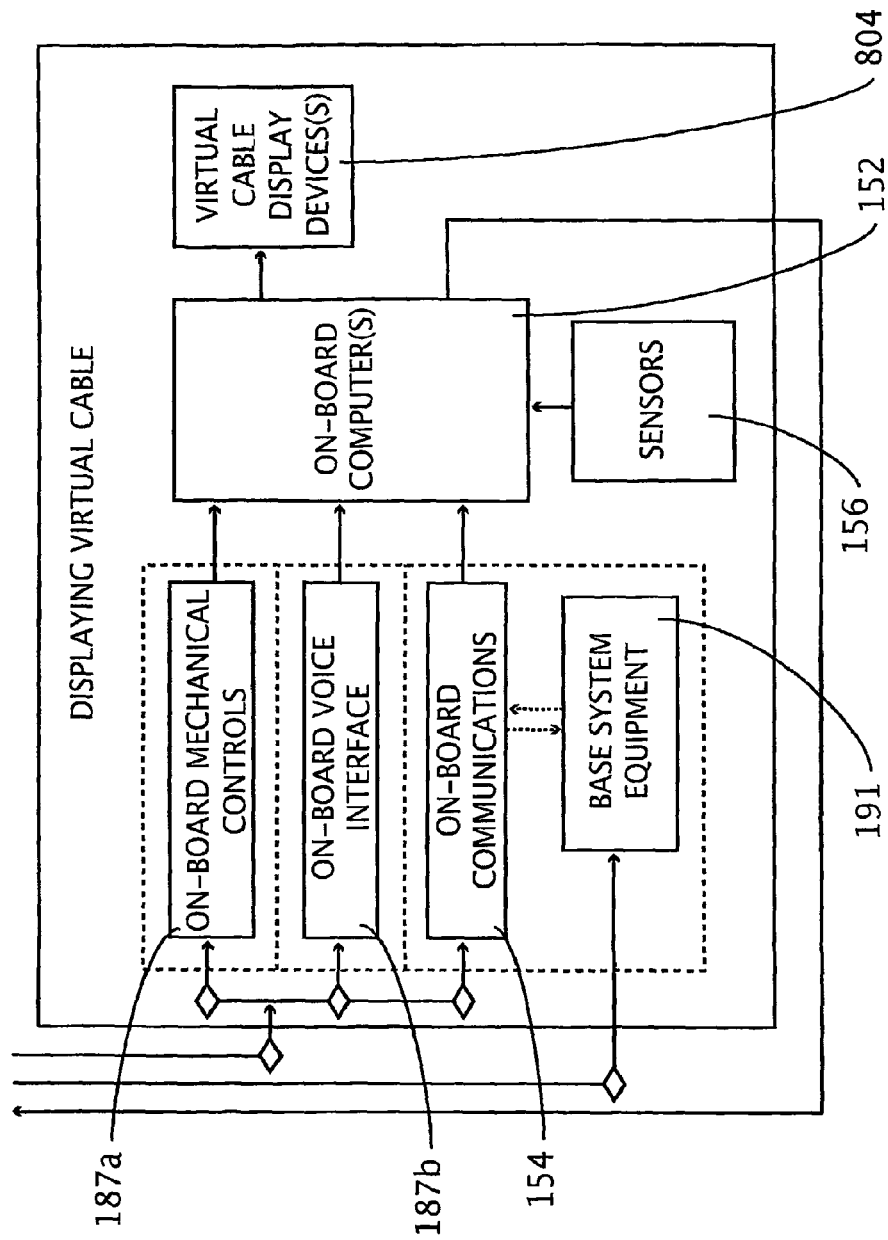
Figure 52C:
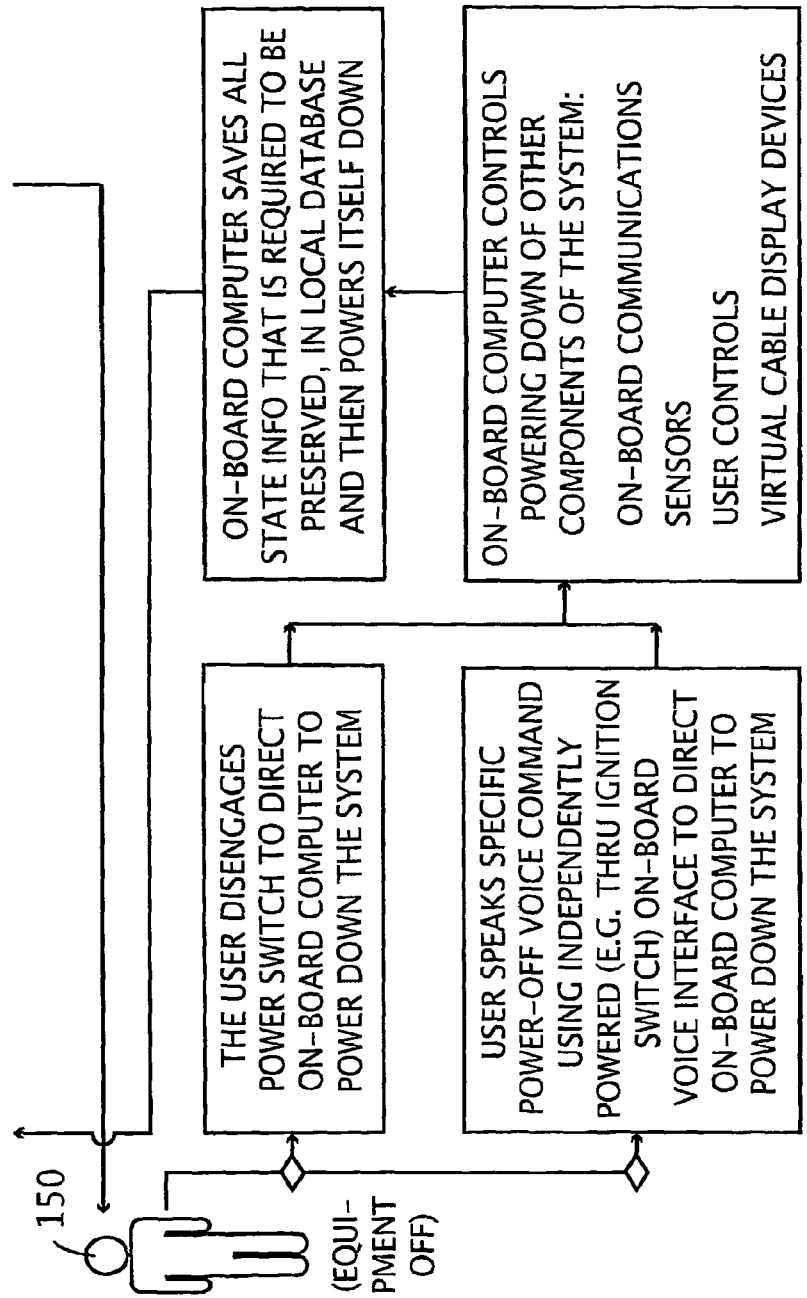
Figure 53C:
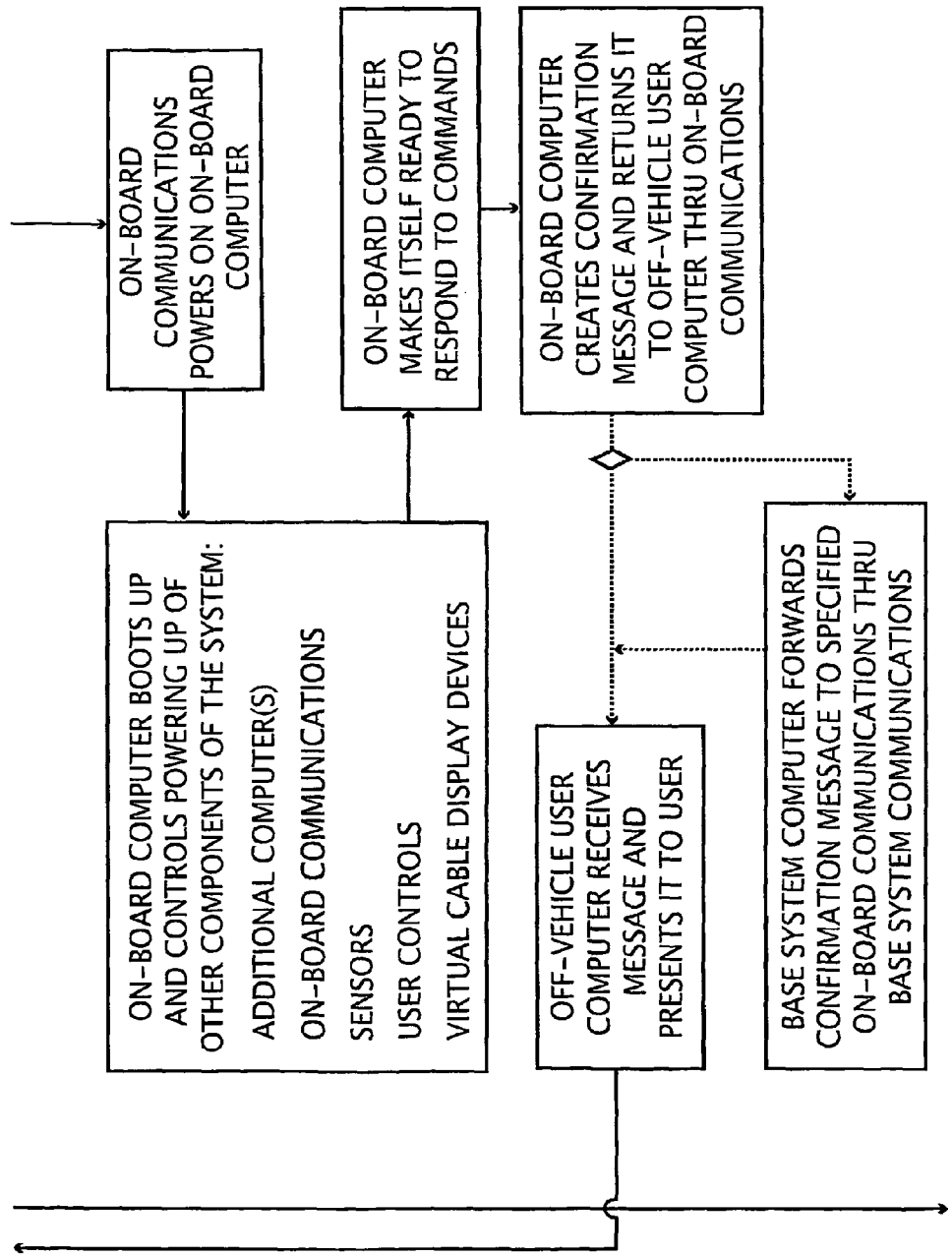
Figure 53D:
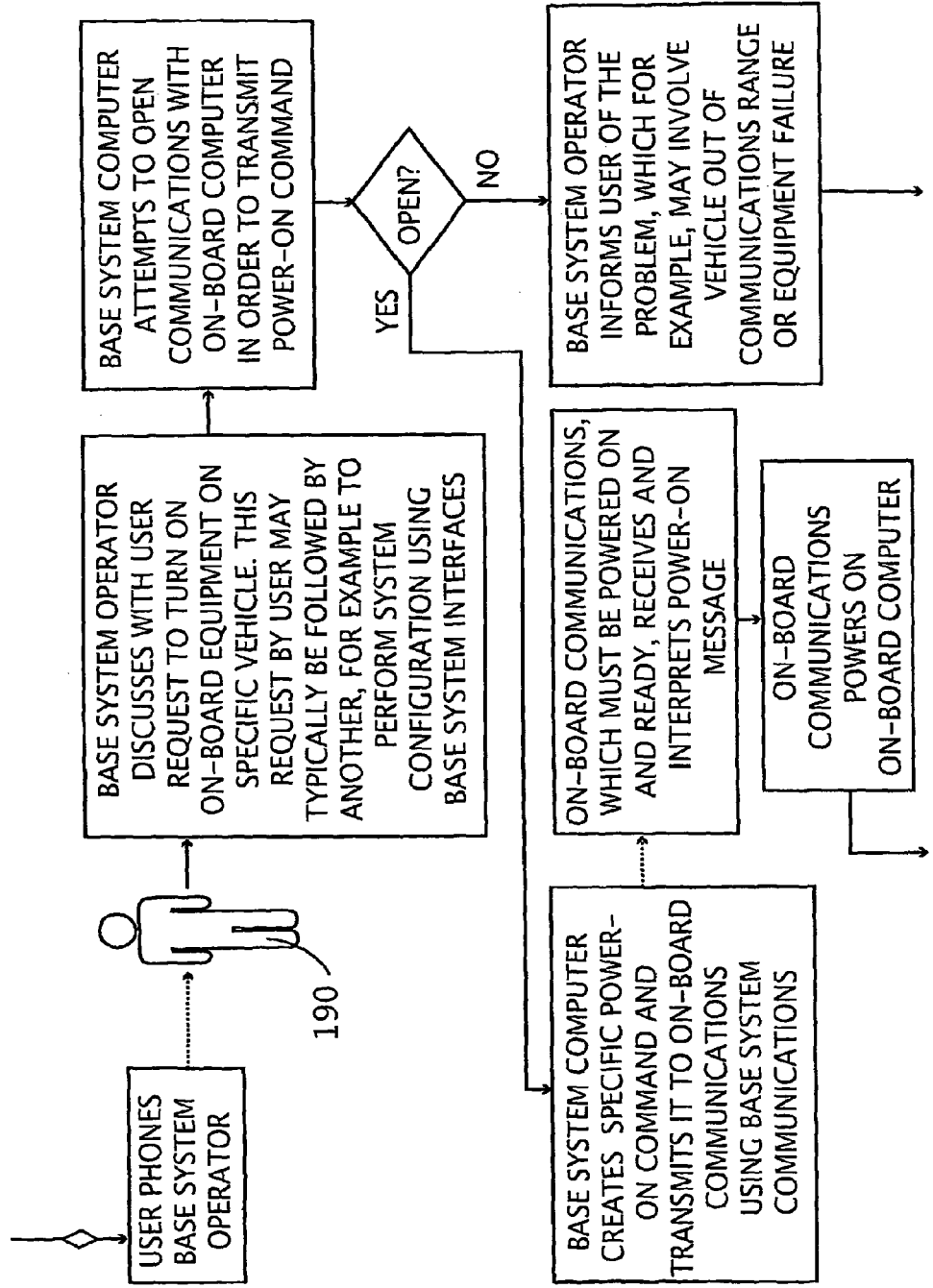
Figure 53E:
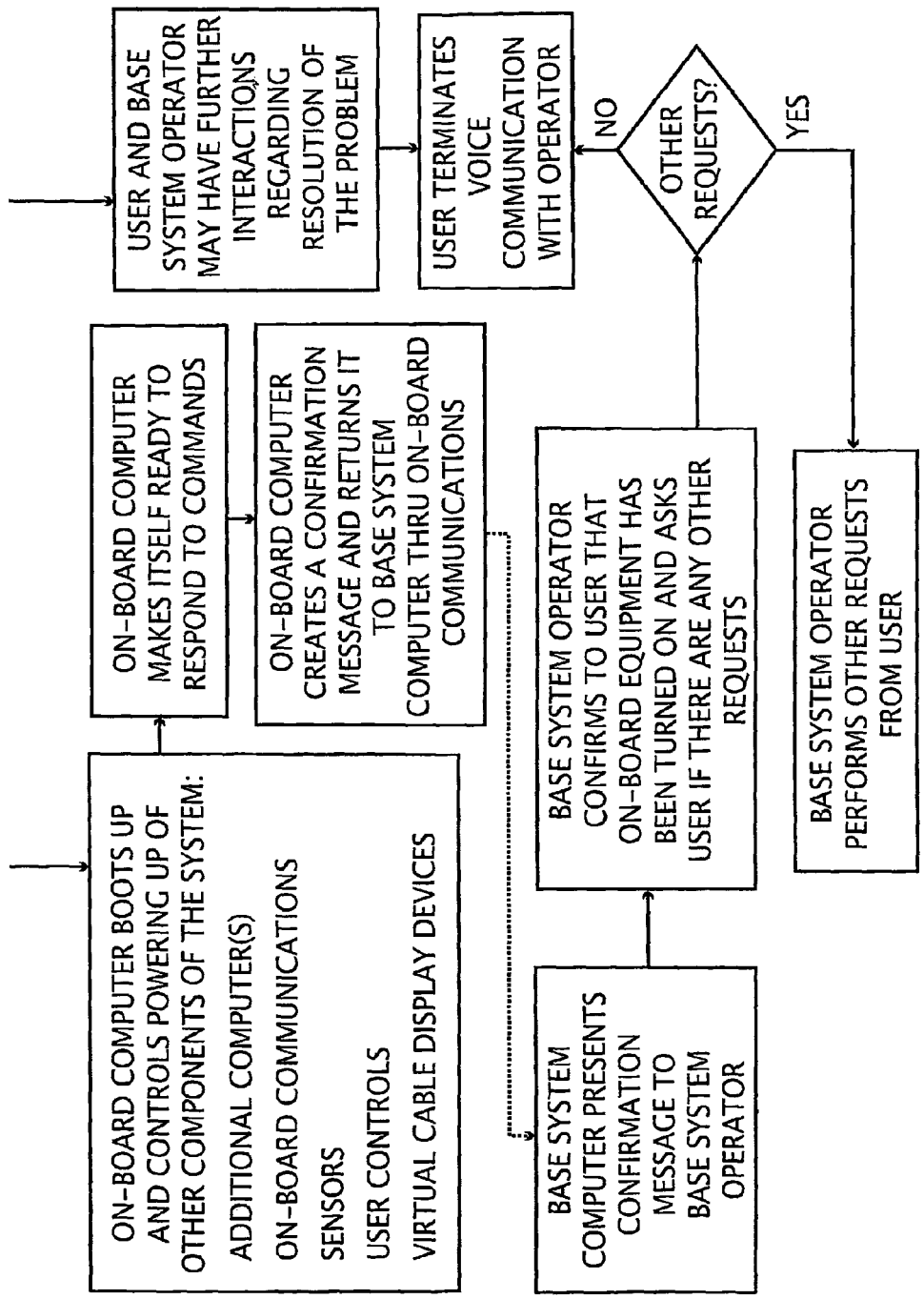
Figure 54C:
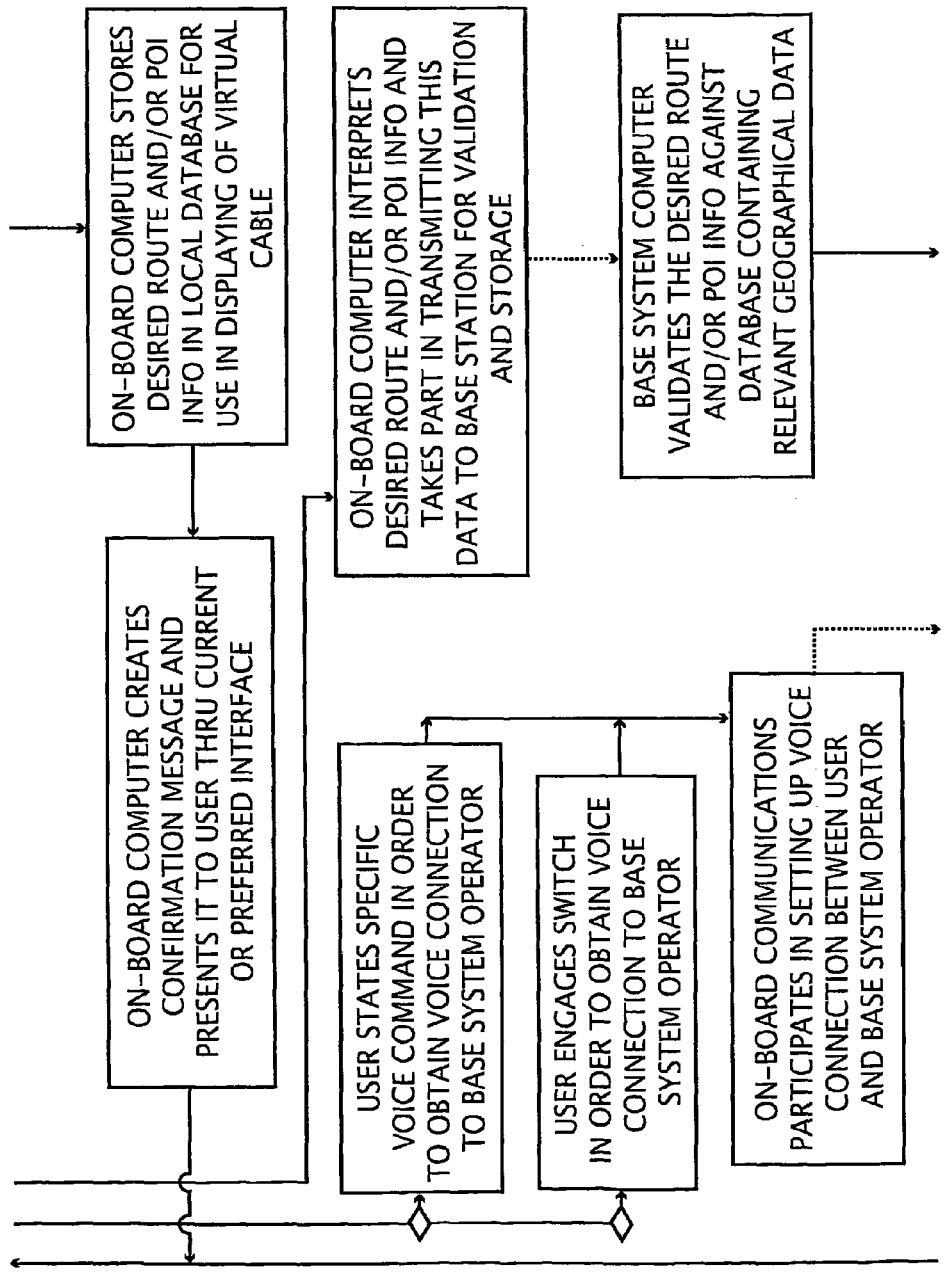
Figure 54D:
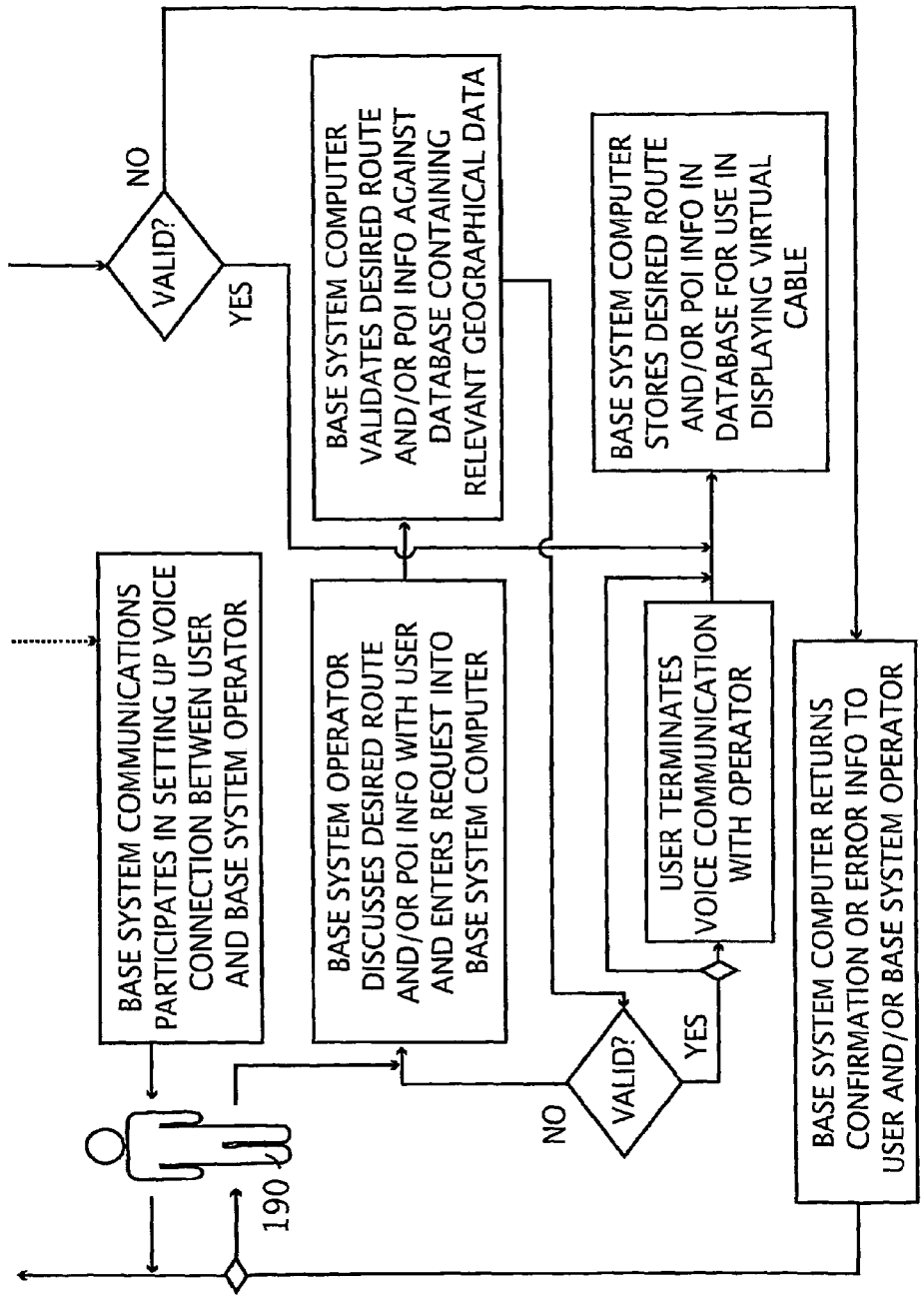
Figure 55C:
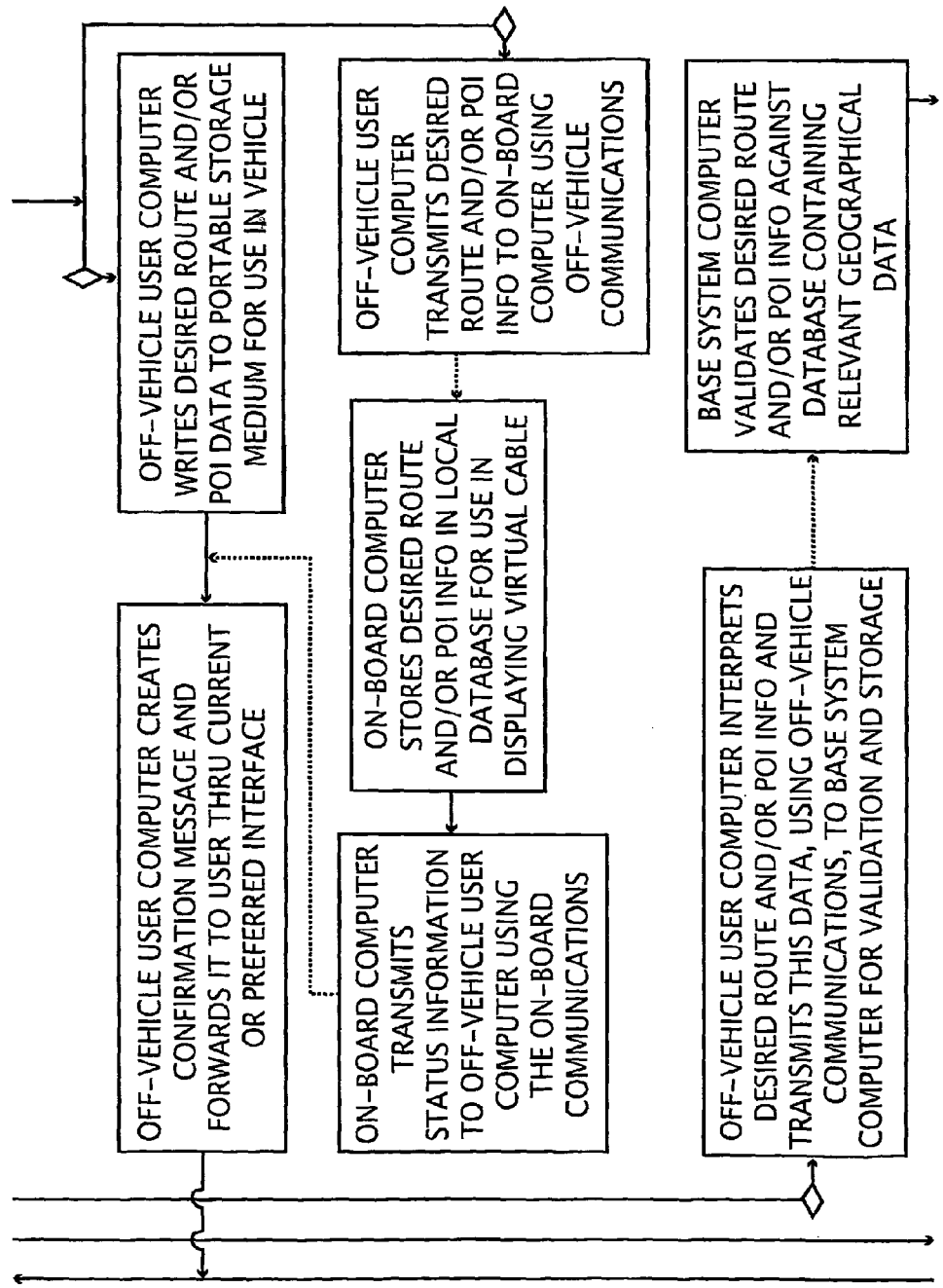
Figure 55D:
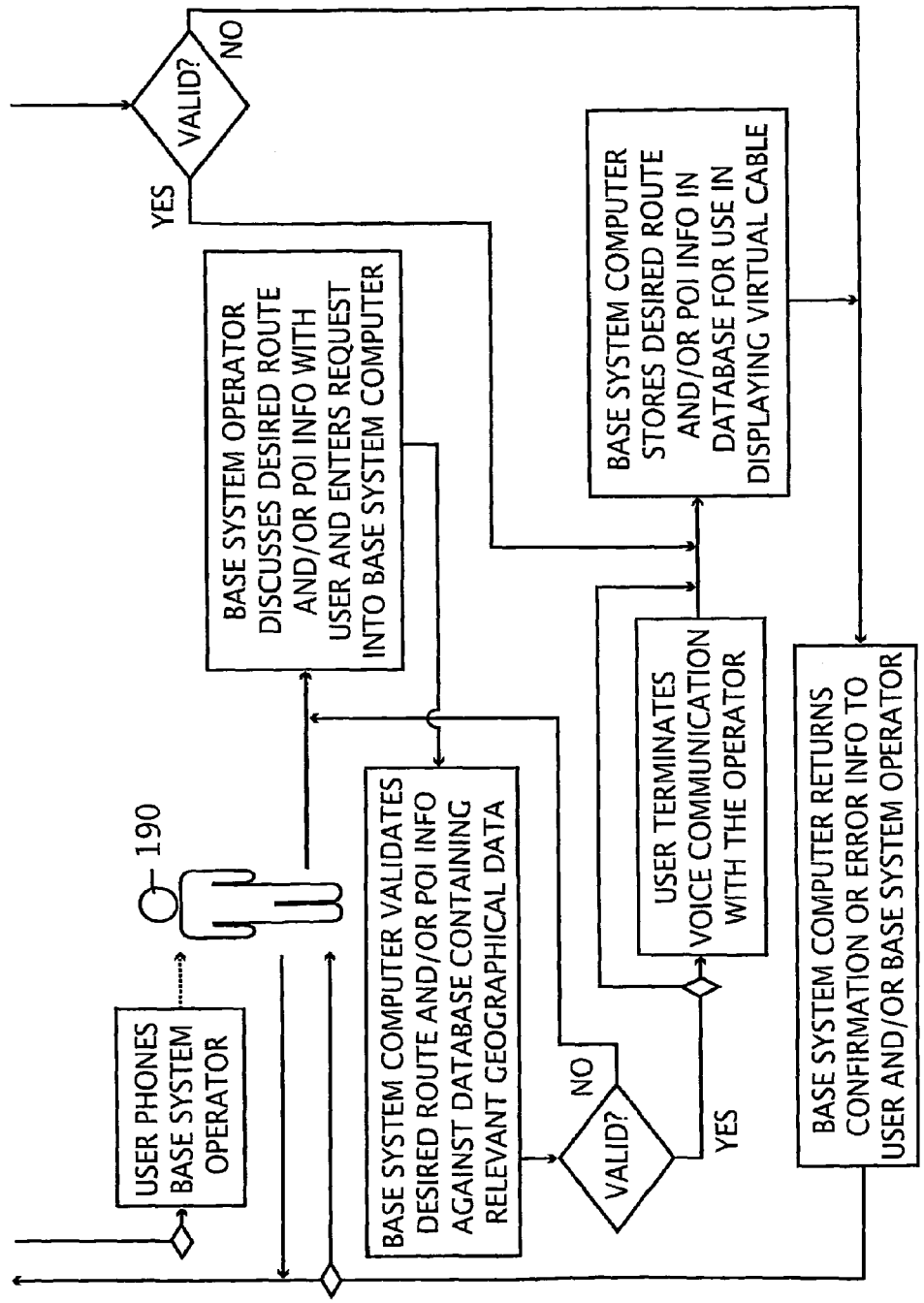
Figure 56C:
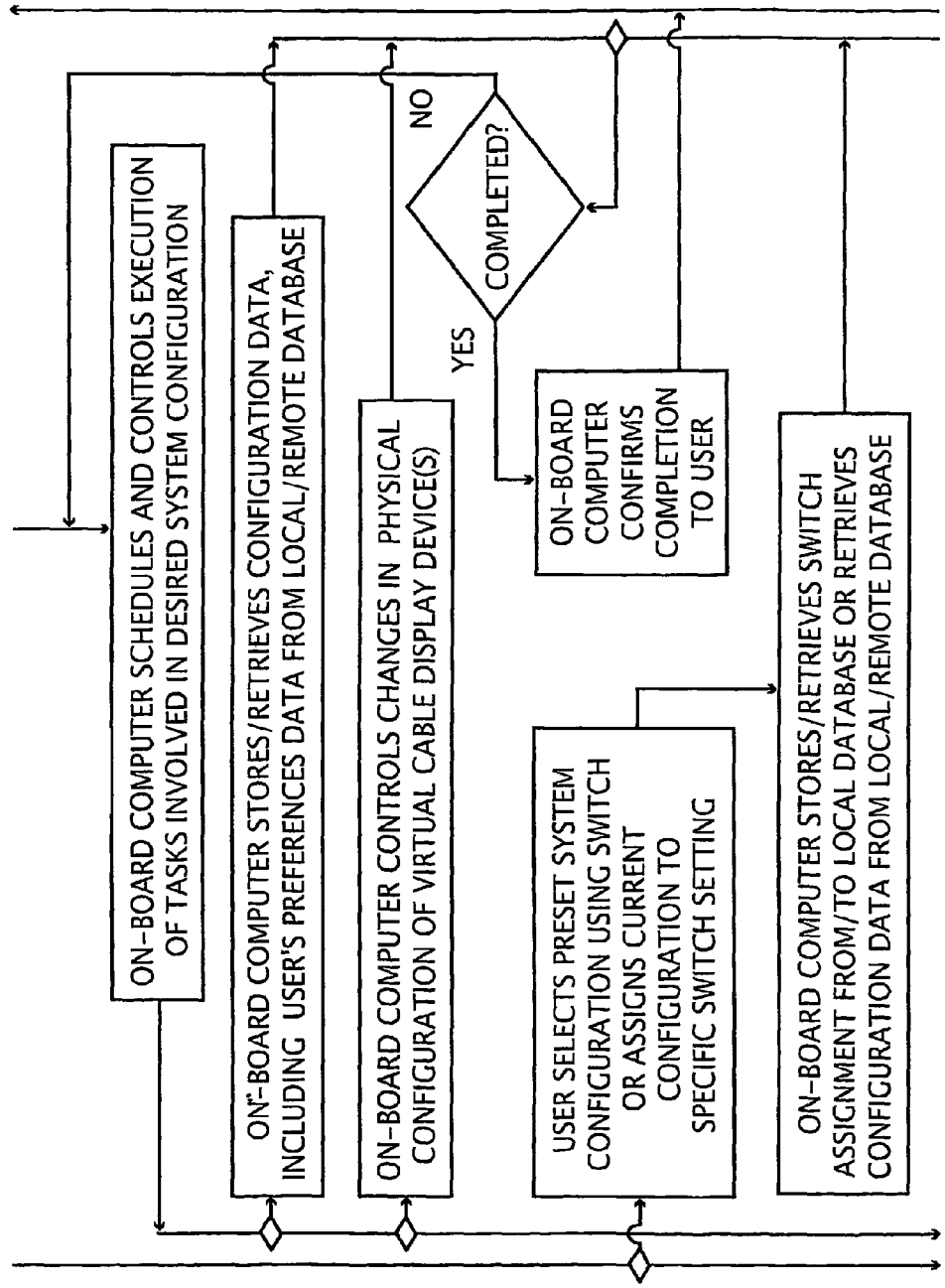
Figure 56D:
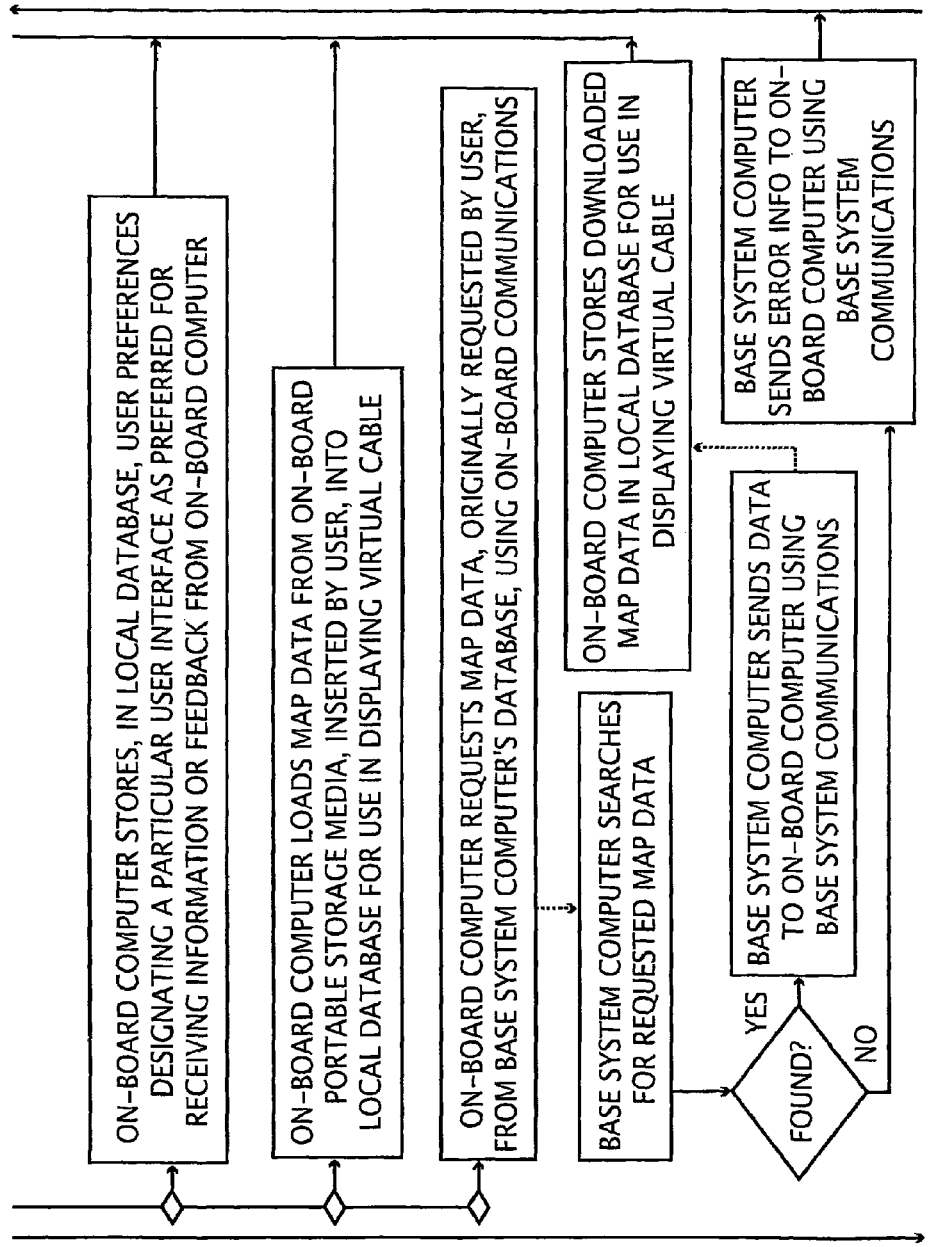
Figure 56E:
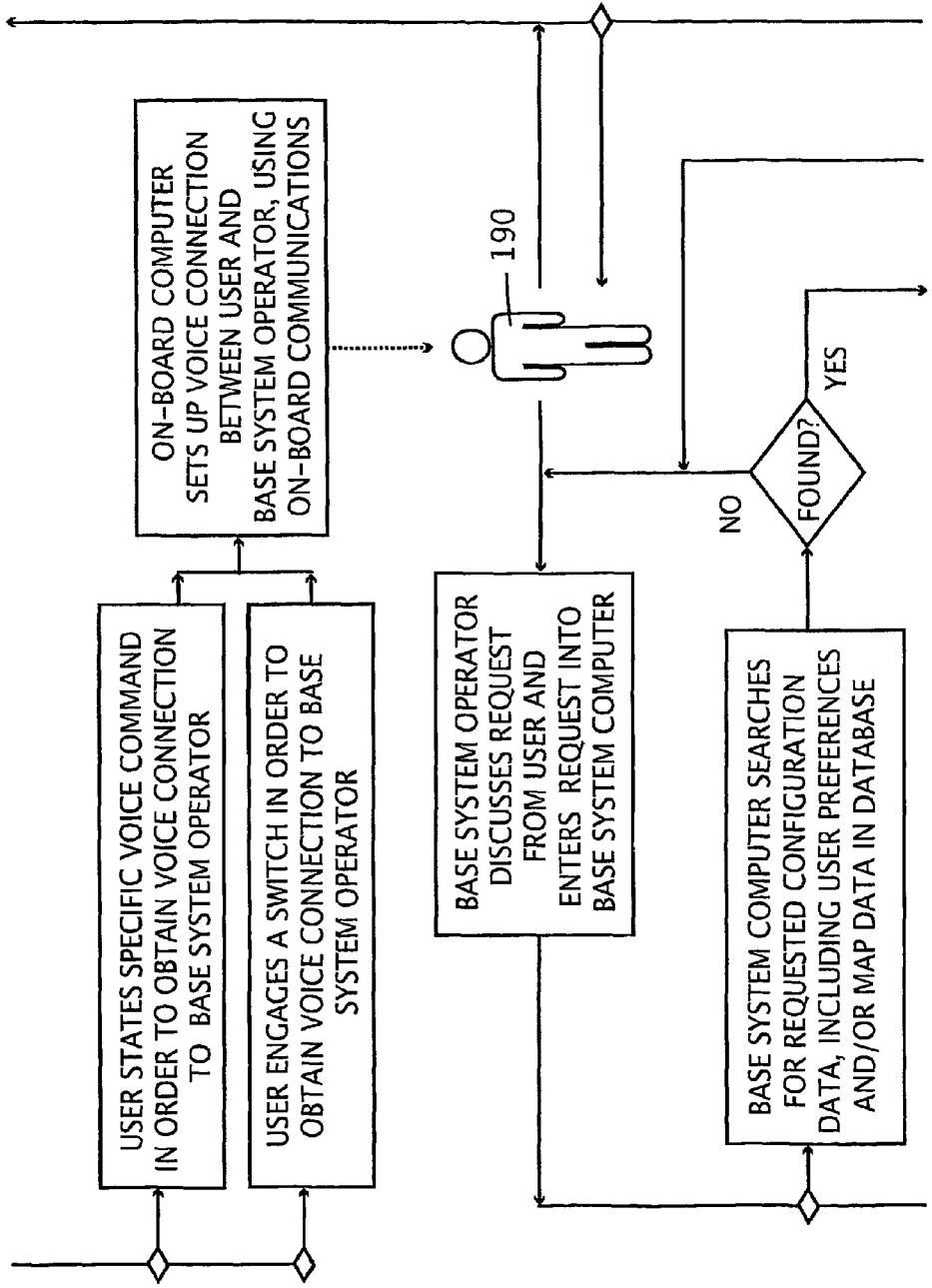
Figure 56F:
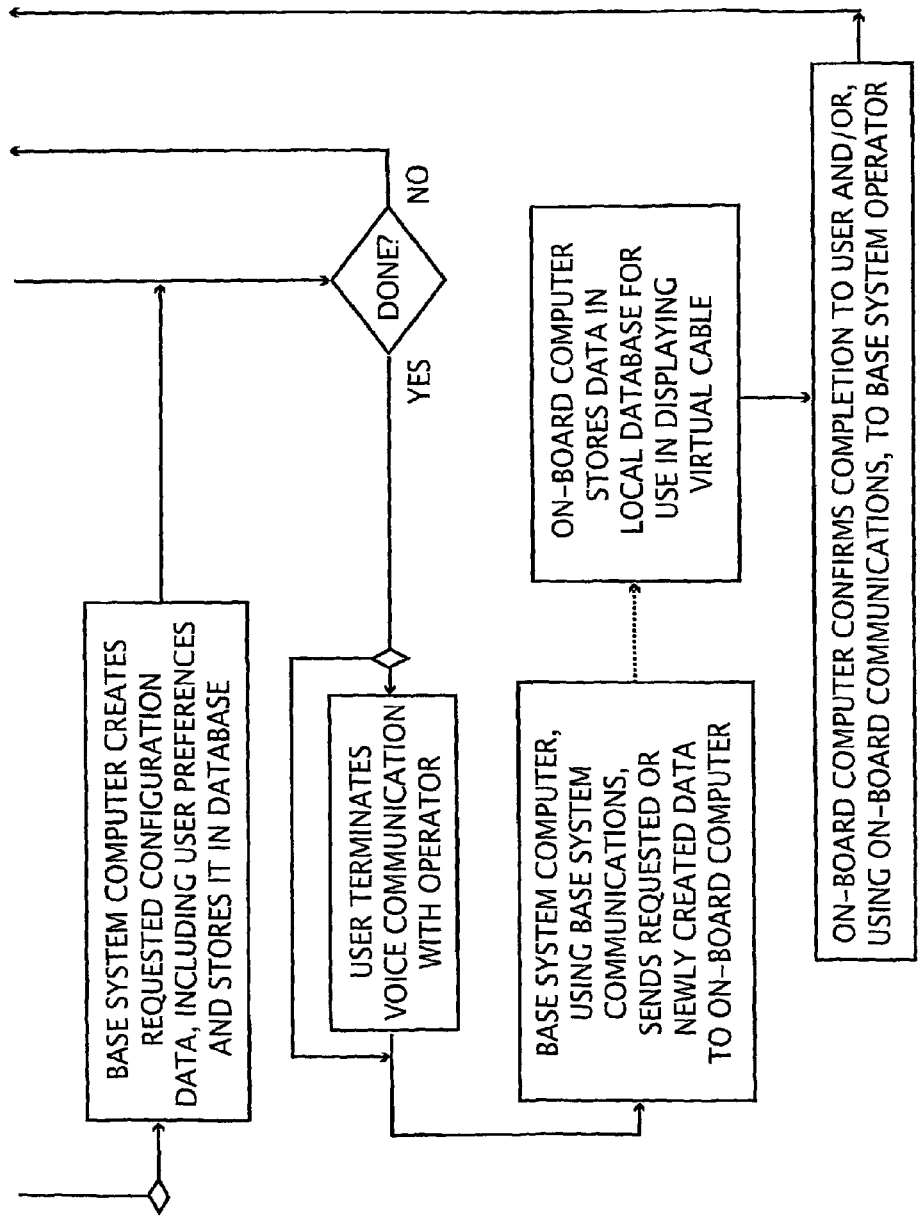
Figure 57C:
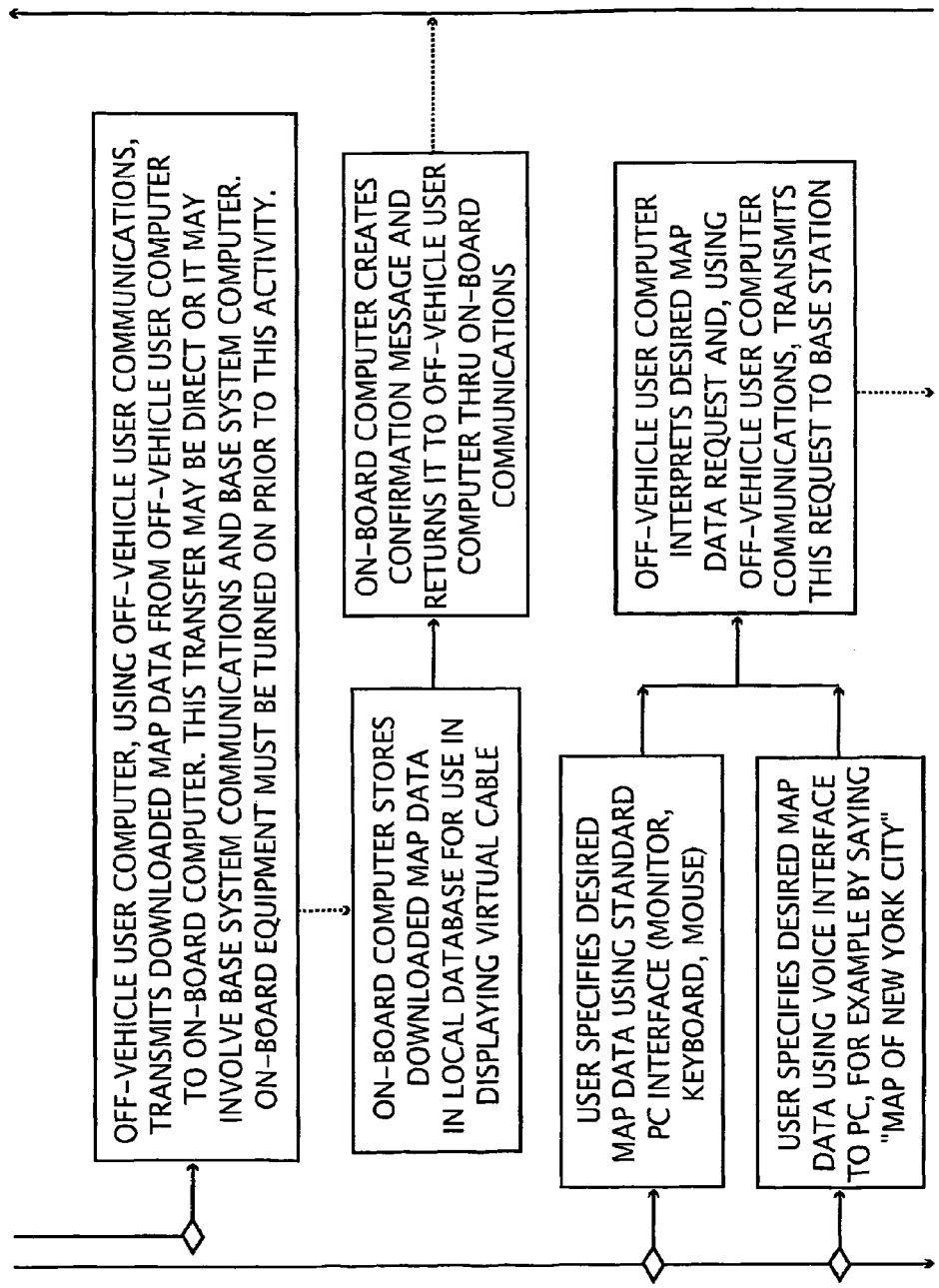
Figure 57D:
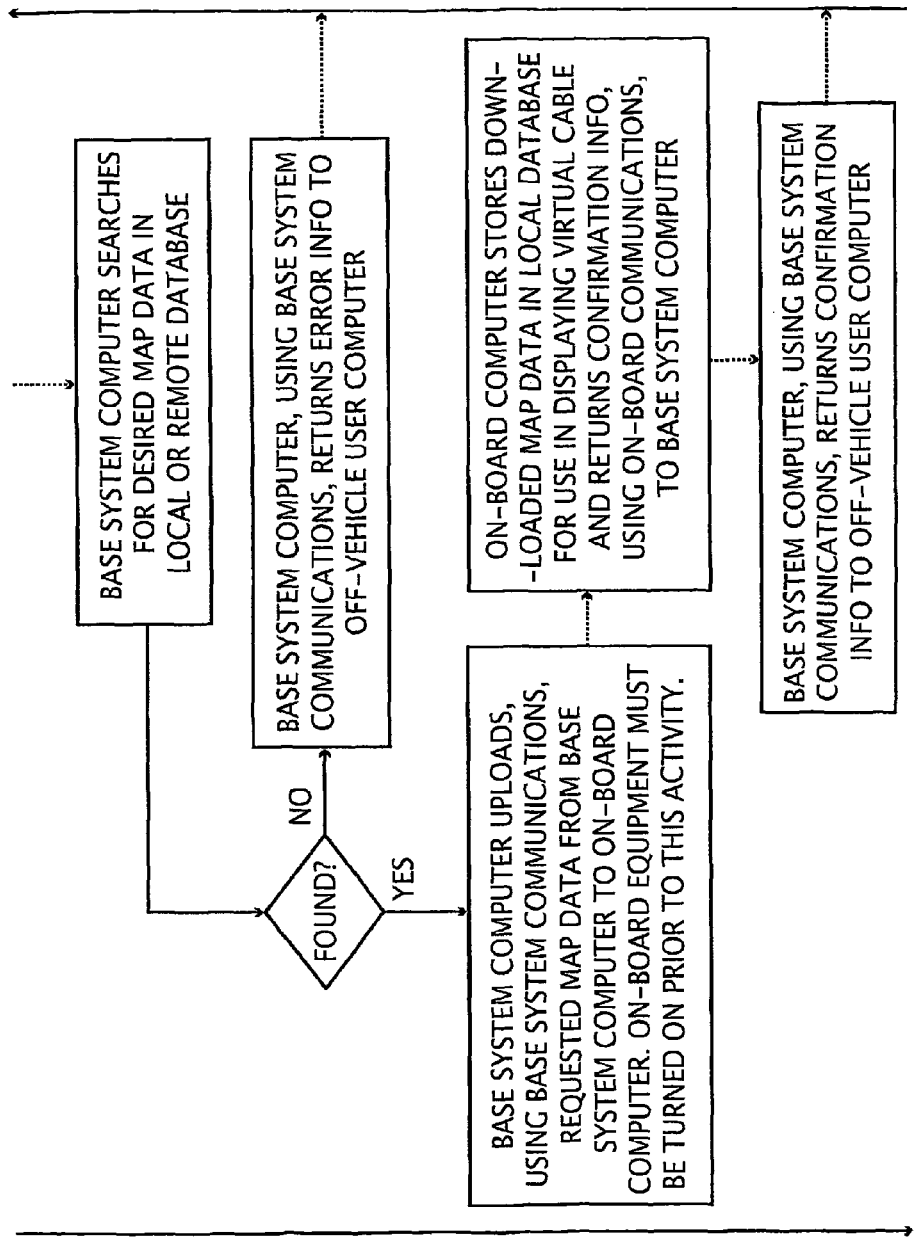
Figure 57F:
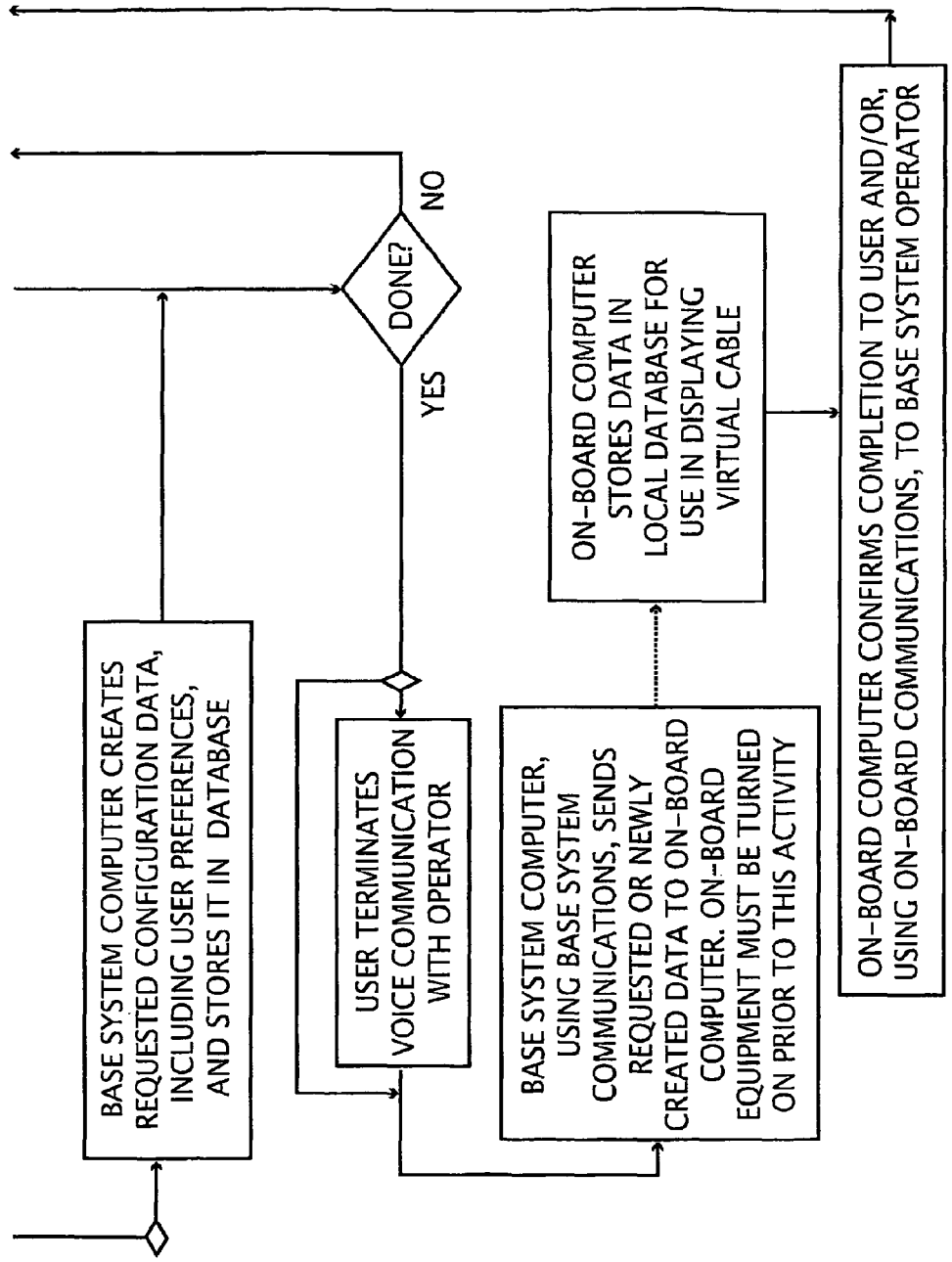
Figure 58C:
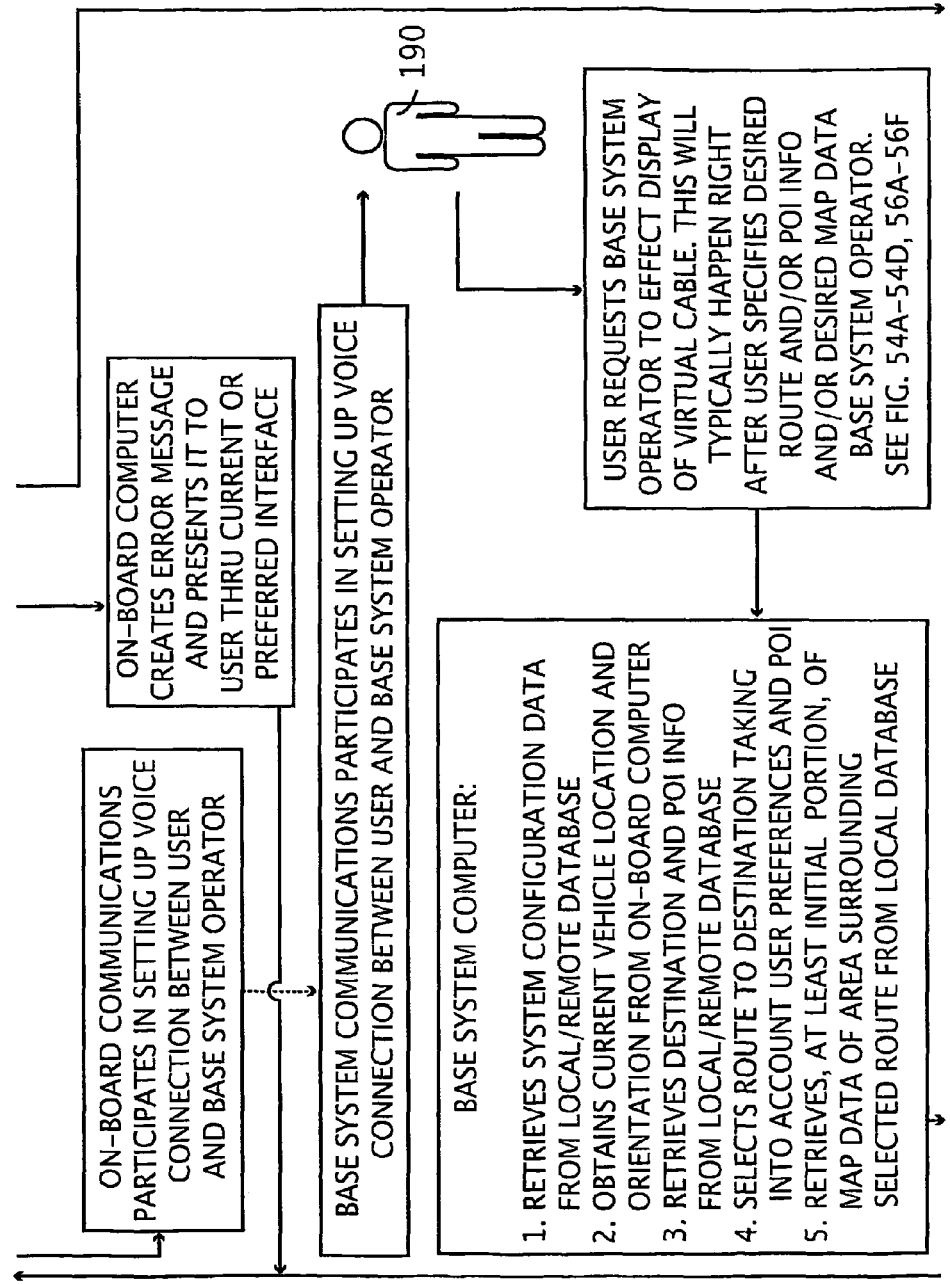
Figure 58D:
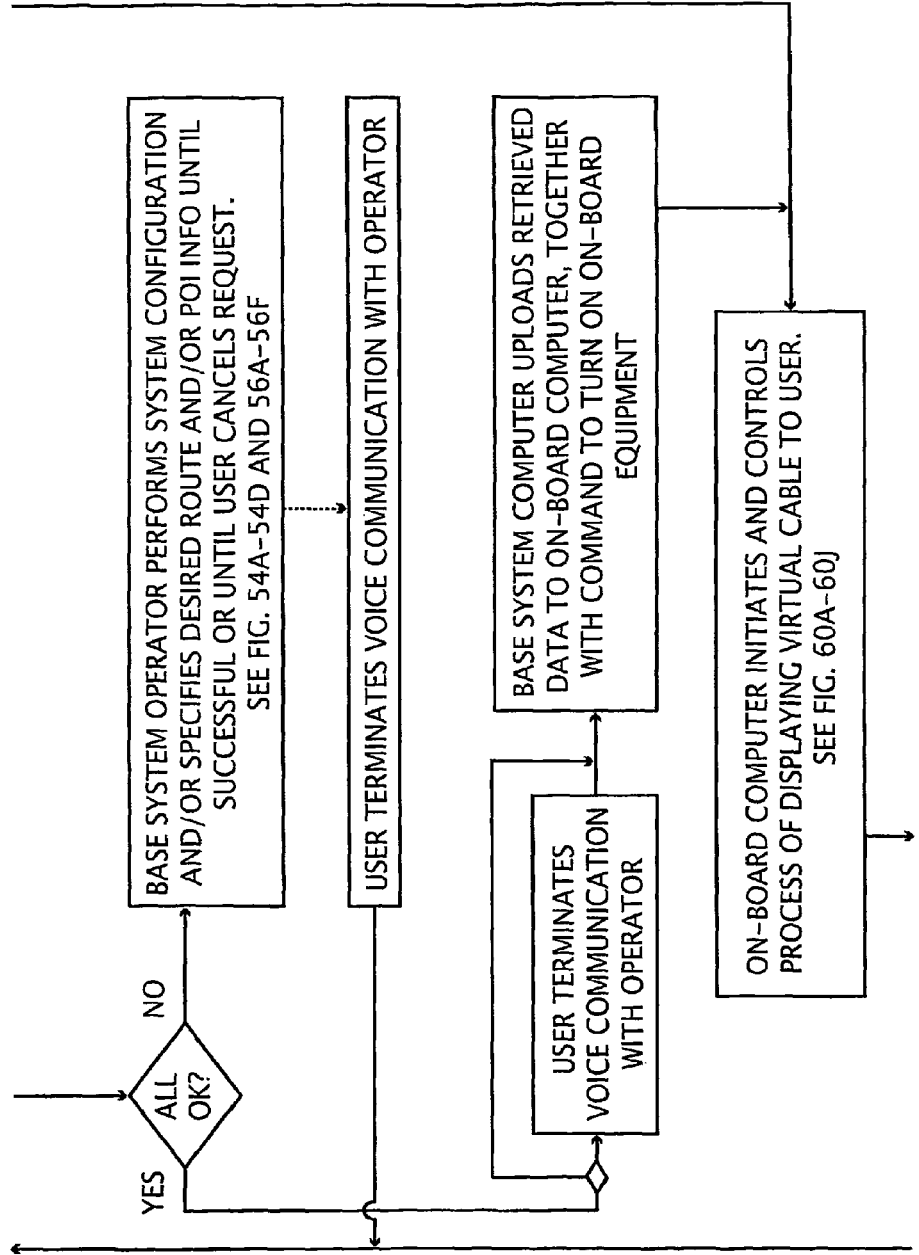
Figure 58E:
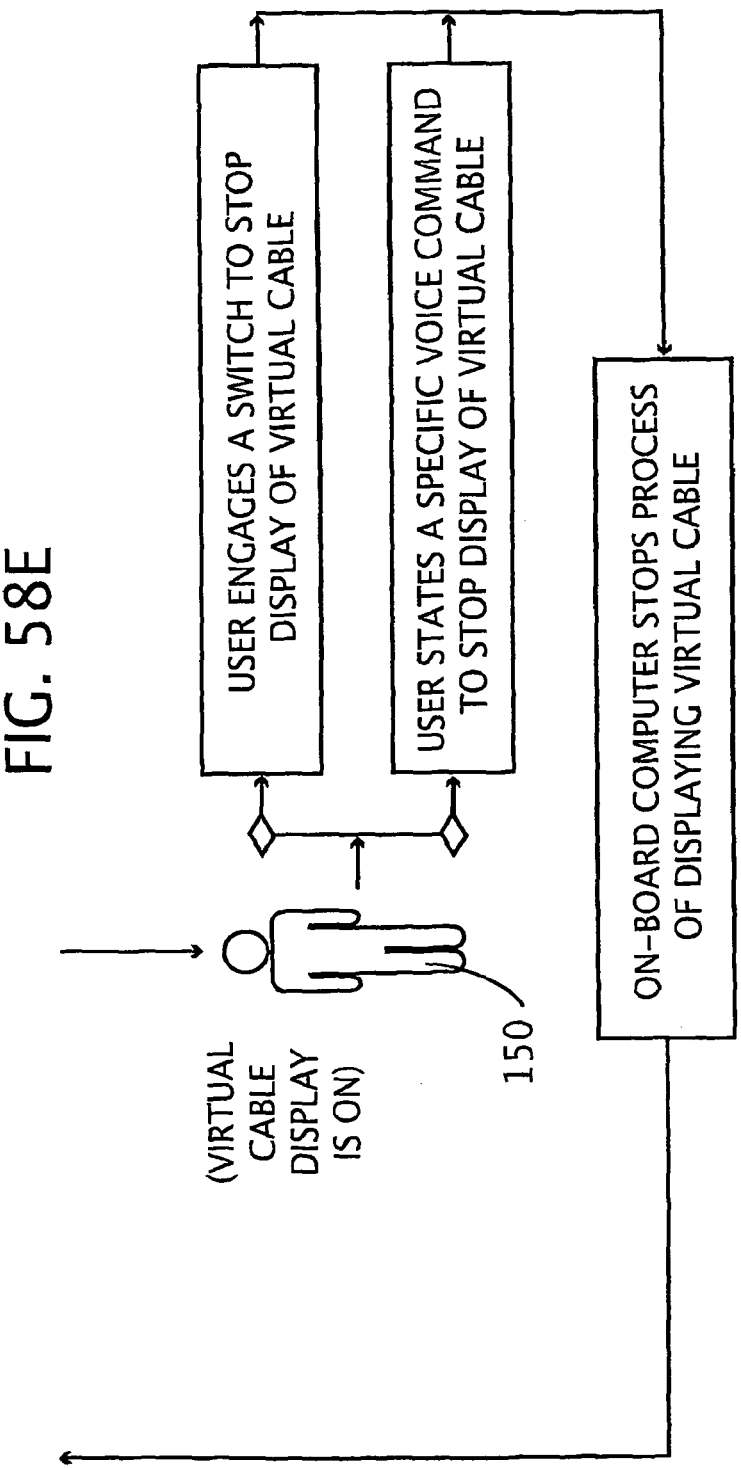
Figure 59C:
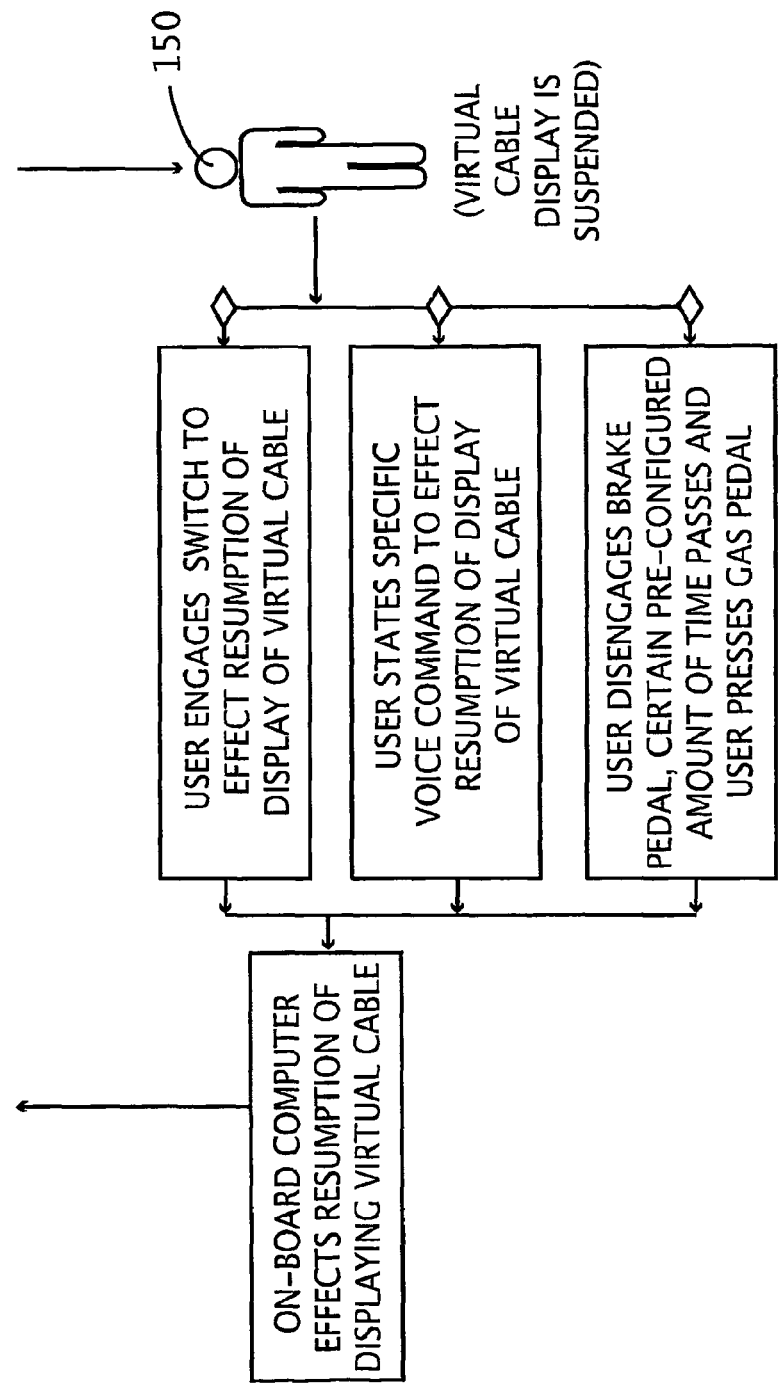
Figure 60C:
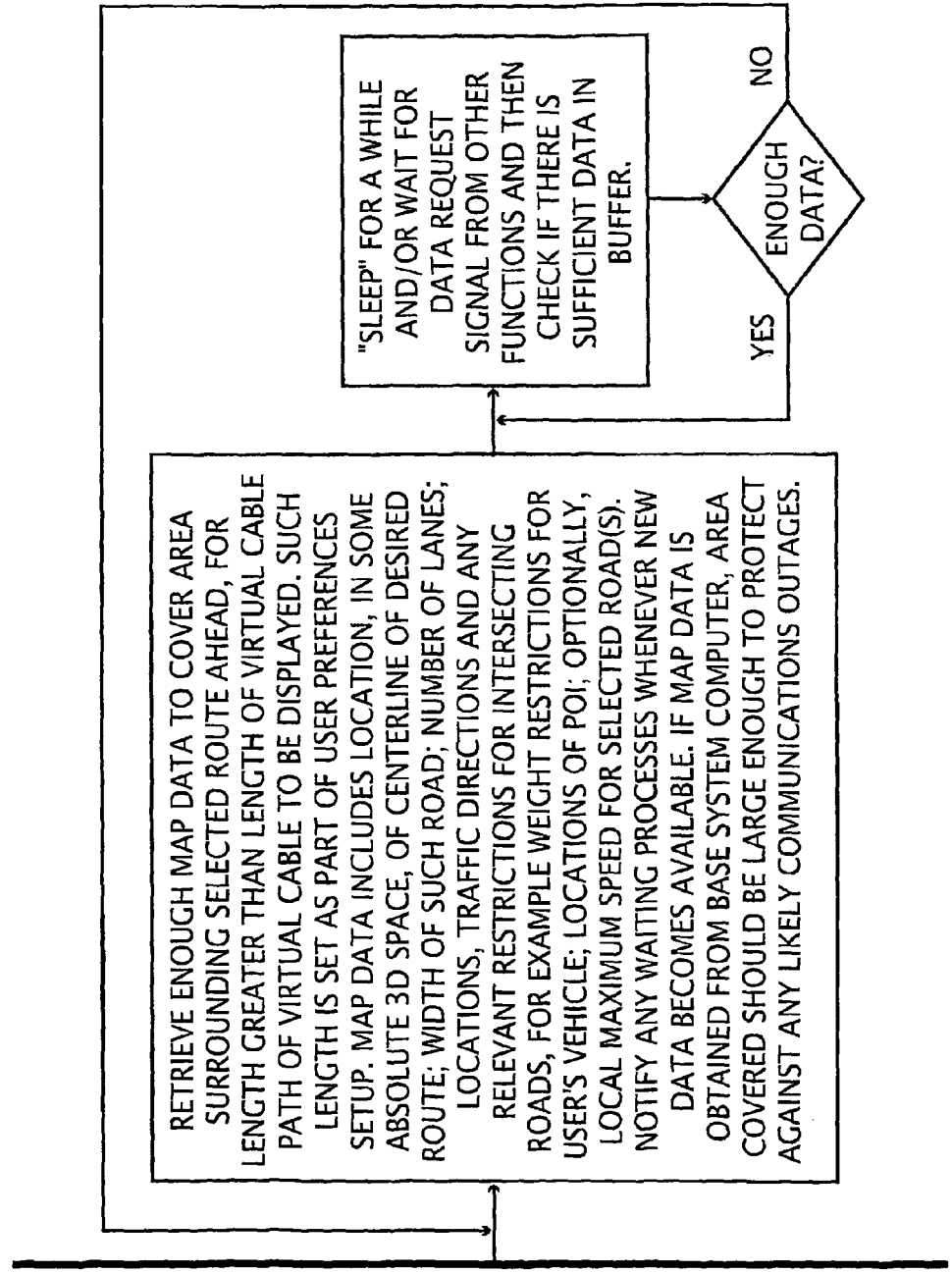
Figure 60D:
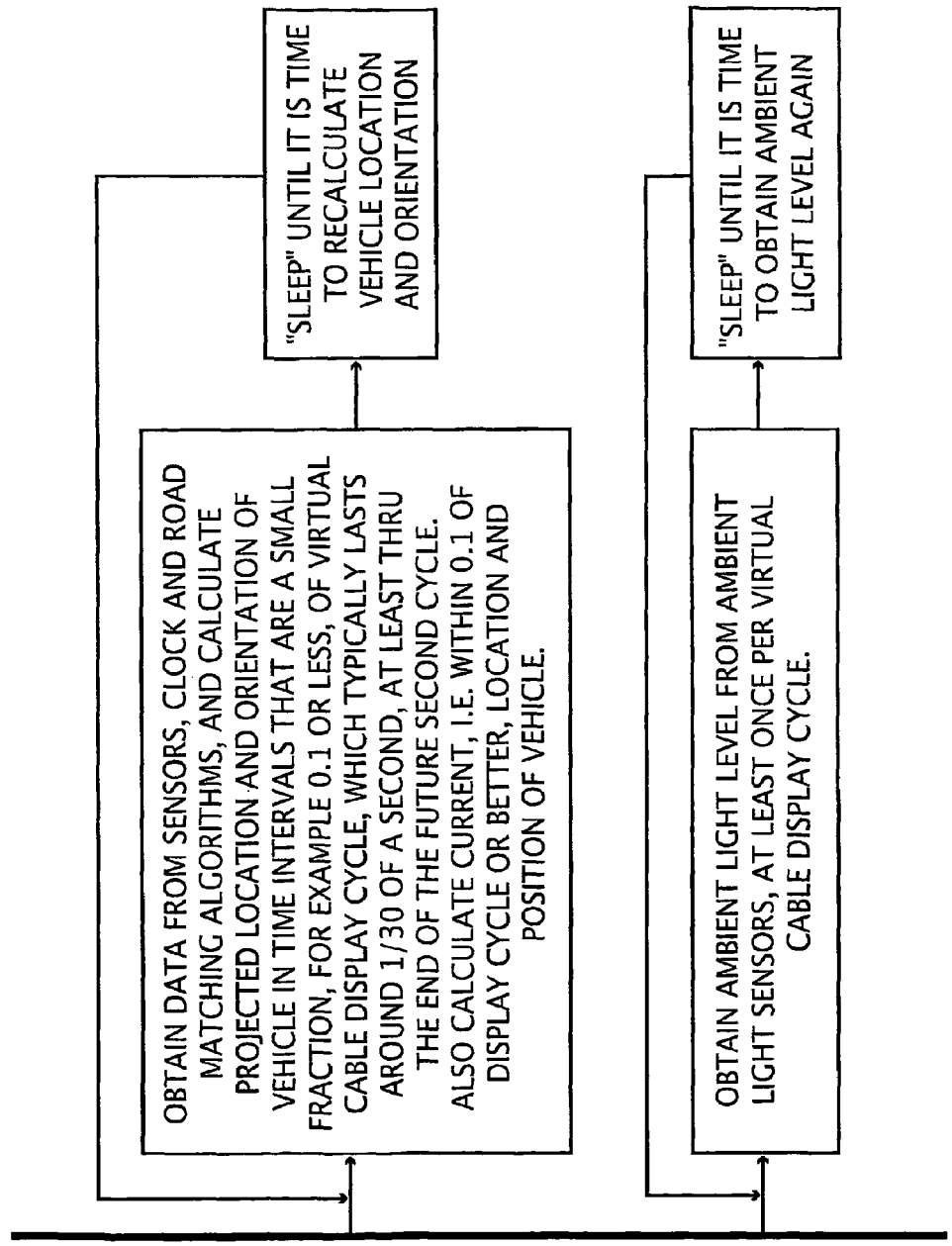
Figure 60E:
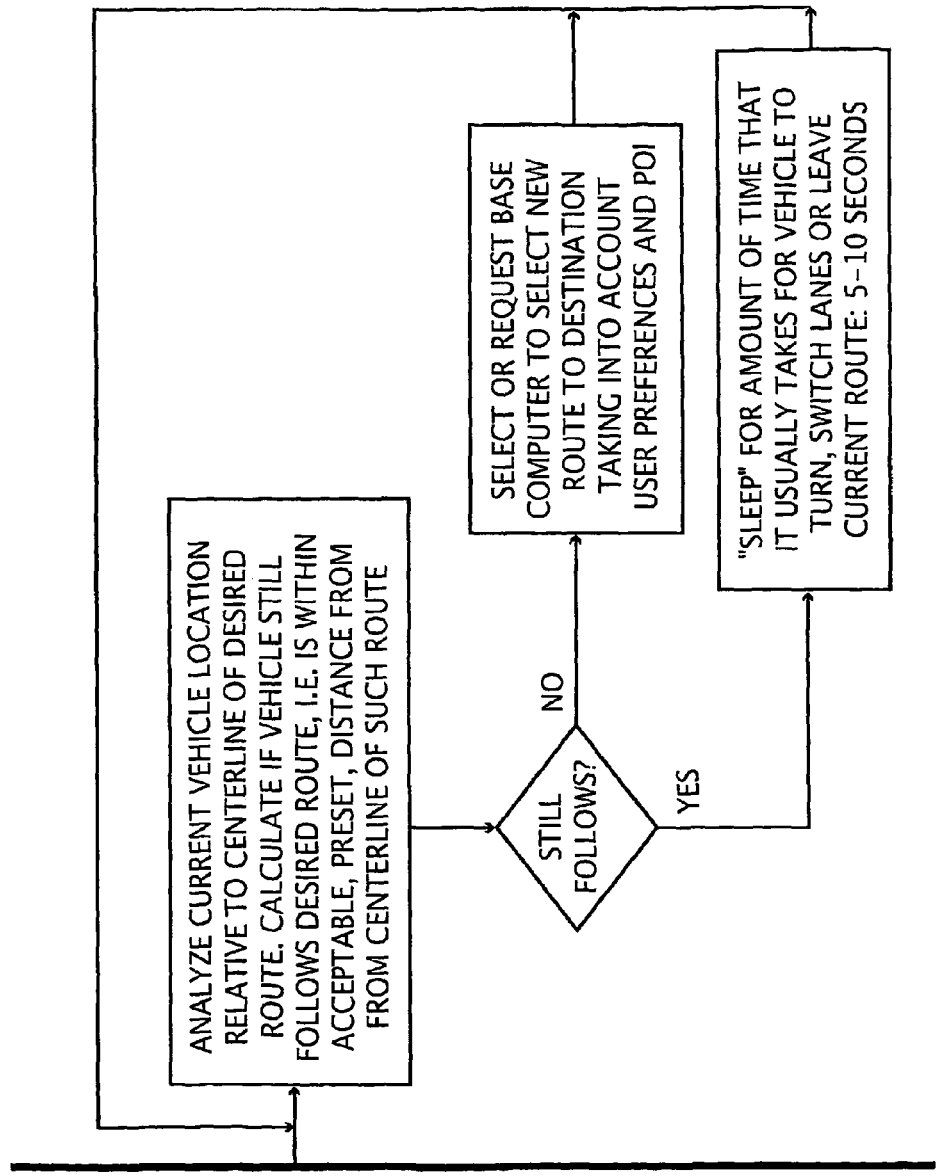
Figure 60F:
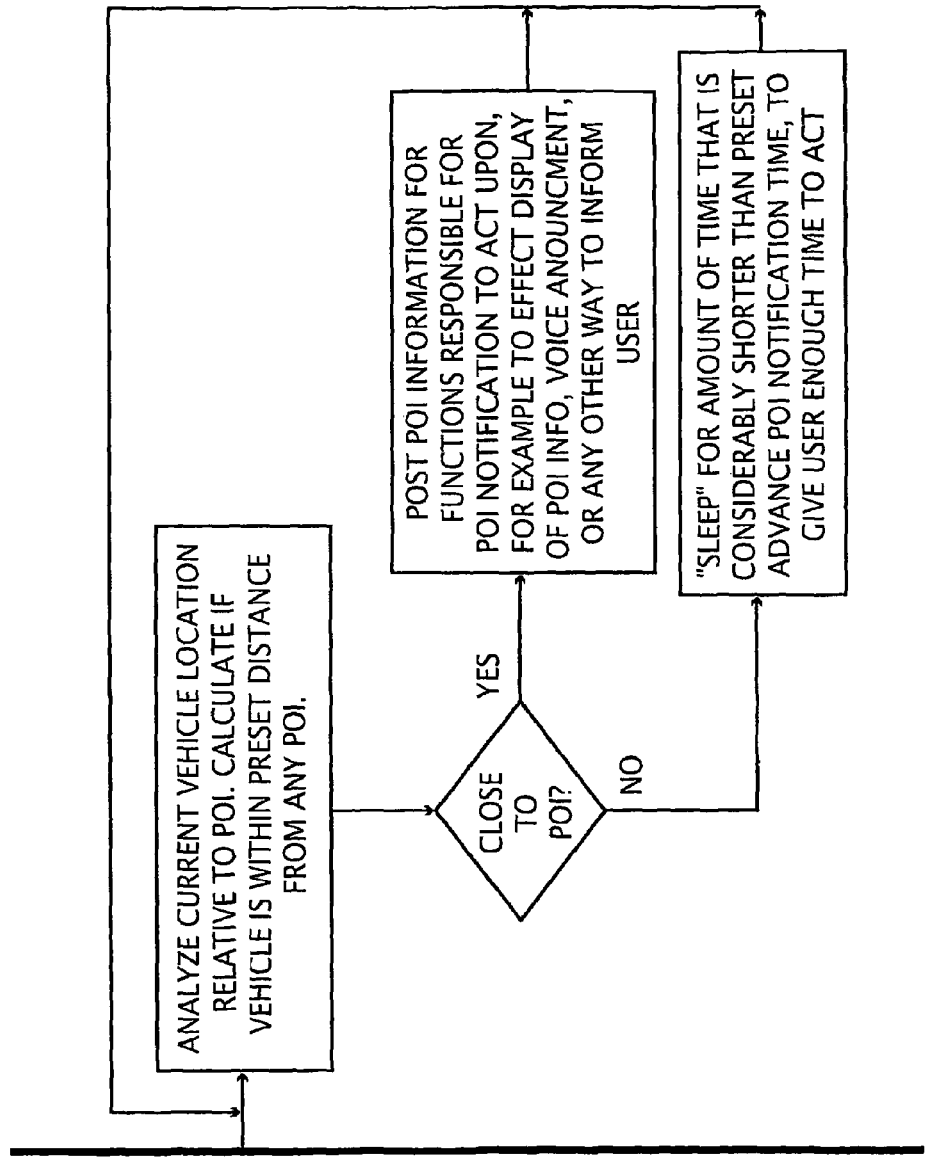
Figure 60G:
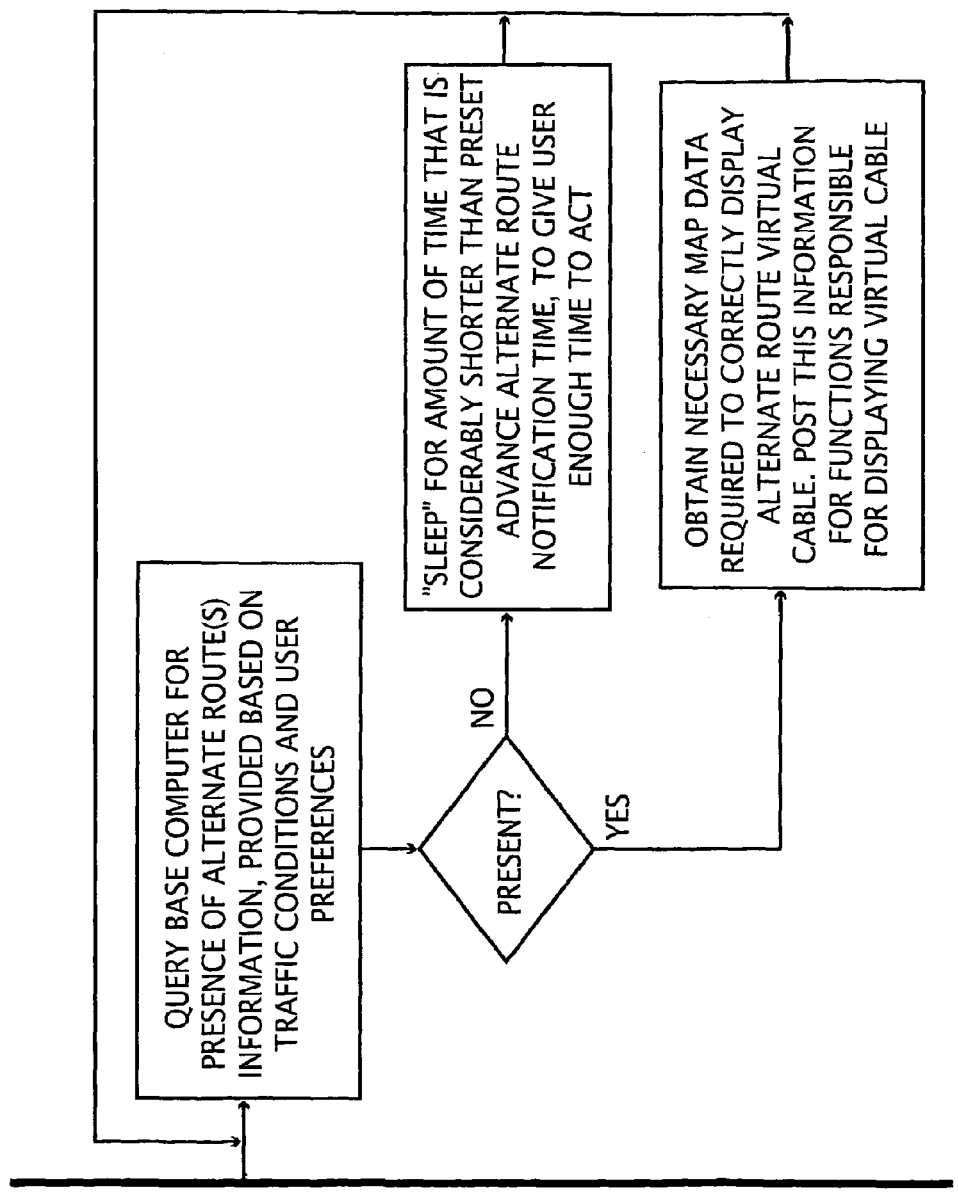
Figure 60H:
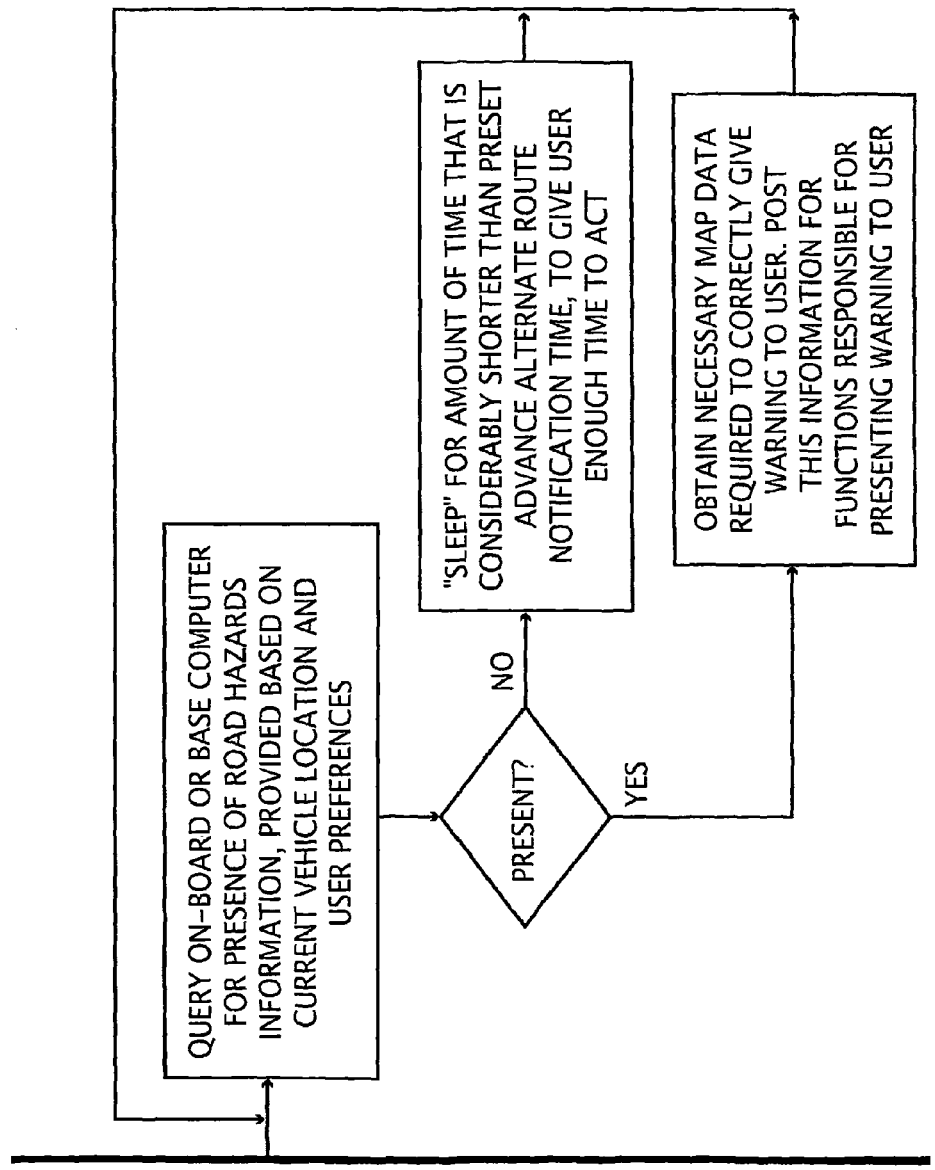
Figure 60I:
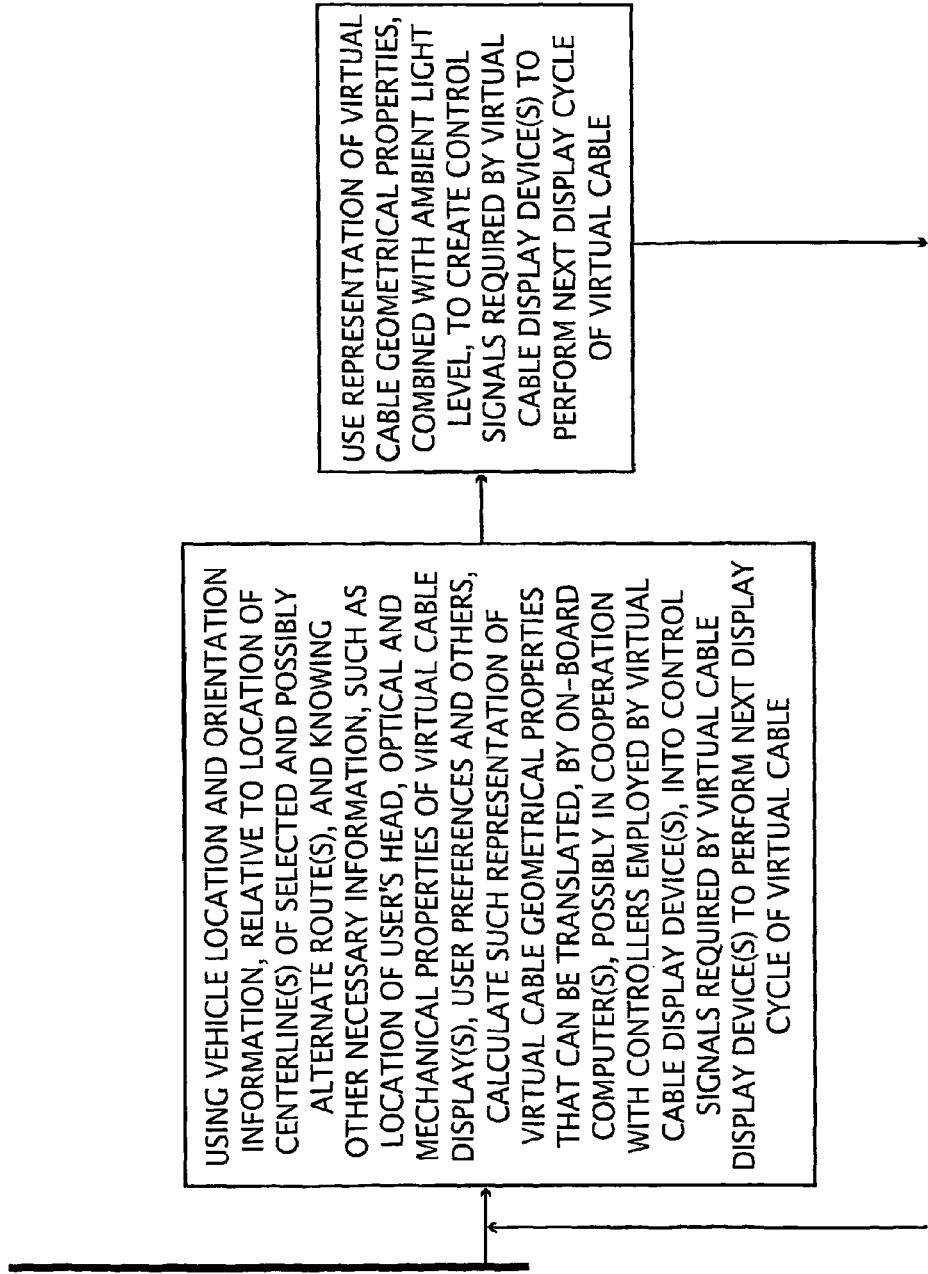

The symbology used in the activity flow diagrams is now explained with reference to FIG. 50. This FIG. does not depict any actual functionality of the system. It is presented simply to explain the symbology employed in the actual activity flow diagrams that follow.

All activity flows are initiated by a) a driver 150 or 170 in a particular role which, for the most part, is a role of the user in carrying out a non-driving function such as inputting information into the system or communicating with a base system operation or b) a base system operator 190 on behalf of the driver. Each activity flow ends in a driver 5001 receiving some kind of stimulus or response or feedback, such as appearance of the virtual cable image, an error message or a noticeable change in the system configuration.

A thin solid line ended with an arrowhead, like lines 5002, represents an activity flow path, with the arrowhead representing the activity flow direction.

An set of activity flow choices is represented by a connected collection of at least two diamonds, such as indicated at 5003. Each such set of choices is flowed into by a single activity flow path 5002. Each diamond represents an activity flow path choice that is made based on human operator input and/or a particular design of the virtual cable apparatus and/or a particular configuration of the virtual cable apparatus.

The merge of two separately originating activity flow paths 5002 into a single activity flow path is represented by two activity flow path symbols coming together, such as indicated at 5004.

Text surrounded by a rectangle, such as 5005, represents a particular activity or related activities, the nature of such activity or activities being described by the text within the rectangle.

A thin dashed line ended with an arrowhead, like line 5006, represents an activity flow path involving wide area communication, such as for example the Internet, cell phone network, a direct radio communication, etc., with the arrowhead representing the activity flow direction.

A thick solid line such as 5007 that has exactly one incoming activity flow path 5002, and at least two incoming activity flow paths 5002 represents the concurrent execution of the activities to which the outgoing symbols point. In this example, then, after activity H concludes, then activities E, G and I are performed concurrently. Activities belonging to such activity flow paths, e.g., activities E, G and I, are performed repetitively, usually "in a loop", until explicitly terminated by some external signal, usually supplied by the designated controlling activity, and may communicate with each other and/or the designated controlling activity. This type of activity structure is usually implemented by taking advantage of the multiprocessing and/or multithreading capabilities of computers and their operating systems.

A thin solid line such as 5008, with exactly one outgoing activity flow path 5002 and at least two outgoing activity flow path 5002 represent a merger of two or more of separately originating activity flow paths into a single activity flow path 5002.

Text surrounded by a large diamond, such as 5009, represents a test of a condition described by the text within the diamond.

With the symbology of the activity flow diagrams of FIGS. 51A through 60J, those diagrams thus understood, the diagrams themselves are self-explanatory and need not be described in further detail herein, given the detailed and comprehensive text contained in the various activity rectangles 5005.

9. Safety Issues

The disclosed system can be used in low light conditions such as darkness or artificial illumination, provided that the driver is able to safely follow the designated route under such light conditions. For example, a driver using the disclosed system in a boat on a lake can operate the boat along a desired route even in total darkness. However, operating a vehicle in such conditions, raises the possibility of collisions with unseen objects. Accordingly, the system may be configured in such a way that when input from ambient light sensors 156c indicates that any forward movement of the vehicle might be dangerous, the virtual cable is turned off.

The driver may have difficulty seeing the virtual cable under very bright light conditions, such as when direct sunlight is shining in the driver's eyes, among others, or where the brightness of the display is not higher than the brightness of the background upon which the virtual cable is displayed. But it is possible that moving ahead under such bright light conditions may be impossible or dangerous irrespective of the driver's ability to observe the virtual cable. Under such conditions the virtual cable image becomes unusable and the driver must rely on other means of navigation, such as a map, voice commands, dashboard screen, or others.

A further safety issue relating to the possibility that a driver may become habituated to the idea of using the virtual cable as a delineator of the road surface underneath it is presented hereinabove. Under that, or possibly other circumstances, however, the system's ability to exactly delineate a particular road surface should not be provided or, if available, it should be disabled. In other words, the virtual cable should serve as delineator of the route rather than the exact delineator of the road surface or a driving lane.

10. Alternative Features

The foregoing describes a particular embodiment of a system embodying the principles of our invention. Other embodiments may implement yet other features or aspects, as is described in this section.

10.1 Depth Cues not Implemented in the Embodiment

The present embodiment implements a set of depth cues that provide a very pronounced impression of the virtual cable being real. There are, however, yet other depth cues that are not implemented in the presently disclosed embodiment that could be implemented, if desired, in order to further enhance the illusion that the virtual cable is real. Among those depth cues are texture gradient, aerial perspective and interposition.

One might implement a texture gradient along the virtual cable, this being is a reduced amount of perceived texture of the virtual cable as a function of the perceived distance of such object from the driver, again enhancing the perception of reality.

Aerial perspective is the slight shift in the perceived hue of objects as a function of the perceived distance of such segments from the driver, such as the apparent bluish or hazy appearance of far-away mountains caused by water and dust particles in the air. Conceivably such a depth cue could be implemented for the virtual cable if desired.

Interposition is the hiding of segments of the virtual cable by other objects. If it were desired to incorporate an interposition feature into the system, the location, dimensions and degree of transparency of permanent objects, such as for example buildings, bridges, groups of trees and others, located near a particular route, could be retrieved from the system's database together with all other route-related information. The advantage of such solution is that no additional hardware would have to be added to the virtual cable apparatus. The disadvantage is that precision of registration of the virtual cable blanked-out sections with the interposing objects needs to be much higher than acceptable registration of the virtual cable with the rest of scenery. Another disadvantage is that only permanent objects could be accounted for. Information on movable objects, such as trucks, could not be included in such database. This disadvantage is relatively minor since most movable objects, such as vehicles, are not tall enough and close enough to the driver to interfere with the virtual cable. And those that are probably obscuring the road ahead in such a way that it would be useful to have some advance information about the road by being presented with the virtual cable. Another major disadvantage of this solution is that having to keep the location, dimensions and possibly the transparency information constantly up to date for all the relevant permanent objects would be a very laborious task since many of such objects do change over time. Even though this feature would add to the perception of reality of the virtual cable, we regard it as preferable not to implement interposition in the system because it would take away from the usefulness of the virtual cable as a navigation tool. One of the advantages of the virtual cable is its ability to delineate to the driver parts of the road that are hidden behind trees, buildings, hills, other vehicles, etc. By providing a more realistic look of the virtual cable wherein all or portions of the virtual cable would disappear in the way that a real cable would, the driver would be deprived of that valuable navigation information.

Instead of the impression of a complete hiding of the virtual cable by opaque objects, an alternative embodiment may provide the impression of semi-transparency of such objects, which could be achieved by lowering of the intensity of the virtual cable in the perceived obscured areas. Such perceived obscured areas could also be displayed using a different type of the virtual cable, for example with a pattern of gaps, similar to appearance of hidden lines in technical drawings. The embodiment of the virtual cable apparatus, as described herein, is capable of supporting the display, as discussed above, of the interposition depth cue. But such apparatus needs to have information as to where along the virtual cable to suppress or alter the virtual cable. This would require information on the location, dimensions and degree of transparency of objects located near or on the desired route. The location information would need to be either absolute or relative to the driver. Based on all such information, combined with the known location of the driver, the system could calculate which parts, if any, of the virtual cable would be obscured by such objects, and display the virtual cable accordingly. Since transparent objects are not very common, the lack of the transparency information would not be critical to the practicality of the system.

The abovementioned location, dimensions and, in some cases, the transparency information, could be obtained from an on-board radar-like system designed to determine the location and dimensions of objects located near or on the desired route. Indeed, there has been a lot of research in the automotive industry devoted to construction of such radar-like systems. Such systems could provide the virtual cable apparatus with the information required to implement an interposition cue provided that such systems have the sufficient range and angular area of coverage. Although this approach could provide information on all relevant objects, even the moving ones, the approach would require use of additional, fairly complex and possibly expensive hardware. If a vehicle were equipped with such hardware for other reasons, such as collision avoidance, then the virtual cable apparatus could obtain the required information from such system at little additional cost. Such a solution would not be able to provide information as to the degree of transparency information of the relevant objects. To provide such information, such systems could be augmented, or even replaced, with a stereoscopic-camera-based systems, which could calculate the distance of the visible objects based on differences in position of such objects in both images.

10.2. Augmented Virtual Cable Presentation Features

Particular arrangements may intuitively alert the driver to the existence of particularly sharp or dangerous turn hidden behind a hill or some other object, such as a building, a large vehicle, trees and many others. Some kind of visual or aural alert could be provided the driver at that time. In addition, the curve in the virtual cable representing such a turn could be exaggerated to some extent, i.e. made sharper, especially if the vehicle is approaching such turn at excessive speed. This would give the driver sufficient time to prepare for the turn and to slow down if necessary.

The system may present the driver with several alternative routes to the same destination. For example, a tourist may want to choose from several alternative scenic routes by correlating them with the surrounding scenery. Or a driver stuck in a traffic jam on a highway may decide to take an exit if the system indicates that taking such exit will result in a reasonable alternative route. Such indication may be accomplished by displaying more than one virtual cable at the same time, each delineating a different route. The alternate virtual cables should be easily distinguishable from the original one. FIG. 9 schematically shows an original virtual cable VC, which is continuous, and one alternate virtual cable $VC_a$, which has easily noticeable gaps. Of course different image type combinations could also be used. As soon as the system senses that the driver actually has followed one of the alternative routes, the original virtual cable should disappear and the chosen alternate virtual cable $VC_a$ would become the new main virtual cable. At such time, the image type of the alternate virtual cable $VC_a$ should change to the image type of the original virtual cable.

In particular embodiments, a specific volumetric navigation object can be made visible to a group of people, such as driver and his passenger(s), or a group of persons walking through an exhibit hall. However, in the embodiments as described herein, each vehicle will be provided with a unique navigation object not visible to drivers/passengers of other vehicles. This way many vehicles can navigate through the same area without their virtual cables interfering with one another.

10.3. Point of Interest Information

Yet another embodiment of the virtual cable may present the driver with solicited or unsolicited point of interest information, such as advertised business locations or partial destinations as specified by the driver. Such presentation may involve displaying some image or text next to the virtual cable. Such text should appear focused at some far distance, so that the driver can read it without having to change the eye focus away from the road ahead. Such presentation may also involve a) a temporary change in the virtual cable image type, such as from a continuous cable to a cable with blinking gaps, b) a voice notification, or c) any other method that would result in informing the driver about a particular point of interest.

If, after seeing or hearing such information, the driver indicates interest, for example by a voice command or pressing a button, the virtual cable could be recalculated to lead the driver to such point of interest. The act of showing to the driver an alternative route, as described earlier, can in itself indicate to the driver the existence of the point of interest. Such showing of the alternative route could be combined with other methods of point of interest notification. The driver could indicate interest in a particular point of interest by simply following such alternate route, as described earlier.

10.4. Augmented Visual and/or Aural Information

If desired, the virtual cable apparatus could be used to display a map, scaled based on the preset driver preferences and/or in response to driver voice commands, showing the current position of the vehicle relative to the destination, the entire or partial route, or a particular point of interest. Such map display might be referred to by the driver during the initial route setup, for example. For safety reasons, however, such a display should only be visible when the vehicle is stopped, or perhaps only outside of an urban environment and then only for a very short period of time, for example for 1 to 3 seconds, with a mandatory outage of at least 10 to 15 seconds in order to force the driver to pay attention to safe driving. Given a virtual cable apparatus with a large enough field of view, such apparatus could be used to display the virtual map image as described in our U.S. Pat. No. 6,272,431. Such virtual map could be used instead of the abovementioned conventional map.

No auditory perception of the driver is required to safely navigate the vehicle while using the virtual cable. A voice interface, however, may be used to augment functions such as specifying and/or changing the route and/or point of interest information, turning on/off the on-board equipment, performing the system configuration, obtaining the point of interest information, obtaining certain safety-related information, among others.

Particular embodiments may enable the driver to use voice to describe the desired destination or route, or to control the system. For example a command "on screen!" could be used to activate the display. Our system could also supplement the graphical info with voice announcement or dedicated sounds, for example to inform the drive about points of interest or warn about road hazards, among others.

10.5. Speed Control

Embodiments of the system may assist the driver in maintaining certain constant speed, such as maximum speed allowed on a given road. A mark or marks, such as small marker beads 416 as schematically shown in FIG. 10, could be displayed as part of the virtual cable and in such a way that such mark or marks would appear to the driver as moving along virtual cable VC at a constant speed $S_1$, measured relative to the surrounding terrain, and in the same direction as the driver. Such speed $S_1$ may represent the maximum speed for the given route, automatically retrieved from the system's database, together with all the other route-related information. Or the driver may specify speed $S_1$ as the current desired speed. If the driver is moving with a speed $S_2$, measured relative to the surrounding terrain, then:

If the speed $S_1$ is smaller than the speed $S_2$ then the abovementioned mark or marks will appear to the driver as moving backwards relative to the driver with the speed $S_3=S_2-S_1$. Based on this observation the driver will know that his/her speed is faster than the maximum or the desired speed $S_1$, and the perception of the speed $S_3$ will give the driver some rough idea of the magnitude of such speed difference.

If the speed $S_1$ is greater than the speed $S_2$ then the abovementioned mark or marks will appear to the driver as moving forwards relative to the driver with the speed $S_3=S_1-S_2$. Based on this observation the driver will know that his/her speed is slower than the maximum or the desired speed $S_1$, and the perception of the speed $S_3$ will give the driver some rough idea of the magnitude of such speed difference.

If the speed $S_1$ is equal to the speed $S_2$ then the abovementioned mark or marks will appear to the driver as stationary relative to the driver. Based on this observation the driver will know that his/her speed is equal to the speed $S_1$.

We believe that such markers should be spaced evenly along virtual cable VC. Such spacing interval could, for example, represent the approximate expected braking distance of the vehicle at the current speed $S_2$. This feature would help the driver in estimating the safe distance from the vehicles ahead, the safe approach speed to intersections, and in any other similar situations. An appropriate adjustment to the expected breaking distance could be made based on weather information as sensed by the system, retrieved from a database or specified by the driver.

10.6. Updating of Map or Other Data

It is possible for systems embodying the invention and in operation within vehicles to generate information that can be used to improve or generate roadway and/or map data by reporting the three-dimensional path of the vehicle and/or by reporting anomalies that the system observes between the actual path taken by a vehicle and a path that the vehicle would have been expected to take based on present map data. Such reporting can be made to a central database, for example, which can in turn update map data that is accessed by other vehicles and or which might be able to determine that the reporting vehicle is malfunctioning because no other vehicles have reported the same anomalies. A central system could then thereby perhaps send a signal to that particular vehicle to warn the driver that the virtual cable apparatus may be malfunctioning.

Collection and analysis of the actual three-dimensional path of the vehicles could simplify maintenance of the related map data. If a number of vehicles recently traveled some path that does represent a known (i.e. stored in the database) road, then this may indicate that such road is drivable and can be shown to the subsequent drivers. If the traffic on a particular road suddenly drops or stops, this may indicate that such road is either congested or blocked, and therefore should not be shown (for some time, for example until cars there begin to move again) to any subsequent drivers using the system. If a number of vehicles is observed to travel some path that does not represent a known road, then this may indicate a need for the database update. It is not be recommended, however, that such update be performed automatically (without any independent verification), since the "new road" may turn out to be a shortcut through a parking lot, or a private/restricted road.

Additionally, points of interest may also be added by a driver either for his own use or for general use by being uploaded to the central database.

10.7. Virtual Cable as Supplement to Automated Collision Avoidance

The virtual cable can be used to enhance certain automated collision avoidance systems currently being developed for motor vehicles. If such systems detect an impending collision, they take over the control of the car, maneuvering it in a safe direction. When such system takes over, there are two possibilities:

One possibility is that the system does not allow the driver to override the automated behavior of a vehicle during the collision avoidance process. In order to be able to make correct decisions regarding the required maneuvers and the best collision avoidance path, such systems must be very sophisticated. For example, such a system must be able to recognize that not avoiding an impeding collision with a large garbage canister that suddenly rolled in to the vehicle's path is better than avoiding the collision by veering off into another lane where, say, a pedestrian crossing the street is standing. The garbage canister would appear much larger and heavier to such system particularly if the pedestrian were a small child, therefore appearing to pose much greater threat to the vehicle and its driver.

Another possibility is that the system allows the driver to override the automated behavior of a vehicle during the collision avoidance process. With this approach the driver could have an opportunity to decide to choose collision with a garbage canister, or maybe even with a garbage truck, rather than run over a child. But the driver does not know what such system has decided to do until the driver is able to observe the actual movement of the vehicle controlled by such system. It may be that the system did not decide to veer off into the lane with the child, but chose to steer off the road instead, since there were no obstacles there. By interfering with such automated behavior the driver may actually precipitate a collision that otherwise could be avoided. On the average, humans are not as good at controlling a car as the modern anti-skid and collision control systems, which, in addition to the very fast steering, can also instantly apply power or breaks independently to each wheel.

The above-mentioned enhancement consists of giving such collision avoidance systems the ability to instantly indicate to the driver of a vehicle the automatically chosen collision-avoidance path of the vehicle as soon as it is chosen, thus giving such driver the opportunity to override such path if necessary.

The virtual cable could be instantly modified or turned on in such a way that virtual cable VC would delineate the collision avoidance path as calculated by the collision avoidance system. This would allow the driver to instantly see where the vehicle is about to maneuver and to override such path if necessary. No other existing en-route guidance information systems are as suitable for such purpose. Voice commands would be too vague and too slow. Map-based displays are too complex to interpret instantly. The head-up-display-based systems, described earlier herein do not provide the impression of the augmented reality that would be required to instantly and accurately recognize the shown location of the collision avoidance path as it relates to the objects ahead. Also some of the head-up-display-based systems display the navigation information in the primary area of sight of the driver, which obscures the very objects that the driver needs to pay attention to during a potential collision.

We believe that the optimum height of the virtual cable used in collision avoidance applications is the "low" setting (as described earlier).

11. Video Demonstration of the Virtual Cable

We hereby incorporate by reference a video presentation that demonstrates aspects of the virtual cable by presenting actual footage of passing terrain taken from a vehicle being driven on the road, and showing how the virtual cable would appear to a driver. The virtual cable shown in the video presentation is a mock-up. It was generated using computer graphics techniques—not by apparatus installed in a vehicle such as that disclosed herein. The position of the virtual cable as shown in the video presentation was determined solely using the computer graphics technique rather than being computed using GPS and vehicle data. The reader may find this video presentation helpful in appreciating the various properties of the virtual cable as described herein. The video can by viewed using QuickTime software from Apple Computer, Inc., available as a free download at www.apple.com. The video can be accessed at the following web site:

http://mvs.net/vc/vc.html

Moreover, the various geometries, colors and the like of the virtual cable and methods of displaying it under various driving and other scenarios are merely illustrative. Other embodiments may implement other geometries and other display paradigms.

The foregoing merely illustrates the principles of the invention. Those skilled in the art will be able to devise numerous alternative arrangements that, although not explicitly shown or described herein, embody those principles and are thus within the spirit and scope of the invention.

The invention claimed is:

1. A head-up display for displaying a three-dimensional image, the head-up display comprising
a projection screen,
light projector apparatus configured to project one or more images onto the projection screen,
viewing optics through which a viewer can view the projection screen, and
a computer, wherein the projection screen is moveable under control of the computer in such a way as to adjust positions of the projection screen and to thereby adjust the distance between the projection screen and the viewing optics during at least a portion each of a succession of refresh periods,
whereby portions of an image projected on the projection screen appear to the viewer to be at particular respective different depths within the three-dimensional image based on the respective positions of the projection screen at the time that those portions are projected on the projection screen.

2. A head-up display according to claim 1,
wherein the projection screen is configured in such a way that said distance between the projection screen and the viewing optics is adjustable over a range of distances,
wherein the computer is configured to periodically cause movement of the projection screen across said range of distances with a predetermined periodic motion over a refresh period corresponding to a particular refresh rate,
and wherein the computer is further configured to cause the movement of the projection screen to vary from said predetermined periodic motion for at least a portion of one or more refresh periods.

3. A head-up display according to claim 2, where the projection screen is configured in such a way that its movement can be paused at any arbitrary position within said range of distances under the control of the computer.

4. A head-up display according to claim 2, wherein the varying from said predetermined periodic motion is such as to cause the projection screen to move more slowly than per said predefined periodic motion for said at least portion of one or more refresh periods, thereby increasing time available to display a particular section of the image while the projection screen location is at or near a position within said range of positions that corresponds to the depth of that particular section within the three-dimensional image.

5. A head-up display according to claim 4, wherein as a result of said projection screen moving more slowly, the perceived luminance of said section of the image is increased.

6. A head-up display according to claim 4, wherein said increasing of the available time for displaying said section of the image is carried out when there would otherwise not be enough time for the light projector apparatus to project said particular section onto the projection screen while the projection screen was at or near the position within its range of distances corresponding to that section's depth within the three-dimensional image.

7. A head-up display for displaying a three-dimensional image of a line, the head-up display comprising
a projection screen,
a vector graphic display projector configured to project an image of the line onto the projection screen,
viewing optics through which a viewer can view the projection screen,
a computer, wherein the projection screen is moveable under control of the computer in such a way as to adjust positions of the projection screen and to thereby adjust the distance between the projection screen and the viewing optics during at least a portion each of a succession of refresh periods, whereby portions of the line appear to the viewer to be at particular respective different depths within the three-dimensional image based on the respective positions of the projection screen at the time that those portions are projected on the projection screen, and
a mechanism for varying, along at least a portion of the line, the thickness of the line as perceived by the viewer, the varying being carried out in such a way as to simulate the perceived thinning of a line that occurs in accordance with the laws of perspective when a line is receding into the distance.

8. A head-up display according to claim 7, where said vector graphic display projector is a laser display projector.

9. A head-up display according to claim 8, wherein the change of the thickness of the displayed line is achieved by varying the focus of the projected line along said at least portion of the line.

10. A head-up display according to claim 9, wherein the head-up display includes a lens controllable to vary said focus.

11. A head-up display comprising
a projection screen,
a laser vector graphic display projector configured to cause a laser beam to project an image of a line onto the projection screen, wherein the laser projector is positioned relative to the projection screen in such a way that the laser beam is substantially non-orthogonal to the projection screen, and
a mechanism for varying the focus of the laser beam during the scanning of the image of the line so as to provide a substantially constant degree of focus along the projected image of the line.

* * * * *